(12) United States Patent
Huo et al.

(10) Patent No.: US 11,109,541 B2
(45) Date of Patent: Sep. 7, 2021

(54) BLOW-SUCTION DEVICE WITH OPERATION MODE ADJUSTMENT MECHANISM

(71) Applicant: Positec Power Tools (Suzhou) Co., Ltd., Suzhou (CN)

(72) Inventors: Lixiang Huo, Suzhou (CN); Xiahong Zha, Suzhou (CN); Fengli Zhao, Suzhou (CN); Shiping Jiao, Suzhou (CN); Guoliang Mou, Suzhou (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 261 days.

(21) Appl. No.: 15/562,500

(22) PCT Filed: Apr. 8, 2016

(86) PCT No.: PCT/CN2016/078886
§ 371 (c)(1),
(2) Date: Sep. 28, 2017

(87) PCT Pub. No.: WO2016/161978
PCT Pub. Date: Oct. 13, 2016

(65) Prior Publication Data
US 2018/0146628 A1    May 31, 2018

(30) Foreign Application Priority Data

Apr. 10, 2014    (CN) .......................... 201520215730.3
Jun. 5, 2015     (CN) .......................... 201510304730.5
(Continued)

(51) Int. Cl.
*A01G 20/47* (2018.01)
*A47L 5/14* (2006.01)
(Continued)

(52) U.S. Cl.
CPC ................ *A01G 20/47* (2018.02); *A47L 5/14* (2013.01); *A47L 5/22* (2013.01); *A47L 5/24* (2013.01);
(Continued)

(58) Field of Classification Search
CPC ... A01G 20/47; A47L 5/14; A47L 5/22; A47L 5/24; A47L 5/28; A47L 9/02;
(Continued)

(56) References Cited

U.S. PATENT DOCUMENTS 4,325,163 A * 4/1982 Mattson .................... A47L 5/14
                                                 15/330
4,817,230 A * 4/1989 Kiyooka ................... A47L 5/14
                                                 15/330
(Continued)

FOREIGN PATENT DOCUMENTS

CN    200981987 Y    11/2007
CN    101135139 A     3/2008
(Continued)

OTHER PUBLICATIONS

International Search Report for international application No. PCT/CN2016/78886 dated Jul. 14, 2016.
(Continued)

*Primary Examiner* — Joseph J Hail
*Assistant Examiner* — Arman Milanian
(74) *Attorney, Agent, or Firm* — Marshall, Gerstein & Borun LLP

(57) ABSTRACT

The present invention relates to a blowing-suction device. The blowing-suction device includes: a housing, having a first opening connected to the outside; an air tube, connected to the housing; an air flow generation apparatus that operably generates an air flow, where when the blowing-suction device is in the blowing mode, the air flow is blown out from
(Continued)

the air tube, or when the blowing-suction device is in the suction mode, the air flow is sucked from the air tube; and a collection apparatus, configured to collect an object sucked by the blowing-suction device in the suction mode, where the collection apparatus is connected to the first opening both in the blowing mode and in the suction mode, and the collection apparatus further includes an air admission portion, and in the blowing mode, the air admission portion is open; or in the suction mode, the air admission portion is closed.

10 Claims, 79 Drawing Sheets

(30) Foreign Application Priority Data

| Date | Country | Number |
|---|---|---|
| Aug. 13, 2015 | (CN) | 201510493734.2 |
| Aug. 24, 2015 | (CN) | 201510523696.0 |
| Nov. 6, 2015 | (CN) | 201510752534.4 |
| Nov. 28, 2015 | (CN) | 201510846810.3 |
| Feb. 5, 2016 | (CN) | 201610081528.5 |
| Apr. 6, 2016 | (CN) | 201610209616.9 |
| Apr. 6, 2016 | (CN) | 201610209621.X |
| Apr. 6, 2016 | (CN) | 201610209622.4 |
| Apr. 6, 2016 | (CN) | 201610210027.2 |
| Apr. 6, 2016 | (CN) | 201620278780.0 |
| Apr. 6, 2016 | (CN) | 201620278901.1 |
| Apr. 6, 2016 | (CN) | 201620279413.2 |

(51) Int. Cl.

| | |
|---|---|
| *A47L 5/24* | (2006.01) |
| *A47L 9/02* | (2006.01) |
| *A47L 9/10* | (2006.01) |
| *A47L 9/28* | (2006.01) |
| *E01H 1/08* | (2006.01) |
| *A47L 5/22* | (2006.01) |
| *A47L 5/28* | (2006.01) |
| *A47L 9/14* | (2006.01) |
| *F04D 25/06* | (2006.01) |
| *F04D 25/08* | (2006.01) |
| *F04D 29/54* | (2006.01) |

(52) U.S. Cl.
CPC .................. *A47L 5/28* (2013.01); *A47L 9/02* (2013.01); *A47L 9/149* (2013.01); *A47L 9/1427* (2013.01); *A47L 9/2857* (2013.01); *A47L 9/2889* (2013.01); *E01H 1/0809* (2013.01); *E01H 1/0836* (2013.01); *E01H 1/0863* (2013.01); *E01H 2001/0881* (2013.01); *F04D 25/06* (2013.01); *F04D 25/08* (2013.01); *F04D 29/545* (2013.01)

(58) Field of Classification Search
CPC ...... A47L 9/1427; A47L 9/149; A47L 9/2857; A47L 9/2889; E01H 1/0809; E01H 1/0836; E01H 1/0863; E01H 2001/0881; F04D 25/06; F04D 25/08; F04D 25/545
USPC .......................................................... 15/330
See application file for complete search history.

(56) References Cited

U.S. PATENT DOCUMENTS

| | | | | |
|---|---|---|---|---|
| 5,222,275 | A * | 6/1993 | Baker | A47L 5/14 |
| | | | | 15/329 |
| 5,440,781 | A | 8/1995 | Kitazawa et al. | |
| 5,701,632 | A * | 12/1997 | Webster | A47L 5/14 |
| | | | | 15/330 |
| 5,894,630 | A * | 4/1999 | Bitner | A01G 20/47 |
| | | | | 15/330 |
| 6,141,824 | A * | 11/2000 | Fujiwara | A47L 5/14 |
| | | | | 15/330 |
| 6,622,341 | B2 * | 9/2003 | Jong | A47L 5/14 |
| | | | | 15/338 |
| 6,735,813 | B2 * | 5/2004 | Oohama | A47L 5/14 |
| | | | | 15/327.5 |
| 7,748,078 | B2 * | 7/2010 | Andriolo | E01H 1/0836 |
| | | | | 15/330 |
| 7,870,640 | B2 * | 1/2011 | Hinklin | A47L 5/14 |
| | | | | 15/330 |
| 9,918,601 | B2 * | 3/2018 | Tate | A47L 5/14 |
| 2002/0108207 | A1 | 8/2002 | Oohama | |
| 2015/0283979 | A1 * | 10/2015 | Oh | A47L 7/0076 |
| | | | | 15/330 |
| 2016/0238010 | A1 * | 8/2016 | Schaffter | E01H 1/08 |

FOREIGN PATENT DOCUMENTS

| | | | |
|---|---|---|---|
| CN | 201632451 | U | 11/2010 |
| CN | 101135139 | B | 1/2011 |
| CN | 101322625 | B | 1/2011 |
| CN | 201972129 | U | 9/2011 |
| CN | 102415852 | A | 4/2012 |
| CN | 102647045 | A | 8/2012 |
| CN | 103300790 | A | 9/2013 |
| CN | 103321171 | A | 9/2013 |
| CN | 103554413 | A | 1/2014 |
| CN | 103850206 | A | 6/2014 |
| CN | 103864221 | A | 6/2014 |
| CN | 103866725 | A | 6/2014 |
| CN | 105648959 | A | 6/2016 |
| CN | 105648960 | A | 6/2016 |
| CN | 105648961 | A | 6/2016 |
| CN | 105648962 | A | 6/2016 |
| CN | 105648963 | A | 6/2016 |
| CN | 105648964 | A | 6/2016 |
| DE | 19608376 | A1 | 9/1997 |
| EP | 0792578 | A2 * | 9/1997 ............... A47L 5/14 |
| EP | 0922429 | A2 | 6/1999 |
| EP | 3225740 | A1 | 10/2017 |
| GB | 2304549 | A | 3/1997 |
| JP | 2558617 | B2 | 11/1996 |

OTHER PUBLICATIONS

Supplementary European Search Report for International Application No. PCT/CN2016/078886, dated Dec. 19, 2018.

\* cited by examiner

BLOW-SUCTION DEVICE WITH OPERATION MODE ADJUSTMENT MECHANISM

CROSS-REFERENCE TO RELATED APPLICATIONS

This is the United States National Phase of International Patent Application No. PCT/CN2016/078886, filed Apr. 8, 2016, which claims the benefit of priority of Chinese Patent Application Nos.: CN201520215730.3 filed Apr. 10, 2015; CN201510304730.5 filed Jun. 5, 2015; CN201510493734.2 filed Aug. 13, 2015; CN201510523696.0 filed Aug. 24, 2015; CN201510752534.4 filed Nov. 6, 2015; CN201510846810.3 filed Nov. 28, 2015; CN201610081528.5 filed Feb. 5, 2016; CN201610209622.4 filed Apr. 6, 2016; CN201620279413.2 filed Apr. 6, 2016; CN201610209621.X filed Apr. 6, 2016; CN201620278780.0 filed Apr. 6, 2016; CN201620278901.1 filed Apr. 6, 2016; CN201610210027.2 filed Apr. 6, 2016; and CN201610209616.9 filed Apr. 6, 2016. The entirety of each of the foregoing priority applications is hereby incorporated by reference herein.

FIELD OF THE DISCLOSURE

The present invention relates to a blowing-suction device having a blowing function and a suction function.

BACKGROUND

A blowing-suction device is a common electric outdoor cleaning tool mainly configured to clean and collect rubbish such as leaves. The blowing-suction device usually has a blowing mode and a suction mode. In the blowing mode, the blowing-suction device blows out wind, so that leaves scattered on the ground may be gathered. However, in the suction mode, the blowing-suction device generates a suction force, and in cooperation with a collection apparatus, the blowing-suction device may suck leaves into the collection apparatus, so that manual cleaning is avoided, thereby saving manpower and time. The collection apparatus may be a portable carry-on rubbish bag, or may be a relatively large rubbish bin that can store a relatively large quantity of leaves at once. Therefore, a user may free to select whether the blowing-suction device is in the suction mode or the blowing mode according to an actual working condition. An advantage is that a user can complete leaves gathering and collection by using only one blowing-suction device without another additional tool.

However, for a conventional blowing device having only a blowing function, because the conventional blowing device does not have a suction mode, after a user uses the blowing function to gather leaves, the user still needs to collect gathered leaves into a collection apparatus by means of another tool. The another tool herein is, for example, a vacuum cleaner or a manual tool. Therefore, relatively more tools are required, and operations are relatively complex. This is the advantage of the blowing-suction device compared with the conventional blowing device.

However, the blowing-suction device also has disadvantages. Because the blowing-suction device implements two different functions: blowing and suction functions, characteristics of the two functions need to be considered. Moreover, blowing performance and suction performance need to be improved as much as possible. Consequently, a structure of the blowing device cannot be directly used. In addition, the blowing-suction device needs to be frequently switched between the blowing mode and the suction mode, so that a mode switching process needs to be simplified as much as possible, thereby facilitating use of the blowing-suction device by a user and improving user experience.

The US patent U.S. Pat. No. 4,870,714 discloses a blowing-suction device, and the blowing-suction device has a blowing function and a suction function. When the blowing function is performed, a blower tube is connected to a radial location of a fan; or when the suction function is performed, a suction tube is connected to an axial location of the fan. Such a design has the following disadvantages: 1. First, the blower tube and the suction tube are not a same tube, so that a user needs to equip two tubes: the blower tube and the suction tube, to implement the blowing and suction functions. If the tube is lost, a particular function cannot be performed. Moreover, two tubes certainly occupy larger storage space and higher costs. 2. During blowing-suction mode switching, the installed blower tube/suction tube needs to be removed first, and then the suction tube/blower tube is installed. That is, an air tube needs to be replaced during the blowing-suction mode switching. This is greatly inconvenient for the user to operate. 3. The blower tube and the suction tube need to be installed at different positions on the blowing-suction device, resulting in a complex entire structure. Therefore, a structure of the blowing-suction device needs to be optimized, so that the structure is more compact, the user operates the blowing-suction device more conveniently, and the entire blowing-suction device is smaller, thereby satisfying a requirement of the user.

In recent years, a blowing-suction device whose structure is different from the foregoing conventional structure appears on the market. In the blowing-suction device, a same air tube is used to blow and suck, and a direction of an air flow in the air tube is changed by changing a rotation direction of a fan, thereby implementing switching between a blowing mode and a suction mode. At an air vent that is connected to the outside and that is on a housing of the blowing-suction device, in the blowing mode, a security shield is installed; or in the suction mode, a collection apparatus is installed. The structure of the blowing-suction device is optimized, so that the structure is more compact, a user operates the blowing-suction device more conveniently, and the entire blowing-suction device is smaller. In the blowing-suction device, a switch that controls forward and reverse rotation of a motor is disposed outside of the housing. For example, the switch has three steps 0, 1, and 2. When the switch is at the step 0, the motor stops working. When the user needs a blowing function, the security shield is installed at the air vent when the switch is at the step 0, and then the switch is switched to the step 1, so that the motor drives the fan to rotate in a clockwise direction, and an air flow is blown out along the air tube. After scattered leaves are blown together, the leaves need to be further collected into the collection apparatus. Therefore, the switch is switched to the step 0 to stop the motor, then the security shield at the air vent is replaced with the collection apparatus, and the switch is switched to the step 2, so that the motor drives the fan to rotate in a counterclockwise direction, and an air flow sucks the leaves from the outside into the collection apparatus along the air tube.

However, the blowing-suction device also has corresponding disadvantages. When the security shield is installed at the air vent, if the user switches the switch to the step 2 by mistake, the blowing-suction device is switched to the suction mode. As a result, the blowing-suction device is blocked. When the collection apparatus is installed at the air vent, if the user switches the switch to the position 1 by mistake, the blowing-suction device is switched to the blowing mode. As a result, pressure in the collection apparatus is excessively low. If the collection apparatus is a dust-collection bag, the dust-collection bag is sucked into the air vent. Moreover, when neither the security shield nor the collection apparatus is installed at the air vent, if the user switches the switch to the step 1 or step 2 by mistake, the rotated fan may be dangerous to the operator.

Therefore, it needs to be ensured that mode switching is performed only when the blowing-suction device is in a corresponding condition, so as to avoid blowing-suction device faults and user security hazards, thereby improving user experience.

SUMMARY

In view of this, one of objectives of the present invention is to provide a blowing-suction device that can be easily used by a user and has a simple structure.

To achieve the foregoing objective, a technical solution used in present invention is: a blowing-suction device, including: a housing, having a first opening connected to the outside; an air tube that is connected to the housing and has a tube opening connected to the outside; and an air flow generation apparatus that operably generates an air flow, where when the blowing-suction device is in a blowing mode, the air flow enters the housing from the first opening and is blown out from the tube opening; or when the blowing-suction device is in a suction mode, the air flow enters the air tube from the tube opening and is blown out from the first opening.

Preferably, there is only one air tube, and when the blowing-suction device is in the blowing mode or the suction mode, a position at which the air tube is connected to the housing does not change.

Preferably, the tube opening is located at one end of the air tube, and the other end of the air tube is provided with a connector connected to the housing.

Preferably, the air tube further includes a bent portion provided near the tube opening.

Preferably, the air tube has a length ranging from 500 mm to 800 mm.

Preferably, the air tube includes: a first section and a second section that are detachable, and a fixing structure configured to fixedly connect the first section to the second section is further disposed between the first section and the second section.

Preferably, the fixing structure includes: an elastic clamping part disposed on one of the first section and the second section, and a shape-fitting structure that is configured to shape-fit the clamping part and that is disposed on the other one of the first section and the second section.

Preferably, the housing further has an interface connected to the air tube, and when the blowing-suction device is in the blowing mode or the suction mode, the air tube is connected to the interface.

Preferably, there is only one interface.

Preferably, an orientation of the interface is opposite to an orientation of an opening of the first opening.

Preferably, in the blowing mode, air moves from the first opening to the interface in a straight line; or in the suction mode, air moves from the interface to the first opening in a straight line.

Preferably, in the blowing mode and the suction mode, air moves between the first opening and the interface in opposite directions.

Preferably, the interface and the first opening are located on two opposite sides of the air flow generation apparatus.

Preferably, the air flow generation apparatus includes: a fan and a motor configured to drive the fan to rotate, and the fan can rotate around a fan axis in different directions, so that air flows moving in different directions are generated.

Preferably, the fan includes an axial flow fan, and a movement direction of an air flow generated by the axial flow fan is parallel to an axial direction of the fan.

Preferably, the fan includes a mixed flow fan, and the mixed flow fan can generate an air flow that moves in an extension direction of the fan axis.

Preferably, the fan axis of the fan extends through the first opening.

Preferably, the housing further has an interface connected to the air tube, and the fan axis passes through the interface.

Preferably, projections, on a plane perpendicular to the fan axis of the fan, of the first opening and the tube opening are at least partially overlapped.

Preferably, projections, on the plane perpendicular to the fan axis, of the first opening and the interface are at least partially overlapped.

Preferably, the air flow generation apparatus includes a counter-rotating axial-flow mechanism and a motor that drives the counter-rotating axial-flow mechanism, and the counter-rotating axial-flow mechanism can be driven to generate air flows moving in different directions.

Preferably, the counter-rotating axial-flow mechanism includes: a first axial flow fan and a second axial flow fan that are adjacently disposed, and the motor drives the first axial flow fan and the second axial flow fan to rotate in opposite directions simultaneously.

Preferably, the first axial flow fan and the second axial flow fan separately includes several blades, and rotation directions of the blade of the first axial flow fan and the blade of the second axial flow fan are opposite.

Preferably, a rotation axis of the first axial flow fan and a rotation axis of the second axial flow fan are overlapped.

Preferably, the motor includes: a first motor connected to the first axial flow fan and a second motor connected to the second axial flow fan; and the blowing-suction device further includes a control mechanism that controls the first motor and the second motor, and the control mechanism controls the first motor and the second motor to rotate in different directions.

Preferably, the blowing-suction device further includes a transmission apparatus connected to the first axial flow fan and the second axial flow fan, and the transmission apparatus is driven by the motor to drive the first axial flow fan and the second axial flow fan to rotate in opposite directions.

Preferably, the transmission apparatus includes: a coupling shaft connected to the motor, and a first gear set and a second gear set that are engaged with and connected to the coupling shaft in different rotation directions, where the first gear set and the second gear set are respectively connected to the first axial flow fan and the second axial flow fan.

Preferably, when the blowing-suction device is in the blowing mode, the fan rotates around the fan axis in a clockwise direction; or when the blowing-suction device is in the suction mode, the fan rotates around the fan axis in a counterclockwise direction.

Preferably, the motor is located between the fan and the first opening, so that the distance between the motor and the first opening is less than the distance between the fan and the first opening.

Preferably, the fan, the motor, and the first opening are sequentially arranged in a straight line.

Preferably, the housing further has an interface connected to the air tube; and the interface, the fan, the motor, and the first opening are sequentially arranged in a straight line.

Preferably, the blowing-suction device further includes a shredding mechanism disposed between the axial flow fan and the tube opening, and the shredding mechanism is configured to shred an object sucked from the tube opening.

Preferably, the shredding mechanism is driven by the motor to rotate around a rotation axis.

Preferably, the rotation axis and the fan axis are set to be overlapped.

Preferably, the shredding mechanism includes a cutting blade that can rotate round the rotation axis.

Preferably, the cutting blade extends in a longitudinal direction perpendicular to the rotation axis; the cutting blade includes: an installation portion in the middle of the cutting blade and two working portions longitudinally extending in a direction opposite to the installation portion; and the working portion includes a cutting portion configured to cut an object.

Preferably, the installation portion has a flat rectangular-shaped mounting hole.

Preferably, the two working portions are symmetrically disposed relative to the center of the rotation axis.

Preferably, each working portion includes: an end portion located at a longitudinal end, and a first side edge and a second side edge that are oppositely disposed between the end portion and the installation portion. The cutting portion is located on the first side edge.

Preferably, the second side edge is set to be bent respectively in the longitudinal direction and a transverse direction, so that the second side edge forms a curl relative to the first side edge.

Preferably, the second side edge is set to be inclined relative to the first side edge, so that the transverse length from the installation portion to the end portion gradually narrows.

Preferably, the first side edge and the second side edge are set to be arc-shaped, so that the cutting blade is S-shaped.

Preferably, the shredding mechanism includes at least two cutting blades that are disposed at an interval in an extension direction of the rotation axis.

Preferably, a ratio of an area of a projection of the cutting blade on the air tube to an cross sectional area of the air tube is less than ½.

Preferably, the shredding mechanism includes a trimmer rope made of a flexible material.

Preferably, the shredding mechanism includes: an impeller disposed around the rotation axis, and a cutting blade eccentrically disposed on the impeller.

Preferably, the shredding mechanism further includes a blade that is optionally expanded or retracted.

Preferably, the blowing-suction device further includes a duct that guides the air flow to pass through; and the duct includes: an air guide entity extending in the longitudinal direction, stationary blades distributed in a circumferential direction relative to the air guide entity, and an air guide cover for accommodating the air guide entity and the stationary blade.

Preferably, the fan and the shredding mechanism are respectively located on opposite sides of the duct.

Preferably, the shredding mechanism, the duct, and the fan are sequentially arranged in a straight line.

Preferably, the duct is located on one side that is of the fan and that is away from the first opening.

Preferably, the blowing-suction device further includes a transmission rod that pass through the inside of the air guide entity and that is axially connected to the shredding mechanism and the axial flow fan.

Preferably, a minimum distance between the shredding mechanism and the stationary blade is 10-20 mm.

Preferably, the stationary blade is located between the air guide entity and the air guide cover in a radial direction, and the air flow passes through between the air guide entity and the air guide cover.

Preferably, the stationary blade is disposed to be inclined at a particular angle relative to the movement direction of the air flow.

Preferably, the angle is 5-15 degrees.

Preferably, there are seven stationary blades and the stationary blades are evenly distributed in the circumferential direction.

Preferably, the blowing-suction device further has: an accommodating cavity that accommodates the duct and a mobile mechanism that operably moves the duct, and the mobile mechanism enables the duct to switch between a first position at which the air flow is guided to pass through and a second position which is in the accommodating cavity.

Preferably, a vibration reduction mechanism is disposed between the air guide cover and the housing.

Preferably, the vibration reduction mechanism is an O-shaped ring around the air guide cover.

Preferably, a material of the vibration reduction mechanism is an elastic rubber material.

Preferably, the periphery of the air guide cover is provided with a limiting slot, and the vibration reduction mechanism is located in the limiting slot.

Preferably, the housing is further provided with a limiting step configured to clamp to the limiting slot.

Preferably, a transmission shaft that is driven by the motor and a support bearing that supports the transmission shaft are disposed in the air guide cover.

Preferably, the blowing-suction device further includes a vibration reduction mechanism disposed between the support bearing and the air guide cover.

Preferably, the vibration reduction mechanism is made of an elastic material.

Preferably, the vibration reduction mechanism is a rubber cap sleeved on the support bearing.

Preferably, the vibration reduction mechanism is a rubber ring around the support bearing.

Preferably, an air flow channel for the air flow to move is formed between the first opening and the tube opening, and the motor and the air flow channel are disposed to be separated from each other.

Preferably, the motor is located in the air flow passage, and the blowing-suction device further includes a motor cover that separates the motor from the air flow passage.

Preferably, the air flow passes through between the motor cover and the housing.

Preferably, the blowing-suction device further includes a cooling channel configured to cool the motor in the motor cover, and the cooling channel is independently disposed relative to the air flow channel.

Preferably, the cooling channel includes: an air inlet and an air outlet that are disposed on the housing, and the air inlet and the air outlet are both independently disposed on the first opening.

Preferably, the motor cover is provided with a cooling outlet, and the cooling outlet is set to be aligned to the air outlet, so that cooling air directly passes through the air outlet after being discharged from the cooling outlet.

Preferably, the motor cover further includes several protrusion portions protruding from the motor cover, the protrusion portion abuts against the air outlet on the housing, and the cooling outlet is located on the protrusion portion.

Preferably, the motor cover extends in the longitudinal direction, and the protrusion portion extends in a radial direction perpendicular to the longitudinal direction.

Preferably, the air outlet and the cooling outlet are arranged in the circumferential direction.

Preferably, the motor cover is further provided with a cooling inlet, a guide channel is further provided between the cooling inlet and the air inlet, and the guide channel and the air flow channel are disposed to be separated from each other.

Preferably, the blowing-suction device further includes a duct configured to guide the air flow to pass through; and the duct includes: a air guide entity extending in the longitudinal direction, stationary blades disposed in a circumferential direction relative to the air guide entity, and an air guide cover for accommodating the air guide entity and the stationary blade, where the air flow passes through the inside of the air guide cover.

Preferably, the guide channel is formed between the air guide cover and the housing.

Preferably, the blowing-suction device further includes a cooling fan located in the motor cover, and the cooling fan rotates to generate a cooling air flow.

Preferably, the motor cover further includes a transmission interface for a motor shaft to pass out, so that the motor shaft is connected to a fan located outside of the motor cover.

Preferably, the motor cover includes two half-housings that can be fixedly connected to each other.

Preferably, the motor cover is located on one side that is of the fan and that is close to the first opening.

Preferably, the motor is located outside of the air flow channel.

Preferably, the motor controllably rotates around the motor shaft in a clockwise or a counterclockwise direction and when rotating in the clockwise direction, the motor drives the fan to rotate in a first direction; or when rotating in the counterclockwise direction, the motor drives the fan to rotate in a second direction.

Preferably, the blowing-suction device further includes a control switch that controls a rotation direction of the motor, and the control switch optionally controls the motor to rotate in the clockwise direction or the counterclockwise direction.

Preferably, the housing has a handle configured for grasping, and the control switch is disposed on the handle.

Preferably, the control switch has at least three operation positions, where at a first operation position, the control switch controls the motor to rotate in the clockwise direction; at a second operation position, the control switch disables rotation of the motor; and at a third operation position, the control switch controls the motor to rotate in the counterclockwise direction.

Preferably, the blowing-suction device further includes a security switch that linked with the control switch, and only when the security switch is triggered, the control switch controls the motor to rotate.

Preferably, the housing further has an interface connected to the air tube, and when the air tube is connected to the interface, the security switch is triggered.

Compared with the prior art, a beneficial effect of the present invention is that, in the blowing-suction device, blowing-suction mode switching is implemented by controlling the fan or the air flow generation apparatus to generate air flows moving in different directions, thereby improving operation convenience. In addition, by means of one air tube, a same air duct is used in the blowing mode or the suction mode, so that a blowing function and a suction function are implemented by using only one air tube, thereby simplifying the structure of the entire blowing-suction device.

One of objectives of the present invention is to provide a blowing-suction device that can be easily used by a user and has a simple structure.

To achieve the foregoing objective, the technical solution used in the present invention is: a blowing-suction device that optionally works in a blowing mode or a suction mode, including: a housing; an air tube, connected to the housing in the blowing mode and the suction mode; and an air flow generation apparatus that operably generates an air flow, where in the blowing mode, the air flow is blown out from the air tube; or in the suction mode, the air flow is sucked from the air tube; an air flow channel is formed by the housing and the air tube; and in the blowing mode and the suction mode, the air flow moves in the air flow channel.

Compared with the prior art, a beneficial effect of the present invention is that in the blowing-suction device, air flow passes through the same air flow channel in the blowing mode or the suction mode, so that during blowing-suction mode switching, no additional operation is required to change the air flow channel. Therefore, it is more convenient for a user to use the blowing-suction device.

One of objectives of the present invention is to provide a method for assembling a blowing-suction device, including the following steps: P1: assembling an air flow generation apparatus; P2: assembling the air flow generation apparatus into a housing; and P3: connecting an air tube to the housing, so that the air flow generation apparatus generates an air flow, where when the blowing-suction device is in a blowing mode, the air flow enters from a first opening of the housing and is blown out from a tube opening of the air tube; or when the blowing-suction device is in a suction mode, the air flow is sucked from the tube opening of the air tube and is exhausted from the first opening of the housing.

Preferably, step P1 includes the following steps: S1: assembling a first component, where step S1 includes the following steps: S11: installing a fan at a first end of a transmission mechanism, S12: inserting the transmission mechanism into a duct, and penetrating a second end of the transmission mechanism out of the duct, where the second end and the first end are oppositely disposed, and S13: installing a shredding mechanism at the second end of the transmission mechanism; S2: assembling a second component, where step S2 includes the following steps: S21: fixedly installing a motor into a half-housing of a motor cover, and S22: splicing and fixing another half-housing of the motor cover to the half-housing of the motor cover in S21; and S3: coupling a motor shaft of the second component to the fan in the first component.

Preferably, step P2 includes the following steps: S4: installing the first component and the second component into a half-housing of a housing; and S5: splicing and fixing another half-housing of the housing to the half-housing of the housing in S4.

Preferably, in step S5, the half-housings of the housing are fixedly connected to each other by using a screw.

Preferably, the fan is coupled to the first end of the transmission mechanism by using a flat rectangular structure.

Preferably, in step S11, a support bearing is installed on the transmission mechanism.

Preferably, the support bearing is installed between the first end and the second end of the transmission mechanism.

Preferably, in step S12, the support bearing is inserted into the duct, and the support bearing abuts against a support step in the duct.

Preferably, in step S12, there are at least two support bearings.

Preferably, in step S13, the shredding mechanism is fitted and installed at the second end of the transmission mechanism by using a flat rectangular structure.

Preferably, in step S13, a limiting pin for limiting a movement of the shredding mechanism is installed at the second end.

Preferably, in step S21, the motor shaft of the motor at least partially passes out the half-housing of the motor cover.

Preferably, in step S22, the half-housings of the motor cover are fixedly connected by using a screw.

Preferably, in step S3, the motor shaft is axially connected to the fan in a rectangular fitting manner.

Preferably, in step S3, the motor shaft is axially connected to the fan in a spline fitting manner.

Compared with the prior art, a beneficial effect of the present invention is that the method for assembling the blowing-suction device is simpler and more convenient.

One of objectives of the present invention is to provide a blowing-suction device in which a cooling channel and an air flow channel are sealed and separated.

To achieve the foregoing objective, the technical solution used in the present invention is: a blowing-suction device, including: a housing, having a first opening; an air tube that is connected to the housing and has a second opening; a fan that rotates to generate an air flow, where an air flow channel for the air flow to move is formed between the first opening and the second opening; and a motor, located in the housing and configured to drive the fan to rotate, where the blowing-suction device further includes a motor cover accommodating the motor, the air flow channel is located outside of the motor cover, the blowing-suction device further includes a cooling channel configured to cool the motor, and the cooling channel is separated from the air flow channel.

Preferably, the motor cover includes a transmission interface that accommodates a motor shaft to pass through, the blowing-suction device further includes a sealing part disposed on the transmission interface, and the sealing part separates the air flow channel from the cooling channel.

Preferably, the sealing part is of a barrel-shaped structure, one end of the sealing part is connected to the transmission interface, and the other opposite end is connected to a support structure that supports the motor.

An objective of the present invention is to provide a blowing-suction device whose control switch can be triggered, by a security shield or a collection apparatus, to switch to a blowing mode or a suction mode.

To achieve the foregoing objective, the technical solution used in the present invention is: a blowing-suction device, having a blowing mode and a suction mode, where the blowing-suction device includes: a housing, having a first opening connected to the outside; a motor, configured to generate rotation power; a fan that is driven by the motor to rotate around a fan axis to generate an air flow; a security shield, connected to the first opening in the blowing mode; a collection apparatus, connected to the first opening in the suction mode; and a control switch, configured to control a rotation direction of the motor, where in the blowing mode, the security shield triggers the control switch to be at a first operation position at which the control switch controls the fan to rotate in a first direction; or in the suction mode, the collection apparatus triggers the control switch to be at a second operation position at which the control switch controls the fan to rotate in a second direction that is opposite to the first direction.

Preferably, the blowing-suction device includes a self-resetting mechanism, and the self-resetting mechanism enables the control switch to tend to reset to a third operation position.

Preferably, the blowing-suction device further includes a linkage mechanism that triggers the control switch to be at different operation positions, where in the blowing mode, the security shield drives the linkage mechanism to trigger the control switch to be at the first operation position; or in the suction mode, the collection apparatus drives the linkage mechanism to trigger the control switch to be at the second operation position.

Preferably, the linkage mechanism includes a first linkage mechanism and a second linkage mechanism that are independently disposed, where in the blowing mode, the security shield drives the first linkage mechanism to abut against the control switch; or in the suction mode, the collection apparatus drives the second linkage mechanism to abut against the control switch.

Preferably, the first linkage mechanism includes: a first pivot and a first swing rod pivoting around the first pivot, where the first swing rod includes: a first end abutting against the security shield and a second end abutting against the control switch, where the second end is located between the first end and the first pivot; and the second linkage mechanism includes: a second pivot and a second swing rod pivoting around the second pivot, where the second swing rod includes: a third end abutting against the collection apparatus and a fourth end abutting against the control switch, and the second pivot is located between the third end and the fourth end.

Preferably, the second swing rod has a hollow portion that penetrates the second swing rod in a direction perpendicular to the second pivot, and the first swing rod passes through the second swing rod from the hollow portion.

Preferably, the first pivot is parallel to the second pivot.

Preferably, a first push block abutting against the first swing rod is disposed on the security shield, and a second push block abutting against the second swing rod is installed on the collection apparatus.

Preferably, the security shield and the collection apparatus are at least partially made of polypropylene, and the first push block and the second push block are made of nylon.

Preferably, when the security shield and the collection apparatus are not connected to the first opening, the control switch is at the third operation position, so that the motor stops working.

Preferably, the blowing-suction device further includes: a handle portion connected to the housing and a speed adjustment switch disposed on the handle portion, where when the control switch is at the first operation position or the second operation position, the speed adjustment switch operably adjusts a rotational speed of the motor.

Preferably, the blowing-suction device further includes a trigger switch that linked with the control switch and the speed adjustment switch, where when the trigger switch is triggered, and the control switch is at the first operation position or the second operation position, the speed adjustment switch adjusts the rotational speed of the motor.

Preferably, the blowing-suction device further includes an air tube that is detachably connected to the housing, where when the air tube is connected and fixed to the housing, the trigger switch is triggered.

Preferably, the blowing-suction device includes at least two trigger switches, and the trigger switches are serially connected.

Preferably, the control switch is located in the housing.

Preferably, the blowing-suction device includes at least two control switches, and the control switches are serially connected.

Compared with the prior art, a beneficial effect of the present invention is that the blowing-suction device is switched to the blowing mode or the suction mode by triggering the control switch by the security shield or the collection apparatus, thereby improving operation convenience and operation security.

One of objectives of the present invention is to provide a vibration and noise reduction blowing-suction device.

To achieve the foregoing objective, the technical solution used in the present invention is: a blowing-suction device, having a blowing mode and a suction mode, where the blowing-suction device includes: a housing, having a first opening connected to the outside; a motor, configured to generate rotation power and the rotation power is output by a motor shaft; and a fan that can be driven by the motor shaft to rotate around a fan axis in different directions, so that air flows moving in different directions are generated, where the fan is connected to the motor by using a coupling, and an elastomer configured to reduce vibration and compensate for a position deviation is disposed in the coupling.

Preferably, the coupling further includes: a first clamping part connected to the motor shaft without relative rotation, and a second clamping part connected to the fan without relative rotation, where the elastomer is disposed between the first clamping part and the second clamping part.

Preferably, the first clamping part includes: a first base portion and a first gear portion that is disposed around the first base portion; the second clamping part includes: a second base portion and a second gear portion that is disposed around the second base portion; and the elastomer includes: a third base portion and a third gear portion that is disposed around the third base portion, where each first gear portion is installed between adjacent third gear portions, and each second gear portion is installed between the adjacent third gear portion.

Preferably, the first clamping part is frustum-shaped.

Preferably, the first clamping part is connected to the motor shaft by using an insert part that is sleeved on an output end of the motor shaft without relative rotation, and the insert part is connected to the first clamping part without relative rotation.

Preferably, the insert part is made of powder metallurgy part, and the first clamping part is made of plastic part.

Preferably, the quantity of third gear portions is greater than or equal to the sum of the quantity of first gear portions and the quantity of second gear portions.

Preferably, two side radial surfaces of each third gear portion are respectively adjacent to one of the first gear portions and one of the second gear portions.

Preferably, the second clamping part and the fan are formed integrally.

Preferably, the elastomer is made of polyurethane rubber.

A blowing device is provided, where the blowing device includes: a housing, having a first opening connected to the outside; a motor, configured to generate rotation power and the rotation power is output by a motor shaft; and a fan that can be driven by the motor shaft to rotate to generate an air flow, where the fan is connected to the motor by using a coupling, and an elastomer is disposed in the coupling.

Compared with the prior art, a beneficial effect of the present invention is that vibration generated by transfer torque between the motor and the fan of the blowing-suction device is reduced.

One of objectives of the present invention is to provide a blowing-suction device having relatively good blowing performance and suction performance.

To achieve the foregoing objective, the technical solution used in the present invention is: a blowing-suction device, including: a housing, having an air flow cavity for an air flow to pass through; an air tube, connected to the housing, where an air flow channel for the air flow to move is formed by the air tube and the air flow cavity; a motor, configured to generate rotation power, where the motor includes: a motor main body and a motor shaft that is driven by the motor main body to rotate; and an axial flow fan, located in the air flow channel and is driven by the motor shaft to generate the air flow, where the housing further has a motor cavity accommodating the motor main body, and the motor cavity is disposed outside of the air flow cavity.

Preferably, the housing has: a first opening connected to the outside and an interface connected to the air tube; the air tube is connected to the interface and has a tube opening connected to the outside; and the air flow channel is formed between the first opening and the tube opening.

Preferably, the motor, the fan, and the interface are sequentially arranged in a straight line.

Preferably, there is an angle between a direction of the first opening and a direction of the interface.

Preferably, the motor cavity has a cooling air duct for the air flow to pass through, to cool the motor.

Preferably, the cooling air duct has: an air intake vent and an air exhaust vent, the air exhaust vent is located on one side where the motor is far away from the fan, and the direction of the air exhaust vent is perpendicular to the motor shaft.

Preferably, the air exhaust vent, the motor, the fan, and the interface are sequentially arranged in a straight line.

Preferably, the air flow cavity has an air flow cavity wall, and the air flow cavity wall separates the motor cavity from the air flow cavity.

Preferably, the motor shaft passes through the air flow cavity wall and connects the motor main body to the fan.

A blowing device, including: a housing, having an air flow cavity for an air flow to pass through; an air tube, connected to the housing, where an air flow channel for the air flow to move is formed by the air tube and the air flow cavity; a motor, configured to generate rotation power, where the motor includes: a motor main body and a motor shaft that is driven by the motor main body to rotate; and an axial flow fan, located in the air flow channel and is driven by the motor shaft to generate the air flow, where the housing further has a motor cavity accommodating the motor main body, and the motor cavity is disposed outside of the air flow cavity.

Compared with the prior art, a beneficial effect of the present invention is that interference from the motor main body to the air flow in the air flow channel is avoided, so that wind resistance and noise are reduced, thereby improving blowing performance.

One of objectives of the present invention is to provide a blowing-suction device that is difficult to be blocked.

To achieve the foregoing objective, the technical solution used in the present invention is: a blowing-suction device, where the blowing-suction device includes: a motor, configured to generate rotation power; a fan that rotates around a rotation axis to generate an air flow, where the fan includes several blades, and the blade includes a free end located at a radial end; and an inner wall, located at the periphery of the fan, where a distance between the free end of each blade and the inner wall gradually changes.

Preferably, the free end has two ends, respectively a first free end located on one end and a second free end located on the other opposite end, that are distributed in a circumferential direction of the fan, a distance between the first free end and the inner wall is greater than a distance between the second free end and the inner wall, and the fan rotates in a direction from the first free end to the second free end.

Preferably, the first free end is connected to the second free end by using a circular-arc surface.

Preferably, the distance between the first free end and the inner wall is 0.5-3 mm greater than the distance between the second free end and the inner wall.

Preferably, a distance between the second free end and the rotation axis does not exceed 62.5 mm.

Preferably, the fan includes 11 blades.

Preferably, the blowing-suction device includes a duct that guides the air flow to pass through, the fan is located in the duct, and a distance between the second free end and the duct is 0.5 mm.

Preferably, the fan includes an axial flow fan.

Preferably, the fan includes a mixed flow fan.

Compared with the prior art, a beneficial effect of the present invention is that when the fan rotates, the distance between an end portion of the blade and the inner wall gradually increases. As the fan rotates, an object blocked between the blade and the inner wall falls, so that the fan is prevented from being blocked.

One of objectives of the present invention is to provide a blowing-suction device whose shredding rate is reduced.

To achieve the foregoing objective, the technical solution used in the present invention is: a blowing-suction device, including: a motor, configured to generate rotation power; a fan that is driven by the motor to rotate to generate an air flow; and a shredding mechanism that is driven by the motor to rotate to shred a sucked object, where the blowing-suction device further includes a speed reduction mechanism that enables a rotational speed of the shredding mechanism to be less than a rotational speed of the motor.

Preferably, the blowing-suction device further includes a duct that guides the air flow to pass through, and the duct includes: an air guide entity extending in an axial direction, stationary blades distributed in a circumferential direction relative to the air guide entity, and an air guide cover for accommodating the air guide entity and the stationary blade, where the speed reduction mechanism is located in the air guide entity, and the shredding mechanism and the fan are located on two sides of the air guide entity.

Preferably, the speed reduction mechanism is a planetary gear mechanism.

Preferably, a transmission ratio of the planetary gear mechanism is set to be from 2:1 to 5:1.

Preferably, the rotational speed of the motor ranges from 12000 revolutions per minute to 18000 revolutions per minute.

Preferably, the blowing-suction device includes a transmission shaft that connects the speed reduction mechanism and the shredding mechanism, the shredding mechanism includes a cutting blade that is connected to the transmission shaft without relative rotation and that extends in a radial direction of the transmission shaft, and the transmission shaft is connected to the speed reduction mechanism by passing through the air guide entity.

Preferably, the transmission shaft is connected to a planetary gear of the planetary gear mechanism without relative rotation by using a shaft disk extending in a radial direction.

Preferably, the shredding mechanism, the speed reduction mechanism, the fan, and the motor are sequentially arranged.

Preferably, the fan has a shredding blade for cutting the sucked object.

A suction device, including: a motor, configured to generate rotation power; a fan that is driven by the motor to rotate to generate an air flow; and a shredding mechanism that is driven by the motor to rotate to shred a sucked object, where the suction device further includes a speed reduction mechanism that enables a rotational speed of the shredding mechanism to be less than a rotational speed of the motor.

Compared with the prior art, a beneficial effect of the present invention is that the rotational speed of the shredding mechanism is reduced, and a shredding rate is reduced, so that the duct of the blowing-suction device is difficult to be blocked and a collection apparatus is difficult to leak dust.

One of objectives of the present invention is to provide a blowing-suction device having a cutting blade whose shredding rate is low.

To achieve the foregoing objective, the technical solution in the present invention is: a blowing-suction device, including: a motor, configured to generate rotation power; a fan that is driven by the motor to rotate to generate an air flow; and a cutting blade that is driven by the motor to rotate around a rotation axis and is configured to shred an object passing through the cutting blade, where the cutting blade includes a working portion extending from the rotation axis in a first direction, and there is one working portion.

Preferably, the center of mass of the working portion is located outside of the rotation axis.

Preferably, the cutting blade further includes an installation portion connected to the motor, and the installation portion includes an eccentrically disposed counterweight portion, so that the center of mass of the installation portion is located outside of the rotation axis.

Preferably, the counterweight portion and the working portion are located on two sides of the rotation axis.

Preferably, the center of mass of the cutting blade is located on the rotation axis.

Preferably, the working portion includes: an end portion located at a radial end, and a first side edge and a second side edge that are oppositely disposed between the end portion and the installation portion; the working portion includes a cutting portion configured for cutting, and the cutting portion is located on the first side edge.

Preferably, the cutting portion includes: a cutting edge that is set to be straight and two cutting surfaces extending from the cutting edge, and the cutting surfaces are symmetrical relative to the cutting edge.

Preferably, the first side edge and the second side edge are both set to be straight edges.

Preferably, the second side edge is set to be inclined relative to the first side edge along the radial direction of the rotation axis, so that the transverse width of the working portion gradually narrows.

Preferably, the blowing-suction device includes a duct that guides the air flow to pass through, the cutting blade is located in the duct, and a ratio of the radius of the duct to a distance between the end portion and the duct ranges from 5 to 65.

Preferably, the motor, the fan, and the cutting blade are sequentially arranged.

A cutting blade is provided, where the cutting blade can rotate around a rotation axis to shred an object passing through the cutting blade, the cutting blade includes a working portion extending in a first direction perpendicular to the rotation axis, the working portion shreds the object when rotating, and there is one working portion.

Compared with the prior art, a beneficial effect of the present invention is that the cutting blade has only one working portion, so that the shredding rate is reduced, a structure is simple, and costs are low.

One of objectives of the present invention is to provide a blowing-suction device in which a collection apparatus does not need to be detached in bower and suction modes.

To achieve the foregoing objective, the technical solution used in the present invention is: a blowing-suction device that operably works in a blowing mode or a suction mode, where the blowing-suction device includes: a housing, having a first opening connected to the outside; an air tube, connected to the housing; an air flow generation apparatus that operably generates an air flow, where when the blowing-suction device is in the blowing mode, the air flow is blown out from the air tube; or when the blowing-suction device is in the suction mode, the air flow is sucked from the air tube; and a collection apparatus, configured to collect an object sucked by the blowing-suction device in the suction mode, where the collection apparatus is fixedly connected to the first opening both in the blowing mode and in the suction mode, and the collection apparatus further has an air admission portion, so that in the blowing mode, air enters the first opening through the air admission portion.

Preferably, the collection apparatus further has an operation portion that controls the air admission portion; and in the blowing mode, the operation portion opens the air admission portion, and air passes through the air admission portion; or in the suction mode, the operation portion closes the air admission portion, and air cannot pass through the air admission portion.

Preferably, the collection apparatus includes a collection portion; the air admission portion is movably relative to the collection portion; and in the suction mode, the air admission portion is taken into the collection portion; or in the blowing mode, the air admission portion is exposed from the collection portion.

Preferably, the collection apparatus includes a pivotal shaft that connects the collection portion to the air admission portion, so that the air admission portion rotates around the pivotal shaft.

Preferably, the operation portion is a handle installed on the collection portion.

Preferably, the air admission portion is provided with an air intake hole.

Preferably, the collection apparatus includes a collection main body configured for collection; the air admission portion is a notch provided on the collection main body; and in the suction mode, the notch is blocked by the operation portion; or in the blowing mode, the operation portion moves, so that the notch is open.

Preferably, the notch is formed by two intersected barrier walls on the collection main body, and the operation portion is a wedge-shaped three-dimensional structure that can be inserted into the notch.

Preferably, the wedge-shaped three-dimensional structure has an inclined surface and a bottom surface that correspond to the barrier walls, and a ventilation structure is provided on the inclined surface and the bottom surface.

Preferably, the notch is provided on a surface of the collection main body, and the operation portion is a cover that operably opens or closes the notch.

Preferably, the cover opens or closes the notch in a translation manner, and the blowing-suction device has a guide mechanism that guides the cover to move.

Preferably, the cover opens or closes the notch in a pivoting manner, the blowing-suction device has a pivotal shaft, and the cover is rotatably connected to the pivotal shaft.

Compared with the prior art, a beneficial effect of the present invention is that regardless of the suction mode or the blowing mode of the blowing-suction device, the collection apparatus is always connected to the blowing-suction device, so as to prevent the collection apparatus from being frequently changed by a user, thereby saving manpower and improving working efficiency.

One of objectives of the present invention is to provide a blowing-suction device that is difficult to be blocked.

To achieve the foregoing objective, the technical solution used in the present invention is: a blowing-suction device, including: a housing; an air tube that is connected to the housing and that has a tube opening connected to the outside; a motor that is located in the housing and that provides rotation power; a fan that is driven by the motor to rotate to generate an air flow, where the fan controllably rotates in a first direction and generates the air flow that moves from the tube opening to the inside of the housing, and when the air flow from the tube opening to the housing is blocked, the fan controllably switches rotation from the first direction to a second direction, and generates an air flow that moves from the inside of the housing to the tube opening.

Preferably, the blowing-suction device includes: a detection unit configured to detect an operational parameter of the motor; a processing unit that generates a processing instruction according to a detection result; and an execution unit that switches the rotation direction of the fan between the first direction and the second direction according to the processing instruction.

Preferably, when the detection unit detects that a change rate of the operational parameter exceeds a preset value or deviates a preset interval, the detection unit sends a first detection signal to the processing unit, and the processing unit receives the first detection signal and sends a first processing instruction; or when the detection unit detects that a change rate of the operational parameter does not exceed a preset value or is in a preset interval, the detection unit sends a second detection signal to the processing unit, and the processing unit receives the second detection signal and sends a second processing instruction.

Preferably, when the detection unit detects that the operational parameter exceeds a preset value or deviates a preset interval, the detection unit sends a first detection signal to the processing unit, and the processing unit receives the first detection signal and sends a first processing instruction; or when the detection unit detects that the operational parameter does not exceed a preset value or is in a preset interval, the detection unit sends a second detection signal to the processing unit, and the processing unit receives the second detection signal and sends a second processing instruction.

Preferably, the motor has a motor shaft that rotates around an axis, and the motor shaft is connected to the fan, where when the motor shaft rotates in a forward direction, the fan rotates in the first direction; or when the motor shaft rotates in a reverse direction, the fan rotates in the second direction.

Preferably, the execution unit includes a switch component that optionally switches between a first working position and a second working position, where when receiving the first processing instruction, the switch component switches to the first working position, and in this case, the motor shaft rotates in the reverse direction; or when receiving the second processing instruction, the switch component switches to the second working position, and in this case, the motor shaft rotates in the forward direction.

Preferably, the operational parameter includes a current and a voltage of the motor, and a rotational speed of the motor.

Preferably, the processing unit is a micro control unit (MCU), and the detection unit and the execution unit are electrically connected to the MCU.

Preferably, the fan is an axial flow fan.

Preferably, the first direction is opposite to the second direction.

Preferably, the blowing-suction device includes a control circuit that controls the fan to rotate in the first direction or the second direction, and the control circuit includes a first switch and a second switch that is serially connected to the first switch, where the second switch operably enables the fan to move between a first position in which the fan rotates in the first direction and a second position in which the fan rotates in the second direction, a circuit adjustment module is further disposed on the control circuit, and the circuit adjustment module works when the second switch is at the second position.

Preferably, the circuit adjustment module includes a voltage step-down circuit, and when the voltage step-down circuit works, the voltage of the motor is reduced.

Preferably, the second switch is a double control switch.

Preferably, the second switch further has a resetting structure, and the resetting structure enables the second switch to tend to move toward the first position.

Preferably, the resetting mechanism includes an elastic part that enables the second switch to be biased to the first position.

Preferably, the control circuit is connected to the motor, the motor has a motor shaft that rotates around the axis, and the motor shaft is connected to the fan, where when the motor shaft rotates in a forward direction, the axial flow fan rotates in the first direction; or when the motor shaft rotates in a reverse direction, the fan rotates in the second direction.

Preferably, the first switch operably turns on or turns off the motor.

To achieve the foregoing objective, the technical solution used in the present invention is: a blowing-suction device, including: a housing; an air tube that is connected to the housing and has a tube opening connected to the outside; a fan that operably rotates in a first direction or a second direction and generates an air flow; and a motor, configured to drive the fan and provide rotation power, where when the fan rotates in the first direction and the generated air flow sucked from the tube opening is blocked, the fan controllably rotates in the second direction and generates the air flow that is blown out from the tube opening.

To achieve the foregoing objective, the technical solution used in the present invention is: a blowing-suction device, including: a housing; an air tube that is connected to the housing and has a tube opening connected to the outside; a fan that operably rotates in different directions to generate air flows moving in different directions; and a motor, configured to drive the fan to rotate in different directions, where when the blowing-suction device is blocked, the fan controllably changes a rotation direction, so that a movement direction of the air flow changes.

To achieve the foregoing objective, the technical solution used in the present invention is: a blowing-suction device, including: a housing; an air tube that is connected to the housing and that has a tube opening connected to the outside; a motor that is located in the housing and that provides rotation power; a fan that is driven by the motor to rotate to generate an air flow, where the fan controllably rotates in a first direction or in a second direction; and when the fan rotates in the first direction, the fan generates the air flow that moves from the tube opening to the inside of the housing; or when the fan rotates in the second direction, the fan generates the air flow that moves from the inside of the housing to the outside of the tube opening; the blowing-suction device has a control circuit connected to the motor, and the control circuit includes: a detection unit configured to detect an operational parameter of the motor, a processing unit that generates a processing instruction according to the detection result, and an execution unit that switches a rotation direction of the axial flow fan between the first direction and the second direction according to the processing instruction.

To achieve the foregoing objective, the technical solution used in the present invention is: a blowing-suction device, including: a housing; an air tube that is connected to the housing and that has a tube opening connected to the outside; a motor that is located in the housing and that provides rotation power; a fan that is driven by the motor to rotate to generate an air flow, where the fan controllably rotates in a first direction or in a second direction; and when the fan rotates in the first direction, the fan generates the air flow that moves from the tube opening to the inside of the housing; or when the fan rotates in the second direction, the fan generates the air flow that moves from the inside of the housing to the outside of the tube opening; a control circuit for controlling a rotation direction of the fan is further disposed on the blowing-suction device; the control circuit includes a control switch that operably moves between a first position and a second position, where when the control switch is at the first position, the fan rotates in the first direction; or when the control switch is at the second position, the fan rotates in the second direction; and a circuit adjustment module that works when the second switch is at the second position is further disposed on the control circuit.

Compared with the prior art, a beneficial effect of the present invention is that when the blowing-suction device in the suction mode is blocked, the air flow blowing out is switched to by switching different rotation directions of the fan, so that it is convenient to resolve a problem that the blowing-suction device is blocked.

BRIEF DESCRIPTION OF THE DRAWINGS

The foregoing described objectives, technical solutions, and beneficial effects of the present invention may be clearly obtained by using the following detailed descriptions about the specific embodiments that can implement the present invention with reference to descriptions of the accompany drawings.

Same numerals and symbols in the accompany drawings and the specification are used to represent same or equivalent elements.

DETAILED DESCRIPTION

The preferred embodiments of the present invention are described in detail in the following with reference to the accompanying drawings, so that the advantages and features of the present invention are more easily understood by a person skilled in the art. Therefore, the protection scope of the present invention is more expressly defined.

Figure 1:
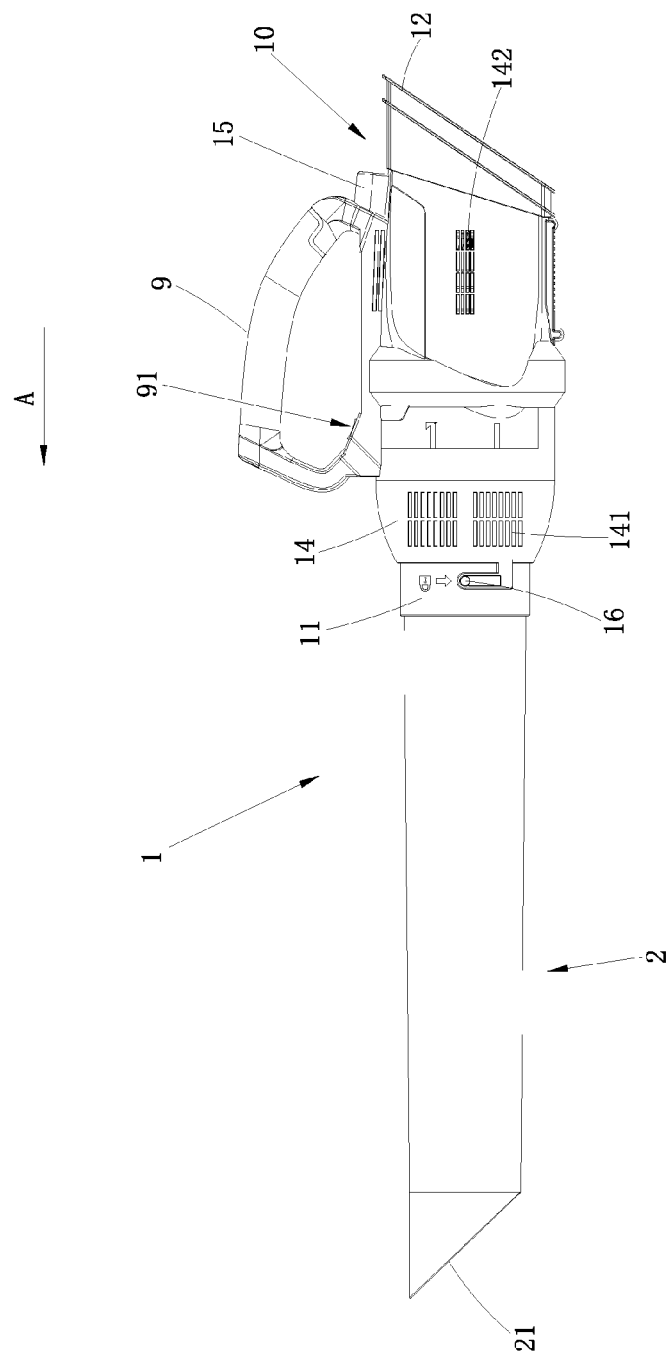
FIG. 1 is an overall schematic diagram of a blowing-suction device according to an embodiment of the present invention.

FIG. 1 is an overall schematic diagram of a blowing-suction device 1 according to an embodiment of the present invention. The blowing-suction device 1 is a common garden tool and is configured to perform a cleaning work. The blowing-suction device 1 may gather scattered leaves together by using a blowing function, and may further suck the leaves into a specified rubbish collection apparatus by using a suction function, thereby achieving an objective of cleaning. Therefore, the blowing-suction device 1 has at least two working modes. When the blowing-suction device 1 is in a first working mode, the blowing-suction device 1 performs a blowing function; or when the blowing-suction device 1 is in a second working mode, the blowing-suction device 1 performs a suction function. Therefore, the first working mode may also be referred to as a blowing mode, and the second working mode may also be referred to as a suction mode. The blowing-suction device 1 optionally works in the blowing mode or the suction mode according to an actual requirement of a user. The entire blowing-suction device 1 extends in a direction indicated by an arrow A shown in FIG. 1, and the direction is defined as a longitudinal direction. The blowing-suction device 1 mainly includes a main body 10 and an air tube 2 that is connectable to the mainly body 10. The main body 10 includes a housing 14, and the housing 14 substantially extends in the longitudinal direction. The housing 14 is configured to enclose the outside and has a protective function. In different embodiments, the housing 14 may be an integrally formed housing, or may be an integral formed by multiple half-housings. The half-housings are fixedly connected by using a fixing element such as a screw. The housing 14 may include a housing set of one layer or multiple internal and external layers, or may include multiple housings protecting respective elements. The air tube 2 is connectable to the main body 10. The inside of the air tube 2 is hollow and is configured to provide air ventilation, so that air is blown out from the air tube 2 or is sucked from the outside. In this embodiment, the air tube 2 is detachably connected to the main body 10. When the blowing-suction device 1 does not need to be used at normal times, the air tube 2 is detached and separated from the main body 10, so that the length of the entire blowing-suction device 1 can be reduced. When the blowing-suction device 1 needs to be used, the air tube 2 may be connected to the main body 10, so that the corresponding blowing function or suction function is performed. As shown in FIG. 1, the air tube 2 is located at a longitudinal front end of the main body 10.

Figure 2:
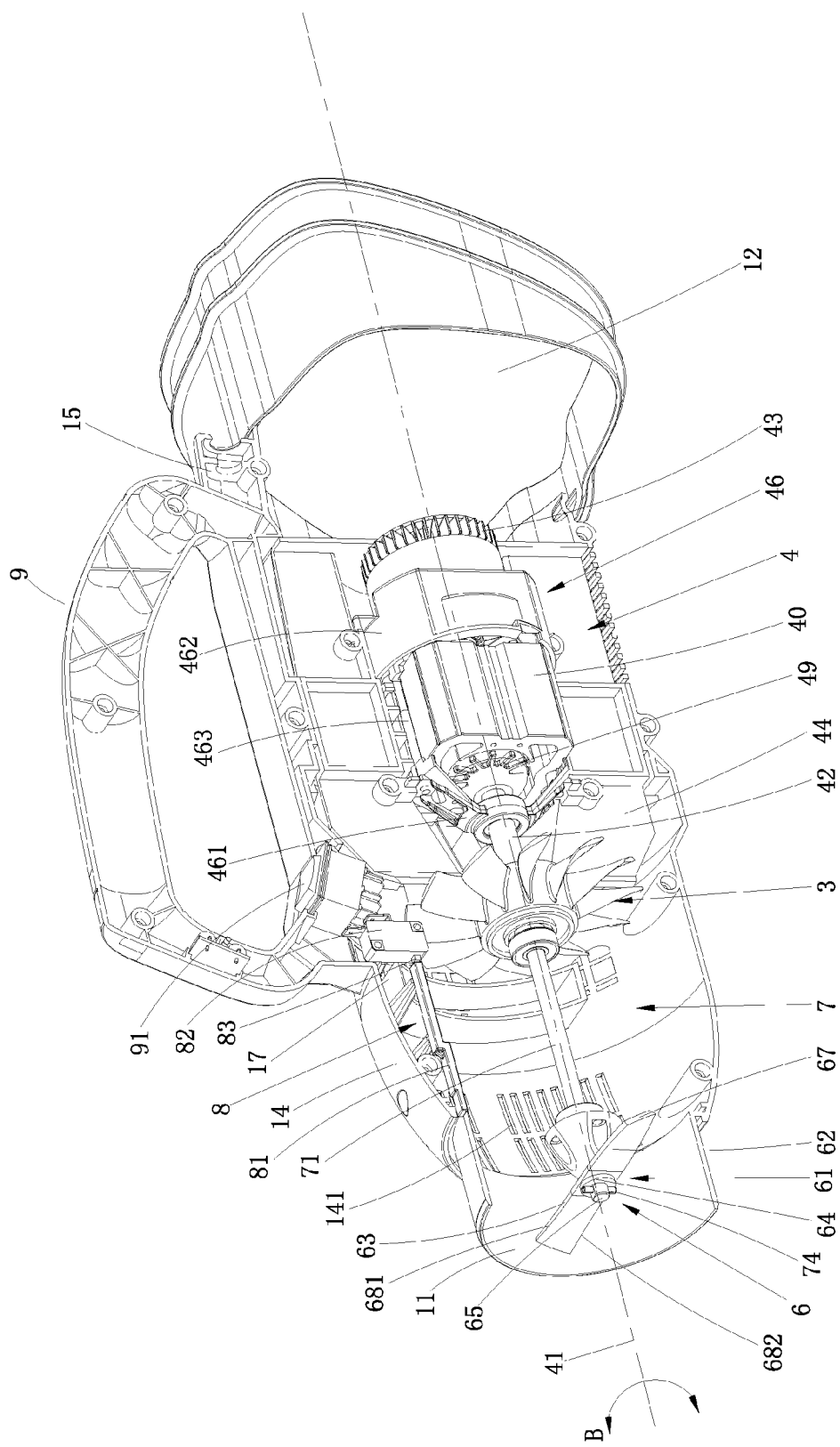
FIG. 2 is a schematic diagram of the blowing-suction device in FIG. 1 in which a duct is removed.

The blowing-suction device 1 includes an air flow generation apparatus. As shown in FIG. 2, the air flow generation apparatus is accommodated in the housing 14, and operably generates an air flow. The air flow generated by the air flow generation apparatus can move in a particular direction. In this preferred embodiment, the air flow generation apparatus controllably generates air flows moving in different directions. For example, the air flow generation apparatus may generate an air flow moving in a direction of the longitudinal front end, or may generate an air flow moving in a direction of a longitudinal back end that is opposite to the direction of the longitudinal front end. An included angle between the different directions in which the air flows move may be 180 degrees. In another embodiment, there may alternatively be another angle, such as a 60-degree angle, a 90-degree angle, a 120-degree angle, or a 150-degree angle between the different directions in which the air flows move. As shown in FIG. 2, a common air flow generation apparatus includes: a rotatable fan 3 and a motor 4 configured to drive the fan 3 to rotate. The motor 4 is configured to provide rotation power. According to power sources, the motor 4 may be a pneumatic motor, or may be an electrical motor driven by electric power, or may be a gasoline motor using gasoline as fuel. The electrical motor includes a common carbon brush motor or a brushless motor. In this embodiment, the motor 4 has a stator 40 and a rotor 49 that may rotate relative to the stator 40. The stator 40 is fixed and supported by a support structure 46. The support structure 46 includes: a front support 461 and a back support 462 that are separately disposed in the longitudinal direction. The front support 461 and the back support 462 separately support the stator 40. The front support 461 is further fixedly connected to the back support 462 by using a bolt 463. The rotor 49 includes a motor shaft 42 extending along an axis 41. In this embodiment, the axis 41 extends in the longitudinal direction. The rotor 49 drives the motor shaft 42 to rotate around the axis 41. The motor shaft 42 is connected to the fan 3, so as to drive the fan 3 to correspondingly rotate. Certainly, a transmission mechanism such as a gear may further be disposed between the fan 3 and the motor shaft 42. The motor optionally rotates around the axis 41 in a clockwise direction, or may rotate around the axis 41 in a counterclockwise direction, as indicated by a double arrow B in FIG. 2. Certainly, in another embodiment, the motor 4 may alternatively rotate in only one direction. In another embodiment, the air flow generation apparatus is not limited to include the fan 3 and the motor 4. For example, the air flow generation apparatus may be driven by using a new power technology such as a magnetic force to generate an air flow.

Figure 3:
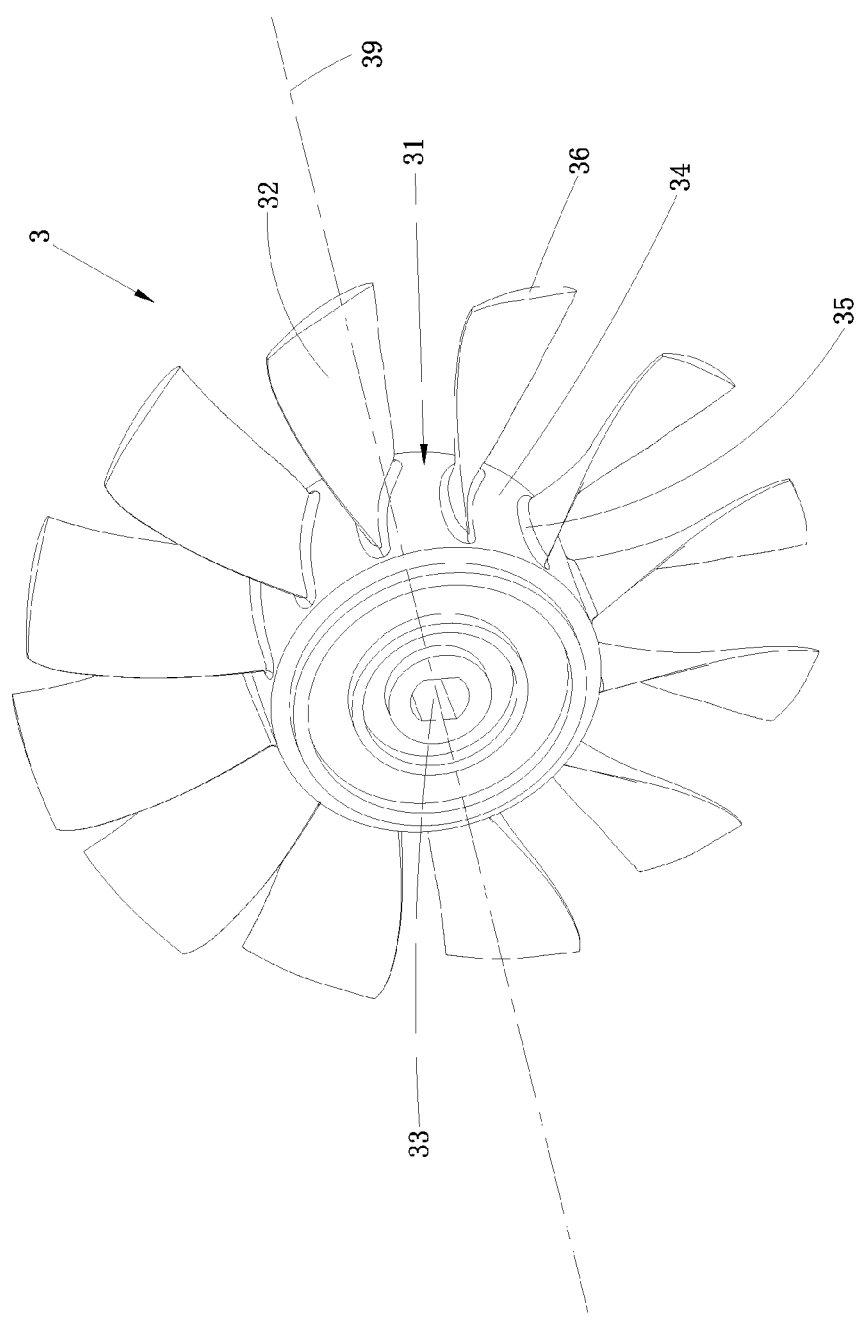
FIG. 3 is a schematic diagram of a fan of the blowing-suction device in FIG. 1.

The fan 3 may be rotatably driven to generate an air flow. In this embodiment, the fan 3 is connected to the motor shaft 42, so that the fan 3 is driven by the motor shaft 42 to correspondingly rotate. The fan 3 and the motor 4 are substantially distributed in a front-and-back manner in the main body 10 in the longitudinal direction. The fan 3 is closer to the longitudinal front end. The motor 4 is closer to the longitudinal back end. The fan 3 includes at least an axial flow fan. The axial flow fan can rotate around a fan axis 39, to generate an air flow flowing in a direction parallel to an extension direction of the fan axis 39. In another embodiment, the fan 3 may be combined by multiple stage axial flow fans, or may be formed by only a single stage axial flow fan. In addition, the fan 3 may alternatively be combined by multiple stage other-type fans, and at least one stage is the axial flow fan. In another embodiment, the fan 3 may alternatively be formed by a mixed flow fan. The mixed flow fan may also generate an air flow that moves in the extension direction of the fan axis 39. In this embodiment, as shown in FIG. 3, the fan 3 is formed by a single stage axial flow fan. The fan 3 includes: a hub 31 and several blades 32 disposed on the hub 31. The hub 31 is provided with a connection hole 33 for coupling to the motor shaft 42. The connection hole 33 is preferably flat rectangular-shaped, which is exactly fitted to a flat rectangular structure on the motor shaft 42, so that there is no relative rotation between the fan 3 and the motor shaft 42. It should be noted that, the connection hole 33 is a through hole having a particular longitudinal thickness, and the motor shaft 42 is inserted into a part of the connection hole 33 in the longitudinal direction, but the motor shaft 42 is not inserted into the entire connection hole 33. An objective of such a design is that the connection hole 33 needs to be coupled to another element. However, in another embodiment, the connection hole 33 and the motor shaft 42 may alternatively be provided with corresponding spline structures, thereby implementing a connection between the fan 3 and the motor 4 without relative rotation. The blade 32 extends in a radial direction of the hub 31. One end of the blade 32 is connected to a circumferential surface 34 of the hub 31, and the end is a connection end 35. The other end opposite to the connection end 35 is a free end 36. The blade 32 may be formed integrally with the hub 31, or may be fixedly connected to the hub 31. A side edge between the connection end 35 and the free end 36 is set to be bent, so that the entire blade 32 is substantially in a curl state. The blade 32 is helically disposed in a direction (that is, a radial direction of the fan 3) of a connection line between the connection end 35 and the free end 36, so that the entire blade 32 is similar to a helically stepped structure. Therefore, the connection end 35 and the free end 36 are not in a same plane. The blades 32 are evenly distributed in a circumferential direction of the fan 3. In a preferred embodiment, the quantity of the blades 32 is 12. Certainly, the quantity of the blades 32 may alternatively be 9, 10, 11, 13, 14, or the like. Helical directions of the several blades 32 are consistent. The blade 32 rotates with the hub 31. In this embodiment, the fan axis 39 of the axial flow fan and the axis 41 of the motor shaft 42 are overlapped. Certainly, in another embodiment, the fan axis 39 of the axial flow fan and the axis 41 of the motor shaft 42 are not set to be overlapped. In this embodiment, a plane formed by rotation of the axial flow fan is basically perpendicular to the axis 41. Air passes through the plane from one side of the fan 3, and moves to another side of the fan 3. The starting side of the fan 3 is defined as an upstream area, and the another side is a downstream area. In this embodiment, the upstream area and the downstream area are distributed in a front-and-back manner in the longitudinal direction. Air passes the fan 3 from the upstream area and moves to the downstream area, so that the fan 3 is located in a path through which air passes. In this example, because the motor 4 and the fan 3 are longitudinally arranged, the motor 4 is also located in the path through which air passes. In addition, it should be noted that the fan 3 optionally rotates in different directions: a first direction and a second direction. Therefore, the fan 3 rotates to generate air flows moving in the different directions. It is especially emphasized that the different movement directions of the air flows are relative to the fan 3. Specifically, a direction of the air flow passing through a plane formed by rotation of the fan 3 in the first working mode is different from a direction of the air flow passing through a plane formed by rotation of the fan 3 in the second working mode. In this embodiment, the fan 3 controllably rotates around the fan axis 39 in a clockwise or counterclockwise direction, as indicated by the double arrow B in FIG. 2. This is performed under the premise that the fan 3 always rotates around the same fan axis. However, in another embodiment, the fan 3 may alternatively rotate around different fan axes. For example, within a time period, the fan 3 rotates around a first fan axis, so that the fan 3 rotates towards first direction. However, in another time period, the fan 3 rotates around a second fan axis. The first fan axis and the second fan axis may be parallelly disposed or a particular included angle may be set between the first fan axis and the second fan axis. The included angle herein may be 90 degrees, or an acute angle, or another angle. In addition, in this embodiment, the motor 4 controls a rotation direction of the fan 3. The motor 4 may enable the fan 3 to generate an air flow moving toward a direction, or may enable the fan 3 to generate an air flow moving toward another direction. In this embodiment, because the motor 4 and the fan 3 are in power connection, if a rotation direction of the motor 4 is controlled, the rotation direction of the fan 3 may be controlled. If the motor 4 is controlled to rotate in a forward direction, the fan 3 rotates in the first direction. However, if the motor 4 is controlled to rotate in a reverse direction, the fan 3 rotates in the second direction. In this embodiment, the first direction of the fan 3 is the clockwise direction, and the second direction of the fan 3 is the counterclockwise direction. In other words, the first direction and the second direction are opposite. In another embodiment, a reverse clutch may further be disposed between the motor 4 and the fan 3. The fan 3 is driven to rotate in different directions by changing a clutch position and/or state of the reverse clutch. However, regardless of which direction to which the fan 3 rotates, the motor 4 may rotate in only one direction to transmit power.

As shown in FIG. 1 and FIG. 2, a handle portion 9 configured for grasping is further disposed on the main body 10, and the handle portion 9 is set to be bent. Two ends of the handle portion 9 are separately connected to the main body 10, so that grasping space is formed. When the blowing-suction device 1 is operated, the handle portion 9 is located above the blowing-suction device 1. More specifically, the handle portion 9 is located above the motor 4, so that relatively ideal weight balance between the handle portion 9 and the motor 4 is achieved. Preferably, a control switch 91 configured to control the rotation direction of the motor 4 is disposed on the handle portion 9. The control switch 91 operably controls the motor 4 to rotate in the clockwise direction or the counterclockwise direction. The control switch 91 may further integrate with another control function, such as a speed adjustment function, so that a rotational speed of the motor 4 is adjusted in a step or stepless manner. Alternatively, the speed adjustment function may be not provided on the control switch 91, but is controlled by using another switch. In a preferred embodiment, the control switch 91 has at least three steps, that is, the control switch 91 has at least three operation positions. The first operation position corresponds to a state in which the motor 4 rotates in the clockwise direction or corresponds to a state in which the fan 3 rotates in the first direction. The second operation position corresponds to a state in which the motor 4 rotates in the counterclockwise direction or corresponds to a state in which the fan 3 rotates in the second direction. The third operation position corresponds to a state in which the motor 4 stops working or corresponds to a state in which the fan 3 stops rotating. The third operation position may be located between the first operation position and the second operation position. Certainly, the third operation position may alternatively be located at another position. However, the control switch 91 is not limited to be on the handle portion 9, or the control switch 91 may be at another position on the main body 10. In this embodiment, an end of the handle of the blowing-suction device 1 is further provided with an electrical interface 15, and the electrical interface 15 is fixedly connected to a power cable (not shown in the figure). The power cable is configured to couple to an external power supply to provide alternating current power to the blowing-suction device 1. The external power supply herein may be a 220 V alternating current power supply. In another embodiment, the electrical interface 15 of the main body 10 may further be coupled to a detachable battery pack, and after the battery pack is plugged into a coupling portion, the battery pack provides direct current power to the blowing-suction device 1. The battery pack is pluggable or fixed. In addition, a material of the battery pack is preferably a lithium battery, a Ni—Cd battery, or the like. A voltage of the battery pack may be, but is not limited to, 40 V and 56 V.

Figure 4:
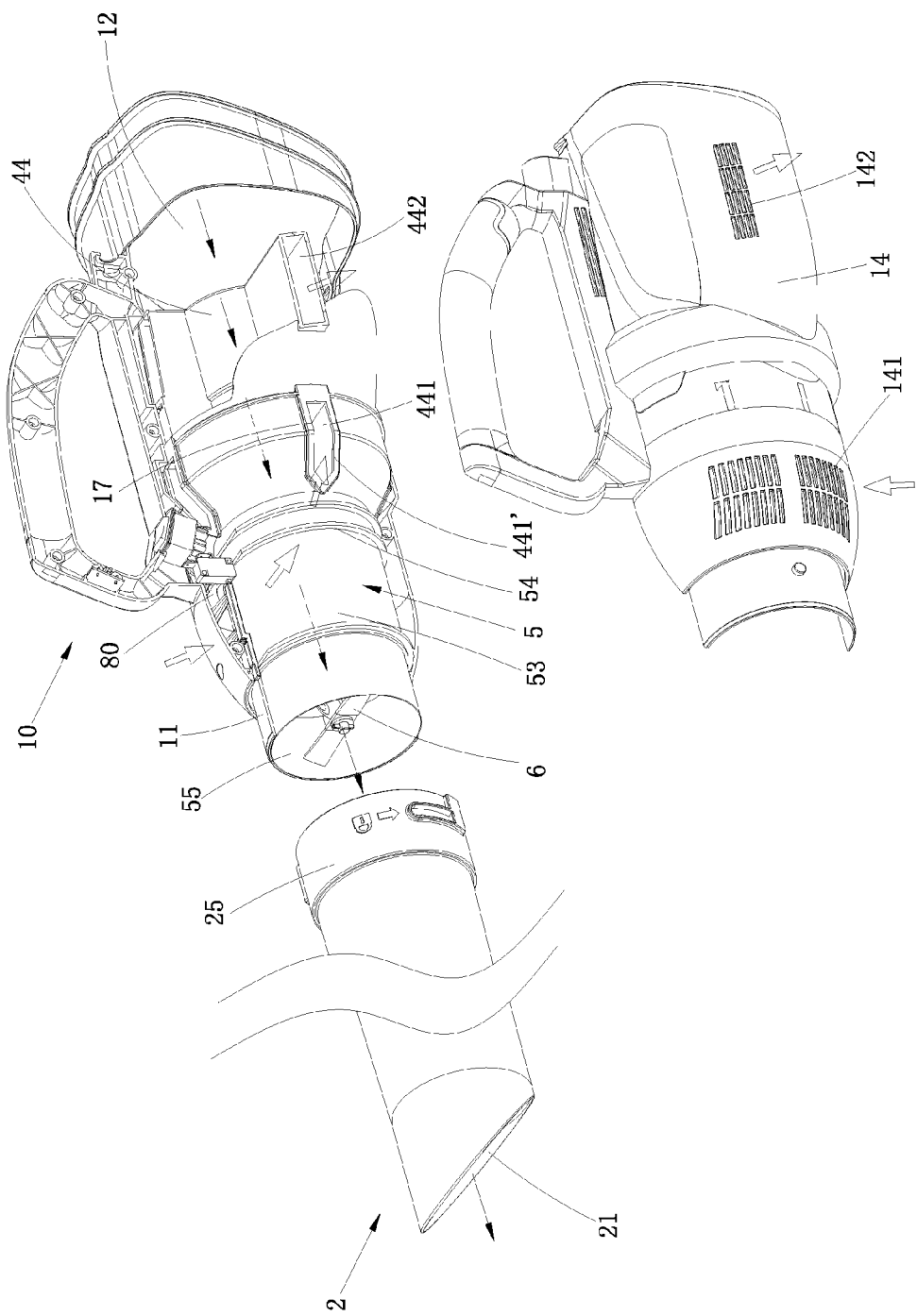
FIG. 4 is a schematic diagram of the blowing-suction device in FIG. 1 in a blowing mode.
Figure 5:
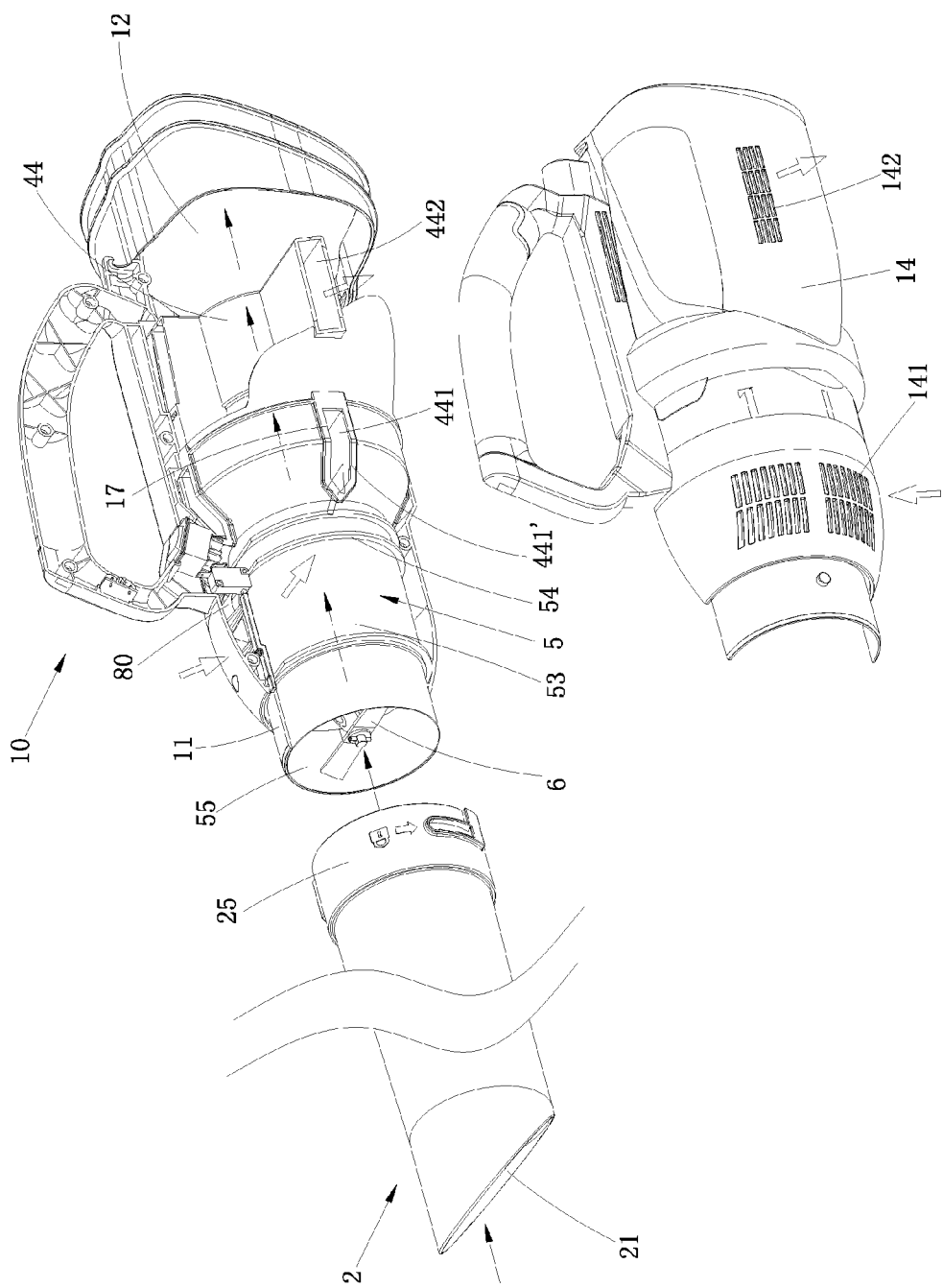
FIG. 5 is a schematic diagram of the blowing-suction device in FIG. 1 in a suction mode.

As shown in FIG. 2, FIG. 4, and FIG. 5, the main body 10 further includes: an interface 11 and a first opening 12 that are arranged in the longitudinal direction. The interface 11 and the first opening 12 are provided on the housing 14. The interface 11 is configured to connect to the air tube 2, and the first opening 12 is configured to connect to the outside. The air flow generated by the air flow generation apparatus may move from the inside of the main body 10 to the outside through the first opening 12, or may move from the outside to the main body 10 through the first opening 12. The interface 11 is located at the longitudinal front end of the main body 10, and the first opening 12 is located at the longitudinal back end of the main body 10. The interface 11 has an outline that is substantially the same as the outline of the air tube 2, and is configured to connect to the air tube 2, so that the air tube 2 is connected to the main body 10. The main body 10 adjacent to the interface 11 is further provided with a positioning structure 16. In this embodiment, the positioning structure 16 is a positioning projection protruding from a surface of the main body 10, and is configured to position and fit a corresponding card slot on the air tube 2.

Figure 23:
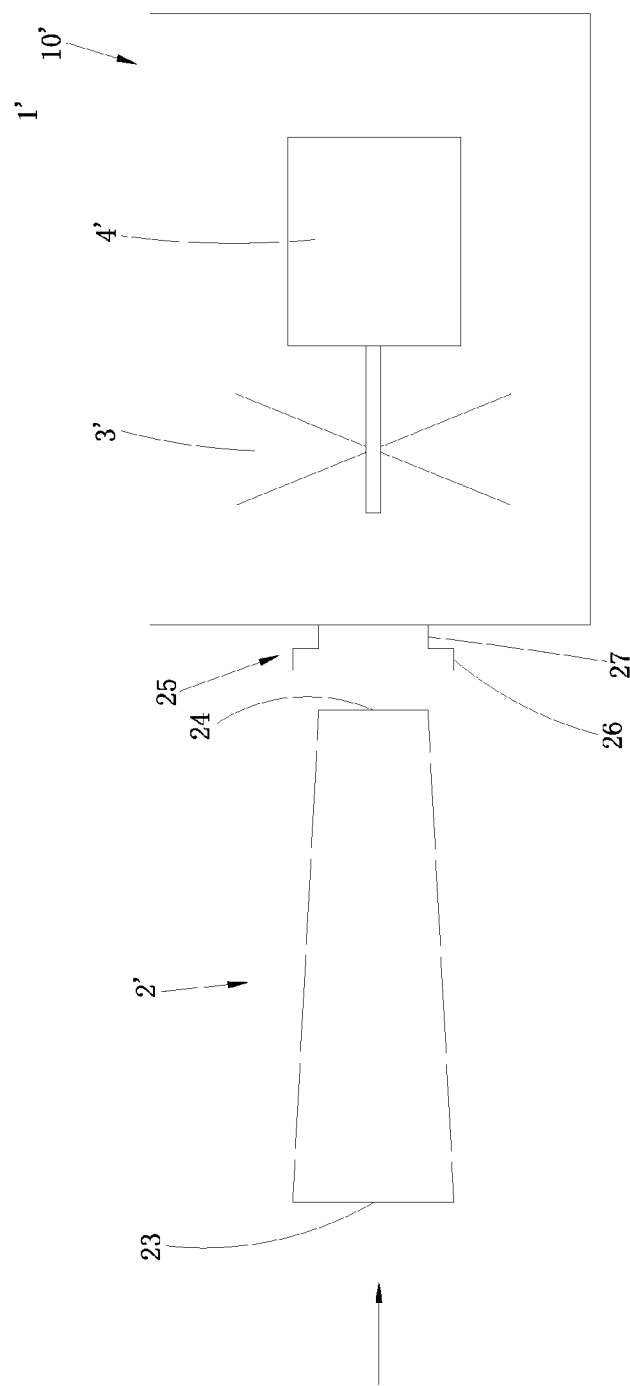
FIG. 23 is a schematic diagram of a blowing-suction device in a suction mode according to a seventh embodiment of the present invention.
Figure 24:
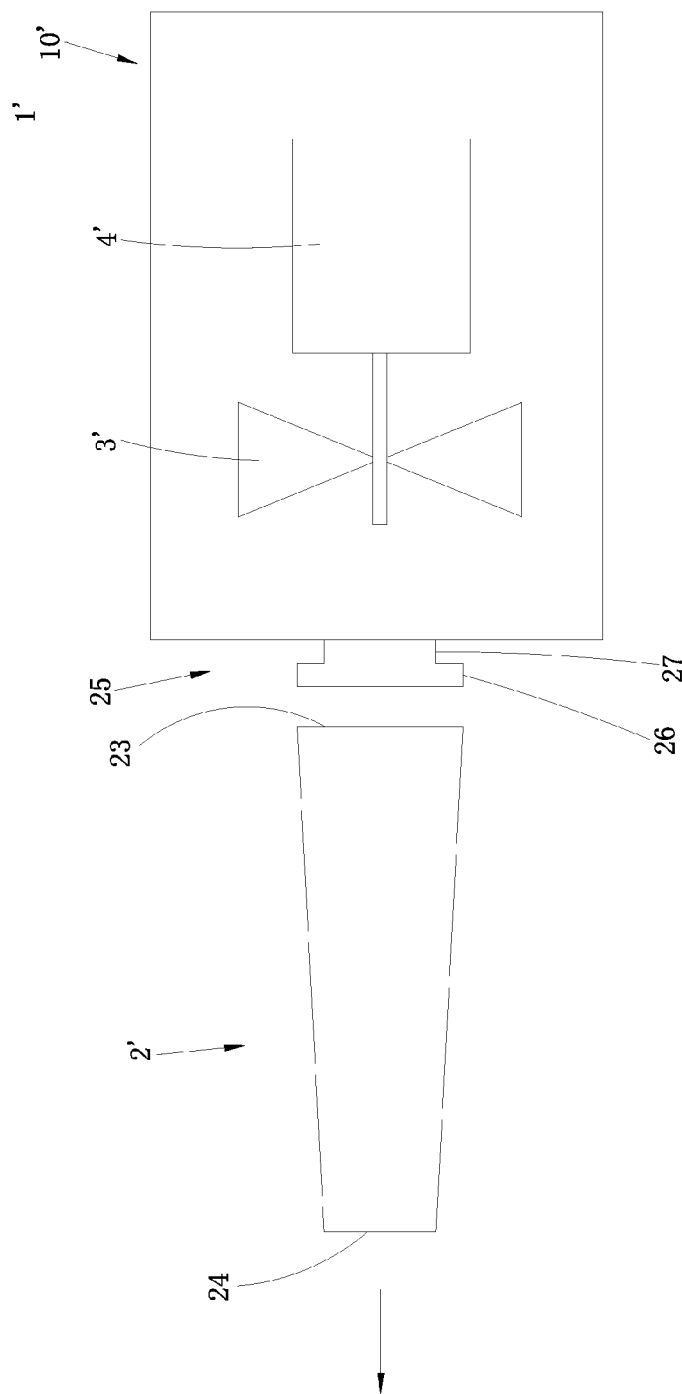
FIG. 24 is a schematic diagram of the blowing-suction device in a blowing mode according to the seventh embodiment of the present invention.

The air tube 2 is configured for air flow ventilation. One end of the air tube 2 is connected to the interface 11, and the other end opposite to the end has a tube opening 21 connected to the outside. In this embodiment, there is only one air tube 2. Certainly, in another embodiment, the air tube 2 may alternatively be an air tube having a complete blowing function or suction function that is formed by combining multiple sections. When the air tube 2 needs to be used, the sections may be connected. For example, the air tube 2 includes: a first section and a second section that are detachable, and a fixing structure configured to fixedly connect the first section to the second section is further provided between the first section and the second section. The fixing structure may include an elastic clamping part disposed on the first section, and a shape-fitting part for fitting the elastic clamping part is disposed at a corresponding position of the second section. The shape-fitting part herein may be a circular hole, which may accommodate the elastic clamping part for inserting and clamping. Certainly, the elastic clamping part may alternatively be disposed on the second section, and the shape-fitting part is disposed on the first section. When the air tube 2 is to be used, the first section and the second section may be connected by using a fixing structure to form the entire air tube for use. When the air tube 2 does not need to be used, the air tube 2 may be detached to multiple sections for storage, thereby reducing an occupied area. In addition, an accessory having an auxiliary function may further be additionally installed on the air tube 2. For example, an accessory that may change a shape of the tube opening 21 is installed at the tube opening 21 of the air tube 2, for example, an accessory for widening an cross sectional area of the air tube. For another example, an accessory for changing an air blowing direction is installed at the tube opening 21 of the air tube 2, so as to change an orientation of the tube opening 21 to some extent, so that air may be blown out in a wider direction, thereby improving working efficiency. In this embodiment, the air tube is a straight tube that extends in a straight line, and a portion whose tube diameter changes is not provided at an end portion of the air tube. Certainly, the end portion of the air tube or the entire air tube may be provided with the portion whose tube diameter changes, thereby facilitating air blowing speed adjustment. For example, a cone-shaped structure whose radius gradually changes may be provided on the air tube 2. In a preferred embodiment, as shown in FIG. 23 and FIG. 24, the entire air tube 2 is a cone-shaped tube. One end of the air tube 2 has a relatively large cross sectional area, and the other end has a relatively small cross sectional area. For another example, the air tube 2 may be provided with a bent portion, so that an extension direction of the air tube 2 is bent at the bent portion. In a preferred embodiment, the bent portion is disposed near the tube opening 21 of the air tube 2. In addition, to reduce grasping pressure, a scroll wheel for supporting the air tube 2 on the ground is disposed near the bent portion of the air tube 2. In this way, when the blowing and suction functions are performed, the weight of the air tube 2 may be burdened by the scroll wheel. According to safety regulations, the length of the air tube 2 ranges from 500 mm to 800 mm, and is preferably 550 mm. The cross sectional area of the air tube 2 ranges from 5000 square millimeters to 15000 square millimeters, and is preferably 8000 square millimeters. As shown in FIG. 4 and FIG. 5, one end of the air tube 2 has a connector 25 connected to the main body 10, and the other end is provided with the tube opening 21 connected to the outside. In the embodiment in FIG. 1, the connector 25 that is of the air tube 2 and that is connected to the main body 10 has a relatively small cross sectional area, and the diameter of the connector 25 is preferably 100 mm. However, the tube opening 21 of the air tube 2 has a relatively large cross sectional area, and the diameter of the tube opening 21 is preferably 110 mm. Therefore, the cross sectional area of the connector 25 is less than the cross sectional area of the tube opening 21. After the air tube 2 is connected to the main body 10, projections on a plane perpendicular to the fan axis 39, of the tube opening 21 of the air tube 2 and the first opening 12 are at least partially overlapped. There is a particular included angle between the cross section of the tube opening 21 and a horizontal line. After the handle portion 9 at the longitudinal back end of the blowing-suction device 1 is grasped by a user, a position in which the hand of the user naturally hangs down is not close to the ground, but there is a distance ranging from approximately tens of centimeters to approximately 1 meter. However, because there is a particular included angle between the tube opening of the air tube 2 located at the longitudinal front end of the blowing-suction device 1 and the horizontal line, the tube opening 21 is relatively close to the ground. The air tube 2 may be detachably connected to the interface 11, or may always be fixedly connected the interface 11. In this embodiment, in the blowing mode or the suction mode, the air tube 2 is connected to the main body 10 by using the interface 11, and the connection does not need to be changed in different modes, so that the air tube 2 may be fixedly connected the main body 10. The air tube 2 and the main body 10 are separated during transportation or storage, so as to reduce an occupied volume. The tube opening 21 of the air tube 2 also refers to a second opening, and the second opening is relative to the first opening 12 of the housing 14. Therefore, in this embodiment, the main body 10 has only one interface 11 connected to the air tube 2.

As shown in FIG. 2, the blowing-suction device 1 further includes a security mechanism 8. A function of the security mechanism 8 is to ensure that after the air tube 2 is connected to the main body 10, a startup circuit is conducted, and then if the user operates the control switch 91, the control switch 91 takes effect. When the air tube 2 is not connected to the main body 10, the security mechanism 8 cuts off the startup circuit, so that even the user operates the control switch 91, the motor 4 cannot normally work, thereby ensuring security. In this embodiment, the security mechanism 8 is disposed near the interface 11 of the main body 10. The security mechanism 8 includes a trigger rod 81 and a trigger switch 82 abutting against the trigger rod 81. The trigger switch 82 is provided with a trigger button 83, and one end of the trigger rod 81 abuts against the trigger button 83. The other end of the trigger rod 81 is a free end. When the air tube 2 is installed and connected to the interface 11, the security mechanism 8 is triggered. Specifically, the air tube 2 abuts against the free end of the trigger rod 81, so that the circuit is conducted by pressing the trigger button 83 by using the trigger rod 81. As a result, the control switch 91 is controlled. When the air tube 2 is detached from the interface 11, the trigger button 83 resets, so that the circuit is cut off.

Figure 8:
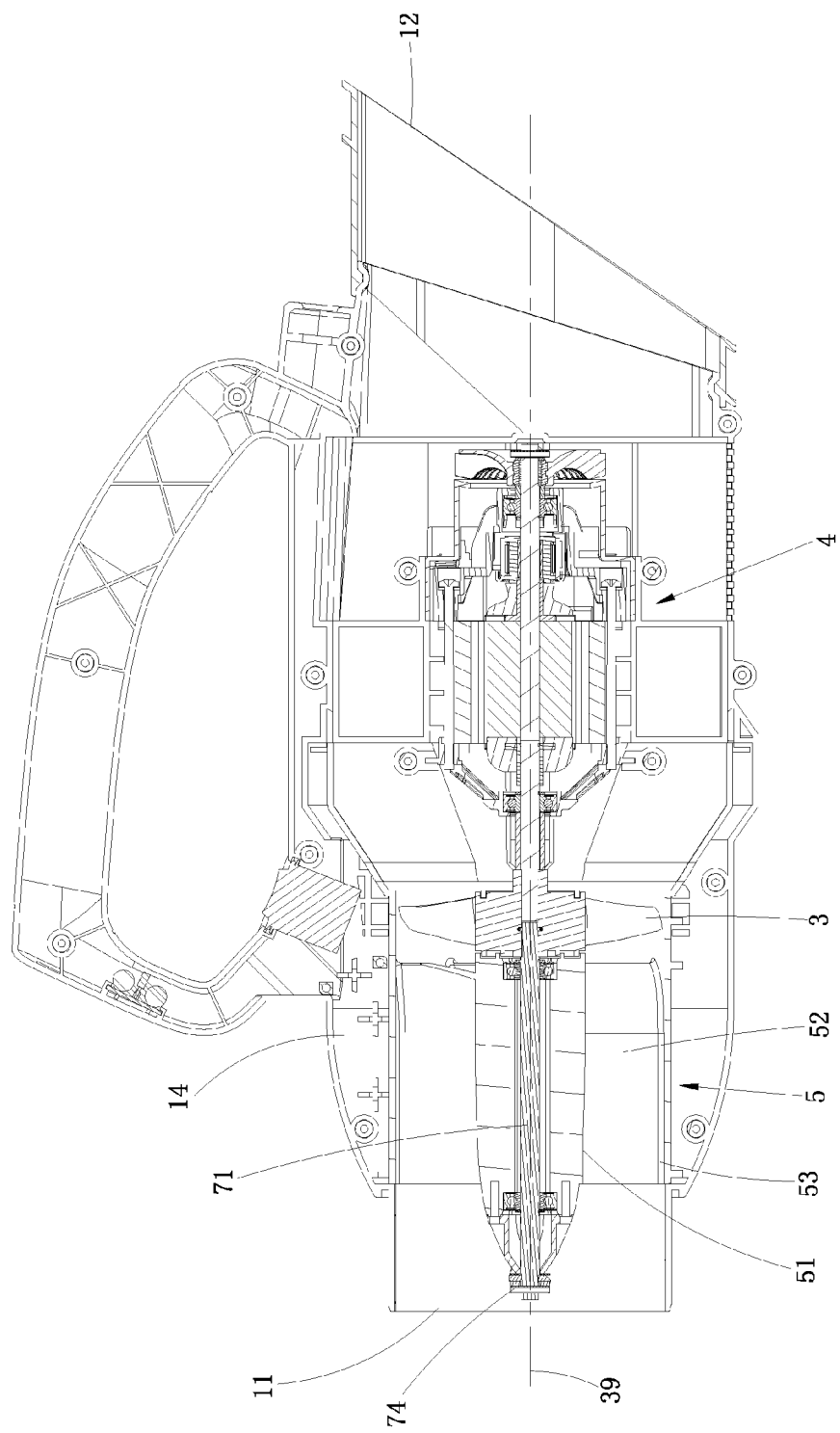
FIG. 8 is a sectional view of the blowing-suction device in FIG. 1.

The first opening 12 is disposed at the longitudinal back end of the main body 10. In the embodiment shown in FIG. 17, the first opening 12 has a detachable security shield 121. In a preferred embodiment, the security shield 121 may rotate around a rotation shaft, so as to open or close the first opening 12. In another embodiment, the security shield 121 may alternatively be fixed on the first opening 12 in a buckling manner or a pluggable manner. In addition, the security shield 121 is provided with several mesh-like air admission structures. Air may pass through the first opening 12 from the air admission structure, but a particle matter having a relatively large volume such as a branch or a leaf cannot pass through the first opening 12 and is shielded outside of the security shield 121. In addition, because of a shielding function of the security shield, the user cannot put the hand into the first opening 12, so that no injury is caused. In a preferred embodiment, after the security shield 121 opens the first opening 12, the first opening 12 may be connected to a collection apparatus. The collection apparatus may be an accessory detachably connected to the blowing-suction device 1. The collection apparatus may be a cloth bag, and the cloth bag is used to collect foreign objects such as leaves or branches when the blowing-suction device 1 is in the suction mode. Certainly, in this embodiment shown in FIG. 2, the first opening 12 is not provided with the security shield. The first opening 12 has a substantially ellipse-shaped outline. A formed plane is inclined relative to the direction of the axis 41. An inclined angle approximately ranges from 30 degrees to 60 degrees, and the inclined angle is preferably 45 degrees. The first opening 12 is substantially ellipse-shaped. As shown in FIG. 8, the fan axis 39 of the fan 3 extends through the first opening 12. In another embodiment, the first opening 12 may alternatively not face the longitudinal back end. Instead, a bent portion is provided on a part of the housing 14, and the first opening 12 is provided on the bent portion, so that the orientation of the first opening 12 on the bent portion changes, and does not face the longitudinal back end. In an embodiment, the bent portion is bent downward, or is bent to face the ground, so that the first opening 12 is set to be downward, that is, away from a direction of the handle portion 9. In another embodiment, the bent portion may be bent upward, so that the first opening 12 is set to be upward, that is, the first opening 12 is close to the direction of the handle portion 9.

However, the interface 11 is disposed at the longitudinal front end of the main body 10. The interface 11 is configured to connect to the air tube 2. Specifically, the interface 11 is connected to the connector 25 of the air tube 2. There is only one interface 11 on the main body 10. Therefore, in the blowing mode or the suction mode, the air tube 2 is connected to the interface 11. A shape of the interface 11 basically matches the connector 25 of the air tube 2. In this embodiment, the interface 11 is set to face the longitudinal front end, and the first opening 12 is set to face the longitudinal back end. Therefore, directions of the interface 11 and the opening of the first opening 12 are opposite. In addition, the interface 11 and the first opening 12 are located on two opposite sides of the air flow generation apparatus. For the main body 10, when the blowing-suction device 1 is in the blowing mode, as shown in FIG. 4, air enters the main body from the first opening 12, then moves basically in a straight line, leaves the main body 10 from the interface 11, and correspondingly enters the air tube 2. However, when the blowing-suction device 1 is in the suction mode, air enters the main body 10 from the interface 11, and then leaves the main body 10 from the first opening 12 in a straight line. Therefore, in the blowing mode and the suction mode, movement directions of air flows that are generated by the air flow generation apparatus and that are between the interface 11 and the first opening 12 are opposite. In addition, it should be noted that in this embodiment, the fan axis 39 of the fan 3 extends through the interface 11. For the fan 3 and the motor 4 of the air flow generation apparatus, the motor 4 is located between the fan 3 and the first opening 12, so that a distance between the motor 4 and the first opening 12 is less than a distance between the fan 3 and the first opening 12. In this embodiment, the fan 3, the motor 4, and the first opening 12 are sequentially arranged in a straight line. Extension directions of the interface 11 and the first opening 12 along the fan axis 39 are respectively located on two sides of the fan 3. Alternatively, the interface 11 and the first opening 12 are located on two opposite sides of the air flow generation apparatus. Projections on a plane perpendicular to the fan axis 39, of the interface 11 and the first opening 12 are at least partially overlapped. Therefore, the interface 11, the fan 3, the motor 4, and the first opening 12 are sequentially arranged in a straight line.

Figure 6:
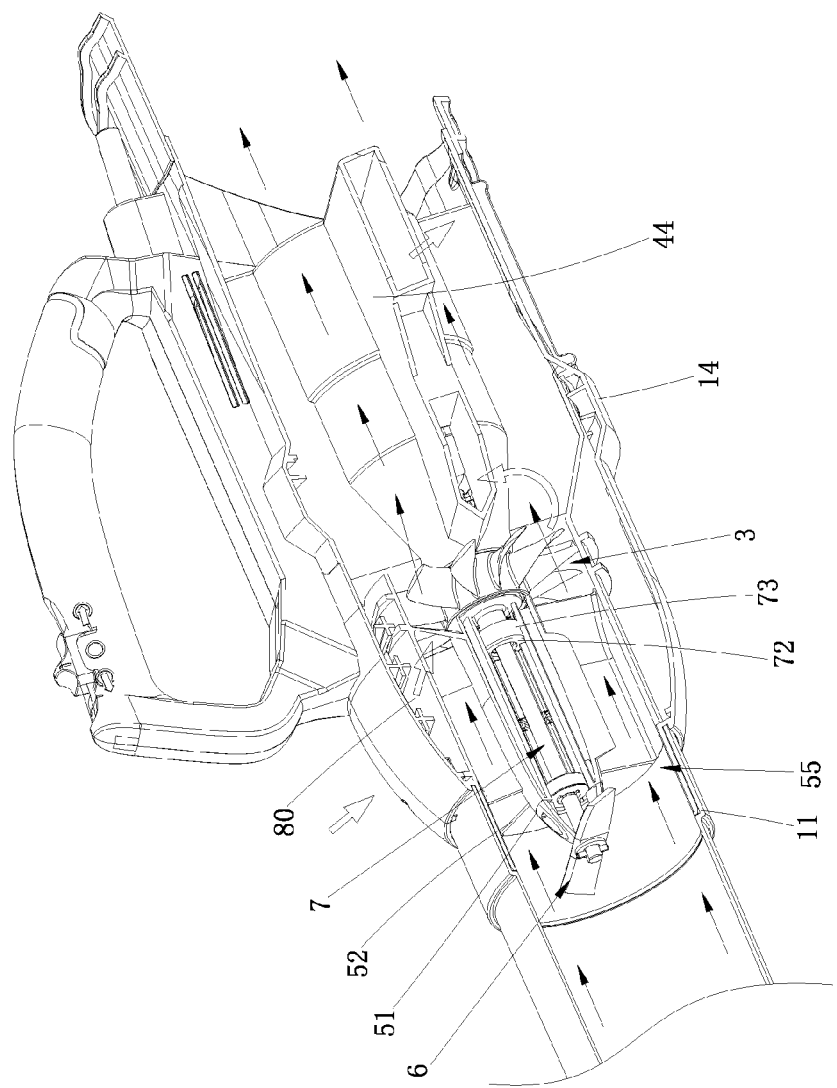
FIG. 6 is a schematic diagram of an air flow channel inside of the blowing-suction device in FIG. 1.

After the air tube 2 is connected to the main body 10, in the blowing mode, the air flow generation apparatus generates an air flow moving in one direction. After entering the housing 14 from the first opening 12 of the main body 10, air moves in the main body 10 until the air flow blowing out from the tube opening 21 of the air tube 2 is formed. A movement direction of the air flow is indicated by a single-line arrow shown in FIG. 4. However, in the suction mode, the air tube 2 is still connected to the main body 10, and a position at which the air tube 2 is connected to the main body 10 remains unchanged. The air flow generation apparatus generates an air flow moving in another direction. In the suction mode, a movement direction of the air flow is different from the movement direction of the air flow in the blowing mode, that is, air enters the air tube 2 from the tube opening 21. After the air flow is sucked, the air flow moves in the main body 10, and finally forms an air flow exhausting from the first opening 12, as indicated by a single-line arrow shown in FIG. 5. Certainly, it is additionally emphasized that in the suction mode, because the tube opening 21 is aligned to the ground, foreign objects such as leaves, branches, and dust enter the main body 10 into the tube opening 21 with the air flow. However, in the blowing mode, the first opening 12 is far away from the ground. Therefore, only air enters the main body 10. Therefore, as shown in FIG. 6, in the blowing-suction device 1, an air flow channel 55 for the air flow to pass through is formed between the first opening 12 and the tube opening 21. In other words, the housing 14 and the air tube 2 together form the air flow channel 55 for the air flow to pass through. The air flow channel 55 is a channel through which air moves in the blowing-suction device 1. In a common case, because the blowing-suction device 1 has different working modes: the blowing mode and the suction mode. Due to consideration of respective performances, air flow channels in different working modes are different. However, in the present invention, the air flow channel 55 is a channel used for the air flows in the blowing mode and the suction mode. That is, in the blowing mode and the suction mode, the air flows move in the same air flow channel. However, in the two modes, movement directions of the air flows are different. Optimally, in the two modes, the movement directions of the air flows are opposite. Specifically, in the blowing mode, the air flow moves from the first opening 12 to the tube opening 21. However, in the suction mode, the air flow moves from the tube opening 21 to the first opening 12. In addition, it should be noted that the entire air flow channel 55 extends in the longitudinal direction. Certainly, the air flow channel 55 may alternatively be partially bent or folded. In this embodiment, the fan 3 and the motor 4 are both located in the air flow channel 55. When the blowing-suction device 1 is in the blowing mode, the fan 3 is driven by the motor 4 to rotate, and the fan 3 rotates around the fan axis 39 in the clockwise direction. When the blowing-suction device 1 is in the suction mode, the fan 3 is driven by the motor 4 to rotate, and the fan 3 rotates around the fan axis 39 in the counterclockwise direction. However, in an embodiment shown in FIG. 20, the fan 3 is stilled located in the air flow channel 55, and the motor 4 is not located in the air flow channel 55.

Figure 7:
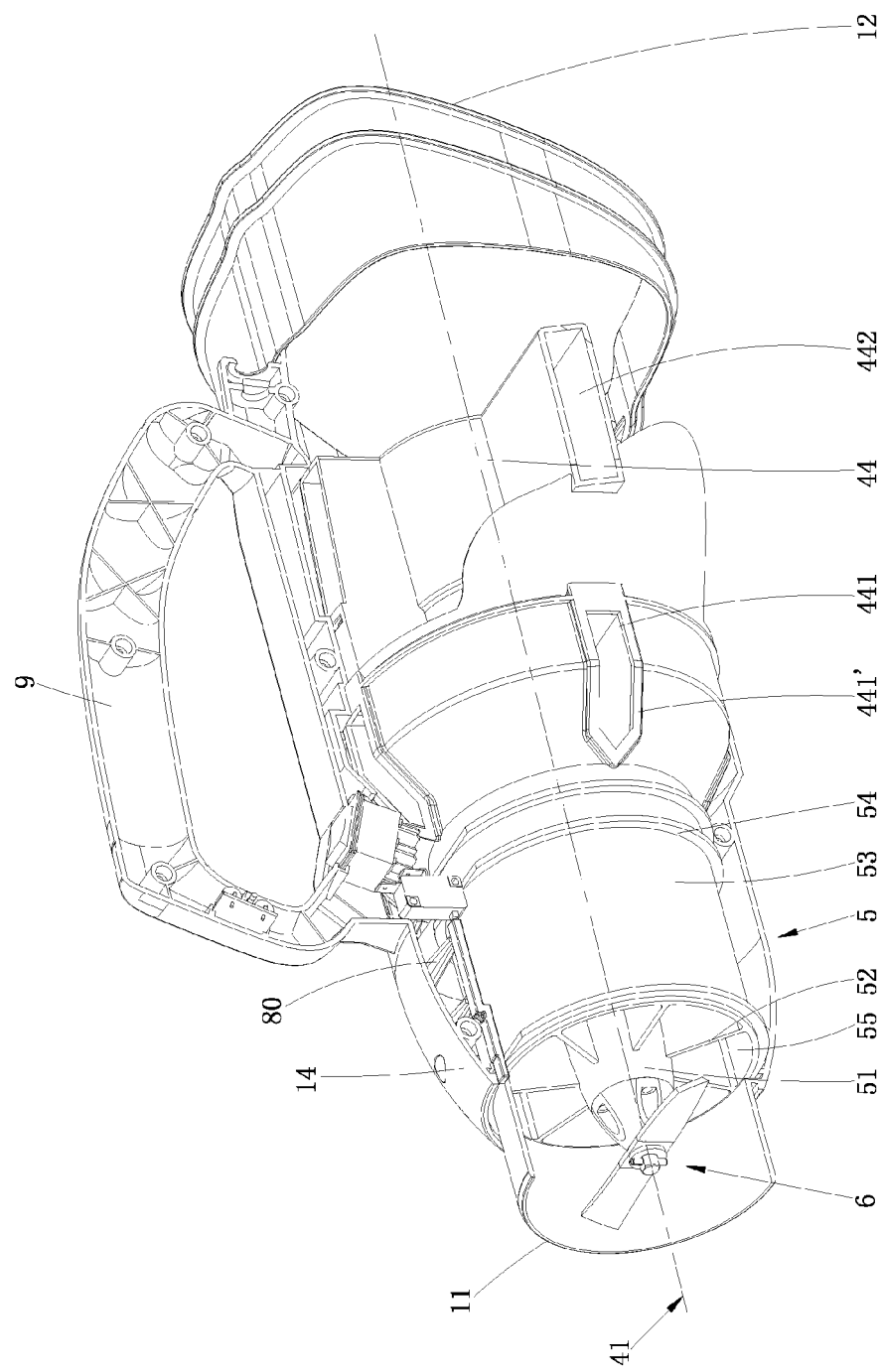
FIG. 7 is a schematic diagram of an internal structure of the blowing-suction device in FIG. 1.
Figure 17:
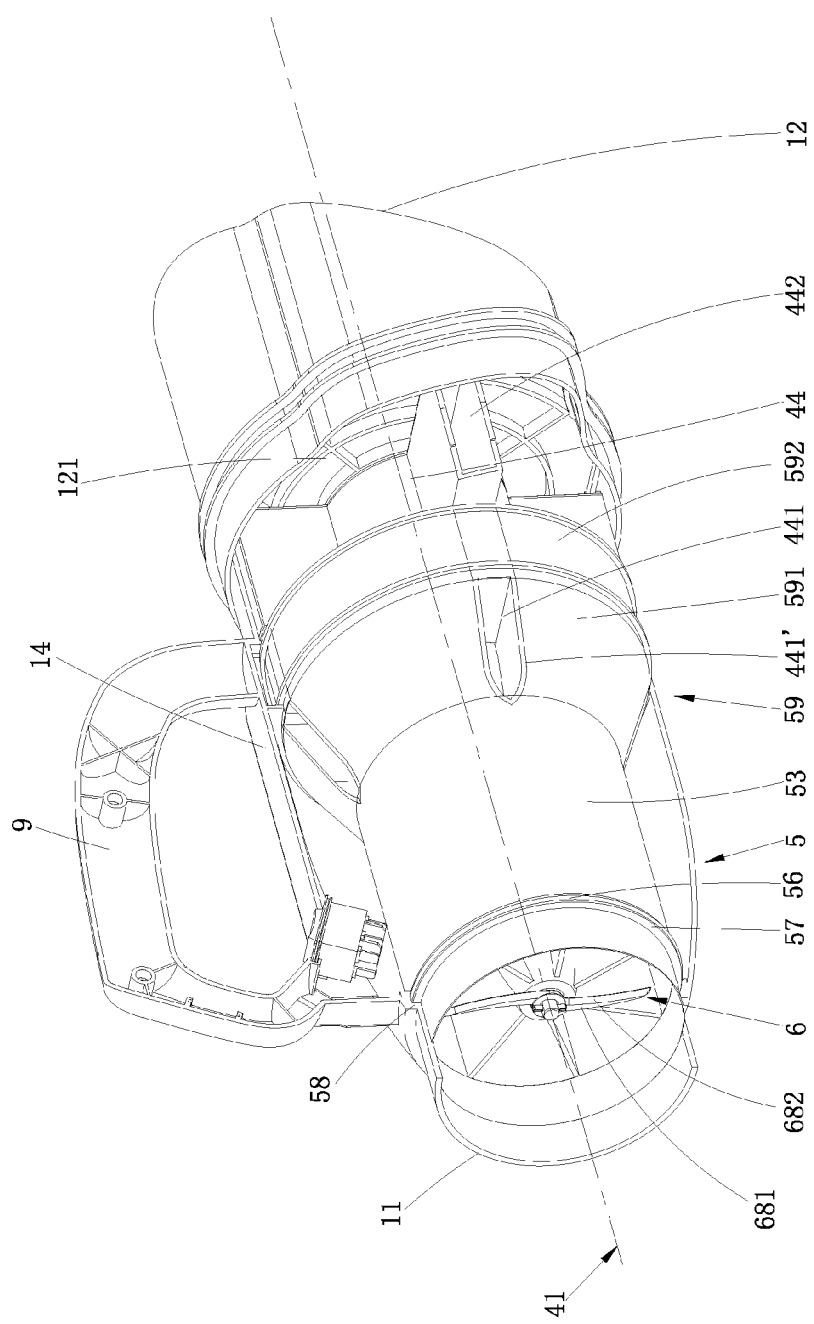
FIG. 17 is a schematic diagram of an internal structure of a blowing-suction device according to the second embodiment of the present invention.

As shown in FIG. 7 and FIG. 8, the blowing-suction device 1 further includes a duct 5. A function of the duct 5 is to guide air flows generated by the fan 3 to move toward the air tube 2, so that movement directions of the air flows are more consistent, thereby improving effects of the air flows. In this embodiment, the duct 5 is also located in the air flow channel 55, and is located between the interface 11 and the fan 3. The duct 5 is disposed near the interface 11 of the main body 10, and the duct 5 is closer to the longitudinal front end than the fan 3, or the duct 5 is located on one side that is of the fan 3 and that is away from the first opening 12. When the fan 3 generates an air flow moving to the interface 11, the air flow passes through the duct 5 before arriving at the interface 11. In other words, the air flow passes through an air guide entity of the duct 5 before arriving at the interface 11. The duct 5 includes: the air guide entity 51 located inside of the housing 14, a stationary blade 52 fixedly connected the air guide entity 51, and an air guide cover 53 configured to accommodate the air guide entity 51 and the stationary blade 52. The air guide cover 53 is located outside of the housing 14, and space is formed between the air guide cover 53 and the housing 14. In this embodiment, the air guide cover 53 is a cylindrical-shaped housing having a hollow interior. The interior of the cylindrical-shaped housing accommodates the air guide entity 51 and the stationary blade 52. The air flow generated by the fan 3 passes through the inside of the air guide cover 53. The air guide cover 53 is preferably further provided with a protrusive fixing element 54. The fixing element 54 is disposed outside of the air guide cover 53, and can be fixedly coupled to the inside of the housing 14, thereby fixing a position of the air guide cover 53. In this embodiment, the fixing element 54 may be a rib protruding a surface, and is set to be ring-shaped. In another embodiment, as shown in FIG. 17, a vibration reduction mechanism 56 is disposed between the air guide cover 53 and the housing 14. The vibration reduction mechanism 56 is configured to reduce vibration transferred from the air guide cover 53 to the housing 14. The air guide cover 53 is provided with a positioning slot 57, and the vibration reduction mechanism 56 is accommodated in the positioning slot. However, a corresponding position of an inner wall of the housing 14 is provided with a positioning step 58 fitting the positioning slot 57. In this embodiment, the vibration reduction mechanism 56 is a ring-shaped elastic ring around the air guide cover 53. Certainly, the vibration reduction mechanism 56 may alternatively be a block-shaped elastic block. In addition, it should be noted that the vibration reduction mechanism 56 is preferably located at a longitudinal front end of the air guide cover 53. The air guide cover 53 further has a fitting portion 59 disposed at a longitudinal back end. The fitting portion 59 also extends in the longitudinal direction. The fitting portion 59 has a cone-shaped structure whose radius gradually changes. The cone-shaped structure is similar to a horn mouth whose mouth face a back end. A function of the cone-shaped structure is to partially fit a motor cover 44 enclosing the motor 4. The motor cover 44 may be partially fitted and fixed to the fitting portion 59. The air guide cover 53 extends along the longitudinal direction, and two longitudinal ends of the air guide cover 53 are not sealed. Certainly, in another embodiment, the housing 14 may alternatively be used as the air guide cover 53.

The air guide entity 51 is located in the air guide cover 53. The entire air guide entity 51 substantially extends in the direction of the axis 41, and is of a cone-shaped structure. One end of the air guide entity 51 faces the interface 11, and the other end is away from the interface 11. The end away from the interface 11 has an opening. An extension direction of the air guide entity 51 is the same as an extension direction of the air guide cover 53. The air guide entity 51 has a hollow interior, and another element may enter the interior of the air guide entity 51 from the opening. The air flow generated by the fan 3 passes through the outside of the air guide entity 51. Therefore, the air guide entity 51 fits the air guide cover 53, so that the air flow generated by the fan 3 passes through between the air guide entity 51 and the air guide cover 53.

The stationary blade 52 is disposed outside of the air guide entity 51. Stationary blades 52 are preferably evenly distributed on the air guide entity 51 in a circumferential direction. The stationary blade 52 is fixedly connected to the air guide entity 51. Preferably, a plane formed by the stationary blades 52 is substantially inclined and has a particular angle relative to the direction of the axis 41. The inclined angle may be set to 8 degrees to 15 degrees. The quantity of the stationary blades 52 are approximately seven. The duct 5 is located in the air flow channel 55. Space between the air guide cover 53 and the air guide entity 51 is for the air flow to pass through. The stationary blade 52 is disposed between the air guide entity 51 and the air guide cover 53, and is exactly located in the air flow channel 55, so that the stationary blade 52 can guide the passing air flow. In the blowing mode, the duct 5 is located in the downstream area of the fan 3, rectification occurs when air flows blowing out from the fan 3 pass through the duct 5, so that rotation directions of some air flows may be adjusted, and eddy currents are reduced. Therefore, directions of all the air flows are more consistent, thereby improving blowing effects and blowing efficiency of the air flows. It should be noted that the stationary blade 52 and the blade 32 of the fan 3 are disposed around the axis in a circumferential direction. To avoid mutual interference between the stationary blade 52 and the blade 32 of the fan 3 in the circumferential direction and ensure that there are no more overlapped blades on any phase in the circumferential direction and similar resonance overlapping effects generated, so that the quantity of the stationary blades 52 and the blades 32 are set to prime to one another. For example, the quantity of the stationary blades 52 may be set to 6, and the quantity of the blades 32 is correspondingly 11. For another example, the quantity of the stationary blades 52 is 7, and the quantity of the blades 32 is 12. In this way, when the fan 3 rotates, at any moment, the quantity that blades 32 and stationary blades 52 are overlapped on the phase is at most one. The duct 5 may be located in the main body 10 and is integrally formed with the main body 10. Certainly, the duct 5 may alternatively be used as an independent element to fixedly couple to the main body 10. However, in another embodiment, the duct 5 may alternatively be disposed in the air tube 2.

As shown in FIG. 4 and FIG. 5, the blowing-suction device 1 has at least two working modes: the blowing mode and the suction mode. When the blowing-suction device 1 is in the blowing mode, the fan 3 operably rotates in the first direction, so that a generated air flow is blown out from the tube opening 21 of the air tube 2. When the blowing-suction device 1 is in the suction mode, the fan 3 operably rotates in the second direction, so that a generated air flow is sucked from the tube opening 21 of the air tube 2. It should be noted that in the blowing mode or the suction mode, the air tube 2 is connected to the interface 11 of the main body 10. In this way, when the blowing-suction device 1 is switched from the blowing mode to the suction mode, or is switched from the suction mode to the blowing mode, a user does not need to perform an additional operation on the position of air tube 2 and fixing of air tube 2, or move the air tube 2. Only the rotation direction of the fan 3 needs to be controlled. When the blowing mode is switched to, the fan 3 is controlled to rotate in the first direction. When the suction mode is switched to, the fan 3 is controlled to rotate in the second direction. Further, in the blowing mode, air enters the first opening 12 and is blown out from the tube opening 21. However, in the suction mode, air is sucked from the tube opening 21 and is exhausted from the first opening 12. In the blowing mode or the suction mode, paths through which air passes are both between the first opening 12 and the tube opening 21, and the paths through which air moves are the same. Only air movement directions in the blowing mode and the suction mode are different. Therefore, in the blowing mode or the suction mode, the blowing-suction device 1 uses the air flow channel 55. Therefore, a structure of the air flow channel of the blowing-suction device 1 is further simplified, and there is no need to additionally dispose a second air flow channel.

Figure 29:
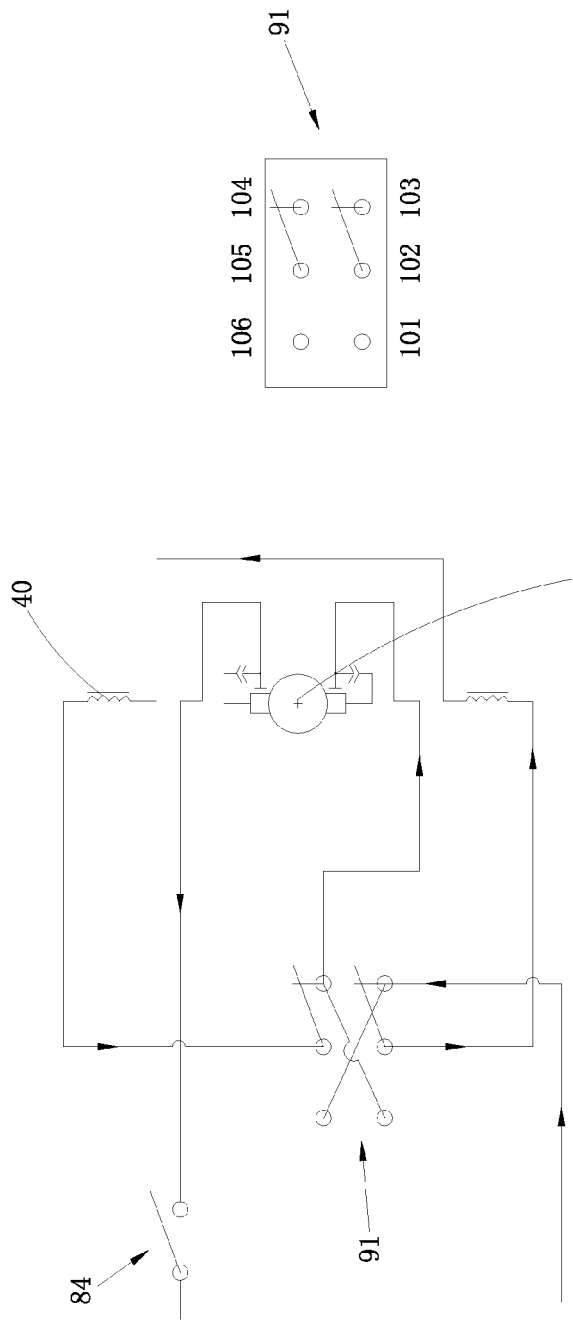
FIG. 29 is a schematic circuit diagram of a control switch at a first operation position in the blowing-suction device in FIG. 1.
Figure 30:
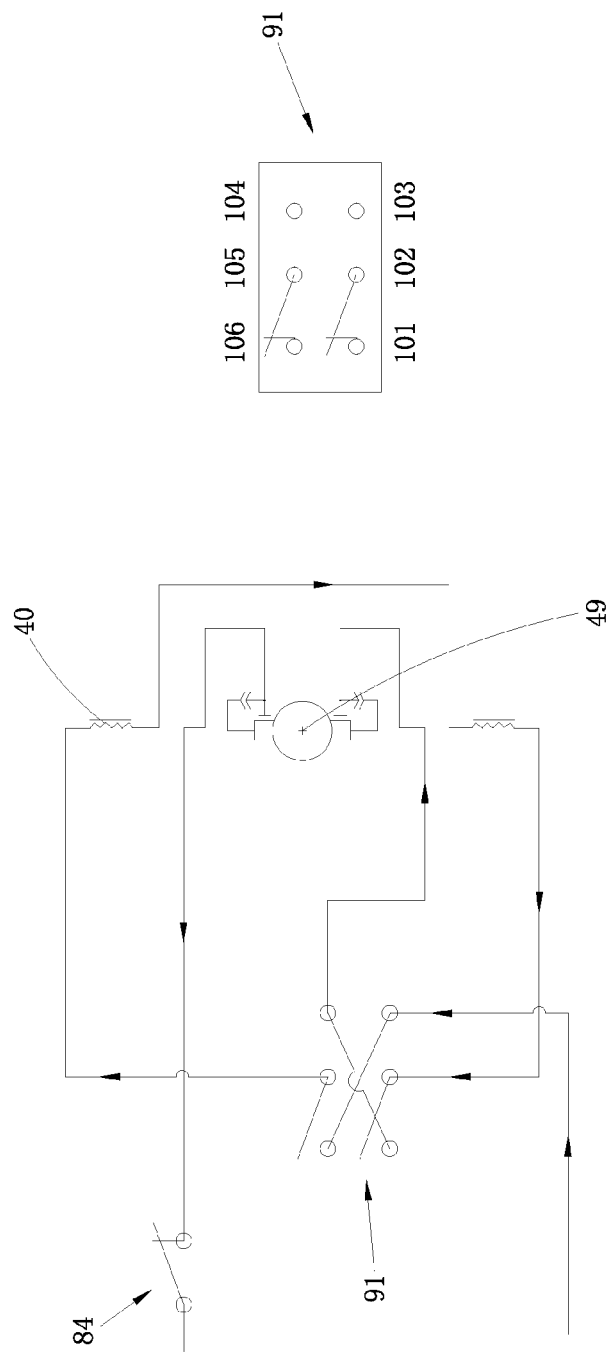
FIG. 30 is a schematic circuit diagram of the control switch at a second operation position in the blowing-suction device in FIG. 1.
Figure 31:
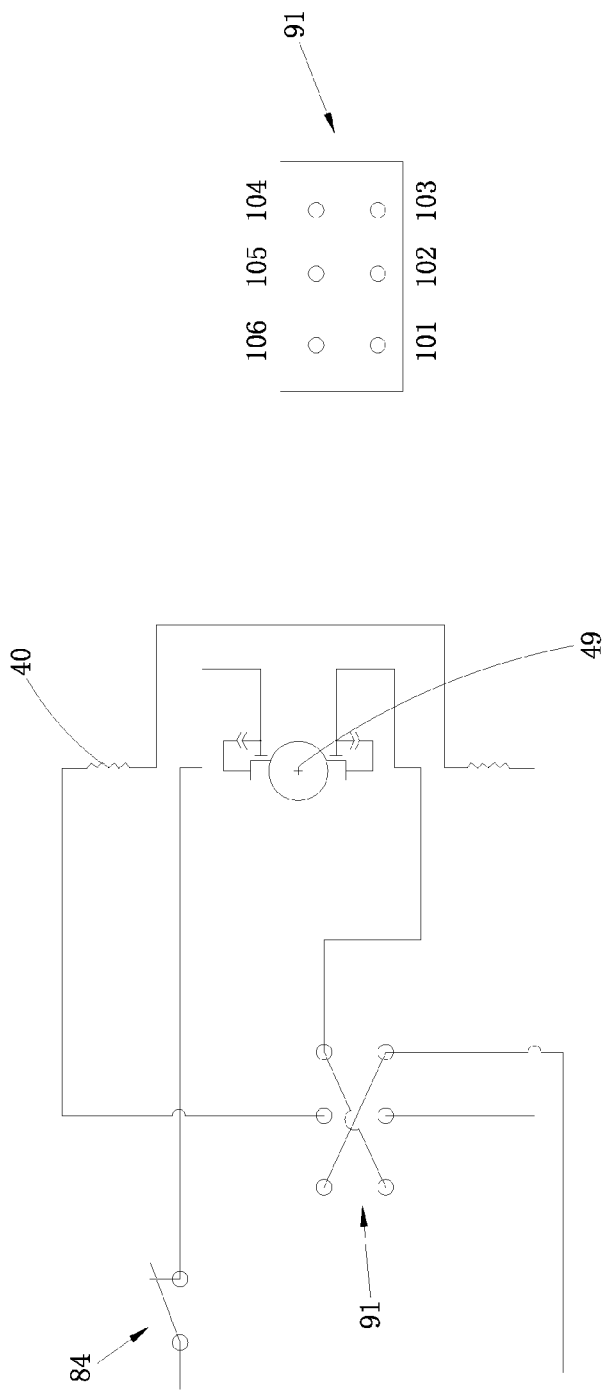
FIG. 31 is a schematic circuit diagram of the control switch at a third operation position in the blowing-suction device in FIG. 1.
Figure 32:
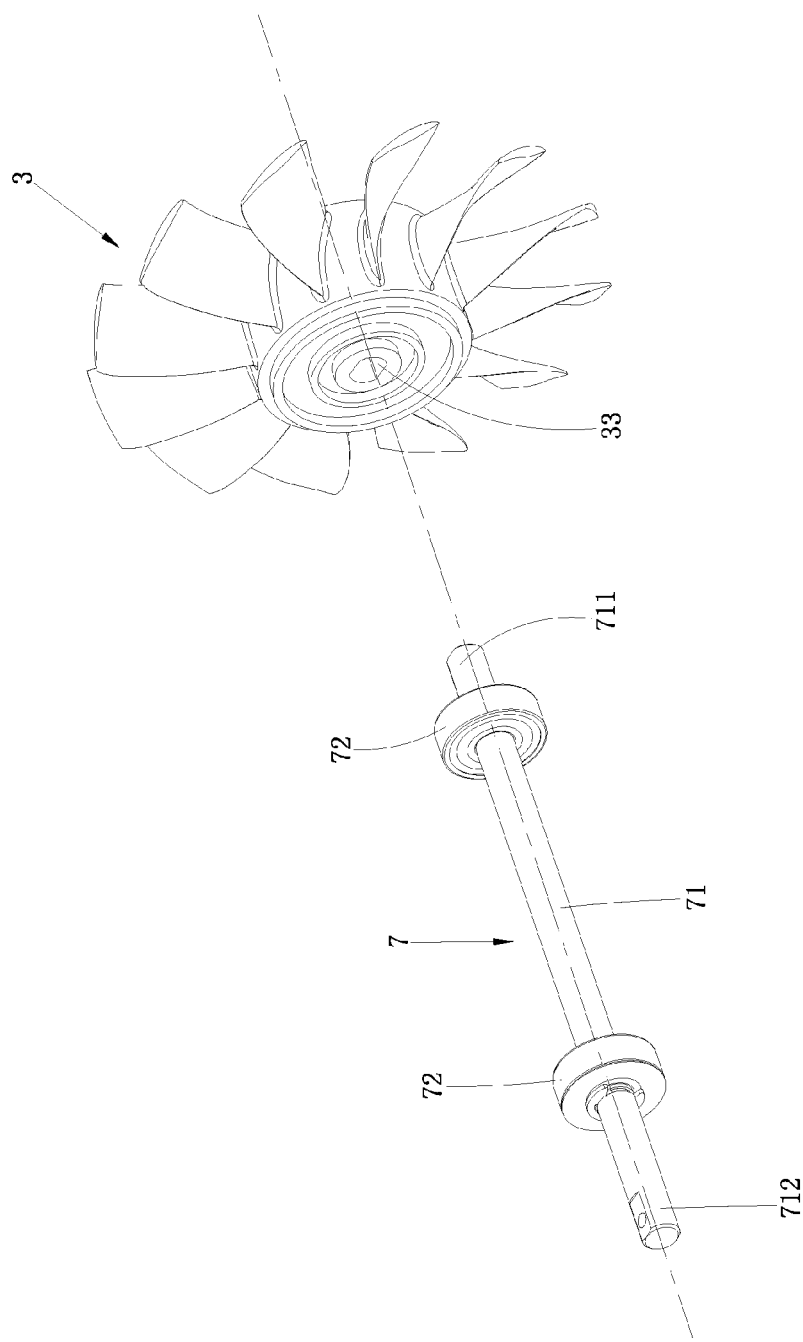
FIG. 32 is a schematic diagram of assembling a fan and a transmission mechanism according to the present invention.

In addition, because the blowing-suction device 1 has at least two different working modes, how to conveniently switch the working manner needs to be considered. Therefore, the blowing-suction device 1 has a switch for blowing and suction mode switching. If a user operates the switch for blowing and suction mode switching, mode switching may be performed, For example, a first working mode is switched to the second working mode, or the second working mode is switched to the first working mode. In the present invention, during mode switching, because the air tube 2 does not need to be moved or a position of the air tube 2 does not need to be changed, the switch for blowing and suction mode switching may be a control switch 91. When the control switch 91 is operated to switch to a position at which the fan 3 is enabled to rotate in the first direction, the blowing-suction device 1 is in the blowing mode. When the control switch 91 is operated to switch to a position at which the fan 3 is enabled to rotate in the second direction, the blowing-suction device 1 is in the suction mode. Therefore, an advantage is that it is very convenient for the user to operate during working mode switching, and there is no need to replace the air tube 2 or move the air tube 2. When the blowing-suction device 1 does not need to be used, the air tube 2 may be detached from the main body 10 for storage. When the blowing-suction device 1 needs to be used, regardless of the blowing mode or the suction mode, the air tube 2 needs to be installed on the main body 10, and then the control switch 91 is operated, so that the motor 4 starts up and rotates in a corresponding direction. Specifically, when the blowing-suction device 1 is in the blowing mode, the control switch 91 is operated to move to the first operation position, or when the blowing-suction device 1 is in the suction mode, the control switch 91 is operated to move to the second operation position. Even the mode switching needs to be performed, the air tube 2 does not need to be frequently detached and installed. In addition, the fan 3 of the blowing-suction device 1 includes the axial flow fan. Because the axial flow fan can generate a relatively high wind speed, compared with a conventional centrifugal fan, blowing efficiency is greatly improved under the premise that the size of the fan is not increased. Because the motor 4 is connected to the fan 3, when the motor 4 rotates in the clockwise direction, the motor 4 drives the fan 3 to rotate in clockwise direction, or when the motor 4 rotates in the counterclockwise direction, the motor 4 drives the fan 3 to rotate in the counterclockwise direction. Therefore, in this embodiment, the control switch 91 indirectly controls the fan 3 by controlling the rotation direction of the motor 4. As shown in FIG. 29 to FIG. 31, the motor 4 includes: a stator 40 and a rotor 49 that may rotate relative to the stator 40. The stator 40 and the rotor 49 are separately twined with coils and connected to circuits. According to the electromagnetic induction principle, relative rotation between the stator 40 and the rotor 49 may be implemented by using a current generated after the circuits are conducted. The control switch 91 is configured to control conduction and cut-off of the control circuit. The control switch 91 has multiple steps, or the control switch 91 has multiple operation positions. The steps or the operation positions may be operably moved between each other. In an embodiment shown in FIG. 29, the control switch 91 has a pin 102 and a pin 105. When the control switch 91 is operated to move to the first operation position, the pin 102 and a pin 103 are connected, and a pin 104 and the pin 105 are connected at the same time. In this case, according to the conducted circuits, a current direction of the circuit in which the stator 40 is located and a current direction of the circuit in which the rotor 49 is located are the same. According to the electromagnetic induction principle, the rotor 49 rotates in the clockwise direction relative to the stator 40, so that the overall performance of the motor 4 is that the motor 4 rotates in the clockwise direction, and the corresponding fan 3 also correspondingly rotates in the clockwise direction. In this case, the blowing-suction device 1 is in the blowing mode. When the mode of the blowing-suction device 1 needs to be switched, the control switch 91 needs to be operated to move to the second operation position. As shown in FIG. 30, when the pin 102 and a pin 101 are connected, a pin 106 and a pin 105 are connected at the same time. In this case, the current direction of the circuit in which the stator 40 is located changes, and the current direction of the circuit in which the rotor 49 is located does not change. Therefore, the rotor 49 rotates in the counterclockwise direction relative to the stator 40, and the motor 4 and the fan 3 correspondingly rotate in counterclockwise direction. In this case, the blowing-suction device 1 is in the suction mode. Certainly, a person skilled in the art easily conceives that when the control switch 91 is moved to different operation positions, the current passing through the stator 40 is not changed, and the current direction of the rotor 49 is changed. In conclusion, when the control switch 91 is moved to different positions, any current direction of the rotor 49 and the stator 40 is changed. Therefore, a method for controlling the blowing-suction device to switch between the blowing mode and the suction mode is that the control switch 91 is operated, so that the first operation position at which the axial flow fan is enabled to rotate in the first direction is moved to the second operation position at which the axial flow fan is enabled to rotate in the second direction. However, in a switching process, a position at which the air tube 2 is connected to the main body 10 remains unchanged. In a preferred embodiment, the control switch 91 may further have the third operation position that is different from the first and the second operation positions. At the operation position, as shown in FIG. 31, the pin 102 and the pin 105 are not connected to another pin. Therefore, the circuits connected to the stator 40 and the rotor 49 are not conducted, that is, the motor 4 does not rotate, and is in a stopped state. Therefore, the control switch 91 may control the motor 4 to switch between three states, which are respectively a forward rotation state, a stopped state, and a reverse rotation state. In addition, as shown in FIG. 29 to FIG. 31, a security switch 84 of a linked security mechanism 8 may be further disposed on the circuits in which the stator 40 or/and the rotor 49 are located. When the security switch 84 is not triggered, regardless of which operation position at which the control switch 91 is located, the entire circuit is in a cut-off state, and the motor 4 is not started up. Only when the security switch 84 is triggered, the control switch 91 can control the circuit.

In addition, as shown in FIG. 2, FIG. 6, and FIG. 7, the blowing-suction device 1 further includes a shredding mechanism 6. Because the fan 3 or/and the motor 4 are both located in the air flow channel 55. In the suction mode, an object having a relatively large volume such as a branch or a leaf enters the main body 10 from the tube opening 21 with air. Therefore, the fan 3 or/and the motor 4 are damaged. As a result, the service life of the blowing-suction device 1 is affected. Therefore, an objective of disposing the shredding mechanism 6 is to shred a sucked object into objects having relatively small volumes and light weights to pass through the fan 3, so as to reduce damage to the fan 3 that is caused by crashing the fan 3 by an object having a relatively heavy weight at a high speed. Therefore, the shredding mechanism 6 is disposed between the fan 3 and the tube opening 21. In this embodiment, the shredding mechanism 6 is disposed at a position that is inside of the main body 10 and that nears the interface 11, so that in the suction mode, after entering the main body 10 from the tube opening 21, a to-be-shredded object passes through the shredding mechanism 6 first and then passes through the fan 3. In this embodiment, the duct 5 is located between the shredding mechanism 6 and the fan 3. The fan 3 and the shredding mechanism 6 are respectively located on two opposite sides of the duct 5, that is, the shredding mechanism 6 is closer to the tube opening 21 than the duct 5. The shredding mechanism 6, the duct 5, and the fan 3 are sequentially arranged in a straight line. The duct 5 is located on one side that is of the fan 3 and that is away from the first opening 12. The shredding mechanism 6 may be driven to rotate around a rotation axis to generate a shredding effect. In this embodiment, the shredding mechanism 6 may be driven by the motor 4 to rotate. The blowing-suction device 1 includes a transmission mechanism 7 connecting the fan 3 to the shredding mechanism 6. The transmission mechanism 7 enables the shredding mechanism 6 to rotate. In this embodiment, the rotation axis of the shredding mechanism 6 and the rotating axis of the fan 3 are set to be overlapped. Certainly, the rotation axis of the shredding mechanism 6 and the rotating axis of the fan 3 may alternatively be set to be parallel to each other or set to have a particular acute angle. Because in this embodiment, the fan 3 is also driven by the motor 4, the motor 4 may drive the fan 3 and the shredding mechanism 6 to rotate together at the same time. In a preferred embodiment, the fan 3 and the shredding mechanism 6 may synchronously rotate. When the fan 3 rotates in the first direction, the shredding mechanism 6 also rotates in the first direction, or when the fan 3 rotates in the second direction, the shredding mechanism 6 correspondingly rotates in the second direction. When the shredding mechanism 6 rotates, the shredding mechanism 6 rotates at a high speed to form a cutting plane substantially perpendicular to the axis 41. In the blowing mode, air ventilation is not affected. However, in the suction mode, air and a to-be-shredded object pass through the cutting plane. Air may losslessly pass through the cutting plane, and the to-be-shred object is shredded into tiny objects when passing through the cutting plane, and then the tiny objects pass through the fan 3, thereby protecting the fan 3 and facilitating collection. As shown in FIG. 2 and FIG. 8, the transmission mechanism 7 is a transmission shaft 71 extending in the longitudinal direction. The transmission shaft 71 may rotate around the axis 41. Certainly, the transmission shaft 71 may not rotate around the axis 41 by using some eccentric structures. One end of the transmission shaft 71 is connected to the fan 3, and the other end is connected to the shredding mechanism 6, so that the fan 3 and the shredding mechanism 6 synchronously move. The one end that is of the transmission shaft 71 and that is connected to the fan 3 is connected to a connection hole 33 of the fan 3 by using a flat rectangular structure or a spline structure. Because the motor shaft 42 and the transmission shaft 71 are respectively located on two side of the fan 3, the motor shaft 42 of the motor 4 is connected to the fan 3 from one side of the connection hole 33, and the transmission shaft 71 connected to the shredding mechanism 6 is connected to the fan 3 from the other side of the connection hole 33. In this embodiment, the transmission shaft 71 is not directly connected to the motor shaft 42, the transmission shaft 71 and the motor shaft 42 are linked by transmission of the fan 3. However, after the shredding mechanism 6 is installed on the transmission shaft 71, the end of the transmission shaft 71 is further provided with an anti-slip structure 74, and a function of the anti-slip structure 74 is preventing the shredding mechanism 6 from moving in an axial direction relative to the transmission shaft 71. In this embodiment, the anti-slip structure 74 is a positioning pin that can be inserted into a jack on the transmission shaft 71. In addition, the anti-slip structure 74 further includes a gasket, and the like. Because the motor 4 and the shredding mechanism 6 are located on two opposite sides of the duct 5, the transmission shaft 71 passes through the duct 5, to connect the motor 4 to the shredding mechanism 6. In this embodiment, the transmission shaft 71 passes through the hollow interior of the air guide entity 51 of the duct 5 in the axial direction. As shown in FIG. 6, a support bearing 72 configured to support the transmission shaft 71 is disposed between the transmission shaft 71 and the air guide entity 51. The transmission shaft 71 can rotatably support relative to a support bearing 72. There may be one or more support bearings 72. In this embodiment, there are two support bearings 72, and the support bearings 72 are disposed at an interval in an extension direction of the transmission shaft 71. However, in another embodiment, the transmission mechanism 7 optionally cuts off transmission transferred from the fan 3 to the shredding mechanism 6. In this case, when the fan 3 rotates, the shredding mechanism 6 may not rotate. In this embodiment, the transmission mechanism 7 includes a clutch system that is connected to or disconnected to the motor shaft 42. When the clutch system is optionally in power connection with the motor shaft 42, the fan 3 rotates with the shredding mechanism 6. When the clutch system is optionally out of power connection with the motor shaft 42, the fan 3 may still rotate, but the shredding mechanism 6 does not rotate.

As shown in the embodiment in FIG. 2 and FIG. 7, the fan 3 and the duct 5 are located on one side of the motor 4. In other words, the motor 4 and the duct 5 are respectively on two sides of the fan 3. In this embodiment, one end of the transmission shaft 71 is not directly connected to the motor shaft 42, but is connected to the fan 3. In this embodiment, the connection hole 33 of the fan 3 is a flat rectangular-shaped through hole. The through hole is separately connected to the transmission shaft 71 and the motor shaft 42 in a flat rectangular manner. Although the transmission shaft 71 is not directly connected to the motor shaft 42, the transmission shaft 71 and the motor shaft 42 are separately coupled to the fan 3, so that synchronous motion can still be implemented. Certainly, a spline structure may further be provided in the connection hole 33, and the transmission shaft 71 and the motor shaft 42 are respectively fitted and connected to the fan 3 by respective splines. In another embodiment, the transmission shaft 71 may alternatively be directly coupled to the motor shaft 42 in a common transmission manner such as in a sleeve manner, by using a planetary gear, or by using an external gear. Because the fan 3 is located at a longitudinal back end of the duct 5, and the shredding mechanism 6 is located at a longitudinal front end of the duct 5, the transmission shaft 71 passes through the air guide entity 51 of the duct 5 and is connected to the shredding mechanism 6. Certainly, in another embodiment, the motor 4 may alternatively be located in the duct 5, that is, the motor 4 and the duct 5 are located on one side of the fan 3. In addition, because the shredding mechanism 6 is closer to the longitudinal front end than the duct 5. To not reduce air amount entering the duct 5, the shredding mechanism 6 needs to have a particular longitudinal interval with the duct 5. A minimum distance between the shredding mechanism 6 and the stationary blade 52 of the duct 5 is 0.5-50 mm. More preferably, the minimum distance between the shredding mechanism 6 and the stationary blade 52 of the duct 5 is 10-20 mm. Further, the minimum distance is 12 mm or 13 mm.

In the embodiment shown in FIG. 2, the shredding mechanism 6 includes a cutting blade. The cutting blade is made of alloy metal material and has particular hardness, and is configured for cutting an object passing through the cutting blade at a high speed. The cutting blade may rotate around the rotation axis of the shredding mechanism 6. However, in this embodiment, the rotation axis of the shredding mechanism 6 and the axis 41 are overlapped.

Figure 12:
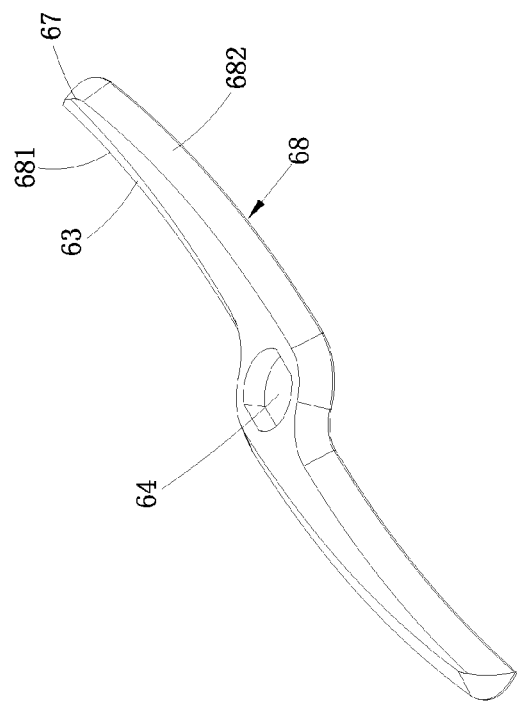
FIG. 12 is a schematic diagram of a shredding mechanism according to a third embodiment of the present invention.
Figure 11:
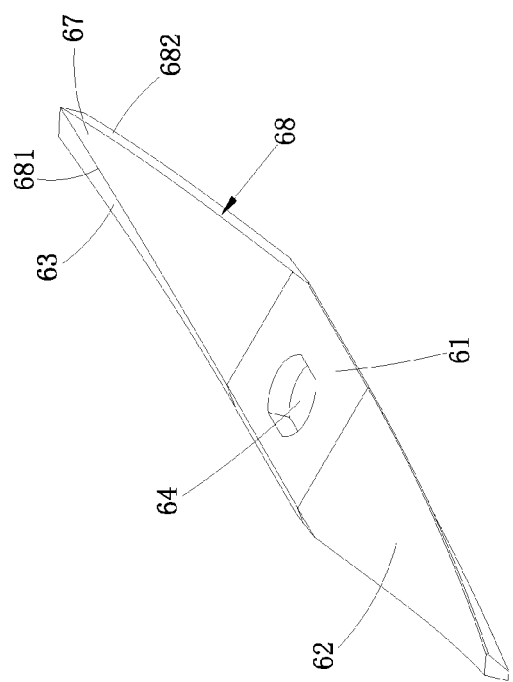
FIG. 11 is a schematic diagram of a shredding mechanism according to a second embodiment of the present invention.

Alternatively, the rotation axis and the axis 41 may be set to be parallel to each other or intersected at a particular angle. The cutting blade extends in a longitudinal direction perpendicular to the rotation axis. The cutting blade includes: an installation portion 61 in the middle of the cutting blade, and two working portions 62 longitudinally extending in a direction opposite to the installation portion 61. The working portion 62 includes a cutting portion 63 configured to cut an object. The working portion 62 is symmetrically disposed relative to the cutting blade. The installation portion 61 is configured to connect to the transmission mechanism 7, and the installation portion 61 includes a mounting hole 64. The mounting hole 64 may be flat rectangular-shaped, or may be of a spline structure or another transmission structure, so that the mounting hole 64 and the transmission shaft 71 are in power connection. Certainly, multiple shape-fitting mounting holes may alternatively be used in the installation portion 61. In addition, the installation portion 61 further includes a positioning part 65 that fixes the mounting hole 64 onto the transmission shaft 71. The positioning part 65 may be a common circlip, a pin, a nut, and the like. Each working portion 62 includes: an end portion 67 located at a longitudinal end of the cutting blade and a side edge 68 located between the installation portion 61 and the end portion 67. Because the installation portion 61 and the end portion 67 of the cutting blade has particular longitudinal widths, each working portion 62 has two oppositely disposed side edges 68: a first side edge 681 and a second side edge 682. The first side edge 681 and the second side edge 682 both extend along the longitudinal direction. A cutting portion 63 is located on one of the two side edges, for example, the first side edge 681. The cutting portion 63 may be a cutting edge or may be saw-toothed, and is configured to shred a to-be-shred object. Certainly, the cutting portion 63 may be disposed on the two side edges 68, or even disposed at the end portion 67. In an embodiment, the cutting portion 63 is disposed on only the first side edge 681, and the second side edge 682 of the cutting blade is set to be curled relative to the first side edge 681. That is, the second side edge 682 of the cutting blade is set to be bent in the longitudinal direction and a transverse direction perpendicular to the longitudinal direction, so that the second side edge 682 may form an air lifting portion. Therefore, negative pressure of air in a downstream area of the air lifting portion is reduced, and eddies are reduced. Certainly, in another embodiment, alternatively, the entire cutting blade may be set to be basically planar without being curled. It should be noted that the shredding mechanism 6 may include more than one cutting blade, and may include multiple cutting blades. The multiple cutting blades are arranged at an interval in an axis direction of the shredding mechanism 6. In an optimal embodiment, the shredding mechanism 6 includes two cutting blades disposed at an interval in the axis direction. Structures of the two cutting blades are the same, and the two cutting blades are driven by the motor 4, so that the two cutting blades perform synchronous rotation having a particular phase difference. Certainly, the cutting blade may further have different shapes. In another embodiment shown in FIG. 11, the first side edge 681 and the second side edge 682 of each working portion 62 of the cutting blade are disposed obliquely relative to each other, and an included angle between the two side edges is an acute angle, so that the longitudinal width of the cutting blade from the installation portion 61 to the end portion 67 gradually narrows. An advantage of such a design is that space occupied by the cutting blade is reduced, so that there is more space for the air flow to pass through. In a preferred embodiment, when a ratio of a projection area of the cutting blade on a cross section of the air tube 2 to the cross sectional area of the entire air tube 2 is less than ½, an effect of air flow ventilation is better. In a more preferred embodiment, the ratio of the projection area to the cross sectional area is ⅓ or ¼. In another embodiment shown in FIG. 12, the first side edge 681 and the second side edge 682 of each working portion 62 of the cutting blade are set to be arc-shaped, and radians of the two side edges are different, so that the entire cutting blade is substantially S-shaped.

Figure 14:
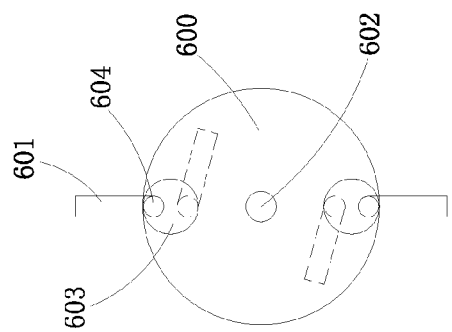
FIG. 14 is a schematic diagram of a front face of the shredding mechanism according to the fourth embodiment of the present invention.
Figure 13:
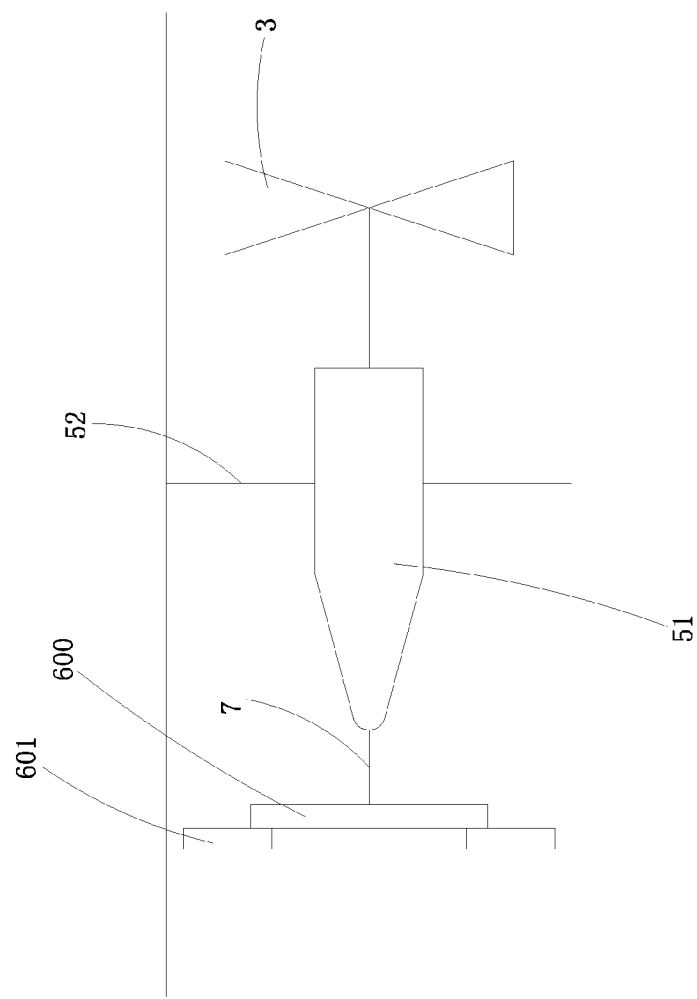
FIG. 13 is a schematic diagram of a side surface of a shredding mechanism according to a fourth embodiment of the present invention.

In an embodiment shown in FIG. 13 and FIG. 14, the shredding mechanism 6 further includes: an impeller 600 and a blade 601 disposed on the impeller 600. The shredding mechanism 6 may also be driven by the motor 4 to rotate. Certainly, when the shredding mechanism 6 is not driven by the motor 4, the shredding mechanism 6 stops rotating. In this embodiment, the impeller 600 is disc-shaped. The blade 601 is disposed on an edge of the disc. A connection portion 602 connected to the transmission mechanism 7 is disposed at the center of the impeller 600. The transmission mechanism 7 drives the impeller 600 to rotate around an axis of the transmission mechanism 7. Certainly, the rotation may be rotation in one direction, or may be rotation in forward and reverse directions. The edge of the impeller 600 is provided with several mounting holes 603, and the blade 601 is coupled to the impeller 600 by using the mounting hole 603. As shown in FIG. 13, a pivot column 604 is disposed on the blade 601. The pivot column 604 passes through a plane in which the blade 601 is located, and the pivot column 604 passes through the mounting hole 603 and may fit a side wall of the mounting hole 603. An area of the mounting hole 603 is greater than a cross sectional area of the mounting column 604. When the impeller 600 is driven by the transmission mechanism 7 to rotate, the blade 601 located on the edge of the impeller 600 is thrown out in a radial direction of the impeller 600 due to a centrifugal force. The blade 601 can extend out of the impeller 600 to perform cutting. When the blade 601 encounters a relatively hard object, the blade 601 hits the object and the mounting column 604 is displaced in the mounting hole 603, so that the blade 601 is retracted from extending out of the impeller 600, as shown in a dashed line in FIG. 13, thereby avoiding abrasion of the blade 601. In this embodiment, two sets of blades 601 are disposed on the impeller 600. Certainly, multiple sets, such as 3 sets or 4 sets, of blades may alternatively be set on the impeller 600.

Figure 15:
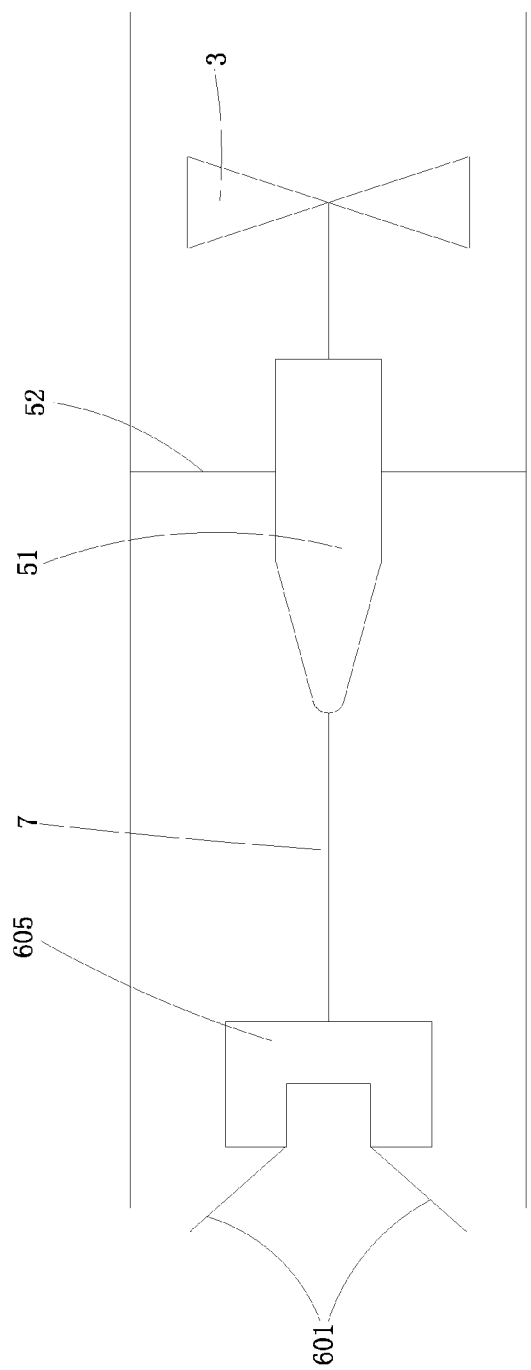
FIG. 15 is a schematic diagram of an extended shredding mechanism according to a fifth embodiment of the present invention.
Figure 16:
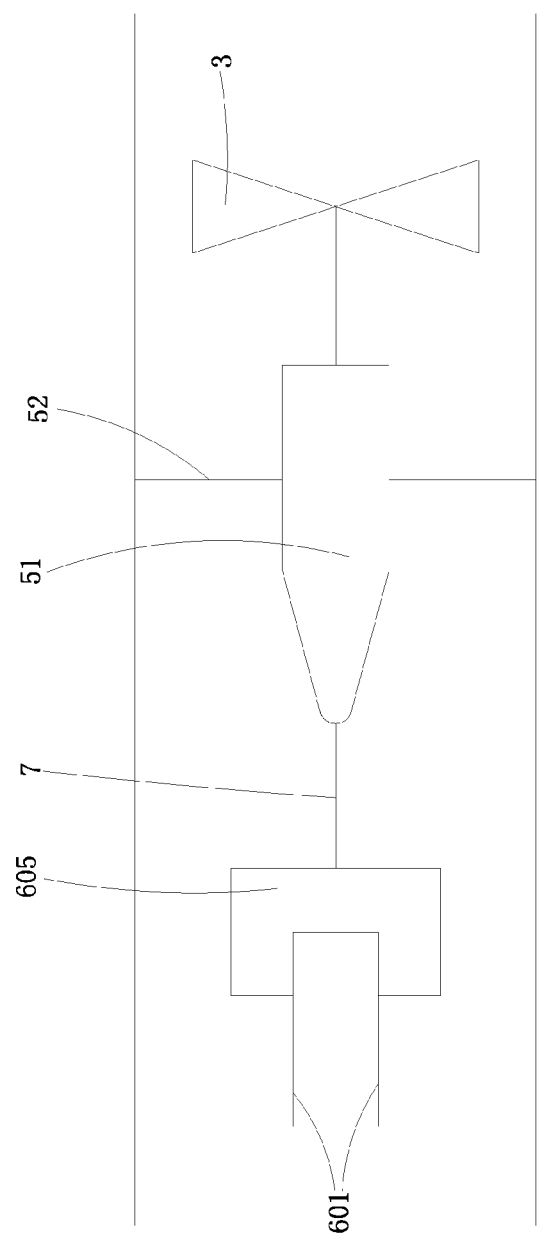
FIG. 16 is a schematic diagram of a retracted shredding mechanism according to the fifth embodiment of the present invention.

In another embodiment shown in FIG. 15 and FIG. 16, the shredding mechanism 6 includes at least one set of symmetrically disposed blades 601. Certainly, the shredding mechanism 6 may alternatively include several sets, such as 2 sets, 3 sets, or more sets, of blades 601. In addition, the shredding mechanism 6 further includes a telescoping part 605. The blade 601 is installed on the telescoping part 605. As shown in FIG. 15 and FIG. 16, the telescoping part 605 can drive the blade 601 to switch between a retracted state and an expansion state. As shown in FIG. 15, the blade 601 expands outward. In this case, the blade 601 is in the expansion state, and when the blade 601 is expanded, the blade 601 may perform a shredding function. As shown in FIG. 16, the blade 601 is retracted inward. In this case, the blade 601 is the retraction state. The telescoping part 605 drives the blade 601 to expand or retract in a movable manner. As shown in FIG. 15 and FIG. 16, the telescoping part 605 is movable connected to the transmission mechanism 7. The transmission mechanism 7 drives the telescoping part 605 to move in an axial direction. Specifically, as shown in FIG. 15, when the transmission mechanism 7 rotates in one direction, the telescoping part 605 move towards the longitudinal front end under action of the rotation in the direction. In this case, the blade 601 is in the expansion state. In this case, the corresponding blowing-suction device 1 is exactly in the suction mode, so that the expanded blade 601 can perform the shredding function. As shown in FIG. 16, when the transmission mechanism 7 rotates in another direction, the telescoping part 605 move towards the longitudinal back end under action of the rotation. In this case, the blade 601 is in the retracted state. The retracted blade 601 can reduce a cross sectional area occupied by the blade 601, thereby ensuring a sufficient air ventilation area. In this case, the corresponding blowing-suction device 1 is exactly in the blowing mode. That is, when the blowing-suction device 1 is in the suction mode, the blade 601 expands to perform shredding. When the blowing-suction device 1 is in the blowing mode, the blade 601 is retracted, so that the air ventilation area is increased.

In another embodiment, the shredding mechanism 6 includes a trimmer rope made of a flexible material. When the transmission mechanism 7 drives the shredding mechanism 6 to rotate around the axis of the shredding mechanism 6 at a high speed, the trimmer rope extends in the radial direction under action of a centrifugal force, so as to perform a function similar to the function of the cutting blade. Under such a design, the trimmer rope also performs the shredding function.

Figure 10:
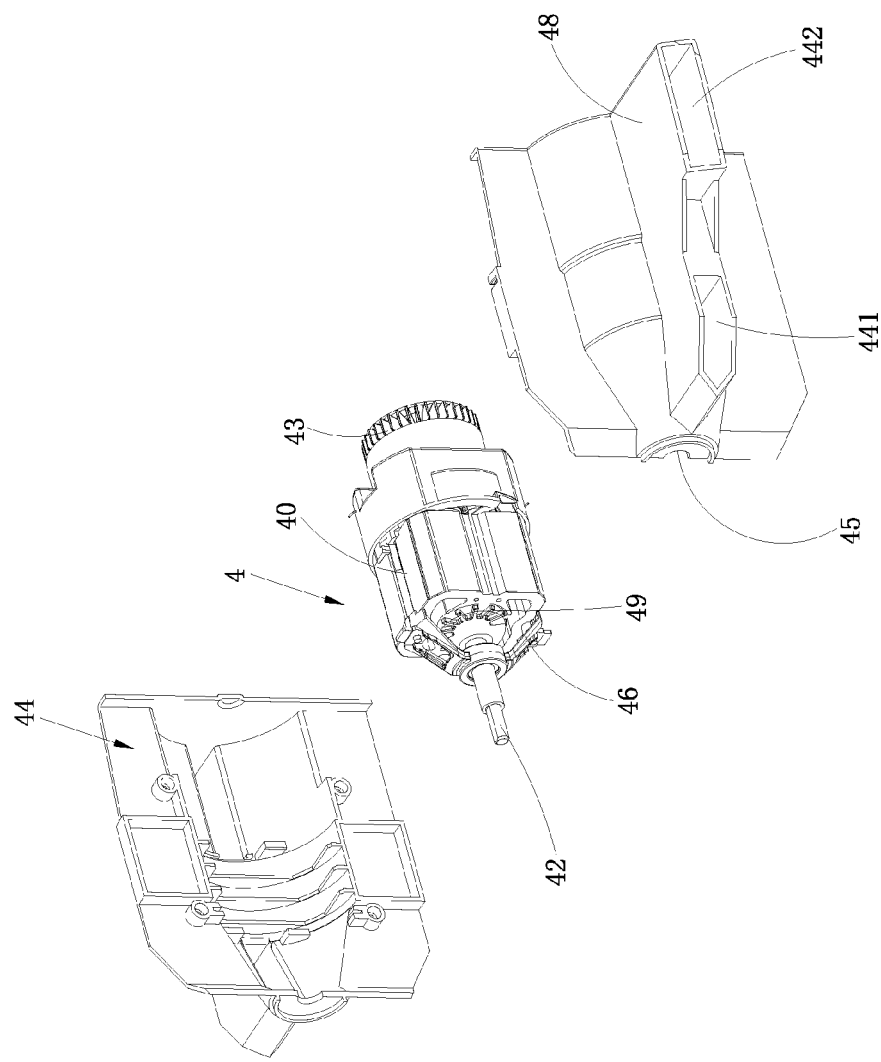
FIG. 10 is a schematic exploded view of a motor cover in FIG. 6.

Even the shredding mechanism 6 has the shredding function, shredded tiny particles still cause damage to the motor 4 when passing through the motor 4. In some extreme conditions, air flows sucked in the suction mode may carry a small quantity of water stains and water vapors. Moisture generated by the water stains and the water vapors also obviously affects the motor 4. Therefore, in the blowing-suction device 1 of the present invention, a optimization design is further performed on the motor 4, so that the motor 4 and the air flow channel 55 are separately disposed. In an embodiment shown in FIG. 2, the motor 4 is located in the air flow channel 55, and the blowing-suction device 1 includes the motor cover 44 located inside of the housing 14. Sealed inner space is formed inside of the motor cover 44. The motor 4 is in the inner space, and the air flow channel is located outside of the motor cover 44. Therefore, the motor cover 44 separates the motor 4 from the air flow channel 55. An air flow passes through the air flow channel 55 between the motor cover 44 and the housing 14. The motor 4 is always in the motor cover 44 and is not affected. Foreign objects or water vapors in the air flow channel 55 do not affect the motor 4 in the motor cover 44. In another embodiment shown in FIG. 18, the motor 4 is directly disposed outside of the air flow channel 55, so as to avoid impact of foreign objects or water vapors on the motor 4. Therefore, in this embodiment, the motor 4 may alternatively not set the sealed motor cover 44. As shown in FIG. 10, the motor cover 44 may include two half-housings that may be fixedly connected to each other. Certainly, in another embodiment, the motor cover 44 may alternatively be integrally formed. In addition, because the motor cover 44 encloses the motor 4, the motor cover 44 is located on one side that is of the fan 3 and that is close to the first opening 12.

To generate an ideal cooling effect for the motor 4 in the motor cover 44, a cooling channel is further disposed in the blowing-suction device 1, and the cooling channel is configured to guide a cooling air flow to pass through the motor 4, so as to achieve the cooling effect. In this embodiment, the cooling channel through which the cooling air flow passes and the air flow channel through which the air flow generated by the fan 3 passes are independently disposed relative to each other. In this way, it may be ensured that movements of the cooling air flow and the air flow generated by the fan 3 are independent of each other, and do not interfere with each other. Therefore, as shown in FIG. 1, FIG. 4, and FIG. 5, the cooling channel has an air inlet 141 and an air outlet 142 that are provided on the housing 14. The air inlet 141 and the air outlet 142 are independently disposed relative to each other. Positions of the air inlet 141 and the air outlet 142 and positions of the interface 11 and the first opening 12 on the housing 14 are different. The air inlet 141 and the air outlet 142 are separately connected to the motor cover 44. Specifically, in the blowing mode, as shown in FIG. 4, the cooling air enters the inside of the motor cover 44 from the air inlet 141 and cools the motor 4, and then leaves the motor cover 44 and returns to the outside through the air outlet 142, as indicated by a hollow arrow shown in FIG. 4. However, the air flow generated by the fan 3 enters the main body 10 from the first opening 12, and then is blown out from the tube opening 21 of the air tube 2, as indicated by the single-line arrow shown in FIG. 4. In the suction mode, air and foreign objects are sucked from the tube opening 21 of the air tube 2 into the air flow channel, and then is exhausted from the first opening 12, as indicated by the single-line arrow shown in FIG. 5. However, the cooling air still enters the motor cover 44 from the air inlet 141, and returns to the outside from the air outlet 142 with heat generated by the working motor 4, as indicated by a hollow arrow shown in FIG. 5. In this embodiment, the air inlet 141 and the air outlet 142 are both located at a longitudinal middle section of the housing 14. The air inlet 141 and the air outlet 142 are evenly distributed on the housing 14 around a circumferential direction. The air inlet 141 and the air outlet 142 are set as roughly grid-shaped openings. The air inlet 141 and the air outlet 142 are distributed in a front-and-back manner in the longitudinal direction. The air inlet 141 is closer to the longitudinal front end of the housing 14 than the air outlet 142, and the air outlet 142 is closer to the longitudinal back end of the housing 14 than the air inlet 141. In a preferred embodiment, as shown in FIG. 2, the blowing-suction device 1 further includes a cooling fan 43 disposed in the motor cover 44. The cooling fan 43 may be driven by the motor 4 to rotate, to generate a cooling air flow. The cooling fan 43 is connected to the motor shaft 42 of the motor 4. The cooling fan 43 is preferably located at a longitudinal back end of the motor 4.

As shown in FIG. 10, the motor cover 44 is provided with a transmission interface 45 that accommodates the motor shaft 42 to pass out, thereby facilitating a connection between the motor 4 in the motor cover 44 and the fan 3 outside of the motor cover 44. The transmission interface 45 is disposed in the direction of the axis 41. The transmission interface 45 has a relatively small cross sectional area, and may accommodate only the motor shaft 42 to pass out. This does not affect sealing of the motor cover 44. The motor cover 44 is preferably formed by fixedly connecting a left half-housing to a right half-housing. Two half-housings are fixedly connected by fixing a bolt or in another common fixing manner. In addition, the cooling fan 43 is also located inside the motor cover 44.

The air inlet 141 and the air outlet 142 are disposed on the housing 14, and the motor cover 44 is located inside the housing 14. To ensure smooth connection between the air inlet 141 and the air outlet 142, the motor cover 44 is further provided with a cooling inlet 441 and a cooling outlet 442. The cooling inlet 441 is connected to the air inlet 141, and the cooling outlet 442 is connected to the air outlet 142.

Figure 9:
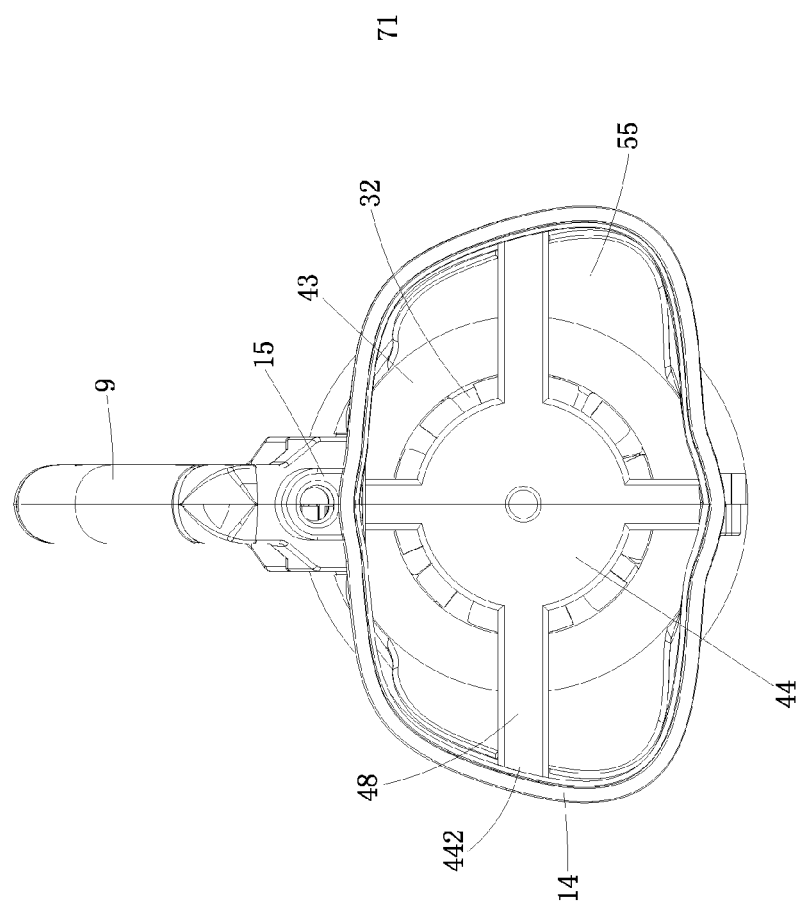
FIG. 9 is a rear view of the blowing-suction device in FIG. 1.

In this embodiment, the size and the position of the cooling outlet 442 are set in correspondence with the size and the position of the air outlet 142. Preferably, the cooling outlet 442 on the motor cover 44 is aligned to the air outlet 142 on the housing 14, so that after exhausting out of the motor cover 44 from the cooling outlet 442, the cooling air is directly exhausted to the outside through the air outlet 142. As shown in FIG. 9 and FIG. 10, the motor cover 44 includes several protrusion portions 48 protruding from a surface of the motor cover 44. An end portion of the protrusion portion 48 may directly abut against an inner surface of the housing 14. The periphery of the protrusion portion 48 in the housing 14 is still a portion for ventilation of the air flow generated by the fan 3. The cooling outlet 442 is located on the end portion of the protrusion portion 48. A position of the housing 14 that is abutted against by the protrusion portion 48 is provided with the air outlet 142. Several air outlets 142 and cooling outlets 442 are disposed in a circumferential direction. In this embodiment, the motor cover 44 substantially extends in the longitudinal direction. However, the protrusion portion 48 extends in a radial direction of the longitudinal direction. In other words, the protrusion portions 48 are evenly distributed in a circumferential direction of the axis 41. In this embodiment, the quantity of the protrusion portions 48 is 4, and an included angle between two adjacent protrusion portions 48 is 90 degrees. Certainly, the quantity of the protrusion portions 48 may alternatively be 3, 5, 6, or the like. As shown in FIG. 9, air passes through a gap between the protrusion portion 48 and the housing 14 when passing through the protrusion portion 48, and the gap of the portion forms a part of the air flow channel 55. However, in the suction mode, the motor cover 44 and the protrusion portion 48 are located in the downstream area of the fan 3, and air passes through the surrounding of the protrusion portion 48. Therefore, the protrusion portion 48 may also takes an effect similar to air guiding. Similarly, to reduce the resonance overlapping effects, the quantity of the protrusion portions 48 and the quantity of the blades 32 are set to prime to one another. For example, the quantity of the protrusion portions 48 is 4, and the quantity of blades 32 is 11. For another example, the quantity of the protrusion portions 48 is 5, and the quantity of blades 32 is 12. In this way, when the fan 3 rotates, at any moment, at most one blade 32 and at most one protrusion portion 48 are overlapped on the phase. In the suction mode, after entering the motor cover 44, the cooling air moves from the protrusion portion 48 to the cooling outlet 442, and finally flows to the outside from the air outlet 142. In another embodiment, the cooling outlet 442 of the motor cover 44 may alternatively not be directly aligned to the air outlet 142 on the housing 14, and the cooling air is exhausted from the air outlet 142 after passing through a section of the channel.

In this embodiment, the air inlet 141 is not directly aligned to the cooling inlet 441, but the air inlet 141 and the cooling inlet 441 are set to be staggered a distance in the longitudinal direction or in a circumferential direction perpendicular to the longitudinal direction. Therefore, as shown in FIG. 4 to FIG. 6, a guide channel 80 is further provided between the cooling inlet 441 and the air inlet 141. The cooling air passes through the guide channel 80 between the cooling inlet 441 and the air inlet 141. In other words, after entering the housing 14, the cooling air enters the motor cover 44 through the guide channel 80. A gap between the air guide cover 53 and the housing 14 forms the guide channel 80. However, the air flow generated by the fan 3 passes through the inside of the air guide cover 53, and the cooling air passes through the guide channel 80. Therefore, the air guide cover 53 may still separates the cooling air from blown and sucked air flows generated by the fan 3. In this embodiment, the fitting portion 59 of the air guide cover 53 of the duct 5 encloses the motor cover 44. Certainly, in another embodiment, alternatively, the air guide cover 53 and the motor cover 44 may be disposed to be completely separated from each other. The air guide cover 53 is provided with a cooling inlet 441' attached on the cooling inlet 441. Air enters the inside of the housing 14 from the air inlet 141, then moves in the gap between the housing 14 and the air guide cover 53, and enters the inside of the motor cover 44 through the cooling inlets 441 and 441'. In this embodiment, the cooling inlet 441' is provided on the fitting portion 59.

The blowing-suction device 1 has at least two working modes: the blowing mode and the suction mode. In the blowing mode, the air tube 2 is fixedly connected to the main body 10 by using the interface 11. The fan 3 controllably rotates around the fan axis in the first direction, so as to generate an air flow. Certainly, the rotation direction of the fan 3 is preferably controlled by the control switch 91. Air enters the inside of the main body 10 from the first opening 12, and then passes through the air flow channel 55 and the fan 3 between the motor cover 44 and the housing 14. The air flow channel 55 between the motor cover 44 and the housing 14 forms the upstream area of the fan 3 in the blowing mode. Because a sealing function of the motor cover 44, air does not enter the inside of the motor cover 44. After passing through the fan 3 from the upstream area, the air passes through the inside of the air guide cover 53. Specifically, inner space between the air guide entity 51 and the air guide cover 53 forms the air flow channel 55 for the air to pass through, and the part of the air flow channel 55 forms the downstream area in the blowing mode. Finally, the air is blown out from the tube opening 21 of the air tube 2.

In the suction mode, the air tube 2 is still fixedly connected to the main body 10 by using the interface 11. The fan 3 controllably rotates around the fan axis in the second direction, so as to generate an air flow. The second direction is different from the first direction. The rotation direction of the fan 3 is preferably controlled by the control switch 91. Air enters the tube opening 21 of the air tube 2 with foreign objects such as leaves, and then passes through the air flow channel 55 between the air guide entity 51 and the air guide cover 53. The air flow channel 55 forms the upstream area of the fan 3 in the suction mode. After passing through the fan 3, the air enters the air flow channel 55 between the motor cover 44 and the housing 14. The part of the air flow channel 55 forms the downstream area in the suction mode. Finally, the air is exhausted from the downstream area to the first opening 12 of the main body 10. In this mode, the first opening 12 is preferably connected to a collection apparatus such as a rubbish bag, and rubbish such as leaves may enter the rubbish bag to be recycled after being exhausted from the first opening 12 together with the air.

Figure 39:
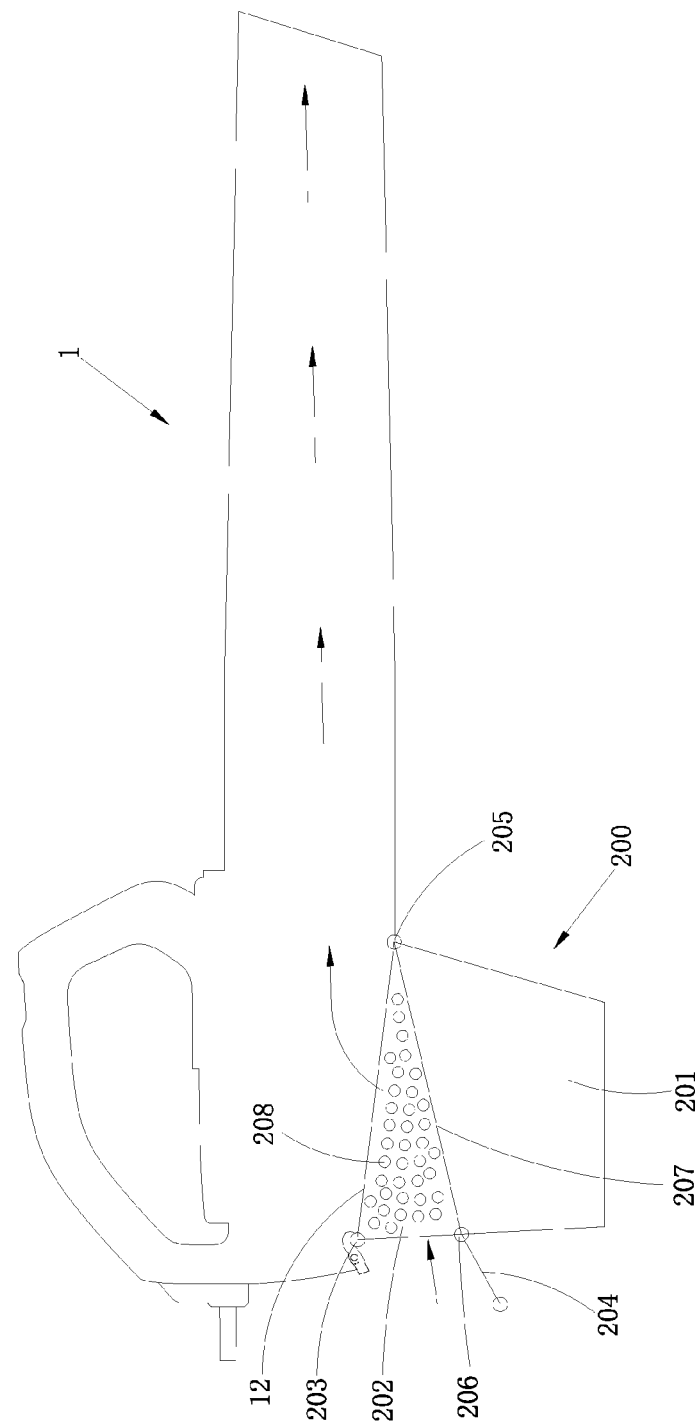
FIG. 39 is a schematic diagram of installing a collection apparatus when a blowing-suction device is in a suction mode according to an embodiment of the present invention.
Figure 40:
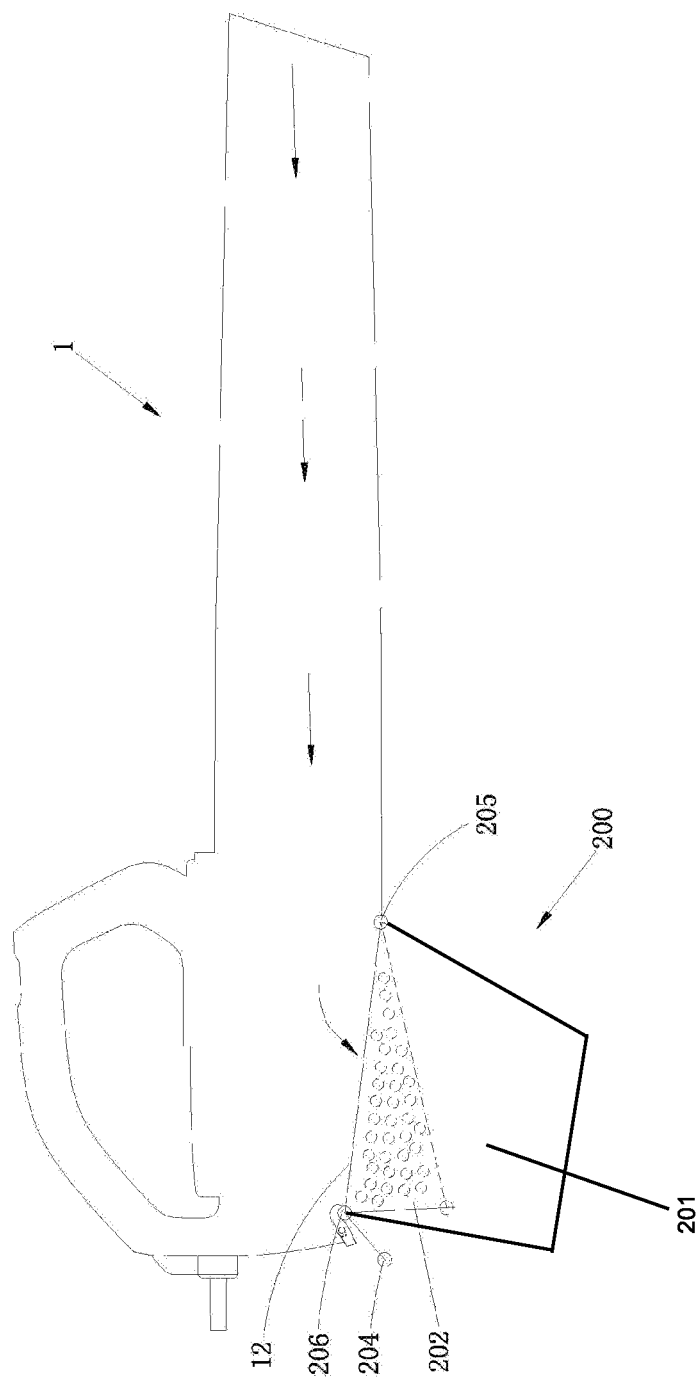
FIG. 40 is a schematic diagram of installing a collection apparatus when the blowing-suction device in the embodiment in FIG. 39 is in a blowing mode.

In a conventional blowing-suction device, when the blowing-suction device is in a suction mode, a collection apparatus is installed and connected to the blowing-suction device. However, when the blowing-suction device is in the blowing mode, the collection apparatus needs to be detached from the blowing-suction device. Therefore, when the blowing mode and the suction mode need to be frequently switched, the collection apparatus is correspondingly frequently detached from and installed on the blowing-suction device. As shown in FIG. 39 and FIG. 40, in this embodiment, when a blowing-suction device 1 is in a blowing mode or a suction mode, a collection apparatus 200 may be connected to the blowing-suction device 1. The collection apparatus 200 includes a collection portion 201 and an air admission portion 202 that is movable relative to the collection portion. The collection portion 201 is configured to collect rubbish, and the air admission portion 202 is configured to ventilate air inside and outside of the collection apparatus 200. As shown in FIG. 40, when the blowing-suction device 1 is in the suction mode, a movement direction of air and rubbish is indicated by an arrow shown in FIG. 40. The air admission portion 202 is accommodated in the collection portion, and in this case, rubbish sucked by the blowing-suction device 1 may directly enter the collection portion 201 for collection. As shown in FIG. 39, when the blowing-suction device 1 is switched to the blowing mode, a movement direction of air is indicated by an arrow shown in FIG. 39. The air admission portion 202 moves until the collection portion 201 is exposed. Air required by the blowing-suction device 1 to perform the blowing function enters the blowing-suction device 1 in the air admission portion 202. In this way, the collection apparatus 201 is always connected to the blowing-suction device 1, blowing and suction mode switching may be implemented without detaching the collection apparatus 201. In this embodiment, the collection apparatus 200 further includes an installation portion 203 installed and connected to the blowing-suction device 1. The collection apparatus 200 is always connected to the blowing-suction device 1 by using the installation portion 203. The installation portion 203 is preferably fixedly disposed on the air admission portion 202. The installation portion 203 may be of a slip hook structure. The slip hook structure enables the air admission portion 202 to be fixedly connected to the blowing-suction device 1. However, an operation portion 204 is disposed on the collection portion 201, so that a user controls, by using the operation portion 204, the collection portion 201 to move relative to the air admission portion 202. In this embodiment, the operation portion 204 is a handle installed on the collection portion 201. The user grasps the handle to drive the collection portion 201 to move relative to the air admission portion 202. In this embodiment, the collection portion 201 may pivotally move relative to the air admission portion 202. The collection apparatus 200 includes a pivotal shaft 205 separately connected to the collection portion 201 and the air admission portion 202, so that the collection portion 201 and the air admission portion 202 rotate relative to the pivotal shaft 205. As shown in FIG. 39, the air admission portion 202 is fixedly installed on a first opening 12 of the blowing-suction device 1 by using the installation portion 203. In this embodiment, the first opening 12 is set downward. The collection portion 201 and the air admission portion 202 forms an angle relative to the pivotal shaft 205, so that the air admission portion 202 is exposed out from the collection portion 201. In this way, the blowing-suction device 1 is in the blowing mode, and air from the outside enters the first opening 12 of the blowing-suction device 1 through the air admission portion 202. As shown in FIG. 40, when the blowing-suction device 1 is switched to the suction mode, the operation portion 204 is operated to rotate around the pivotal shaft 205, so that the collection portion 201 rotates relative to the air admission portion 202, and the air admission portion 202 is accommodated in the collection portion 201. In the suction mode, leaves, dust, and rubbish that are exhausted from the first opening 12 enter the collection portion 201. It should be noted that a second installation portion 206 is preferably installed on the collection portion 201. The second installation portion 206 is fixedly connected to the blowing-suction device 1. The second installation portion 206 is preferably of a slip hook structure similar to that of the installation portion 203. In this embodiment, the collection portion 201 is a bag made of a soft material. The bag has a pocket 207, and leaves and rubbish are collected into the bag by using the pocket. When the collection is not performed, the bag may be folded and compressed into a relatively small storage volume for storage. The bag may be commonly made of a material such as a nonwoven fabric. The air admission portion 202 is disposed adjacent to the pocket 207 of the bag. The air admission portion 202 may be made of a rigidity material. The air admission portion 202 is provided with an air intake hole 208 for air ventilation. Certainly, in another embodiment, alternatively, the air admission portion 202 may be optionally always disposed on the blowing-suction device 1, so that the air admission portion 202 is unchanged as a part of the blowing-suction device 1. In this embodiment, the air intake hole 208 is also correspondingly provided on the blowing-suction device 1.

Figure 33:
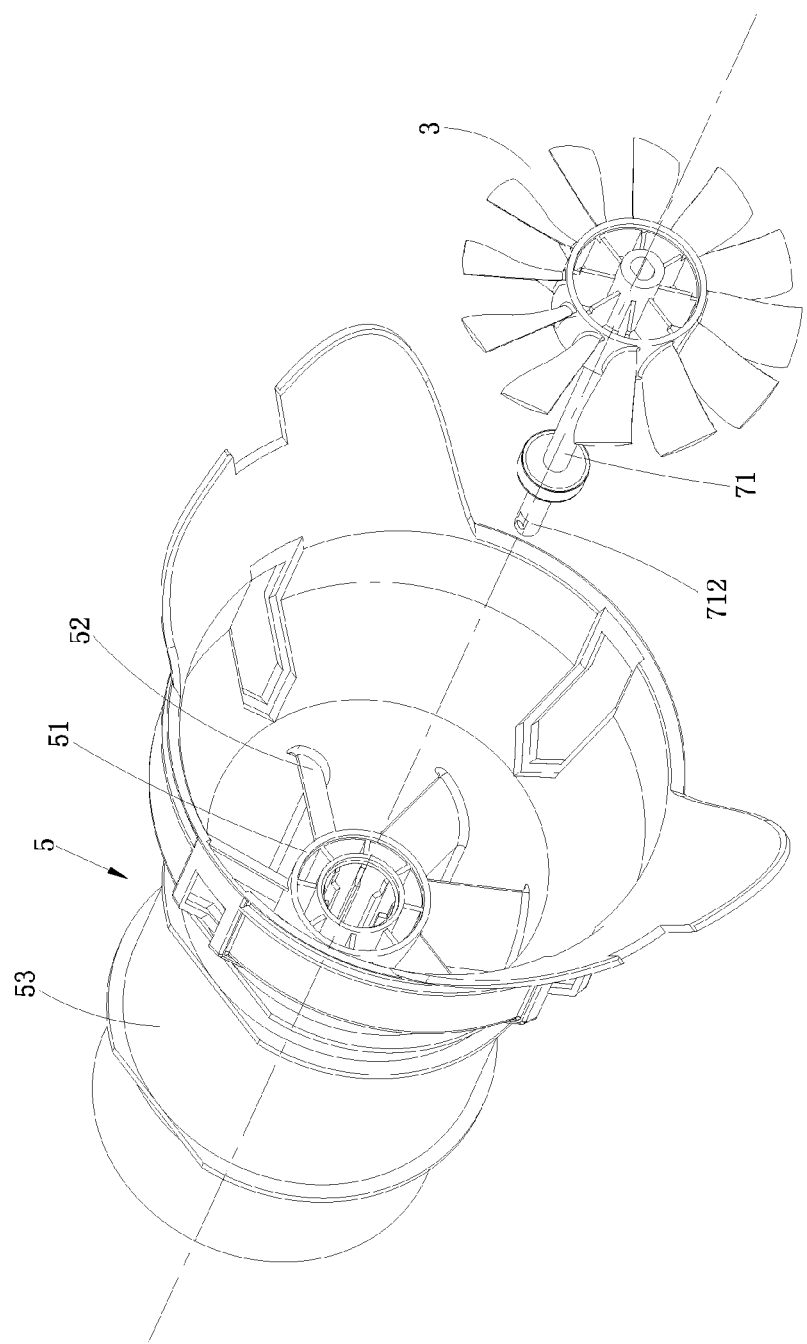
FIG. 33 is a schematic diagram of assembling a duct and a transmission mechanism according to the present invention.
Figure 34:
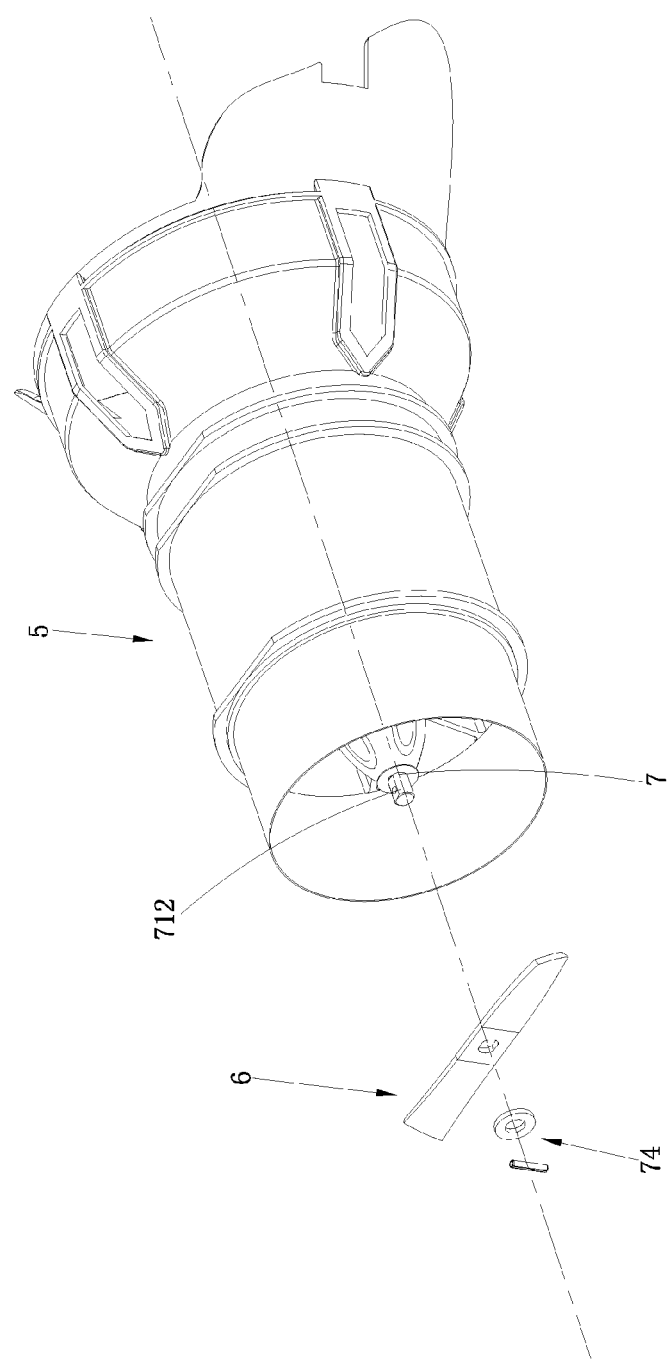
FIG. 34 is a schematic diagram of assembling a shredding mechanism and a transmission mechanism according to the present invention.

The following discloses a method for assembling a blowing-suction device. As shown in FIG. 32 to FIG. 38, the method includes the following steps: step S1: Assemble a first component. The first component mainly includes: a fan 3, a duct 5, a shredding mechanism 6, and a transmission mechanism 7 configured to connect the fan 3 and the shredding mechanism 6. In step S1, the elements are assembled to the component. Step S1 includes three sub-steps: S11, S12, and S13. Specifically, in the substep S11 shown in FIG. 32, the fan 3 is installed at a first end 711 of the transmission mechanism 7. In this embodiment, the transmission mechanism 7 is a transmission shaft 71. The transmission shaft 71 has two opposite ends, and it is assumed that the two ends are respectively the first end 711 and an opposite second end 712. The first end 711 of the transmission mechanism 7 is unrotatably connected to the fan 3 in an extension direction of a dashed line in FIG. 32. The first end 711 of the transmission mechanism 7 and a connection hole 33 of the fan 3 has a coupling structure such as a rectangular structure or a spline structure for connecting the first end 711 of the transmission mechanism 7 to the connection hole 33 of the fan 3. In addition, a support bearing 72 is further installed on the transmission shaft 71. The support bearing 72 is usually located between the first end and the second end of the transmission shaft 71. There are two support bearings 72. The two support bearings 72 support the transmission shaft 71 at an interval. As shown in FIG. 33, after the fan 3 is installed on the transmission shaft 71, substep S12 is performed. In this step, the transmission shaft 71 is inserted into the duct 5. Because the duct 5 is an integral design in this embodiment, the entire duct 5 is an integrally formed part including: an air guide entity 51, a stationary blade 52, and an air guide cover 53. Therefore, the transmission shaft 71 is coupled to the duct 5 only in an inserting manner. The second end of the transmission shaft 71 is inserted into the air guide entity 51 from a tail portion of the duct 5 in the direction of the dashed line in the figure, and is moved toward a head portion of the duct 5. An inner surface of the air guide entity 51 is provided with a protruding positioning structure. The support bearing 72 on the transmission shaft 71 is clamped to some positioning structures in the air guide entity 51. The positioning structure may be a positioning step, a positioning boss, or the like. As shown in FIG. 34, after the transmission shaft 71 is coupled to the duct 5, the second end 712 of the transmission shaft 71 can pass out from the head portion of the duct 5. However, the first end 711 of the transmission shaft 71 is still located outside of the tail portion of the duct 5. The fan 3 connected to the first end 711 of the transmission shaft 71 is also located outside of the duct 5. The transmission shaft 71 passes through the duct 5, and in particular, penetrates the air guide entity 51 of the duct 5. In substep S13, a shredding mechanism 6 is installed at the second end of the transmission mechanism 7 in the direction of the dashed line. The shredding mechanism 6 has an installation portion 61 connected to the second end of the transmission mechanism 7 in a shape-fitting manner. The shape-fitting herein may be a rectangular or spline connection. Therefore, the shredding mechanism 6 is disposed near the head portion of the duct 5, and the fan 3 is disposed near the tail portion of the duct 5. To avoid an axial movement of the shredding mechanism 6 relative to the transmission mechanism 7, the shredding mechanism 6 is installed at the second end of the transmission mechanism 7 and then an anti-slip structure 74 is installed. Therefore, the first component is installed, that is, step S1 is completed.

Figure 35:
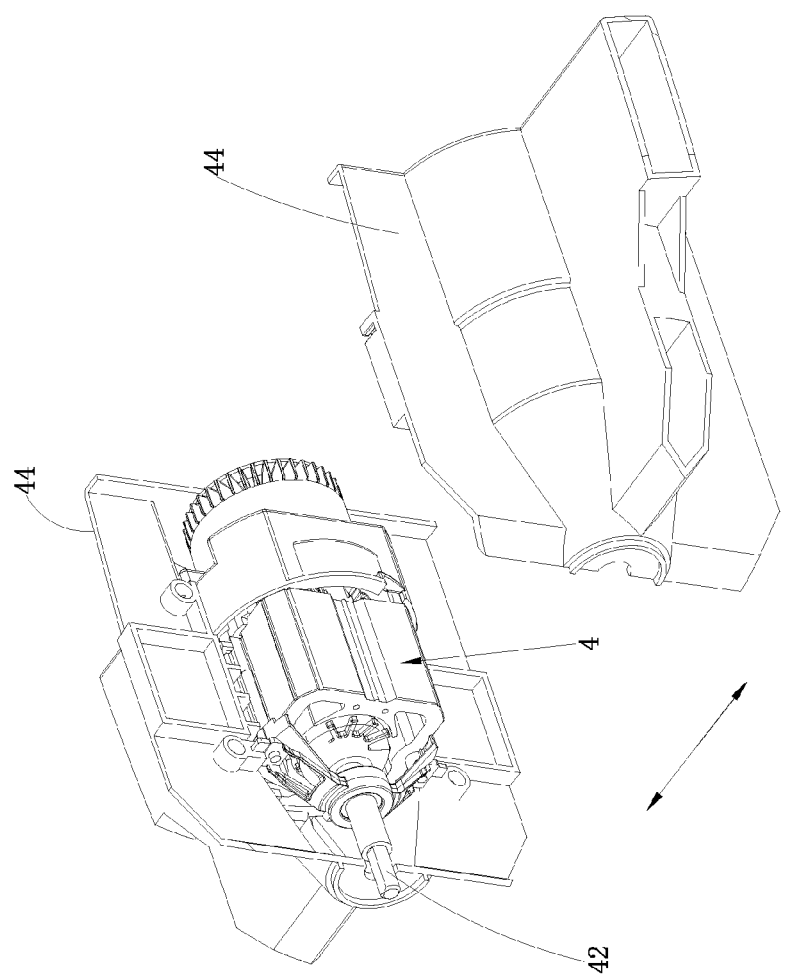
FIG. 35 is a schematic diagram of assembling a motor and a motor cover according to the present invention.

In step S2, a second component is assembled. As shown in FIG. 35, the second component mainly includes: a motor 4 and a motor cover 44. Step S2 mainly includes two substeps: S21 and S22. Because the motor cover 44 includes two half-housings, in substep S21, the motor 4 is fixedly installed in one of the half-housings of the motor cover, ribs for positioning are correspondingly disposed in the motor 4 and the half-housing of the motor cover, so that the motor 4 can be fixedly installed in the half-housing of the motor cover. In substep S22, the other half-housing of the motor cover and the half-housing of the motor cover in substep S21 are interconnected in a direction of a double-head line in the figure, and are fixed by using a fixing element such as a screw. The second component is installed, that is, step S2 is completed.

Figure 36:
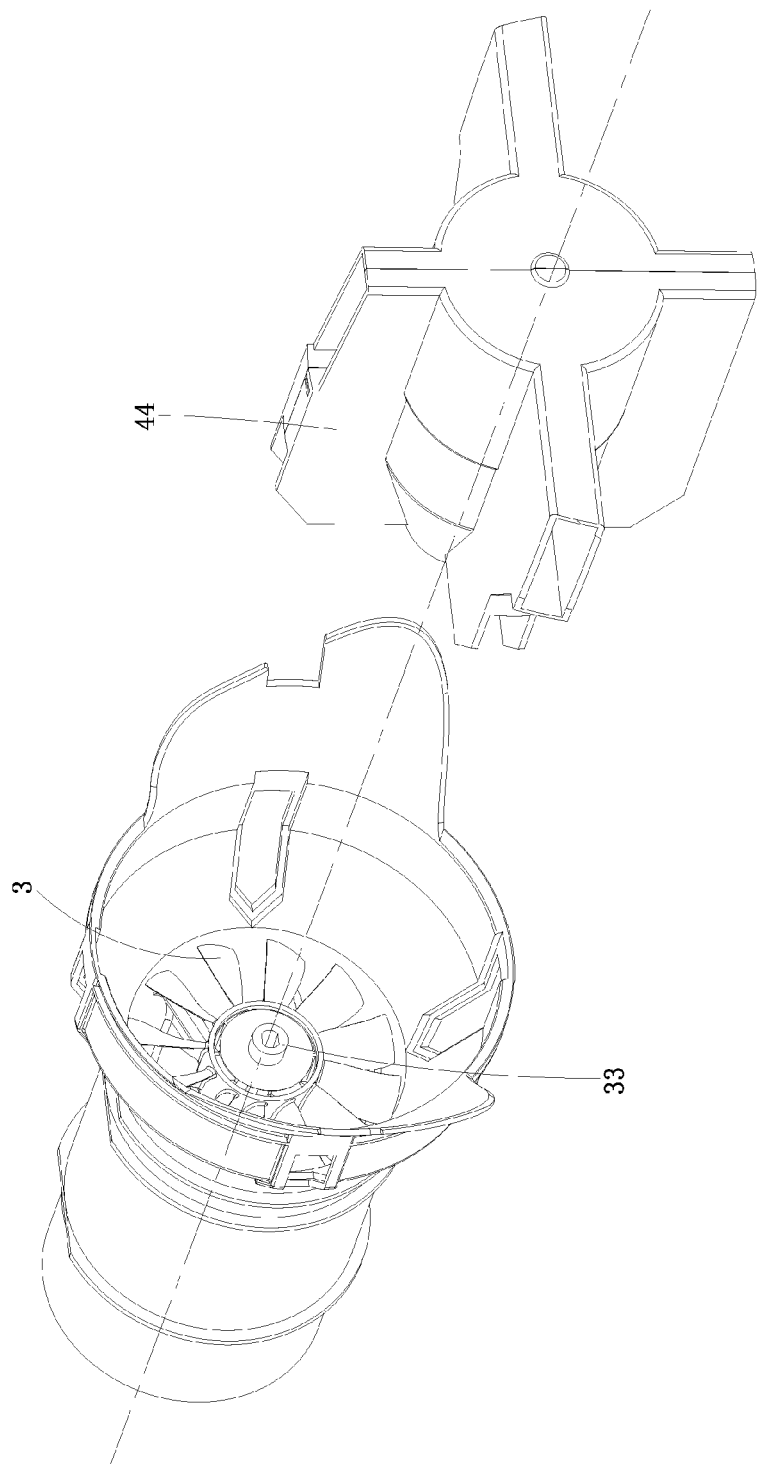
FIG. 36 is a schematic diagram of assembling a first component and a second component according to the present invention.

In step S3, the first component is connected to the second component. As shown in FIG. 36, specifically, a motor shaft 42 that is in the second component and that extends out from the motor cover 44 is coupled to the fan 3 in the first component. The connection hole 33 of the fan 3 is a through hole. One side of the connection hole 33 is connected to the transmission mechanism 7, and the other side is connected to a motor shaft 42. A specific manner of the connection may be the foregoing mentioned rectangular connection or spline connection. After the connection is completed, the first component and the second component are substantially arranged in a front-and-back manner in a longitudinal direction.

In step S4, the connected first component and second component are installed in a half-housing of a housing. As shown in FIG. 36, similarly, the half-housing of the housing has a positioning structure fitting the first component and the second component. The positioning structure may be a positioning rib, or the like. In addition, a control switch that controls a motion manner of the motor 4 is connected to a circuit pin of the motor 4 by using an electric wire.

In step S5, as shown in FIG. 36, the other half-housing of the housing and the half-housing of the housing in step S4 are spliced in a direction of a double-head line in the figure, and are fixedly connected by using a fixing element. In this way, assembling of a main body 10 of the blowing-suction device 1 is completed.

Figure 18:
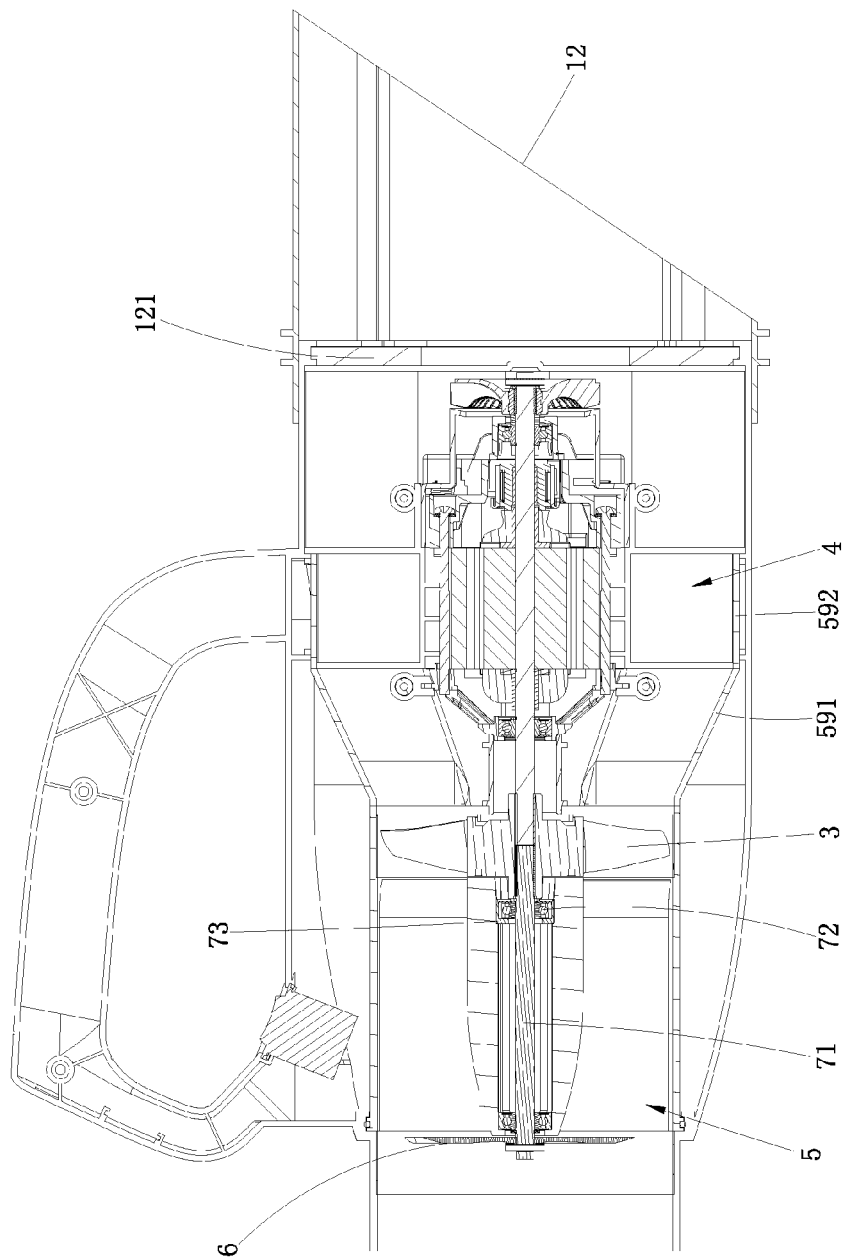
FIG. 18 is a sectional view of the blowing-suction device in FIG. 17.

FIG. 17 and FIG. 18 show a blowing-suction device according to another embodiment. A structure of the blowing-suction device 1 in this embodiment is basically the same as the structure of the blowing-suction device shown in FIG. 1. Differences between the two embodiments are described as follows: in this embodiment, the first side edge 681 and the second side edge 682 of the cutting blade of the shredding mechanism 6 are bent to be arc-shaped, so that the entire cutting blade is substantially S-shaped. In addition, the cutting blade alternatively has a smaller cross sectional area. In this embodiment, there is a shorter distance between the first side edge 681 and the corresponding second side edge 682, and a maximum distance is preferably less than 20 mm. The fitting portion 59 of the duct 5 has a regular structure. The entire fitting portion 59 is similar to a funnel structure, which is formed by a cone-shaped body 591 having a gradually increasing radius and a cylindrical-shaped skirt edge body 592 connected to an end of the cone-shaped body 591. The cone-shaped body 591 is further provided with a cooling inlet 441'. The security shield 121 is further provided at the first opening 12. The security shield 121 is located at a longitudinal back end of the motor cover 44. FIG. 18 is a sectional view of the blowing-suction device in FIG. 17. It may be seen from the figure that transmission shaft 71 connecting the shredding mechanism 6 and the fan 3 is disposed through the duct 5. The support bearing 72 having a support function is disposed on the transmission shaft 71. A vibration reduction element 73 is further disposed on the support bearing 72. A function of the vibration reduction element 73 is to weaken vibration generated by the transmission shaft 71, to transfer the weakened vibration to the duct 5. The vibration reduction element 73 may be sleeved on a rubber ring or a rubber cap on the support bearing 72.

As shown in FIG. 18, a distance between the fan 3 and the stationary blade 52 of the duct 5 is preferably 5-20 mm. A distance L is defined as a longitudinal distance between an end of the stationary blade 52 and a plane P that is formed by rotation of the fan 3 and that passes through the center of the fan 3. The end of the stationary blade 52 refers to an end that is of the stationary blade 52 and that is close to the fan 3. The stationary blade 52 has a particular longitudinal length, and the end of the stationary blade 52 refers to an end closet to an end portion of the fan 3 in the longitudinal direction. The fan 3 rotates to form a rotation plane P perpendicular to the fan axis 39. Because the fan axis 39 is set along the longitudinal direction, an extension direction of the rotation plane P of the fan 3 is perpendicular to the longitudinal direction, and the rotation plane P of the fan 3 passes through the center C of the fan 3. In addition, the width of the free end 36 of the blade 32 of the fan 3 is the chord length d, as shown in FIG. 3. In this embodiment, a ratio of the distance L to the chord length d is 0.3 to 1.5, so as to ensure relatively high blowing performance of the blowing-suction device 1. If the ratio is less than 0.3, it indicates that the distance L is relatively short, and the fan 3 is too close to the duct 5. Consequently, performance of the fan 3 cannot be maximized. This is not beneficial to generate relatively high blowing efficiency. However, if the ratio is greater than 1.5, it indicates that the distance L is relatively long, and the fan 3 is too far away from the duct 5. This is not beneficial to generate high blowing efficiency. Preferably, when the ratio of the distance L to the chord length d is 0.6, the blowing efficiency is the highest. Using an example in which the chord length d of the stationary blade 52 is 21 mm, when the distance L is 6.3 mm, that is, when the ratio is 0.3, a wind speed generated by the blowing-suction device 1 is approximately 42 m/s. When the distance is 12.6 mm, that is, when the ratio is 0.6, the wind speed generated by the blowing-suction device 1 is approximately 45 m/s. Therefore, it may be learned that as the ratio increases, the wind speed increases to some extent, thereby improving efficiency. However, when the distance L is 18.9 mm, that is, when the ratio is 0.9, the wind speed generated by the blowing-suction device 1 is approximately 42 m/s.

Therefore, when the ratio continuously increases, the wind speed decreases. When the distance L is approximately 31.5 mm, that is, when the ratio is 1.5, the wind speed generated by the blowing-suction device 1 is 36 m/s. Therefore, it may be learned that the wind speed significantly decreases, resulting in unideal working efficiency. Therefore, an optimal embodiment is that the ratio is approximately 0.6, the chord length of the blade 32 of the fan 3 is 21 mm, and the distance L is preferably 12.6 mm. In this case, the working efficiency is the highest.

In the blowing mode, the duct 5 is located in the downstream area of the fan 3, rectification occurs when air flows blowing out from the fan 3 pass through the duct 5, so that rotation directions of some air flows are adjusted, and eddy currents are reduced. Therefore, directions of all the air flows are more consistent, thereby improving a blowing effect and blowing efficiency of the air flow. Specifically, because air needs to pass through the stationary blade 52 of the duct 5 and the blade 32 of the fan 3 in sequence, the stationary blade 52 and the blade 32 of the fan 3 are disposed around the axis in a circumferential direction. To avoid mutual interference between the stationary blade 52 and the blade 32 of the fan 3 in the circumferential direction and ensure that there are no more overlapped blades on any phase in the circumferential direction and similar resonance overlapping effects generated, so that the quantity of the stationary blades 52 and the blades 32 are set to prime to one another. If the quantity of the stationary blades 52 and the quantity of the blades 32 has a divisor other than 1 or the quantity of the stationary blades 52 and the quantity of the blades 32, multiple phases of the stationary blade 52 and the blade 32 may be the same at a particular moment, resulting in generation of a disturbed flow similar to the resonance overlapping effect. Consequently, stability of the air flow is affected. In this embodiment, the quantity of the stationary blades 52 is preferably 5 to 8. If the quantity of the stationary blades 52 is set to be too few, for example, 4 or 3, a portion of air directly passes through a gap between two stationary blades 52, but is not guided by the stationary blade 52, resulting generation of a local eddy flow. Consequently, the blowing efficiency of the entire air flow is affected. However, if the quantity of the stationary blades 52 is set to be too many, for example, 9 or 10, although an air guiding effect is relatively good, the stationary blades 52 are too dense. As a result, an rotor area of air in the air flow channel 55 is affected. Consequently, air flow ventilation is not smooth, and the wind speed is reduced. In this embodiment, the quantity of the stationary blades 52 is preferably 6. Correspondingly, the quantity of the blades 32 of the fan 3 is 11. In this way, it may be ensured that the quantity of the stationary blades 52 and the quantity of the blades 32 of the fan 3 are prime to one another. In another embodiment, the quantity of the stationary blades 52 is 7, and the quantity of the blades 32 is 12. In this way, when the fan 3 rotates, at any moment, at most one blade 32 and at most one stationary blade 52 are overlapped on the phase.

In addition, it should be noted that, to further separate the cooling channel from the air flow channel 55 and prevent air flows from being ventilated, the motor cover 44 further includes a sealing part 443. The sealing part 443 is disposed at the transmission interface 45 of the motor cover 44. A reason for disposing the transmission interface 45 is to enable the motor shaft 42 to penetrate out through the transmission interface 45, so as to be in transmission connection with the fan 3. Because the radial size of the transmission interface 46 is certainly greater than the radial size of the motor shaft 42, there is a gap between the transmission interface 46 and the motor shaft 42. A portion of air in the air flow channel 55 outside of the motor cover 44 may enter the inside of the motor cover 44 through the gap. Consequently, separately dispositions of the air flow channel 55 and the cooling channel are interfered. As shown in the figure, the sealing part 443 is disposed at the transmission interface 46. The sealing part 443 can separate the air flow channel 55 from the cooling channel, so that to prevent air flows in two channels from being ventilated through the transmission interface 46. In this embodiment, the sealing part 443 is of a barrel-shaped structure. A circumferential side wall of the barrel-shaped structure is a physical barrel wall. Two ends in an extension direction of a barrel arm are set to be openings. Therefore, the sealing part 443 is of a through-going barrel-shaped structure. The motor shaft 42 passes through a hollow interior of the sealing part 443. One end of the sealing part 443 is installed and connected to the transmission interface 46, and the other end is located inside of the motor cover 44. Specifically, the end of the sealing part 443 is connected to the support structure 46 for supporting the motor 4. Further, the sealing part 443 abuts against the front support 461 of the support structure 46. A support bearing 464 for supporting the motor shaft 42 is disposed on the front support 461, and the support bearing 464 only accommodates seamless passing-through of the motor shaft 42. Therefore, the support bearing 464 can seal an opening of the end of the sealing part 443, so as to separate the inside of the motor cover 44 from the outside of the motor cover 44. In addition, a transmission function of the motor shaft 42 is not affected. In such a design, an air flow in the air flow channel 55 outside of the motor cover 44 cannot enter the inside of the motor cover 44 due to blocking functions of a barrier wall of the sealing part 443 and the support bearing 464. However, an air flow in the cooling channel in the motor cover 44 cannot flow to the outside of the motor cover 44 due to the blocking functions of the barrier wall of the sealing part 443 and the support bearing 464. Therefore, the sealing part 443 may ensure that the air flow channel 55 is separated from the cooling channel, so as to avoid mutual interference between each other, thereby further improving working efficiency. A structure that is of the sealing part 443 and that is connected to the transmission interface 45 and the support structure 46 may be a shape-fitting clamping connection structure such as a boss or a card slot.

Figure 19:
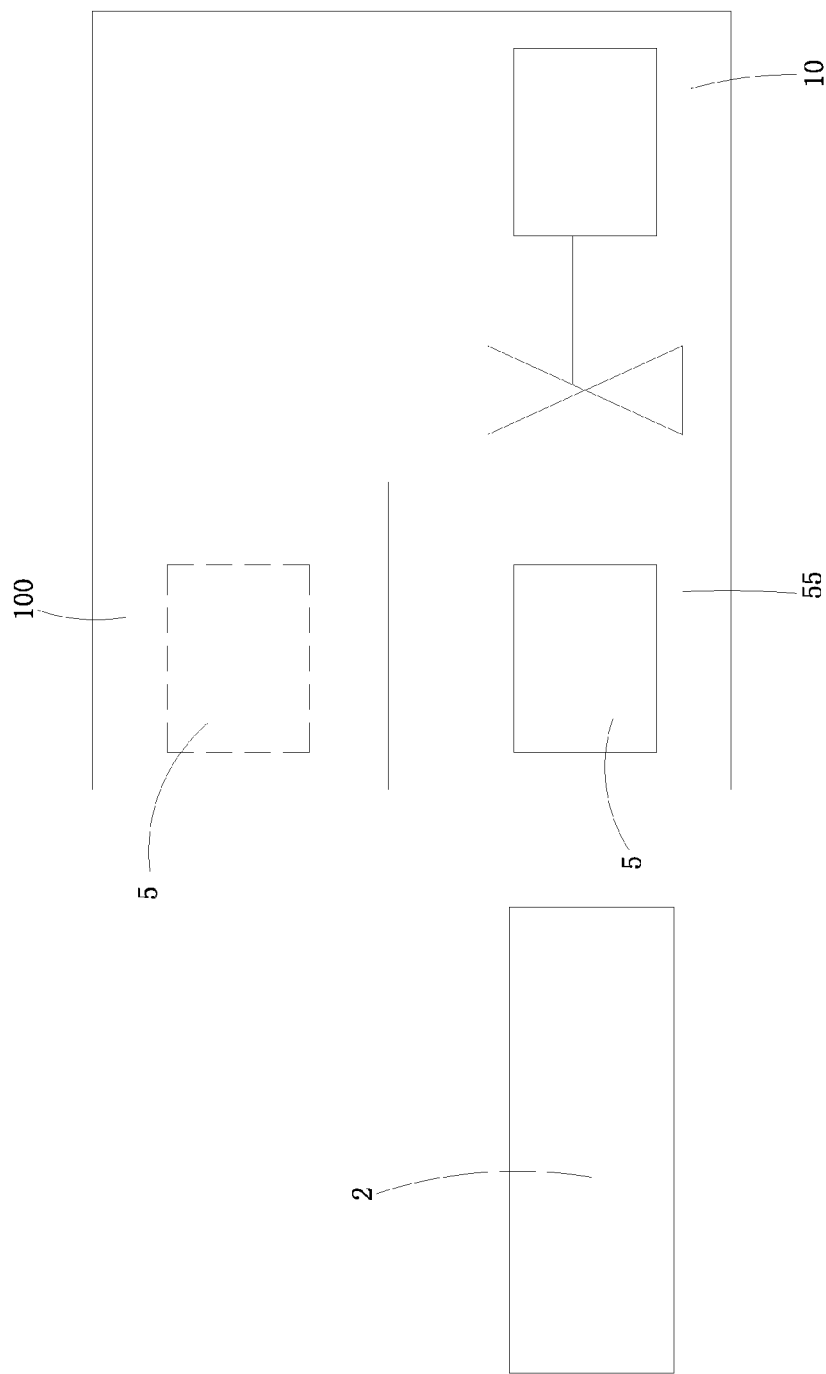
FIG. 19 is a schematic diagram of a movement of a duct in a blowing-suction device according to the third embodiment of the present invention.

In an embodiment shown in FIG. 19, the blowing-suction device 1 may further include: a removing mechanism configured to remove the duct 5 from the air flow channel and an accommodating cavity 100 that can accommodate the duct 5. In the blowing-suction device 1 in which the air tube is a single tube, setting the duct 5 to be removable is a preferred solution. The duct 5 optionally moves into the air flow channel 55 or move out from the air flow channel 55. Preferably, the accommodating cavity 100 that can completely accommodate the duct 5 is further provided near the air flow channel 55. After the duct 5 moves into the accommodating cavity, the duct 5 completely leaves the air flow channel 55. Therefore, smooth of the air flow channel 55 is ensured. After the duct 5 moves into the air flow channel 55, when the blowing-suction device 1 blows air, the duct 5 may perform a air guide function on an air flow passing through the duct 5. A manner of removing the duct 5 by the removing mechanism may also include a translation manner or a rotation manner. In a translation embodiment, the removing mechanism may include a slide guide that enables the duct 5 to slide and a control part that controls the duct 5 to slide on the slide guide. In a rotation embodiment, the removing mechanism may include a clip mechanism in a revolver. A rotation mechanism may be operated to enable the entire duct 5 to perform rotation displacement around an axis, so that the duct 5 is removed from the air flow channel. Alternatively, the rotation mechanism may be operated to enable the duct 5 to return to a position in the air flow channel again. The axis may be located at a position away from the center of the duct 5. In addition, a rotation angle may also preferably 90 degrees, 180 degrees, or the like.

Figure 20:
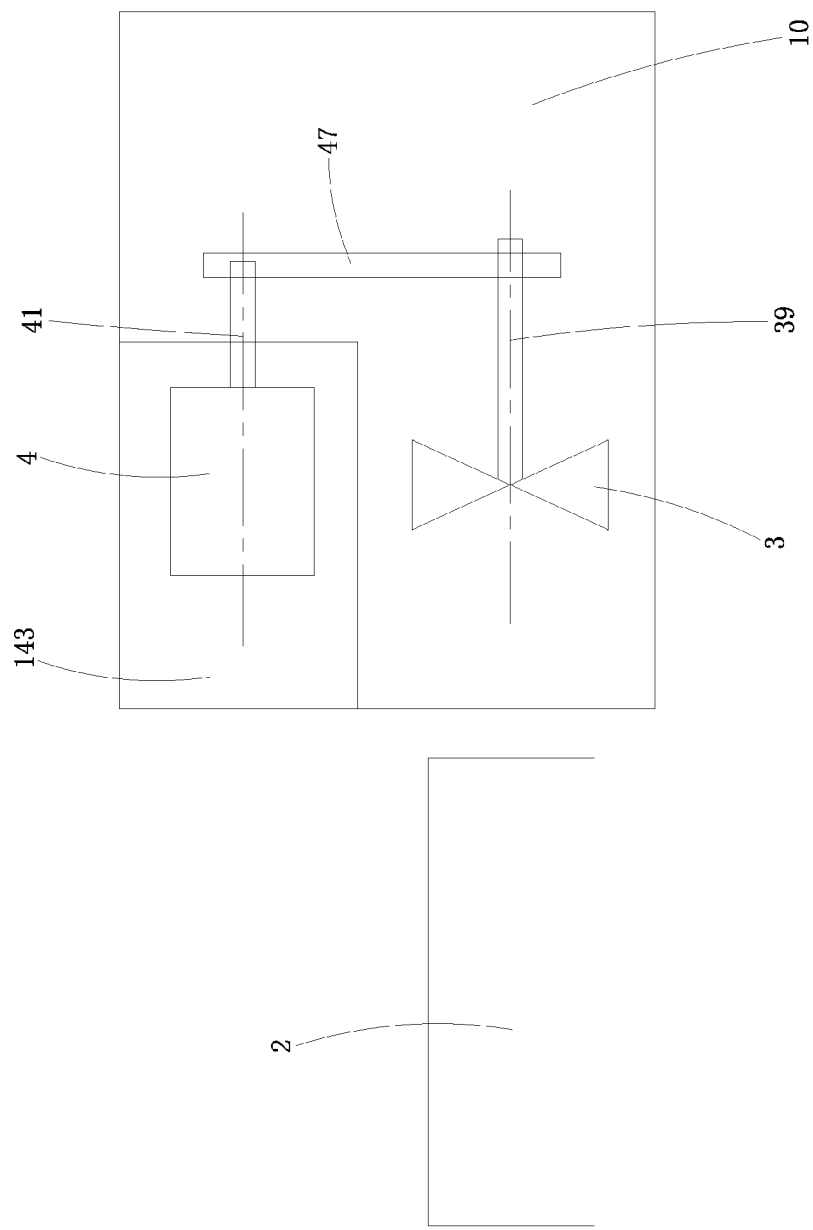
FIG. 20 is a schematic diagram of parallel disposed motor and fan of a blowing-suction device according to the fourth embodiment of the present invention.

In another embodiment shown in FIG. 20, the motor 4 of the blowing-suction device 1 is located in the housing 143 of the motor, and the fan axis 39 of the fan 3 and the axis 41 of the motor 4 are set to be parallel to each other. To implement transmission between the motor 4 and the fan 3, a transmission part 47 is further disposed between the motor 4 and the fan 3. The motor 4 drives, by using the transmission part 47, the fan 3 to rotate. The transmission part 47 herein may be an element such as a common belt or a cone gear that may change a transmission angle. The fan 3 and the motor 4 are not arranged in a longitudinal direction in a front-and-back manner, but the fan 3 and the motor 4 are arranged side by side in the longitudinal direction. In this way, the overall longitudinal size of the blowing-suction device 1 is reduced, and the motor 4 is not located in a path through which air ventilates. A person skilled in the art may easily conceive that, alternatively, an angle, such as an acute angle, may be set between the fan axis 39 of the fan 3 and the axis 41 of the motor 4. However, the air tube 2 in this embodiment is the same as that in the foregoing embodiment.

Figure 21:
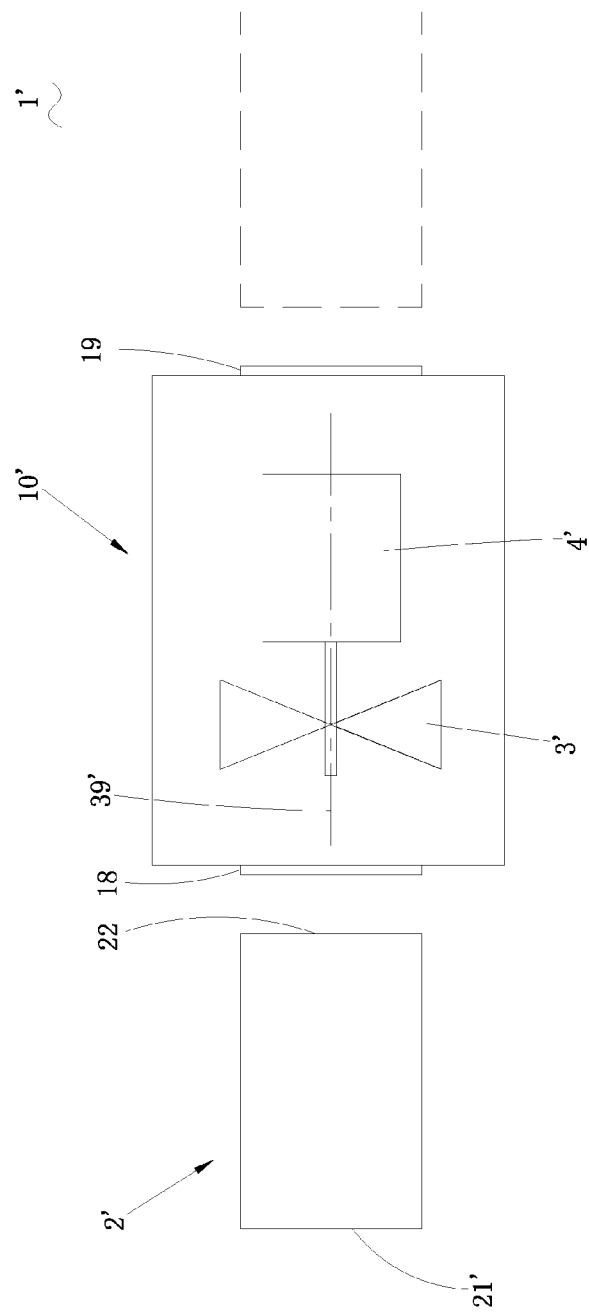
FIG. 21 is a schematic diagram of a blowing-suction device according to the fifth embodiment of the present invention.
Figure 22:
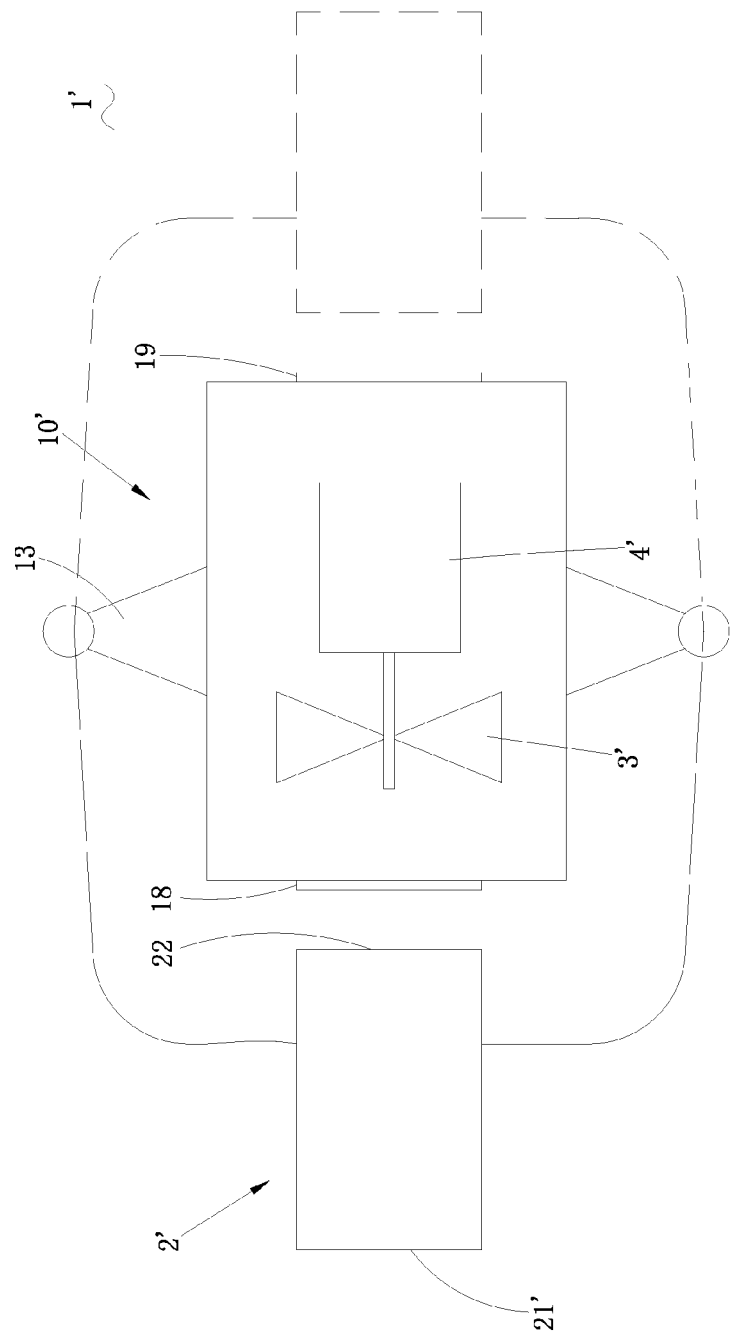
FIG. 22 is a schematic diagram of a blowing-suction device according to a sixth embodiment of the present invention.
Figure 25:
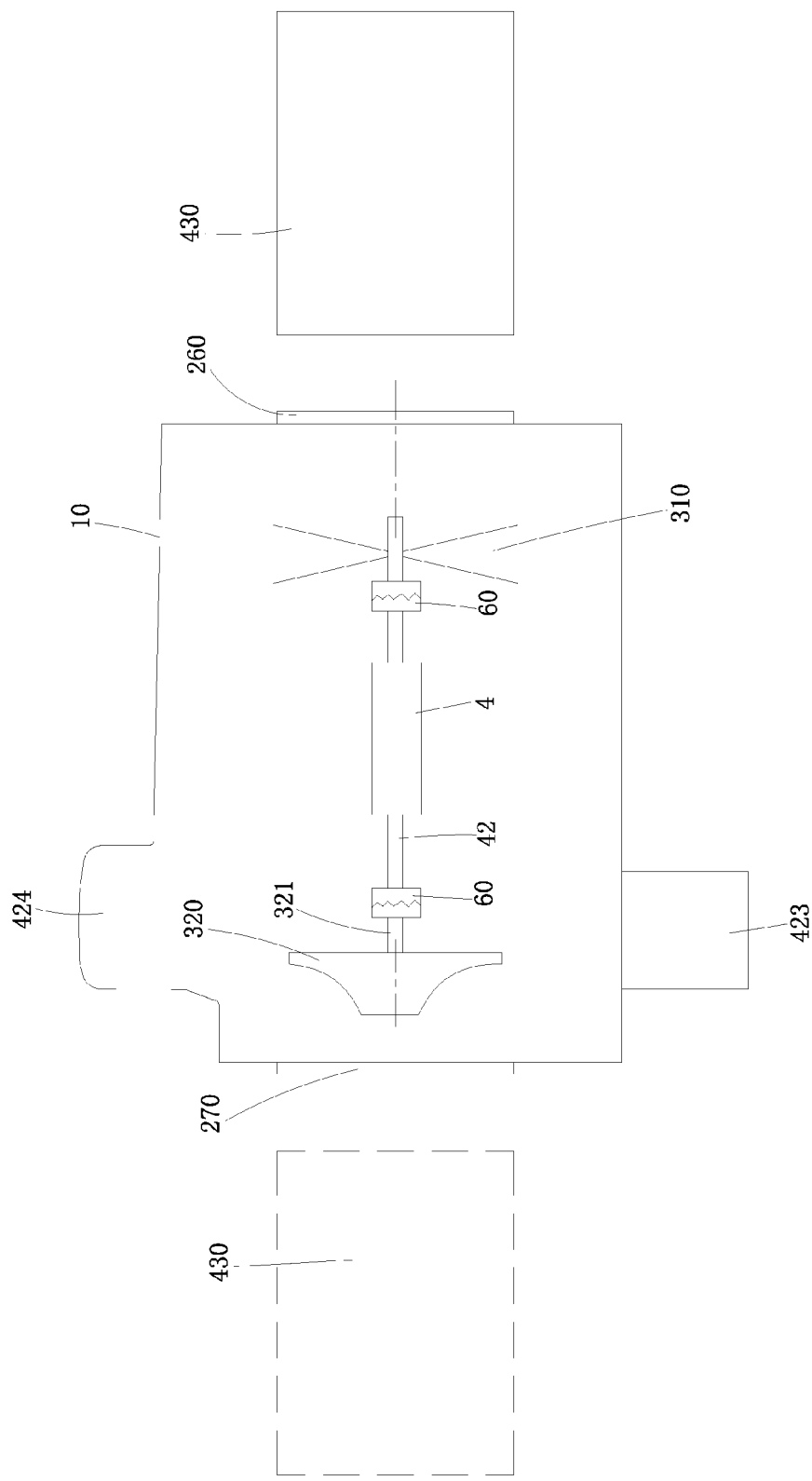
FIG. 25 is a schematic diagram of a blowing-suction device according to an eighth embodiment of the present invention.

In another embodiment shown in FIG. 21, a blowing-suction device 1' also includes an air tube 2' and a main body 10'. There is also one air tube 2'. One end of the air tube 2' is a tube opening 21', and the other end is configured to connect a connecting joint 22 of the main body 10'. A difference between this embodiment and the foregoing embodiment is that the main body 10' has at least two different connectors, which are respectively a first connector 18 and a second connector 19. In addition, the connecting joint 22 of the air tube is optionally coupled to the first connector 18 and the second connector 19. Preferably, the first connector 18 and the second connector 19 are respectively located on two sides of a fan 3' in the main body 10'. Projections, on a plane perpendicular to a fan axis 39' of the fan 3', of the first connector 18 and the second connector 19 are at least partially the same. After the air tube 2' selects a corresponding connector and connects to the connector, the blowing-suction device 1' is naturally switched to a corresponding working mode. For example, when the connecting joint 22 of the air tube 2' is connected to the first connector 18 of the main body 10', the blowing-suction device 1' is in a blowing mode. After the motor 4' starts to work, an air flow generated by the fan 3' is blown out from the tube opening 21' of the air tube 2' through the first connector 18. When the connecting joint 22 of the air tube 2' is connected to the second connector 19 of the main body 10', the blowing-suction device 1' is in a suction mode. When the motor 4' starts to work, an air flow is sucked from the tube opening 21' of the air tube 2' through the second connector 19. It should be noted that in this embodiment, a rotation direction of the fan 3' does not need to be changed in the blowing mode or the suction mode, the fan 3' always rotates in only one direction. An air flow channel in the blowing mode is not the same as an air flow channel in the suction mode. The fan 3' preferably includes an axial flow fan, a mixed flow fan, or the like, to generate an air flow moving in an axial direction of the fan. Certainly, the main body 10' and the air tube 2' may be preferably in detachable connection. When the blowing-suction device 1' does need to work, the main body 10' and the air tube 2' may be detached as two independent components for storage. When the blowing-suction device 1' needs to work, the air tube 2' selects to fixedly connect to one of the connectors of the main body 10'. In another embodiment shown in FIG. 22, the air tube 2' may be connected to the main body 10' in a manner of rotating relative to the main body 10'. A pivotal shaft 13 is disposed on the main body 10', and the pivotal shaft 13 may drive the air tube 2' to rotate around an axis of the pivotal shaft 13 to different positions, so that the air tube 2' is connected to one of the connectors. In a preferred embodiment, in a process in which the air tube 2' rotates from a position at which the air tube 2' is connected to the first connector 18 to a position at which the air tube 2' is connected to the second connector 19, a rotation angle is 180 degrees. Certainly, a person skilled in the art may conceive that a structure in which the air tube and the main body relatively linearly move. FIG. 25 shows another embodiment of the present invention. In this embodiment, the blowing-suction device 1 includes: a first fan 310 and a second fan 320, and the first fan 310 and the second fan 320 are located in the main body 10. The motor 4 is located between the first fan 310 and the second fan 320, and is separately connected to the first fan 310 and the second fan 320. A clutch apparatus 60 is disposed between the motor shaft 42, and the first fan 31 and the second fan 32. The main body 10 is provided with a first opening 260 and a second opening 270. In this embodiment, an outlet tube 423 and a helical channel 424 are disposed on the main body 10, and are disposed near the second opening 270 of the main body 10. In a preferred embodiment, a same air tube 430 may be used as a blower tube and sa suction tube. When the blowing-suction device 1 is in the blowing mode, the air tube 430 is installed at the first opening 260, the motor 4 drives the first fan 310 to work, and an air flow is blown out from the air tube. When the blowing-suction device 1 is switched to the suction mode, the air tube 430 is detached from the first opening 260 and is installed on the second opening 270, the motor 4 drives the second fan 320 to work, and air is sucked from the air tube 430 and is exhausted from the outlet tube 423 on the main body 10.

Figure 26:
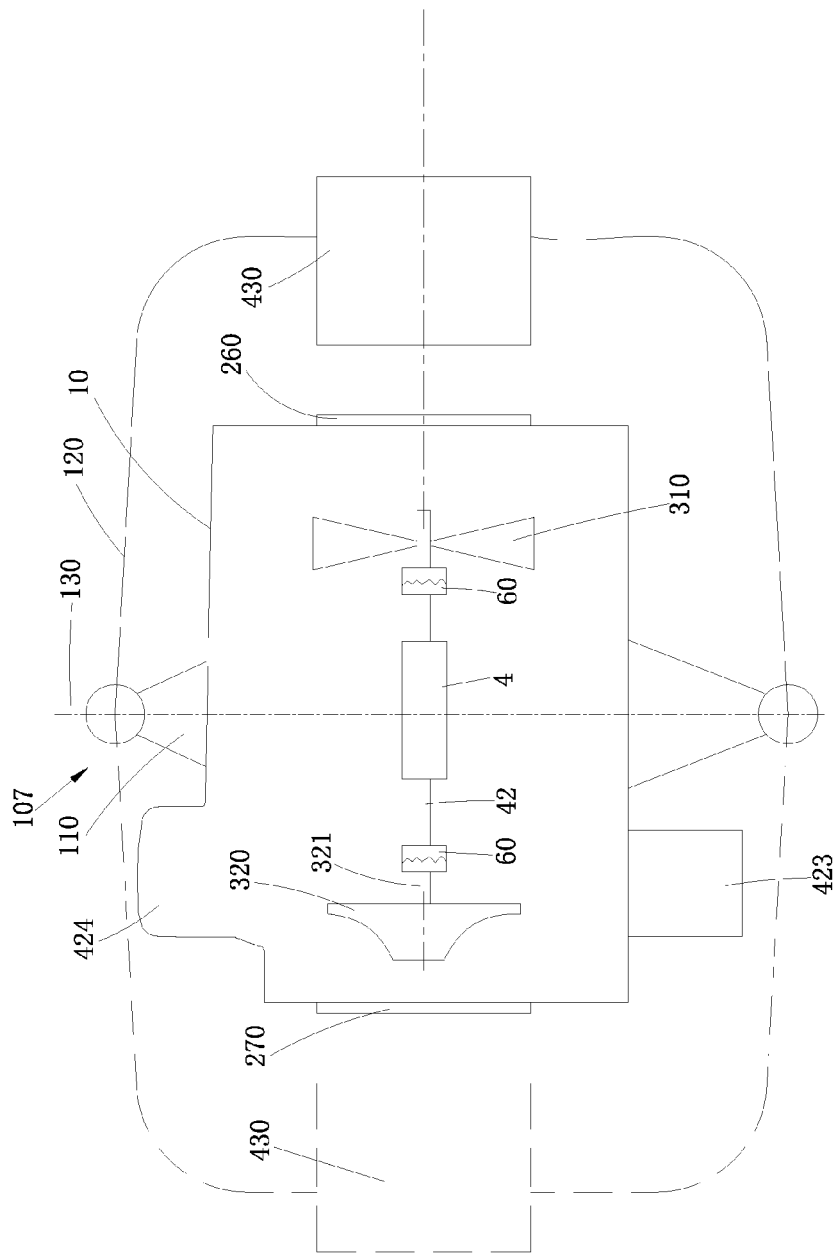
FIG. 26 is a schematic diagram of a blowing-suction device according to a ninth embodiment of the present invention.

FIG. 26 shows another embodiment of the present invention. In this embodiment, an air tube 430 is stilled used as a blower tube or a suction tube. A difference between this embodiment and a fifth embodiment is that a pivot apparatus 107 connecting the air tube and the main body 10 is disposed in the blowing-suction device 1. The pivot apparatus 107 may control the air tube 430 to change a position relative to the main body 10. The pivot apparatus 107 rotates around a pivotal shaft 130. The pivot apparatus 107 further includes a first connection arm 110 connected to the main body 10 and a second connection arm 120 connected to the air tube 430. As shown in FIG. 26, when the blowing-suction device 1 is in the blowing mode, the air tube 430 is moved to a position at which the air tube 430 cooperates with the first fan 310. In this case, the air tube 430 is used as the blower tube. When the blowing-suction device 1 is switched to the suction mode, the air tube does not need to be detached, and the air tube is moved, by using the pivot apparatus, to a position at which the air tube cooperates with the second fan 320. In this case, the air tube 430 is used as the suction tube.

Figure 27:
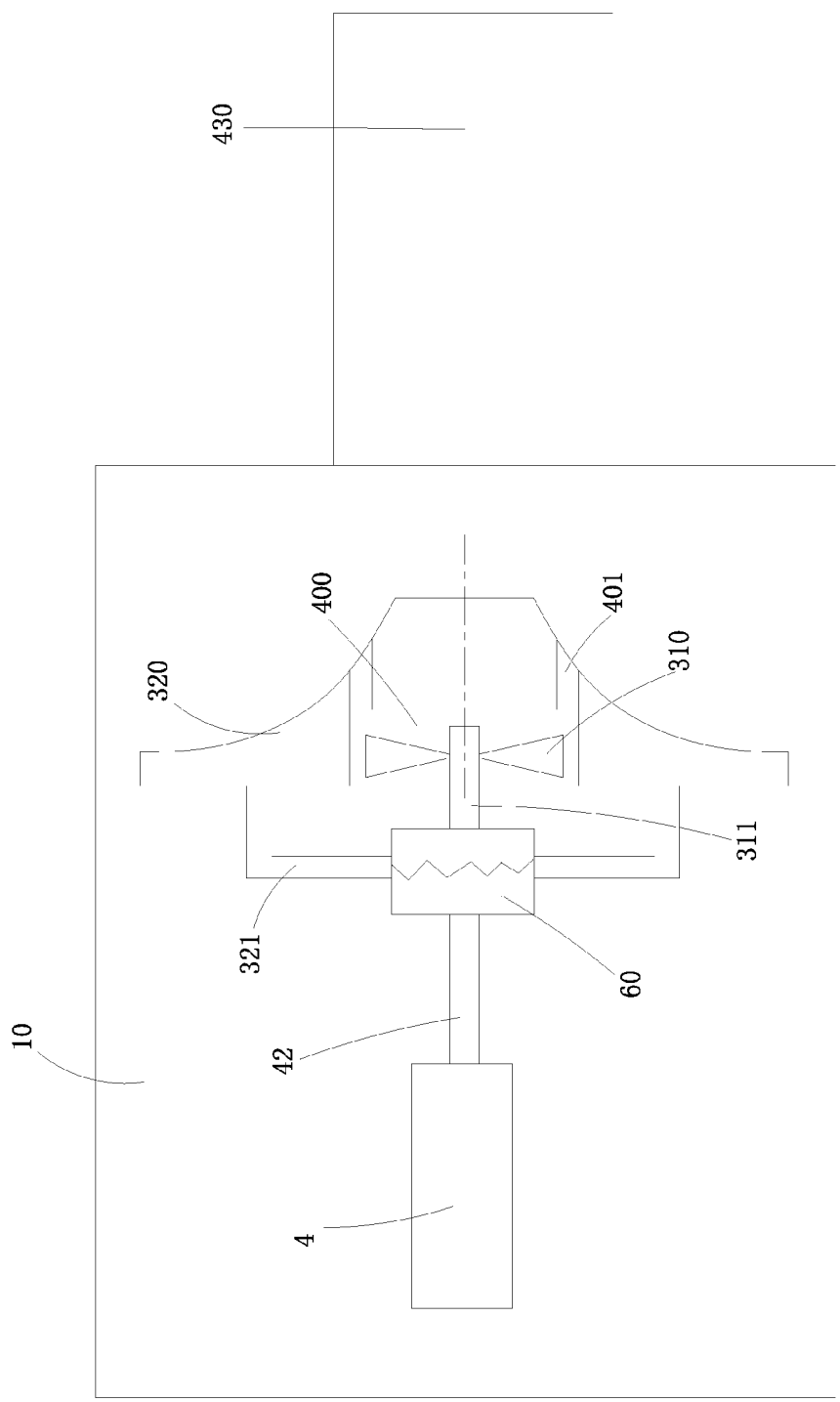
FIG. 27 is a schematic diagram of a blowing-suction device according to a tenth embodiment of the present invention.

FIG. 27 shows another embodiment of the present invention. In this embodiment, an air tube 430 is still used as a blower tube or a suction tube, and during blowing-suction mode switching, the air tube 430 does not need to be moved, and the air tube 430 may be always fixedly connected to the main body 10. A first fan 310 and a second fan 320 are disposed in the main body 10. The first fan 310 is an axial flow fan having an axial blade and a first rotation shaft 311. The second fan 320 is a centrifugal fan having a centrifugal blade and a second rotation shaft 321. The axial flow fan may move between a blowing position at which the motor 4 independently drives the axial flow fan to rotate and a suction position at which the motor 4 simultaneously drives the axial flow fan and the centrifugal fan. The second fan 320 is provided with an accommodating cavity 400 accommodating the first fan 31. The first fan 310 is located in the accommodating cavity 400. The second fan 32 is further provided with a channel 401 connecting the accommodating cavity 400 and the air tube 430. A clutch apparatus is disposed between the first rotation shaft 311 of the first fan 310 and the second rotation shaft 321 of the second fan 320, and the motor shaft 42. In the blowing mode, the motor shaft 42 is in power connection with the first rotation shaft 311 by using the clutch apparatus, and is not in power connection with the second rotation shaft 321, so that the motor 4 drives the first fan 310 to rotate. An air flow generated by the first fan 310 passes through a channel of the second fan 320, and is blown out from the air tube 430. When the blowing-suction device 1 is switched to the suction mode, the motor shaft 42 is in power connection with the second rotation shaft 321 by using the clutch apparatus, and is not in power connection with the first rotation shaft 311. The motor 4 may drive the second fan 32 to rotate, so as to suck an air flow from the air tube 430.

Figure 28:
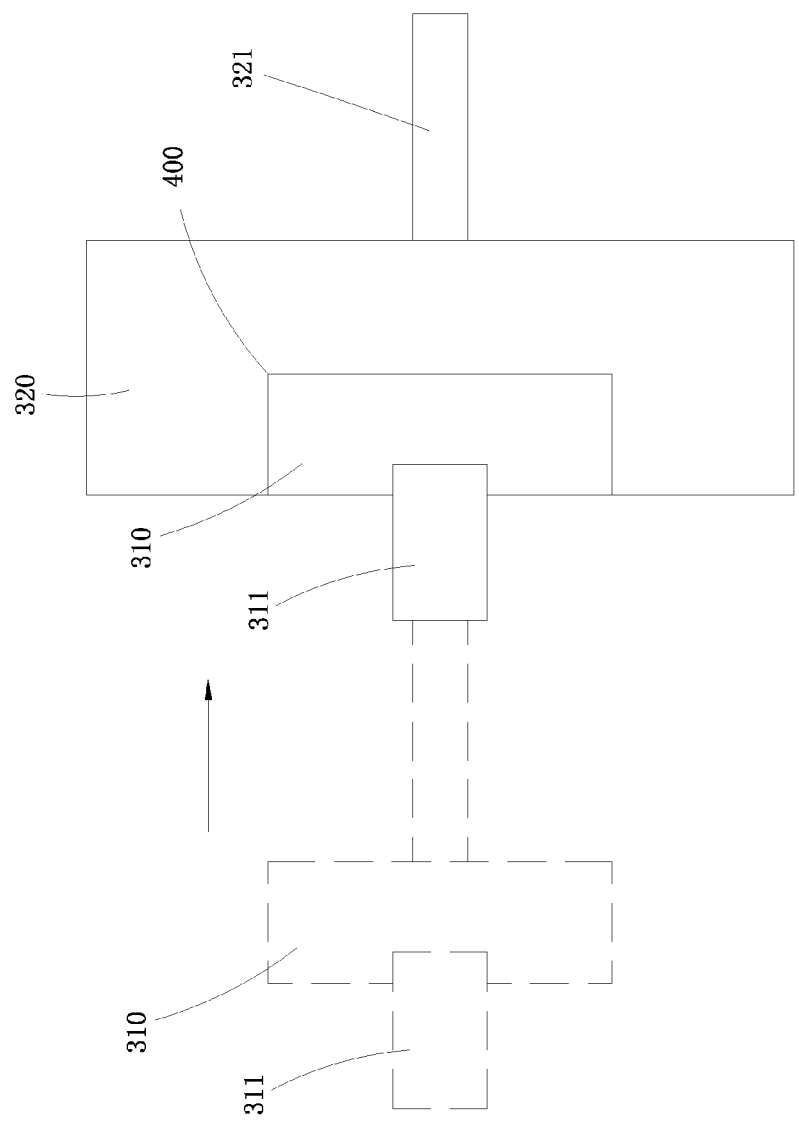
FIG. 28 is a schematic diagram of a blowing-suction device according to an eleventh embodiment of the present invention.

FIG. 28 shows another embodiment of the present invention. In this embodiment, a blowing-suction device still includes a first fan 310 and a second fan 302. The first fan 310 is an axial flow fan, and the second fan 320 is a centrifugal fan. The first fan 310 movably cooperates with the second fan 302. In the blowing mode, the first fan 310 being the axial flow fan works, and does not cooperate with the second fan 320. However, the second fan 320 being the centrifugal fan does not work. In the suction mode, the first fan 310 moves to a position at which the first fan 310 cooperates with the second fan 320, so that the first fan 310 and the second fan 320 work together. As shown in FIG. 28, the second fan 320 has an accommodating cavity 400, and the first fan 310 may move in an axial direction of a first rotation shaft 311. When the first fan 310 is accommodated in the accommodating cavity 400 of the second fan 320, a blade of the first fan 310 and a blade of the second fan 320 are aligned, to form a mixed flow blade. In the blowing mode, the first fan 310 independently works and generates an air flow, and the second fan 320 does not work. In the suction mode, the blade of the first fan 310 and the blade of the second fan 320 are combined to form blades of a mixed flow fan, so that the first fan 310 and the second fan 320 forms the mixed flow fan. The motor 4 drives the first fan 310 and the second fan 320 to work together, so that the mixed flow fan rotates to generate an air flow.

In another embodiment shown in FIG. 23 and FIG. 24, a blowing-suction device 1' also includes an air tube 2' and a main body 10'. There is also one air tube 2'. A difference between this embodiment and the foregoing embodiment is that two end openings at two ends of the air tube 2' are optionally connected to the main body 10'. For ease of description, the two end openings of the air tube 2' are respectively a first end opening 23 and a second end opening 24. The main body 10' is preferably provided with only one connector 25. The working mode of the blowing-suction device is correspondingly switched by connecting different end openings of the air tube 2' to the main body 10'. For example, after the first end opening 23 of the air tube is connected to the connector 25 on the main body 10', the second end opening 24 is used as a free end of the air tube 2', and the blowing-suction device 1' is in the blowing mode. After the motor 4' drives the fan 3' to work, an air flow is blown out from the second end opening 24 of the air tube 2'. After the second end opening 24 of the air tube 2' is connected to the connector 25 of the main body 10', the first end opening 23 of the air tube 2' is used as the free end of the air tube, and the blowing-suction device 1' is in the suction mode. After the motor 4' drives the fan 3' to work, an air flow is sucked from the first end opening 23 of the air tube 2' to the main body 10'. Certainly, in this embodiment, the fan 3' also preferably includes an axial flow fan, a mixed flow fan, or the like, to generate an air flow moving in an axial direction of the fan. A difference between this embodiment and the foregoing embodiment is that the fan 3' can rotate in two different directions. In the blowing mode, the fan 3' rotates in a first direction; or in the suction mode, the fan 3' rotates in a second direction. It should be specifically noted that in this embodiment, the air tube is preferably not a straight tube, but the diameter of the air tube varies. The air tube 2' is substantially cone-shaped, and the radius of the first end opening 23 is greater than the radius of the second end opening 24, so that a cross sectional area of the first end opening 23 is greater than a cross sectional area of the second end opening 24. In this way, an air flow blowing out from the second end opening 24 having a relatively small cross sectional area may achieve a relatively high wind speed, so that a blowing effect is improved. However, in the suction mode, an air flow is sucked from the first end opening 23 having a relatively large cross sectional area. As a result, the end opening is prevented from being blocked by a foreign object, and consequently, a suction effect is not affected. Certainly, to enable the connector 25 of the main body 10' to connect to the air tube end openings having different diameters, the connector 25 has: a first connection portion 26 fitting the first end opening 23 and a second connection portion 27 fitting the second end opening 24. In this embodiment, the connector 25 preferably has a stepped structure similar to a step or a cone-shaped structure similar to a funnel. That is, the first connection portion 26 cooperates with the second connection portion 27 to form a circumferential stepped structure or a cone-shaped structure whose radius gradually changes. In addition, it should be noted that because positions, at which different end openings of the air tube are coupled to the connector, are different, so that in the blowing mode and the suction mode, the effective length of the air tube 2' also changes. The effective length refers to a distance between the connector and the free end of the air tube.

Figure 37:
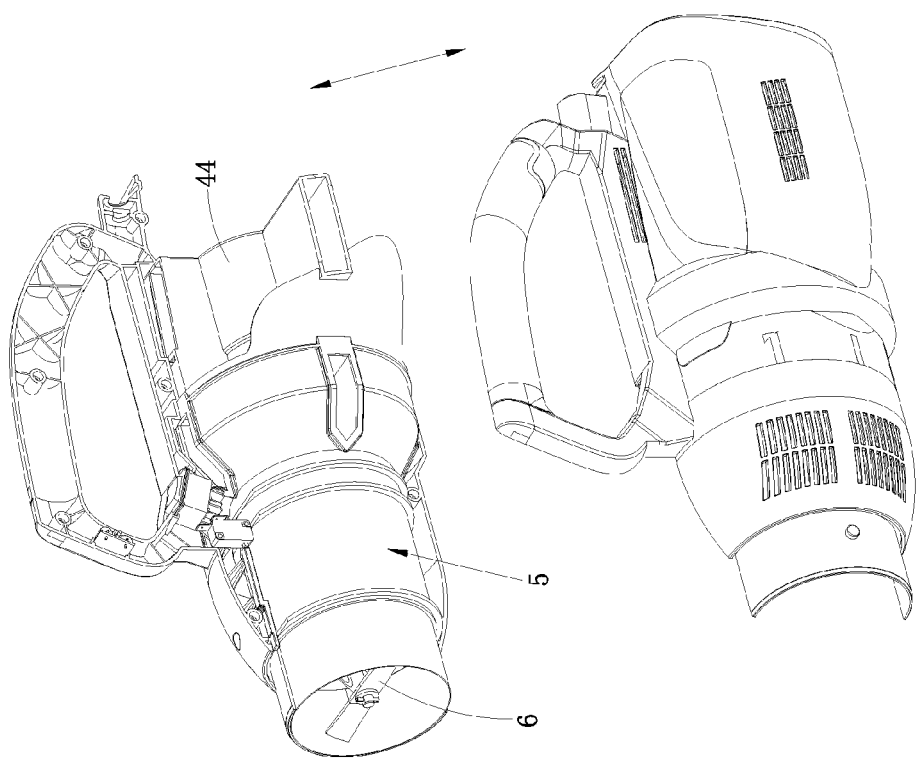
FIG. 37 is a schematic diagram of installing a first component and a second component into a housing according to the present invention.

In another embodiment shown in FIG. 37, a blowing-suction device 1 also includes a main body 10 and an air tube 2 detachably connected to the main body 10. The main body 10 is also provided with a first opening 12. An air flow generation apparatus configured to generate an air flow is disposed in the main body 10. When the blowing-suction device 1 is in a blowing mode, driven by the air flow generation apparatus, air enters the main body 10 from first opening 12 and is blown out from the air tube 2 connected to the main body 10. When the blowing-suction device 1 is switched to a suction mode, driven by the air flow generation apparatus, air together with leaves and dust enter the air tube 2 and are exhausted from the first opening 12. Certainly, the first opening 12 may be provided on different positions of the main body 10. In this embodiment, the air flow generation apparatus includes: a counter-rotating axial-flow mechanism 500 and a motor 501 configured to drive the counter-rotating axial-flow mechanism 500. The counter-rotating axial-flow mechanism 500 includes at least one pair of axial flow fans. The pair of axial flow fans may generate air flows moving in different direction. In the blowing mode, an air flow moving to the air tube 2 is generated; or in the suction mode, an air flow moving to the first opening 12 is generated. The pair of the axial flow fans in the counter-rotating axial-flow mechanism 500 are adjacently disposed, so that a counter-rotating effect is generated between each other. The pair of axial flow fans include a first axial flow fan 502 and a second axial flow fan 503. A distance between the first axial flow fan 502 and the second axial flow fan 503 is between 0.01 time of the diameter of the axial flow fan and 0.5 time of the diameter of the axial flow fan. The first axial flow fan 502 and the second axial flow fan 503 can rotate around respective rotation axes to rotate. In this embodiment, the rotation axes of the first axial flow fan 502 and the second axial flow fan 503 are overlapped, that is, the first axial flow fan 502 and the second axial flow fan 503 rotate around the same rotation axis to rotate. In this embodiment of the present invention, the first axial flow fan 502 and the second axial flow fan 503 are always simultaneously driven to rotate. Further, the first axial flow fan 502 and the second axial flow fan 503 rotate in opposite directions. That is, when the first axial flow fan 502 rotates in a clockwise direction, the second axial flow fan 503 rotates in a counterclockwise direction. However, when the first axial flow fan 502 rotates in the counterclockwise direction, the second axial flow fan 503 rotates in the clockwise direction. Due to a counter-rotating function between the first axial flow fan 502 and the second axial flow fan 503, an air flow passing through the counter-rotating axial-flow mechanism 500 always moves in a direction of the rotation axis.

Figure 38:
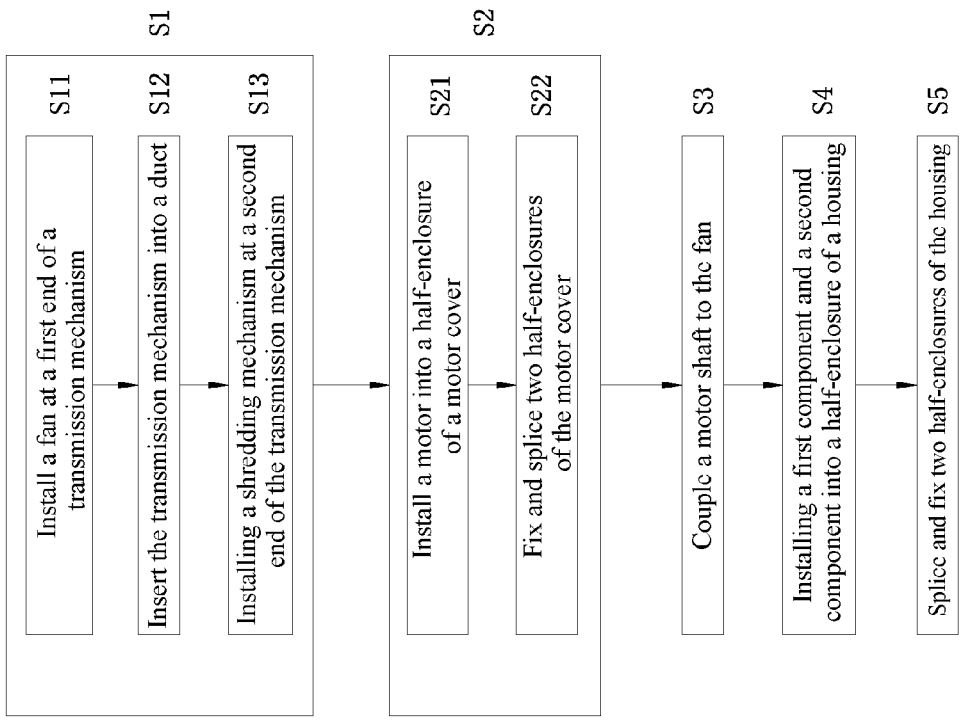
FIG. 38 is a schematic flowchart of assembling a blowing-suction device according to the present invention.

The first axial flow fan 502 and the second axial flow fan 503 have several blades circumferentially arranged around the rotation axis. As shown in FIG. 38, a rotation direction of the blade of the first axial flow fan 502 is a direction of an arrow AA' in the figure, that is, the counterclockwise direction. However, a rotation direction of the blade of the second axial flow fan 503 is a direction of an arrow BB' in the figure, that is, the clockwise direction. Therefore, rotation directions of the blades of the first axial flow fan 502 and the second axial flow fan 503 are set to be opposite. As shown in FIG. 39, when an air flow passes through the first axial flow fan 502, due to the rotation direction of the blade of the axial flow fan, the air flow always deviates toward a direction far away from the axis. When the deviated air flow passes through the second axial flow fan 503, due to the opposite rotation direction of the second axial flow fan 503, the air flow moves toward a direction close to the axis again. Therefore, the air flow passing through the two stage axial flow fans can be ensured to move in the direction of the rotation axis, so that in this embodiment, a duct mechanism does not need to be disposed in the blowing-suction device 1 for guiding air. However, because there is no duct mechanism, in the suction mode, air and particle matters such as leaves and dust directly enter the counter-rotating axial-flow mechanism 500 in the main body 10 without passing through an additional shredding mechanism, so that passing-through efficiency of the particle matter may be improved.

To enable the motor 501 to drive the first axial flow fan 502 and the second axial flow fan 503 to simultaneously rotate, in the embodiment shown in FIG. 37, the blowing-suction device 1 further includes a transmission apparatus 504 connected to the first axial flow fan 502 and the second axial flow fan 503. On one hand, the transmission apparatus 504 is connected to the motor 501, and on the other hand, the transmission apparatus 504 may drive the first axial flow fan 502 and the second axial flow fan 503 to rotate in opposite directions. As shown in FIG. 40, the transmission apparatus 504 includes: a coupling shaft 505 connected to the motor 501, a first gear set 506 connected to the first axial flow fan 502, and a second gear set 507 connected to the second axial flow fan 503. The first gear set 506 and the second gear set 507 are both engaged and transmitted with the coupling shaft 505. The first gear set 506 and the second gear set 507 have different engagement directions for transmission connection with the coupling shaft 505. Therefore, when the coupling shaft 505 is driven by the motor 501 to rotate, the coupling shaft 505 can drive the first gear set 506 and the second gear set 507 to rotate in opposite directions, so as to enable the first axial flow fan 502 and the second axial flow fan 503 to rotate in opposite directions. The blowing-suction device 1 further includes a support apparatus 508 for supporting the coupling shaft 505. The support apparatus 508 includes a support structure. It may be learned from this embodiment that there is one motor 501. In the blowing mode, a user controls the motor 501 to rotate in a first direction, driven by the transmission apparatus 504, when the first axial flow fan 502 rotates in the clockwise direction, the second axial flow fan 503 rotates in the counterclockwise direction. Therefore, the entire counter-rotating axial-flow mechanism 500 generates an air flow blowing out to the air tube 2. However, in the suction mode, the user controls the motor 501 to rotate in a second direction opposite to the first direction, driven by the transmission apparatus 504, when the first axial flow fan 502 rotates in the counterclockwise direction, the second axial flow fan 503 rotates in the clockwise direction. Therefore, the entire counter-rotating axial-flow mechanism 500 generates an air flow sucking from the air tube 2.

Figure 41:
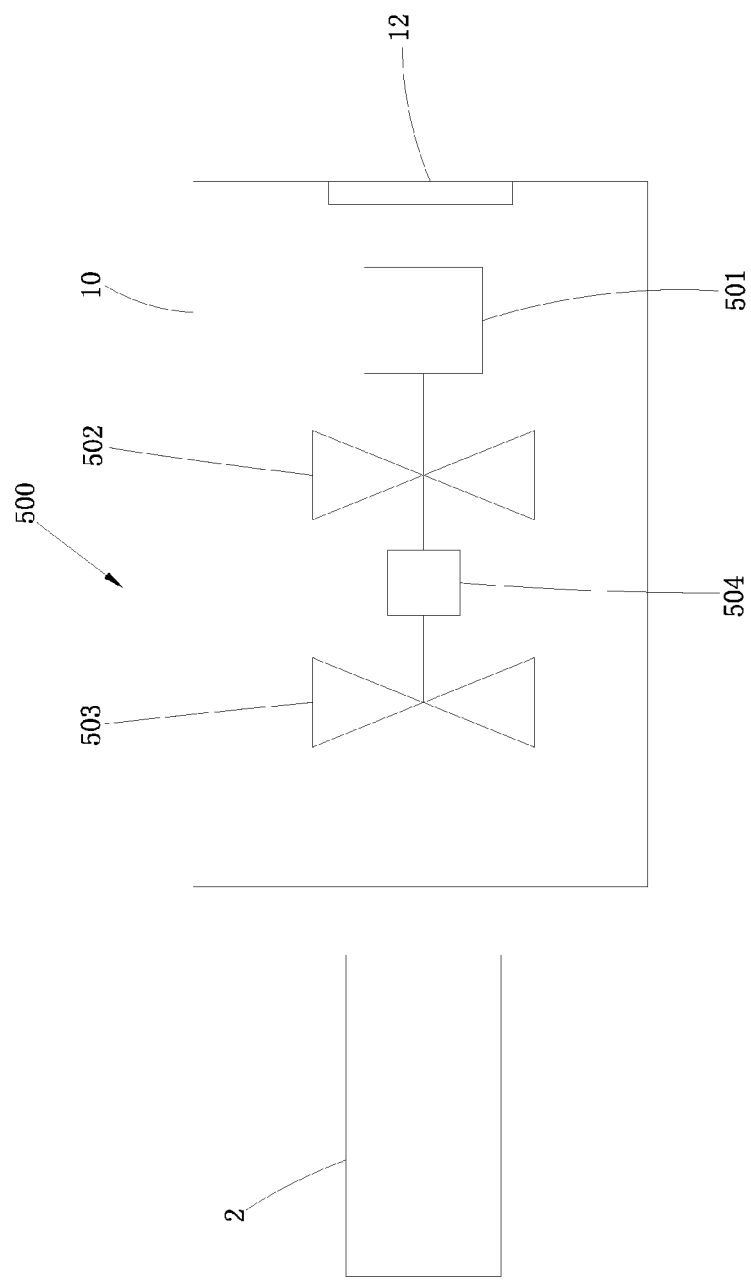
FIG. 41 is a schematic diagram of a blowing-suction device according to a twelfth embodiment of the present invention.
Figure 42:
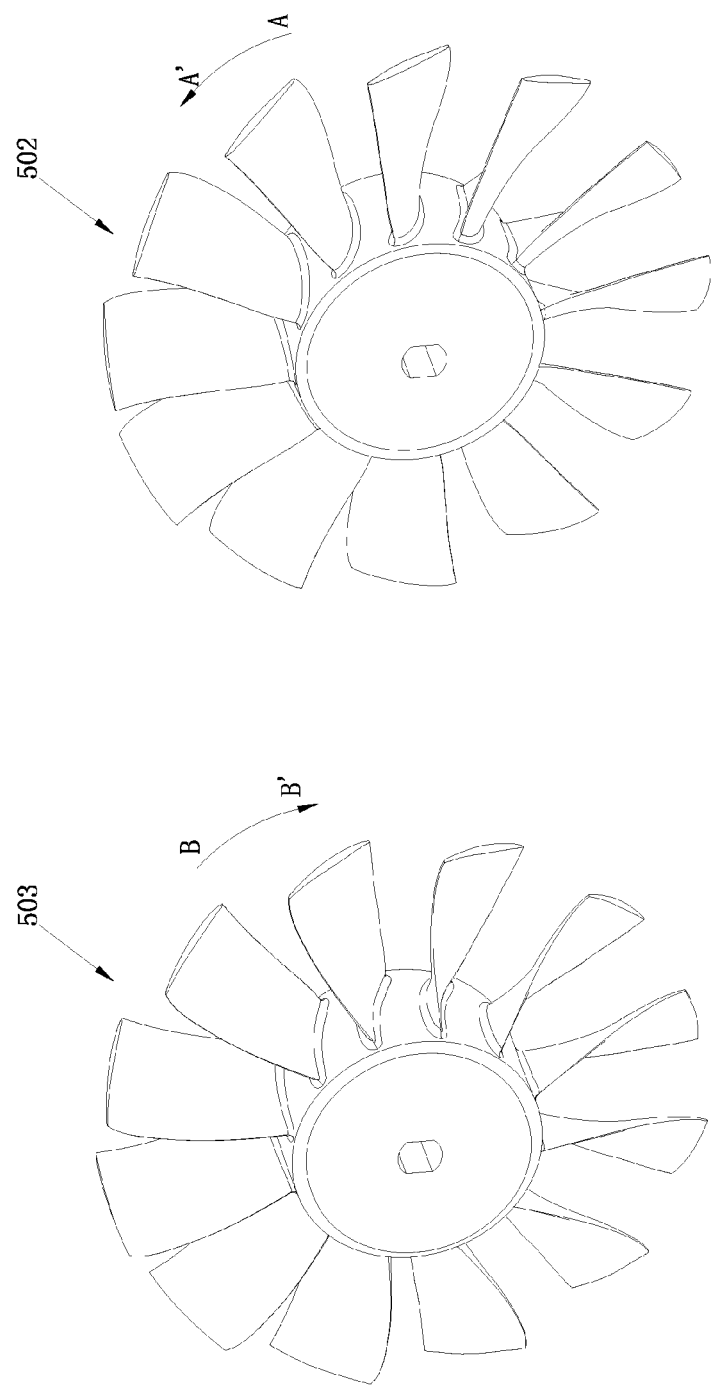
FIG. 42 is a schematic diagram of a counter-rotating axial-flow mechanism of the blowing-suction device in FIG. 41.
Figure 43:
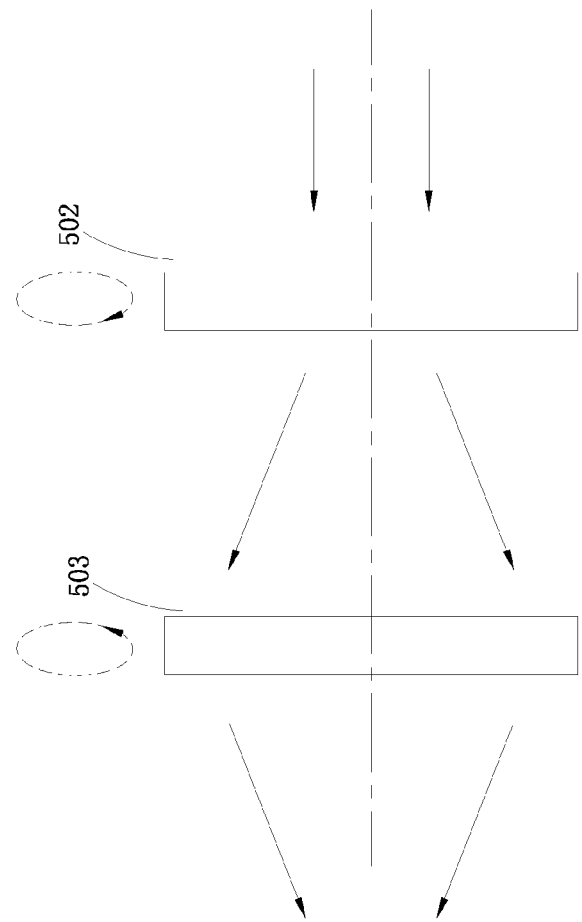
FIG. 43 is a schematic diagram showing that air passes through the counter-rotating axial-flow mechanism in FIG. 42.
Figure 44:
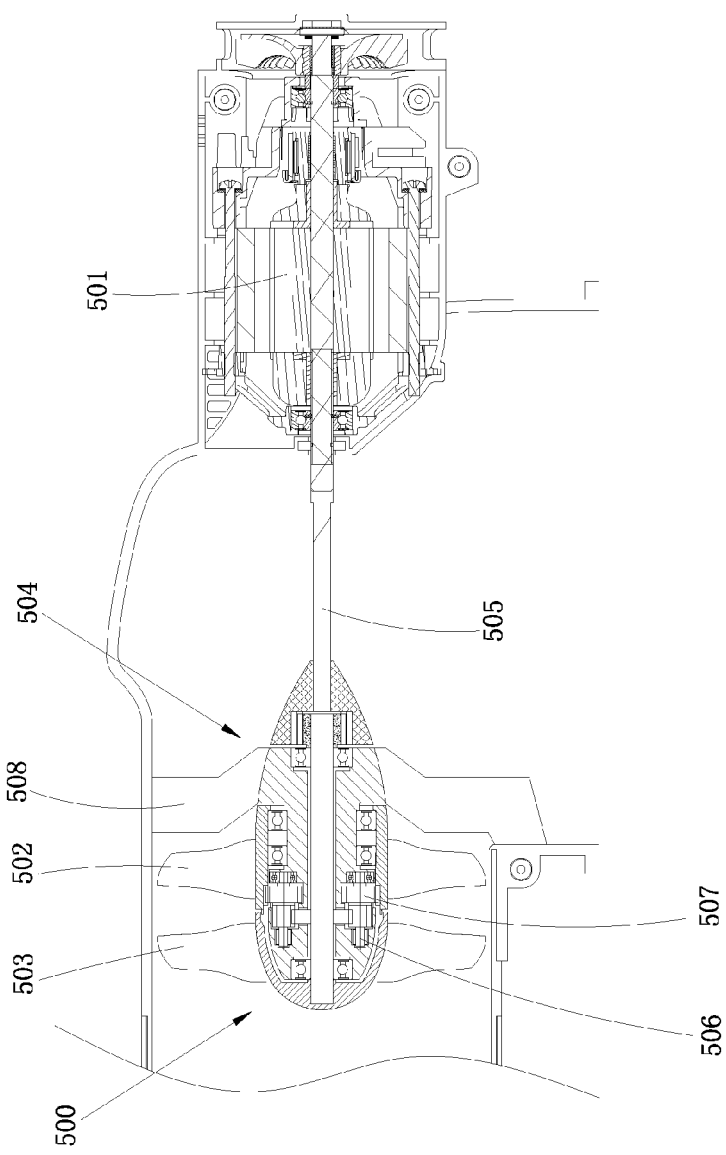
FIG. 44 is a schematic diagram of driving the counter-rotating axial-flow mechanism by a motor of the blowing-suction device in FIG. 41.
Figure 45:
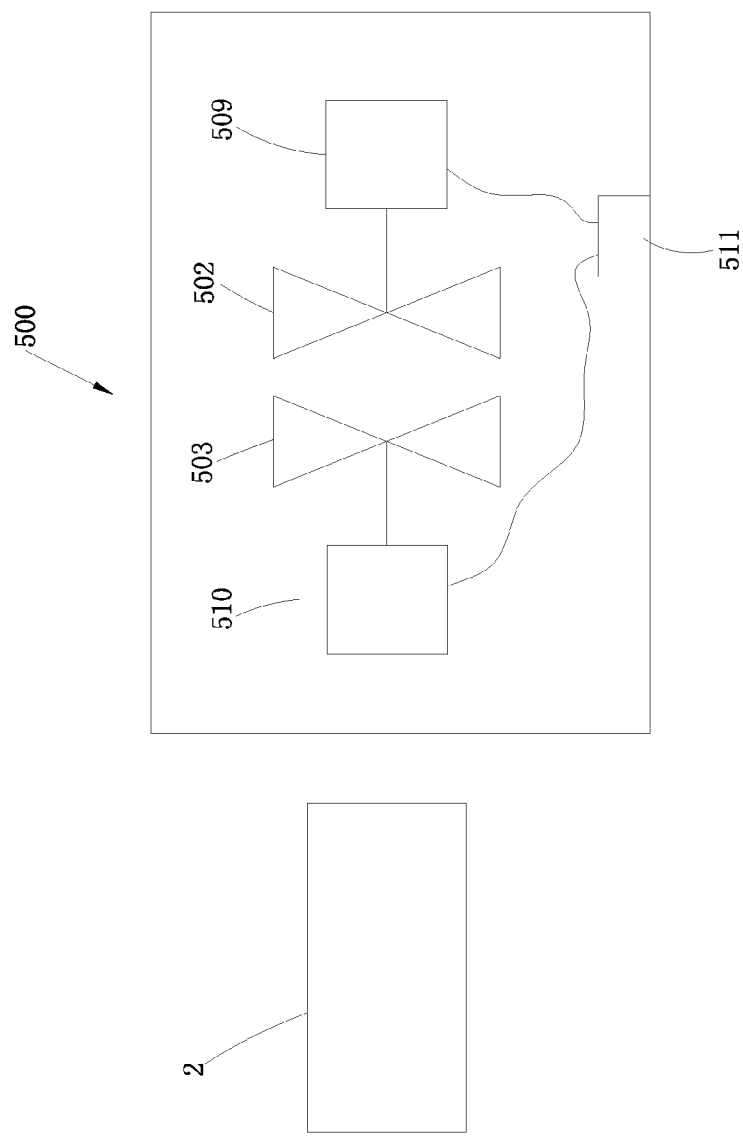
FIG. 45 is a schematic diagram of a blowing-suction device according to a thirteenth embodiment of the present invention.
Figure 46:
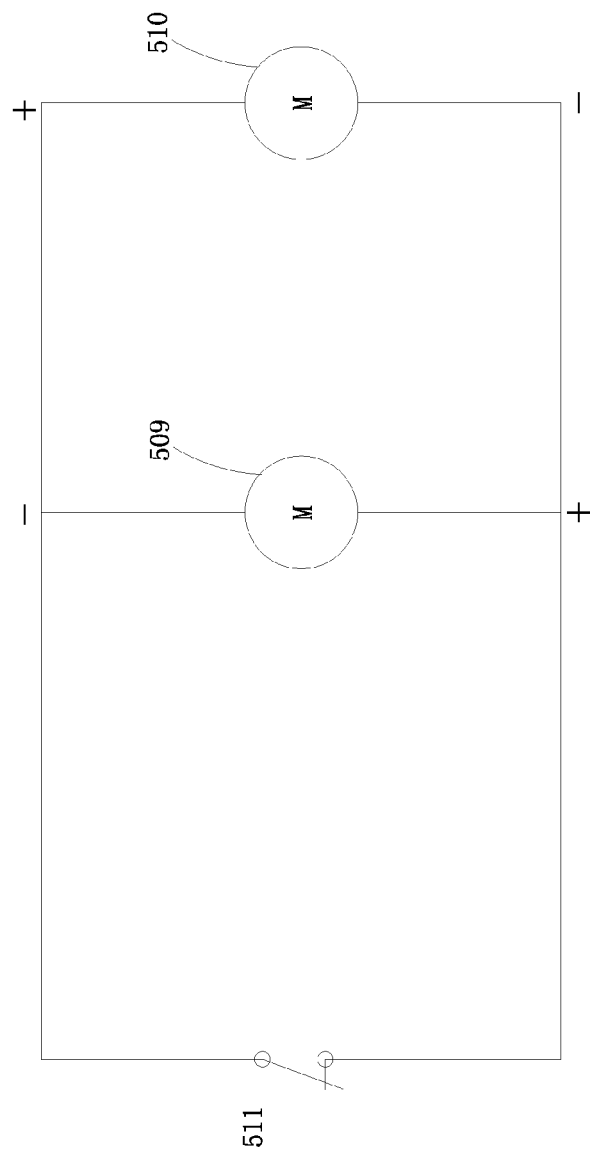
FIG. 46 is a schematic diagram of controlling a first motor and a second motor by a control mechanism in FIG. 42.

In an embodiment shown in FIG. 41, a blowing-suction device 1 also has a counter-rotating axial-flow mechanism 500 including a first axial flow fan 502 and a second axial flow fan 503. A difference lies in that the motor 501 includes: a first motor 509 and a second motor 510 that are separately disposed. The first motor 509 is connected to the first axial flow fan 502 and is configured to drive the first axial flow fan 502 to rotate. The second motor 510 is connected to the second axial flow fan 503 and is configured to drive the second axial flow fan 503 to rotate. The blowing-suction device 1 further includes a control mechanism 511 controlling the first motor 509 and the second motor 510. The control mechanism 511 controls the first motor 509 and the second motor 510 to rotate in opposite directions, so as to drive the first axial flow fan 502 and the second axial flow fan 503 to rotate in opposite directions. The control mechanism 511 may drive two motors in a PCB manner. In this embodiment, there are at least two motors 501. In an embodiment, as shown in FIG. 42, a negative electrode of the first motor 509 and a positive electrode of the second motor 510 are parallel connected to an electrical terminal on one end of the control mechanism 511, and the positive electrode of the motor 509 and the negative electrode of the second motor 510 are parallel connected to an electrical terminal on the other end of the control mechanism 511. When the control mechanism 511 moves to a first position at which a circuit is conducted, the first motor 509 and the second motor 510 simultaneously rotate in opposite direction. However, when the control mechanism 511 moves to a second position at which the circuit is conducted, the first motor 509 and the second motor 510 simultaneously change their respective rotations directions, so that the rotation directions of the first motor 509 and the second motor 510 are still opposite.

In addition, a person skilled in the art may conceive that in a blowing device having only a blowing function, the counter-rotating axial-flow mechanism 500 may also be used, so that axial blowing performance is improved.

Figure 47:
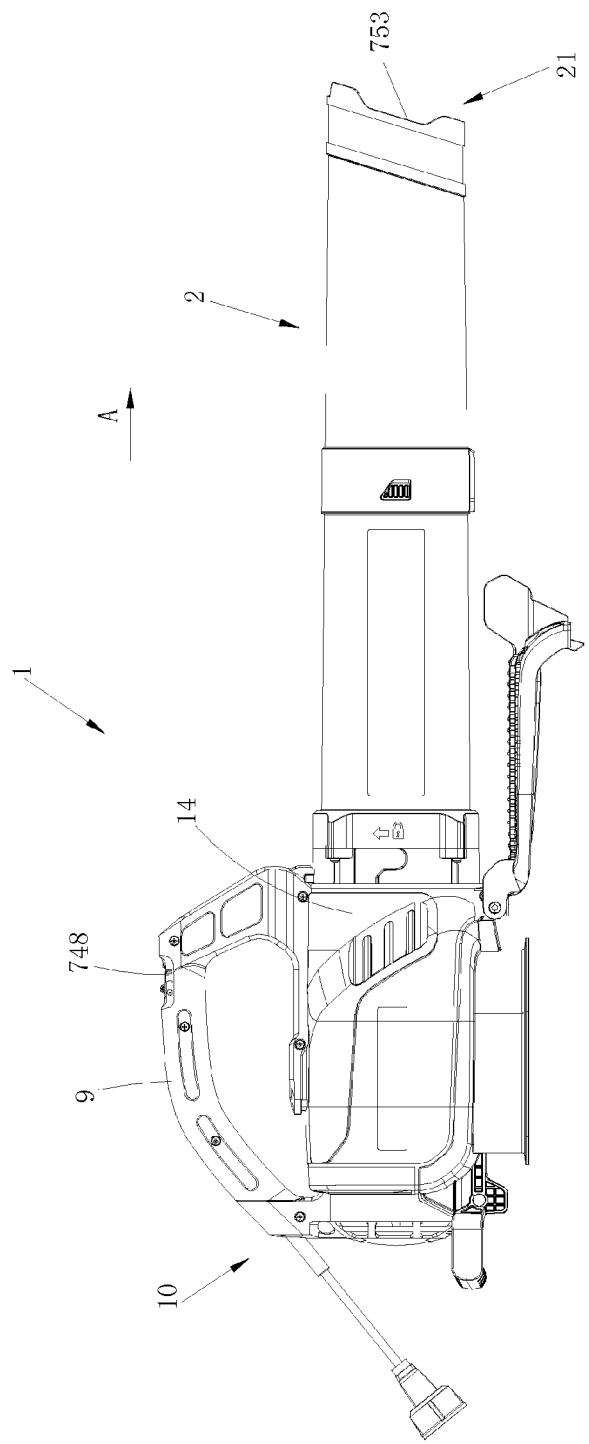
FIG. 47 is an overall schematic diagram of a blowing-suction device according to a fourteenth embodiment of the present invention.

FIG. 47 is an overall schematic diagram of a blowing-suction device 1 according to an embodiment of the present invention. The blowing-suction device 1 is a common garden tool and is configured to perform a cleaning work. The blowing-suction device 1 may gather, by using a blowing function, leaves scattered on the ground together, and may further suck the gathered leaves into a specified rubbish collection apparatus by using a suction function, thereby achieving an objective of cleaning. Therefore, the blowing-suction device 1 has at least two working modes. When the blowing-suction device 1 is in a first working mode, the blowing-suction device 1 performs a blowing function; or when the blowing-suction device 1 is in a second working mode, the blowing-suction device 1 performs a suction function. Therefore, the first working mode may also be referred to as a blowing mode, and the second working mode may also be referred to as a suction mode. The blowing-suction device 1 optionally works in the blowing mode or the suction mode according to an actual requirement of a user.

The entire blowing-suction device 1 extends in a direction indicated by an arrow A shown in FIG. 47, and the direction is defined as a longitudinal direction. The blowing-suction device 1 mainly includes a main body 10 and an air tube 2 that is connectable to the mainly body 10. The main body 10 includes a housing 14, and the housing 14 substantially extends in the longitudinal direction. The air tube 2 is optionally connected to the main body 10. The inside of the air tube 2 is hollow and is configured to provide air ventilation, so that air is blown out from the air tube 2 or is sucked from the outside. In this embodiment, the air tube 2 is detachably connected to the main body 10. When the blowing-suction device 1 does not need to be used at normal times, the air tube 2 is detached and separated from the main body 10, so that the length of the entire blowing-suction device 1 can be reduced. When the blowing-suction device 1 needs to be used, the air tube 2 may be connected to the main body 10, so that the corresponding blowing function or suction function is performed. As shown in FIG. 47, the air tube 2 is located at a longitudinal front end of the main body 10.

Figure 48:
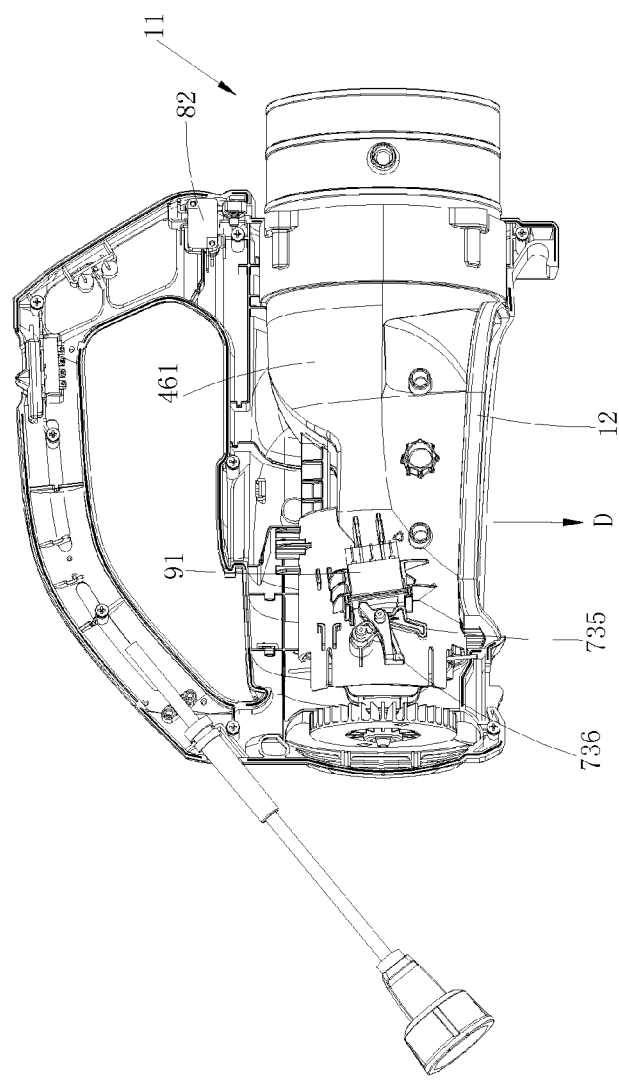
FIG. 48 is a schematic diagram of the blowing-suction device in FIG. 47 in which a half of an housing is removed.
Figure 50:
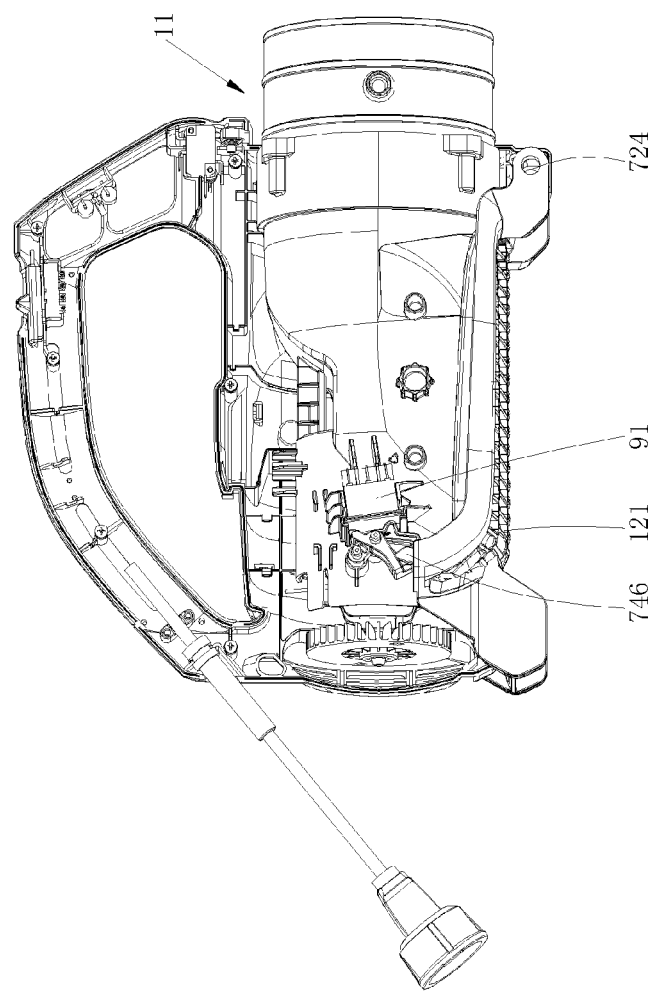
FIG. 50 is a schematic diagram of the blowing-suction device in FIG. 47 in a blowing mode.

As shown in FIG. 48 and FIG. 50, the main body 10 further includes an interface 11 and a first opening 12. The interface 11 and the first opening 12 are provided on the housing 14. The interface 11 is configured to connect to the air tube 2, and the first opening 12 is configured to connect to the outside. The blowing-suction device 1 further includes an air flow generation apparatus. An air flow generated by the air flow generation apparatus may move from the inside of the main body 10 to the outside through the first opening 12, or may move from the outside to the inside of the main body 10. The interface 11 is located at the longitudinal front end of the main body 10, and an opening direction is set in the longitudinal direction. The first opening 12 is located at a longitudinal back end of the main body 10 in the longitudinal direction or a direction having an angle with the longitudinal direction, the angle may be 0-180 degrees. In this embodiment, the orientation of the first opening 12 is a direction perpendicular to the longitudinal direction, as indicated by an arrow D in FIG. 48, and a direction of the arrow D is defined as a vertical downward direction. The interface 11 has an outline that is substantially the same as an outline of the air tube 2, and is configured to connect to the air tube 2, so that the air tube 2 is connected to the main body 10.

Figure 49:
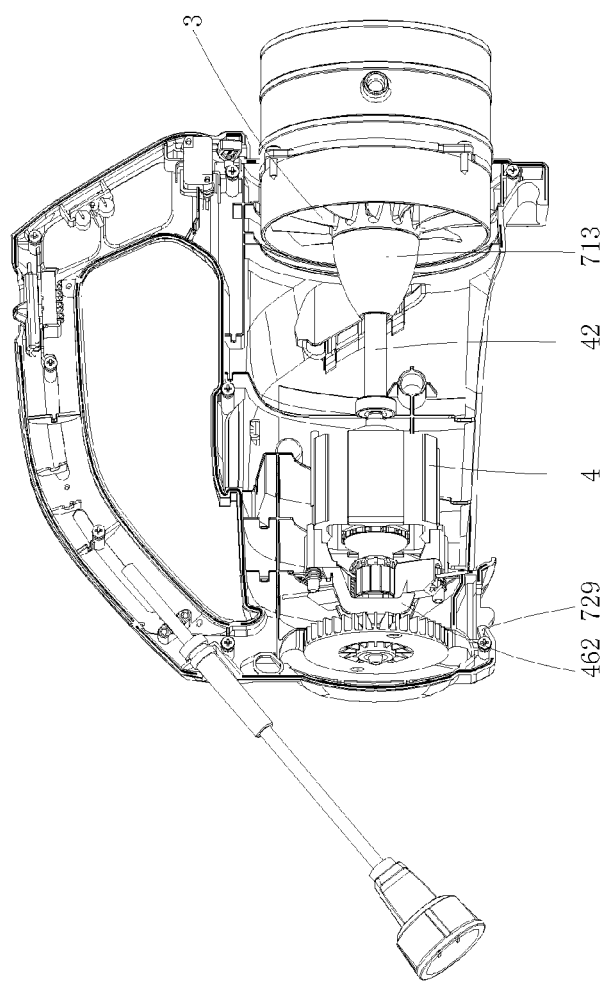
FIG. 49 is a schematic diagram of the blowing-suction device in FIG. 48 in which a front support and an air tube are removed.

As shown in FIG. 49, the air flow generation apparatus is accommodated in the housing 14, and operably generates an air flow. The air flow generated by the air flow generation apparatus can move in a particular direction. The air flow generation apparatus controllably generates air flows moving in different directions. For example, the air flow generation apparatus may generate an air flow moving in a direction of the longitudinal front end, or may generate an air flow moving in a direction of the longitudinal back end that is opposite to the direction of the longitudinal front end. In a preferred embodiment, there is a 90-degree included angle between a direction in which an air flow enters the main body 10 and a direction in which the air flow is exhausted from the main body 10. In another embodiment, there may alternatively be another angle, such as a 60-degree angle, a 120-degree angle, a 150-degree angle, or a 180-degree angle, between the direction in which the air flow enters the main body 10 and the direction in which the air flow is exhausted from the main body 10. As shown in FIG. 49, a common air flow generation apparatus includes: a rotatable fan 3 and a motor 4 configured to drive the fan 3 to rotate. The motor 4 configured to generate rotation power includes: a motor main body 750 and a motor shaft 42 that drives the motor main body 750 to rotate. The motor main body 750 includes: a stator 40 and a rotor 49 that may rotate relative to the stator 40. The motor shaft 42 is driven by the rotor 49 to rotate around an axis of the motor shaft 42. According to power sources, the motor 4 may be a pneumatic motor, or may be an electrical motor driven by electric power, or may be a gasoline motor using gasoline as fuel. The electrical motor includes a common carbon brush motor or a brushless motor. In this embodiment, as shown in FIG. 48 and FIG. 49, the motor 4 is supported by a front support 461 and a back support 462. The front support 461 and the back support 462 are separately disposed in the longitudinal direction. The motor shaft 42 extends in the longitudinal direction, and the motor shaft 42 is connected to the fan 3, so that the fan 3 is driven to correspondingly rotate. The fan 3 is an axial flow fan and is driven by the motor shaft 42 to rotate to generate an air flow.

The fan 3 may be rotatably driven to generate an air flow. The fan 3 and the motor 4 are substantially distributed in a front-and-back manner in the main body 10 in the longitudinal direction. The fan 3 is closer to the longitudinal front end. The motor 4 is closer to the longitudinal back end. The fan 3 includes at least an axial flow fan. The axial flow fan can rotate around a fan axis, to generate an air flow flowing in a direction parallel to an extension direction of the fan axis. Because the axial flow fan can generate a relatively high wind speed, compared with a conventional centrifugal fan, blowing efficiency is greatly improved under the premise that the size of the fan is not increased. In another embodiment, the fan 3 may be combined by multiple stage axial flow fans, or may be formed by only a single stage axial flow fan. In addition, the fan 3 may alternatively be combined by multiple stage other-type fans, and at least one stage is the axial flow fan. In another embodiment, the fan 3 may alternatively be formed by a mixed flow fan, because the mixed flow fan may also generate an air flow moving in the extension direction of the fan axis. In this embodiment, as shown in FIG. 3, the fan 3 is formed by a single stage axial flow fan. In this embodiment, the fan axis of the axial flow fan and the axis of the motor shaft 42 are overlapped. Certainly, in another embodiment, the fan axis of the axial flow fan and the axis of the motor shaft 42 are not set to be overlapped. In this embodiment, a plane formed by rotation of the axial flow fan is basically perpendicular to the axis of the axial flow fan. Air passes through the plane from one side of the fan 3, and moves to another side of the fan 3. An air guide cover 53 is disposed in the housing 14. The air guide cover 53 is a cylindrical-shaped housing having a hollow interior, and the interior of the cylindrical-shaped housing accommodates the fan 3 and a stationary blade 52.

Figure 58:
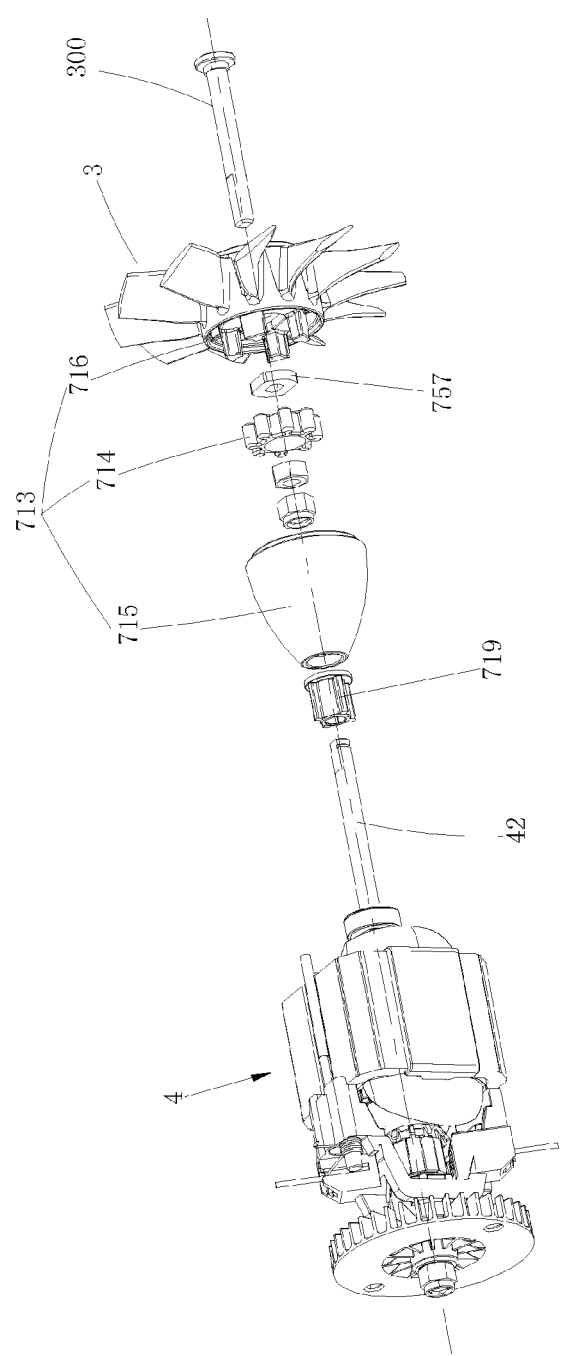
FIG. 58 is an exploded view of an air flow generation apparatus in FIG. 49.

As shown in FIG. 58, a coupling 713 is disposed between the fan 3 and the motor shaft 42, and the fan 3 is connected to the motor shaft 42 without relative rotation by using the coupling 713, so that the fan 3 is driven by the motor shaft 42 to rotate in a corresponding direction. In a preferred embodiment, the coupling 713 is a torx coupling. The coupling 713 is located between the motor 4 and the fan 3, and is closer to the fan. One end of the coupling 713 is connected to the motor shaft 42, and the other end is connected to the fan 3. In a process in which the motor shaft 42 transfers torque to the fan 3, the coupling 713 has a good vibration reduction effect. Certainly, a transmission mechanism such as a gear may further be connected between the fan 3 and the motor shaft 42. In this embodiment, because a distance between the motor 4 and the fan 3 is relatively large, the length of the motor shaft 42 is relatively long. As a result, rigidity is relatively low. In a transmission process, deflexion generated by the motor shaft 42 is also relatively large correspondingly. Therefore, to ensure stability during torque transfer between the motor 4 and the fan 3, in this embodiment, the coupling 713 is disposed between the motor shaft 42 and the fan. The motor 4 optionally rotates in a clockwise direction, or may rotate in a counterclockwise direction. The fan 3 is driven by the motor 4, and may rotate around the fan axis in different direction, so that air flows moving in different directions are generated.

During installation of the motor shaft 42 and a fan shaft 300, a deviation is generated, and consequently, axes are not in a line. In addition, deflexion and deformation are generated during a rotation process. These are reasons for vibration generation when the motor 4 transfers torque to the fan 3. Therefore, the coupling 713 having a vibration reduction effect is connected between the motor 4 and the fan 3. In embodiments shown in FIG. 58, FIG. 59, FIG. 60, FIG. 61, and FIG. 62, the coupling 713 includes: a first clamping part 715 connected to the motor shaft 42 without relative rotation, a second clamping part 716 connected to the fan 3 without relative rotation, and an elastomer 714 disposed between the first clamping part 715 and the second clamping part 716. The elastomer 714 is formed by an elastomer. The elastomer 714 is between the first clamping part 715 and the second clamping part 716, and has vibration reduction and position deviation compensation functions. Therefore, during a torque transfer process, the coupling 713 has a stable and precise transmission effect.

Figure 60:
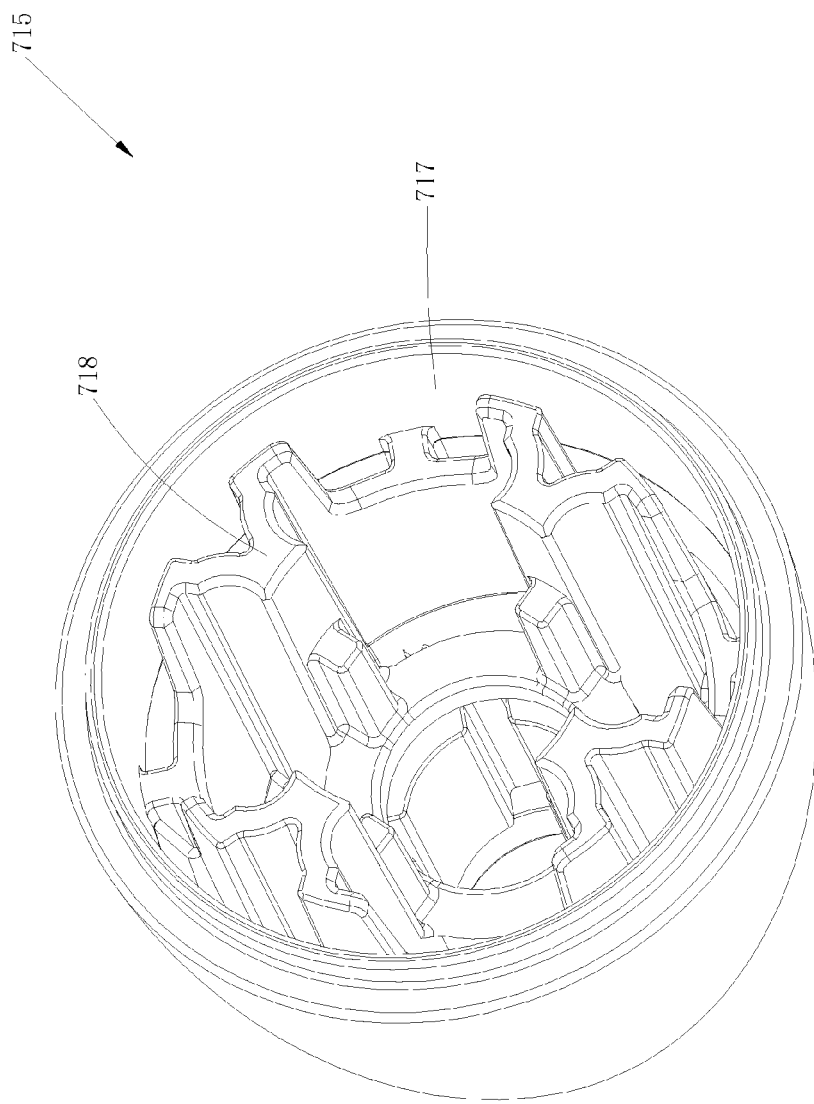
FIG. 60 is a schematic diagram of a first clamping part in FIG. 58.

As shown in FIG. 58 and FIG. 60, the first clamping part 715 is located at one end of the motor shaft 42, and is frustum-shaped. The first clamping part 715 has a streamline outer surface. This helps reduce generation of eddy flows and turbulence flows when an air flow passing through the outer surface of the first clamping part 715, thereby achieving an objective of improving blowing efficiency and suction efficiency. The first clamping part 715 includes: a first base portion 717, and a first gear portion 718 disposed around the first base portion 717. The first base portion 717 has a streamline outer surface and is frustum-shaped. In addition, a cross sectional outline area of the first base portion 717 gradually increases from a longitudinal back end to a longitudinal front end. The first base portion 717 has a hollow interior, and a longitudinal front portion and a longitudinal back portion are provided with openings for the motor shaft 42 to pass through. Evenly circumferentially arranged first gear portions 718 are disposed on an inner circumferential surface of the first base portion 717, and the first gear portion 718 is a protrusion extending out towards the motor shaft 42. To reduce costs and weight of the entire blowing-suction device 1, the first clamping part 715 is a plastic part. However, hardness and strength of plastic part is much worse than hardness and strength of a metal part. Therefore, damage occurs when the plastic first clamping part 715 is connected to the metal motor shaft 42 and the plastic first clamping part 715 transfers torque to the metal motor shaft 42. To avoid that in a process in which the motor shaft 42 transfers torque to the first clamping part 715, the first clamping part 715 is twisted and deformed, or even damaged, an insert part 719 is disposed in the first clamping part 715.

As shown in FIG. 58, the insert part 719 is located in the first base portion 717 and at a position connected to the motor shaft 42. The insert part 719 is tube-shaped. An outer surface of the insert part 719 has several protrusions extending in a circumferential direction. In addition, a longitudinal front end of the insert part 719 has a boss. The boss and the protrusion are clamped to a groove on an inner surface of the first base portion 717. The insert part 719 has a through hole for the motor shaft 42 to pass through, and a longitudinal front end portion of the hole is set to be a flat-rectangular hole. The flat-rectangular hole fits a flat-rectangular shape at an end of the motor shaft 42. In addition, the motor shaft 42 and the insert part 719 are in an interference fit connection manner, so that the motor shaft 42 is connected to the insert part 719 without relative rotation. The insert part 719 is made of a powder metallurgy part. Because by means of a powder metallurgy method, a pressed compact having a final size is pressed, and subsequent machining is not required or rarely required. Therefore, metal is significantly saved, and product costs are reduced. In addition, when the powder metallurgy method is used to manufacture a product, a loss of metal is lower than that when a common casting method is used. The insert part 719 is connected to the first clamping part 715 without relative rotation, so that the motor shaft 42 is connected to the insert part 719 and torque is transferred between the motor shaft 42 and the insert part 719. Because a strength of the insert part 719 is higher than that of the first clamping part 715, the first clamping part 715 is prevented from being damaged when the motor shaft 42 transfers torque to the first clamping part 715. In a preferred embodiment, the insert part 719 is disposed in a mold of the first clamping part 715 before the first clamping part 715 is injection molded. When the first clamping part 715 is molded, the insert part 719 and the first clamping part 715 are integrated. The insert part 719 and an output end of the motor shaft 42 are in interference fit connection in a flat-rectangular manner.

Figure 61:
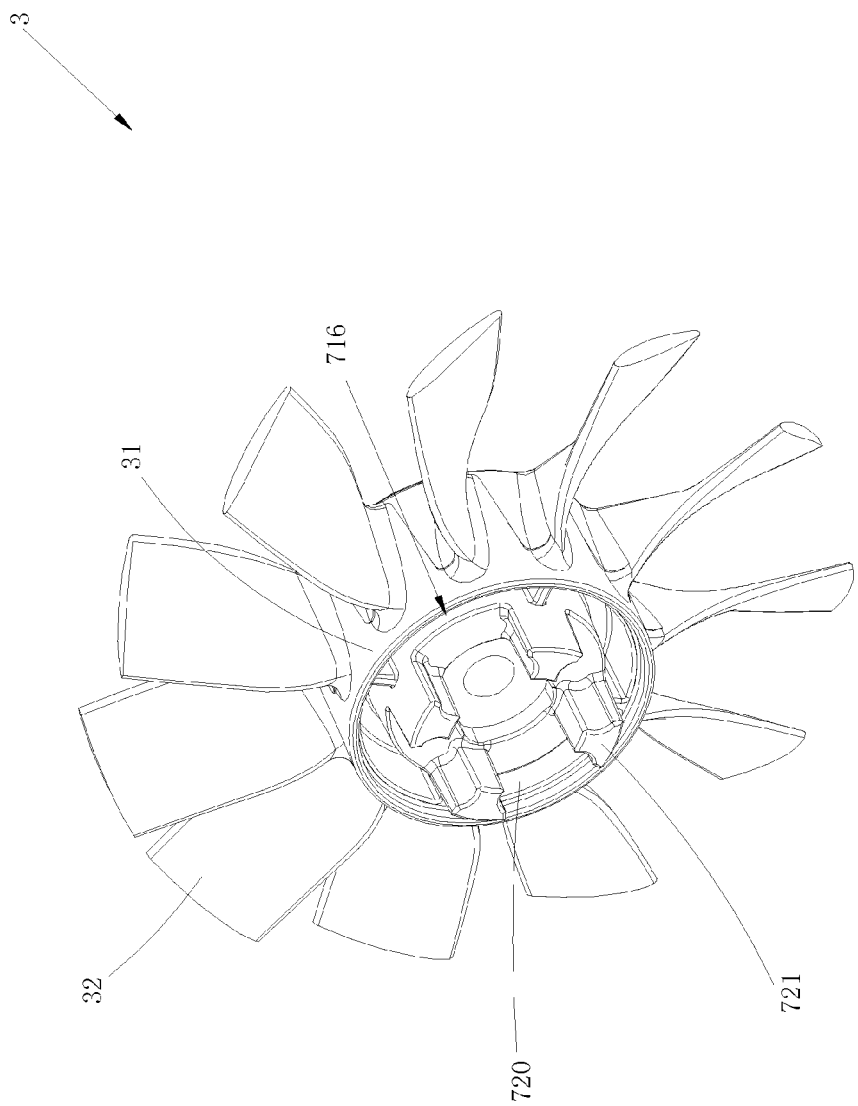
FIG. 61 is a schematic diagram of a second clamping part in FIG. 58.

As shown in FIG. 61, the second clamping part 716 includes: a second base portion 720 and a second gear portion 721 disposed around the second base portion 720. In this embodiment, considering manufacturing costs and installation convenience, the second clamping part 716 and the fan 3 are integrally formed. Certainly, the second clamping part 716 and the fan 3 may alternatively be two separate parts, and the two parts may be fixedly connected in any connection manner such as threaded connection, key connection, or flat-rectangular interference fit connection that a person skilled in the art may conceive. In a preferred embodiment, the second base portion 720 is ring-shaped, and is located in a hub 31 of the fan and is manufactured integrally with the hub 31. The second gear portion 721 extends in an axial direction of the fan 3 from a side edge that is of the second base portion 720 and that is perpendicular to the fan axis.

Figure 59:
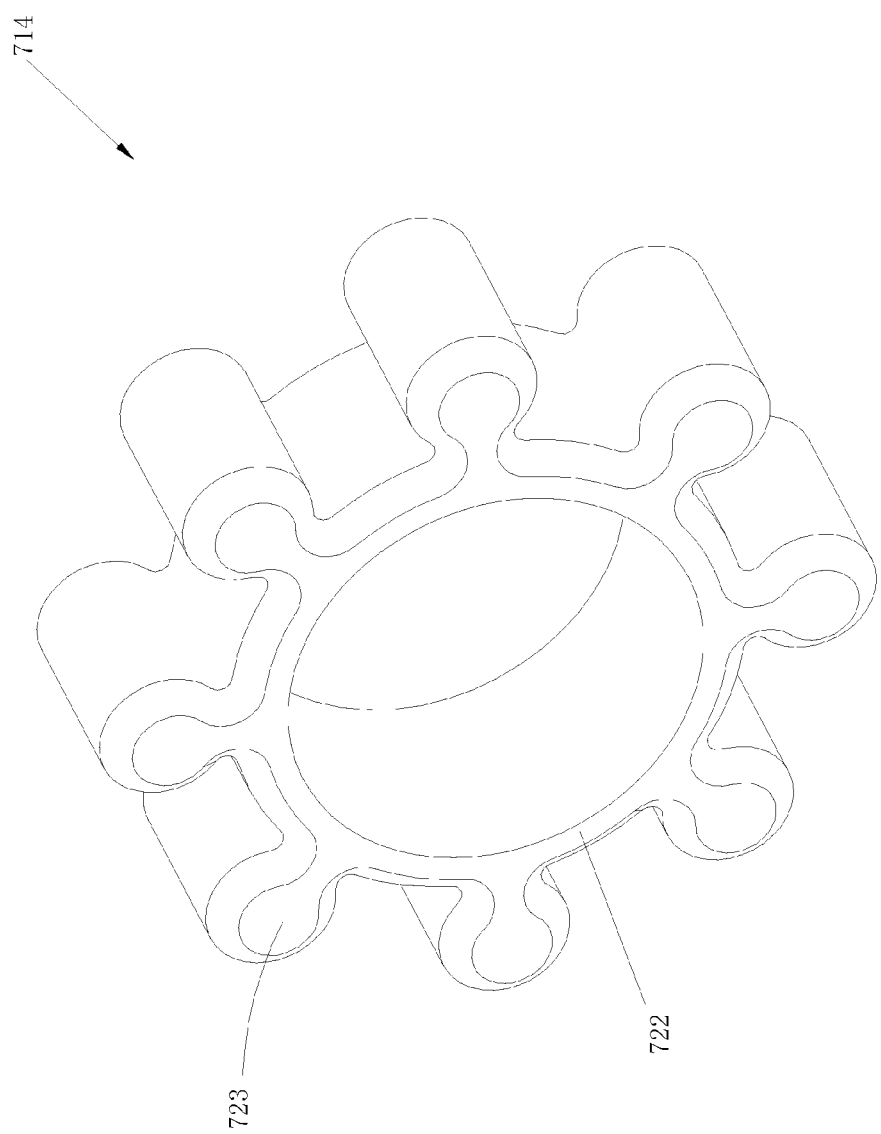
FIG. 59 is a schematic diagram of an elastomer in FIG. 58.
Figure 62:
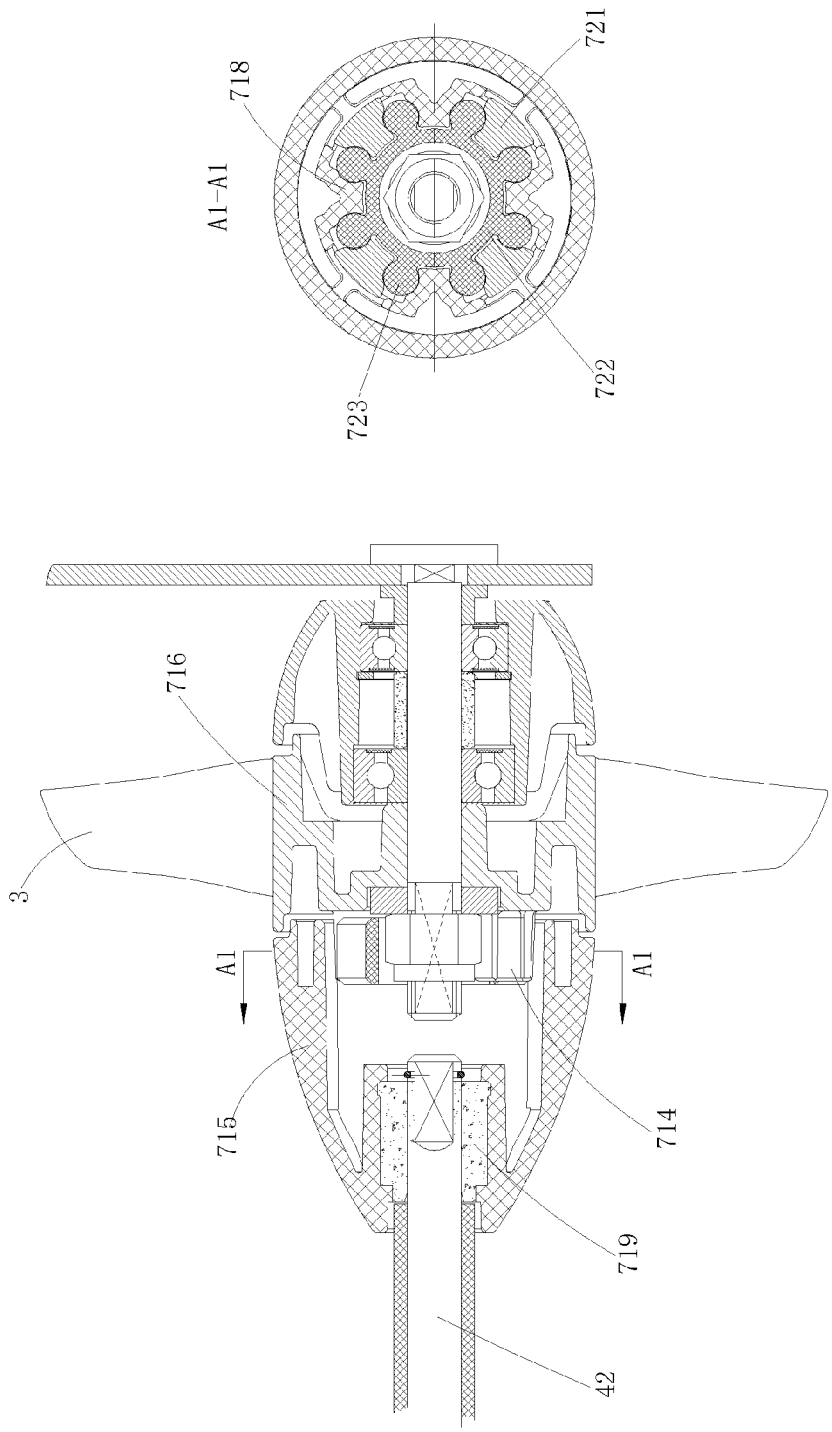
FIG. 62 is an assembly sectional view of a coupling in FIG. 58.

As shown in FIG. 59, the elastomer 714 includes: a third base portion 722 and a third gear portion 723 disposed around the third base portion 722. The quantity of third gear portions 723 is greater than or equal to the sum of the quantity of first gear portions 718 and the quantity of second gear portions 721. Preferably, the quantity of the third gear portions 723 is 8, the quantity of the first gear portions 718 is 4, and the quantity of the second gear portions 721 is 4. The middle of the first base portion 717, the middle of the second base portion 720, and the middle of the third base portion 722 have holes accommodating the motor shaft 42 to pass through. As shown in FIG. 62, each first gear portion 718 is installed between adjacent third gear portions 723, each second gear portion 721 is installed between adjacent third gear portions 723, and two radial side surfaces of each third gear portion 723 are respectively adjacent to one first gear portion 718 and one second gear portion 721. The elastomer 714 is an elastomer, and the elastomer may be made of engineering plastics or rubber. In a preferred embodiment, the elastomer 714 is made of polyurethane rubber. In a transmission process, the elastic elastomer 714 is between the first clamping part 715 and the second clamping part 716, so that the first gear portion 718 is not in contact with the second gear portion 721, and the first base portion 717 is also not in contact with the second base portion 720. Therefore, a cushioning function of the elastomer 714 can weaken radial vibration, axial vibration, and circumferential vibration that are generated between the motor shaft 42 and the fan shaft 300 in the transmission process. When a position deviation exists between the motor shaft 42 and the fan 3, a position deviation also exists between the first clamping part 715 and the second clamping part 716. Because the elastomer 714 is capable of generating elastic deformation, the elastomer 714 may compensate for a radial position deviation, an axial position deviation, and a circumferential position deviation. Therefore, during transmission between the motor 4 and the fan 3, the elastomer 714 has cushioning, vibration reduction, and position deviation compensation functions, so that vibration noise and an energy loss are reduced, thereby improving transmission efficiency.

The coupling 713 in this embodiment is also applicable to a connection between a fan and a motor of a blower apparatus.

As shown in FIG. 48, the blowing-suction device includes a control switch 91 configured to control a rotation direction of the motor 4. The control switch 91 has at least two operation positions, that is, a first operation position and a second operation position. When the control switch 91 is at the first operation position, the motor 4 rotates in a clockwise direction, and the fan 3 correspondingly rotates in a first direction, so that the blowing-suction device 1 is in the blowing mode. When the control switch 91 is at the second operation position, the motor 4 rotates in a counterclockwise direction, and the fan 3 correspondingly rotates in a second direction opposite to the first direction, so that the blowing-suction device 1 is in the suction mode. In a preferred embodiment, the control switch 91 further has a third operation position. When the control switch 91 is at the third operation position, the motor 4 stops working. The blowing-suction device 1 includes a self-resetting mechanism (not shown in the figure). This self-resetting mechanism is linked with the control switch 91, and enables the control switch 91 to tend to reset to the third operation position. Therefore, when there is no external force on the control switch 91, the control switch 91 remains at the third operation position that makes the motor 4 to stop working. When the control switch 91 is abutted against by another object, the control switch 91 may be switched to the first operation position or the second operation position. To prevent the control switch 91 from being triggered in an unexpected situation and ensure that the control switch 91 is triggered to a corresponding operation position in the blowing mode or the suction mode, the control switch 91 is disposed in the housing 14 and located outside of the front support 461. In a preferred embodiment, the control switch 91 is fixed on an outer surface of the front support 461 by using a rib on the outer surface of the front support 461, so that a structure is compact, space is saved, and installation is firm.

Figure 51:
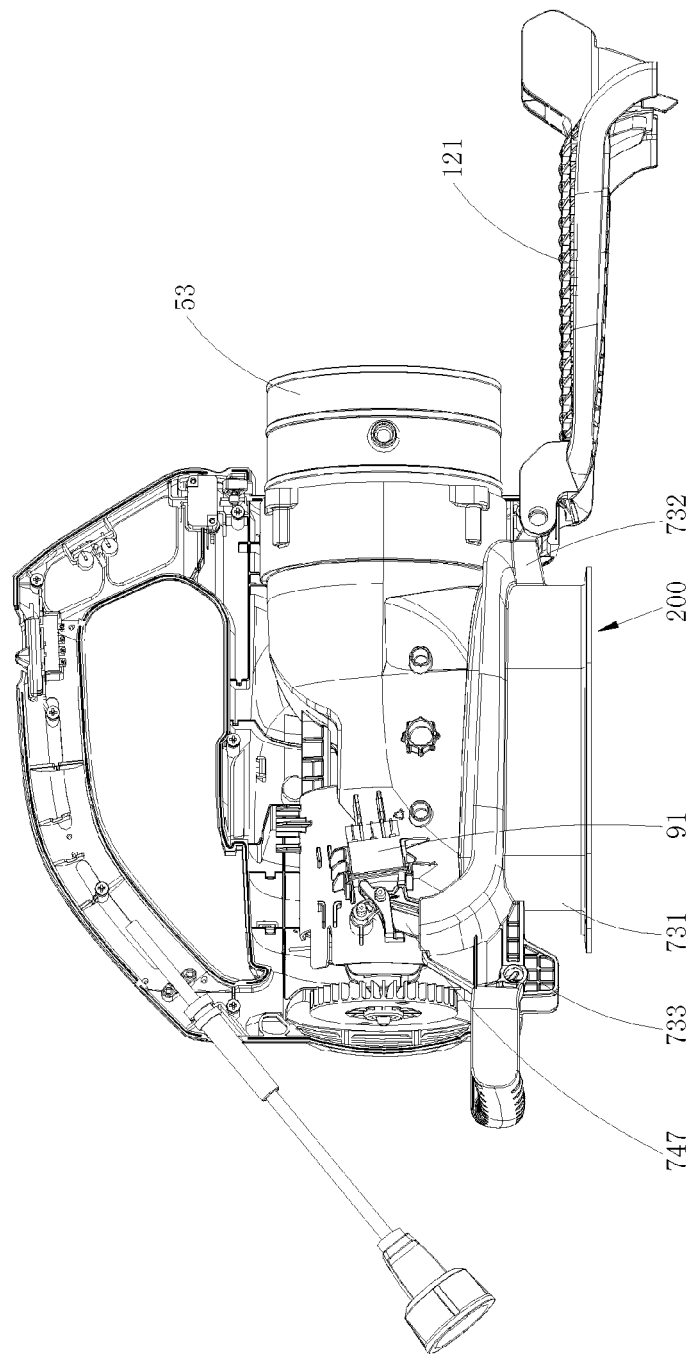
FIG. 51 is a schematic diagram of the blowing-suction device in FIG. 47 in a suction mode.
Figure 52:
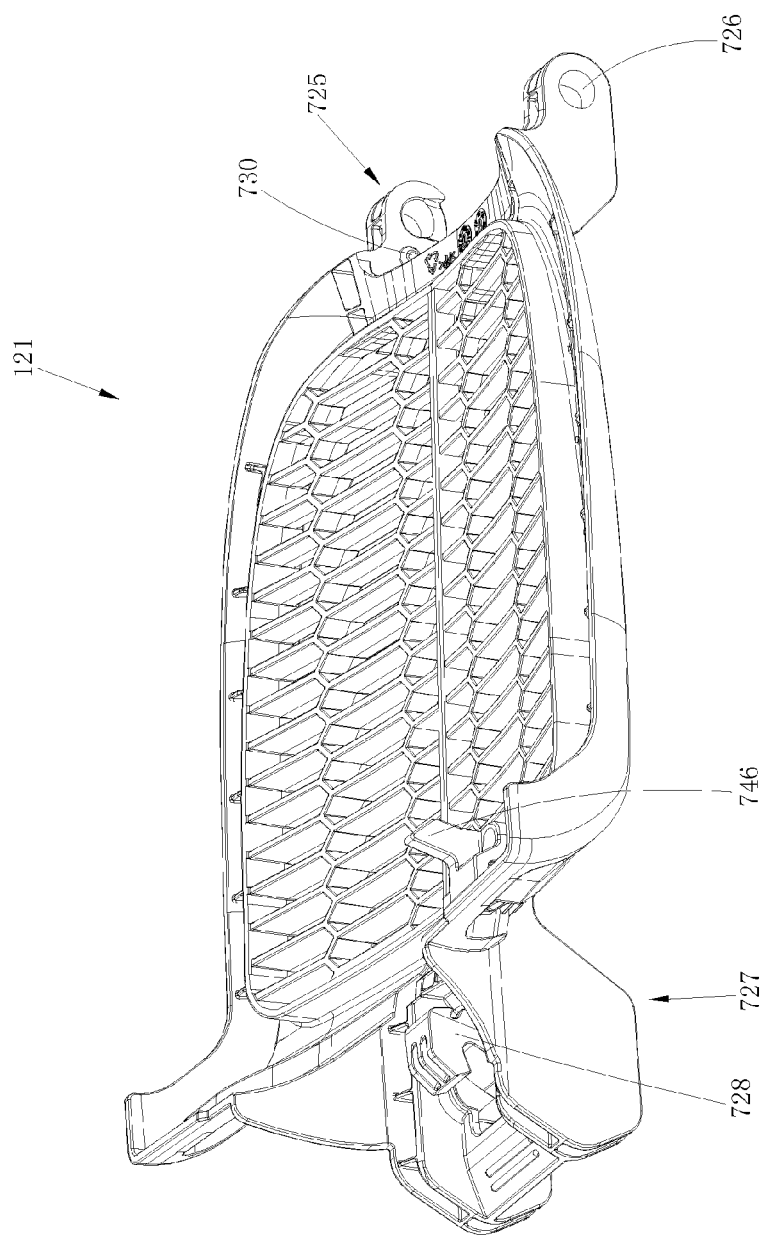
FIG. 52 is a schematic diagram of a security shield of the blowing-suction device in FIG. 50.

As shown in FIG. 50 and FIG. 52, the blowing-suction device 1 further includes a security shield 121. The security shield 121 is provided with an air admission structure. The air admission structure is usually set to be air admission meshes. Air may pass through the first opening 12 from the air admission structure, but a particle matter having a relatively large volume such as a branch or a leaf cannot pass through the first opening 12 and is shielded outside of the security shield 121. In addition, because of a shielding function of the security shield, a user cannot put the hand into the first opening 12, so that no injury is caused. In the blowing mode, the security shield 121 is connected to the first opening 12. In a preferred embodiment, the security shield 121 may rotate around a third pivot 724 disposed on the housing 14, so as to open or close the first opening 12. The third pivot 724 is located at a longitudinal front end of the first opening 12. A first front end 725 of the security shield 121 is provided with a shaft hole 726, and the shaft hole 726 fits the third pivot 724. The security shield 121 further has the other end, that is, a first back end, opposite to the first front end 725. When the security shield 121 covers the first opening 12, the first back end 727 is located at the longitudinal back end of the first opening 12. A clamping part 728 is fixedly installed at the first back end 727, and the clamping part 728 is an elastic connection part. The clamping part 728 may fix the security shield 121 at the first opening 12 by means of an elastic restoring force. An operator may loosen the clamping part 728 by overcoming the elastic restoring force of the clamping part 728, so that the security shield 121 is separated from the first opening 12. Preferably, the clamping part 728 may be a spring clip. When the security shield 121 rotates to cover the first opening 12, the operator presses the clamping part 728 to enable the clamping part 728 to connect to a protrusion hook 729 on the housing 14 shown in FIG. 49, and then loosens the clamping part 728, so that the security shield 121 is fixed at the first opening 12. As shown in FIG. 51, when the operator needs to end the blowing mode of the blowing-suction device 1, the operator presses the clamping part 728 to overcome the elastic restoring force of the clamping part 728, to separate the clamping part 728 from the protrusion hook 729. When the operator rotates the security shield 121 180 degrees from the first opening 12 until the first opening 12 is completely open, a fixed protrusion point 730 at the first front end 725 fits a groove on the housing 14, so that the security shield 121 is fixed at this position. In another embodiment, the security shield 121 may alternatively be fixed on the first opening 12 in a buckling manner or a pluggable manner.

After the security shield 121 opens the first opening 12, the first opening 12 may be connected to a collection apparatus 200. As shown in FIG. 51, the collection apparatus 200 is configured to collect foreign matters such as leaves and branches when the blowing-suction device 1 is in the suction mode. In a preferred embodiment, the collection apparatus 200 may be an accessory detachably connected to the blowing-suction device 1. The collection apparatus 200 includes: a support portion 731 connected to the first opening 12 and an accommodating portion (not shown in the figure) connected to the support portion 731. The support portion 731 is a rigid member, and usually, the support portion 731 may be a polypropylene member. The accommodating portion may be a cloth bag or a rubbish bag made of another material, and the accommodating portion may be connected to the support portion 731 by using a strap, a rubber band, or a rigid buckle. The support portion 731 has a second front end 732 and a second back end 733. The second front end 732 is provided with a protrusion portion, and the protrusion portion may be inserted into an accommodating slot on the housing 14. A clamping part is disposed near the second back end 733. The clamping part herein is the same as the clamping part 728 on the security shield 121. The clamping part may be a spring clip. When the collection apparatus 200 is connected to the first opening 12 and covers the first opening 12, the clamping part is pressed, so that the clamping part is connected to the protrusion hook 729 on the housing 14 shown in FIG. 49, and then the clamping part is loosen, so that the collection apparatus 200 is fixed at the first opening 12.

When the blowing-suction device 1 needs to be used in the blowing mode, the security shield 14 covers the first opening 12, the operator presses the clamping part 728, and enables the clamping part 728 to connect to the protrusion hook 729, and then loosens the clamping part 728, so that the security shield 14 is fixed at the first opening 12. In this case, the security shield 14 triggers the control switch 13 to be at the first operation position. When the blowing-suction device 1 needs to be switched from the blowing mode to the suction mode, the clamping part 728 is pressed to separate the clamping part 728 from the protrusion hook 729. The security shield 121 rotates around the third pivot 724. In a rotation process, the security shield 121 and a dust collection apparatus 22 are not connected to the first opening 12. The control switch 91 is at the third operation position under action of the self-resetting mechanism. When the security shield 121 is rotated 180 degrees from the first opening 12 until the first opening 12 is completely open, the fixed protrusion point 730 at the first front end 725 fits the groove on the housing 14, so that the security shield 121 is fixed at this position. Then, the protrusion portion of the second front end 732 of the collection apparatus 200 is inserted into the accommodating slot on the housing 14, so that the collection apparatus 200 covers the first opening 12. The clamping part fixed on the collection apparatus 200 is pressed, so that the clamping part is connected to the protrusion hook 729 on the housing 14, and then the clamping part 728 is loosened, so that the collection apparatus 200 is fixed at the first opening 12. In this case, the collection apparatus 200 triggers the control switch 91 to be at the second operation position.

In an embodiment, according to the foregoing manner, the security shield 121 or the collection apparatus 200 is directly in contact with the control switch 91 and triggers the control switch 91 to be at the first operation position or the second operation position.

Figure 72:
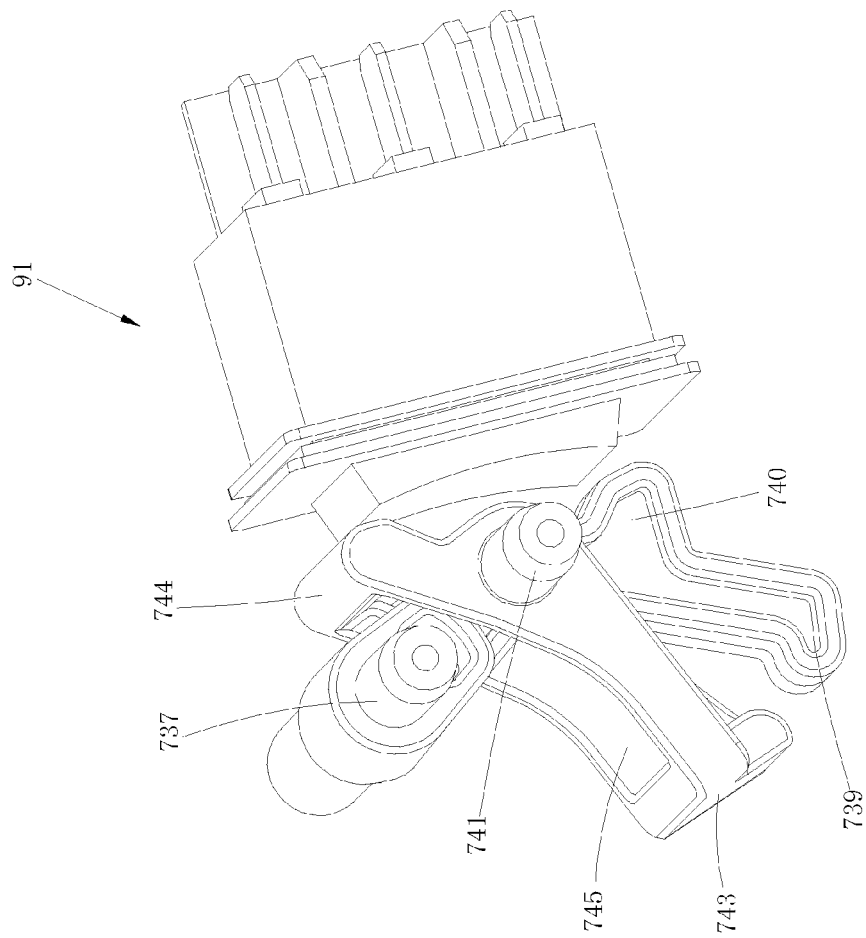
FIG. 72 is a schematic diagram of a linkage mechanism and a control switch in FIG. 48 according to the present invention.

In another embodiment, considering that an actual working movement of the control switch 91 is slightly, when the security shield 121 or the collection apparatus 200 is connected to the first opening 12, the control switch 91 may not be triggered due to a slight position deviation. Consequently, reliability of the control switch 91 is affected. Therefore, to ensure reliability of the control switch 91, in a preferred embodiment, the blowing-suction device 1 further includes a linkage mechanism 734 that triggers the control switch 91 to be at different operation positions. As shown in FIG. 48, the linkage mechanism 734 is disposed between the security shield 121 and the control switch 91, and between the collection apparatus 200 and the control switch 91. In the blowing mode, the security shield 121 drives the linkage mechanism 734 to trigger the control switch 91 to be at the first operation position. In the suction mode, the collection apparatus 200 drives the linkage mechanism 734 to trigger the control switch 91 to be at the second operation position. As shown in FIG. 48 and FIG. 72, in a preferred embodiment, the linkage mechanism 734 includes a first linkage mechanism 735 and a second linkage mechanism 736 that are separately disposed. In the blowing mode, the security shield 121 drives the first linkage mechanism 735 to abut against the control switch 91. In the suction mode, the collection apparatus 200 drives the second linkage mechanism 736 to abut against the control switch 91. Two linkage mechanisms 734 are disposed to separately abut against the control switch 91, so that the control switch 91 is at different operation positions. Compared with that one linkage mechanism 734 is used, reliability of action triggering may be improved.

Figure 53:
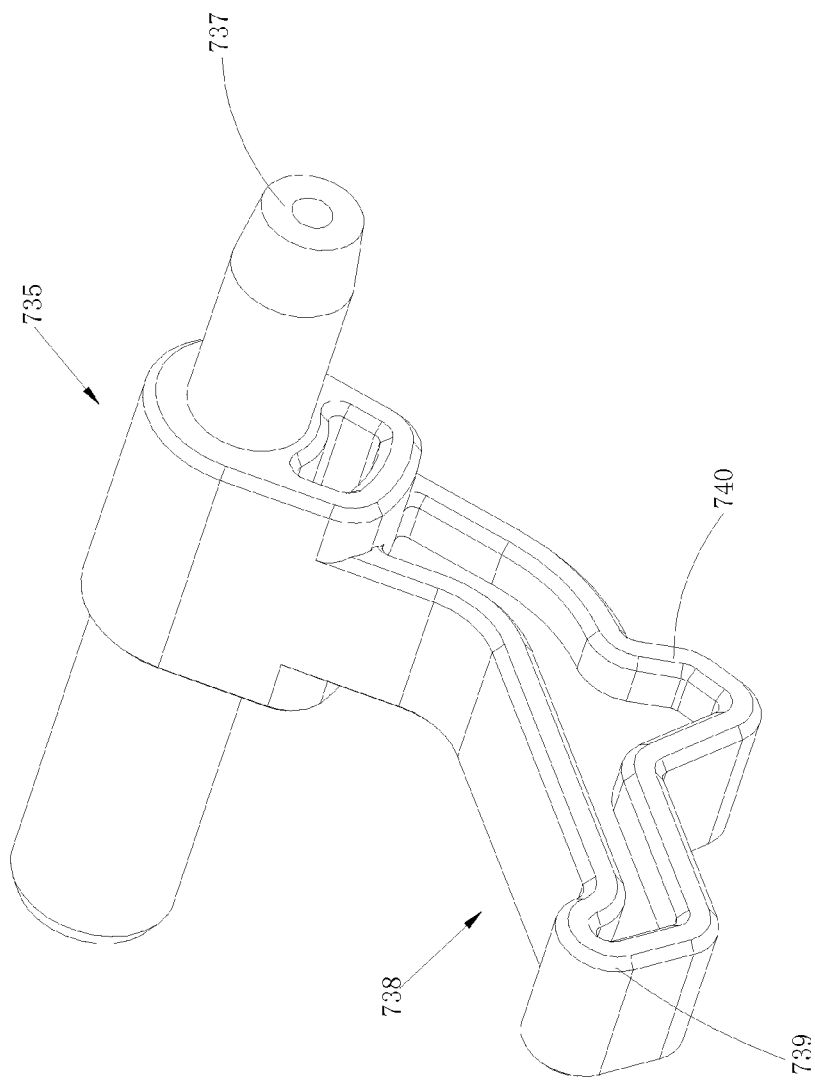
FIG. 53 is a schematic diagram of a first linkage mechanism of the blowing-suction device in FIG. 48.

As shown in FIG. 53, the first linkage mechanism 735 includes: a first pivot 737 and a first swing rod 738 pivoting around the first pivot 737. The first pivot 737 and the first swing rod 738 may be integrally formed, or may be two independently formed parts. In a preferred embodiment, a solution in which the first pivot 737 and the first swing rod 738 are integrally formed is used. The first swing rod 738 includes: a first end 739 abutting against the security shield 121 and a second end 740 abutting against the control switch 91. The second end 740 is located between the first end 30 and the first pivot 737. The first pivot 737 is pivotally installed on the outer surface of the front support 461 and an axis direction of the first pivot 737 is perpendicular to the longitudinal direction.

Figure 54:
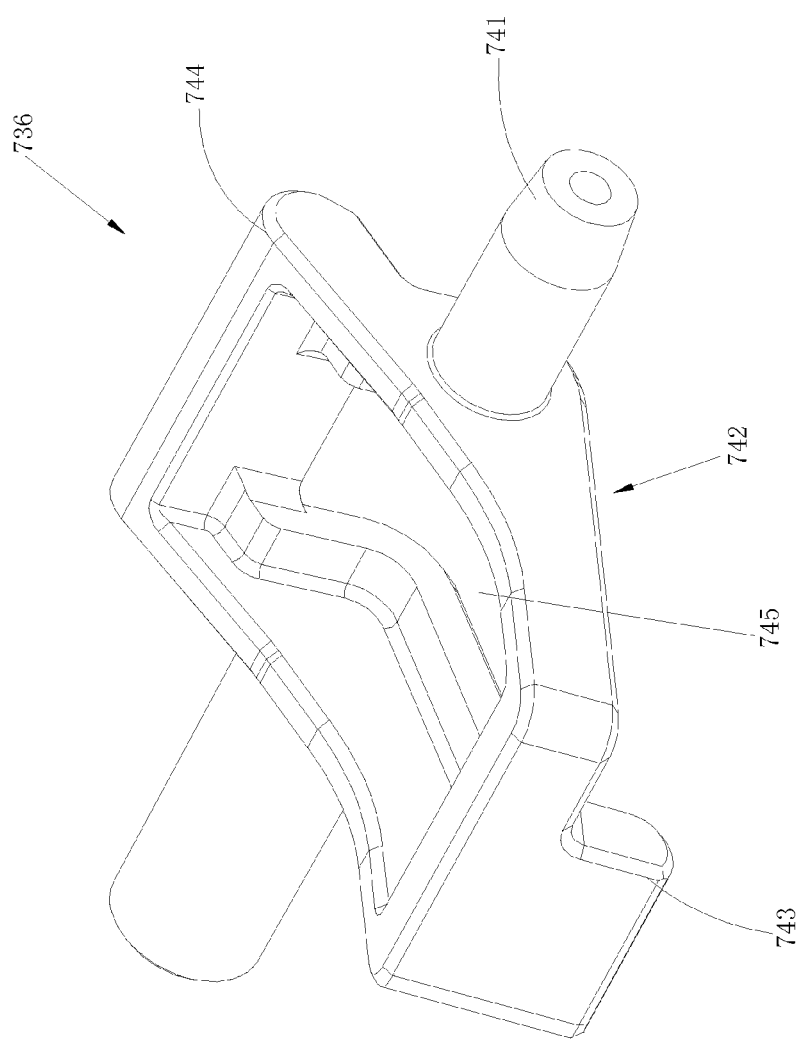
FIG. 54 is a schematic diagram of a second linkage mechanism of the blowing-suction device in FIG. 48.

As shown in FIG. 54, the second linkage mechanism 736 includes: a second pivot 741 and a second swing rod 742 pivoting around the second pivot 741. Similarly, the second pivot 741 and the second swing rod 742 may be integrally formed, or may be two independently formed parts. In a preferred embodiment, a solution in which the second pivot 741 and the second swing rod 742 are integrally formed is used. The second swing rod 742 includes: a third end 743 abutting against the collection apparatus 200 and a fourth end 744 abutting against the control switch. The second pivot 741 is located between the third end 743 and the fourth end 744. The second pivot 741 is pivotally installed on the outer surface of the front support 461 and an axis direction of the second pivot 741 is perpendicular to the longitudinal direction. The second swing rod 742 has a cavity, that is a hollow portion 745, penetrating the second swing rod 742 in a direction perpendicular to the second pivot 741. The first swing rod 738 penetrates the second swing rod 742 from the hollow portion 745. As shown in FIG. 72, a space saving effect is achieved. The first pivot 737 and the second pivot 741 are parallel to each other, and the first swing rod 738 and the second swing rod 742 do not interfere with each other during motion.

Because the security shield 121 and the collection apparatus 200 need to abut against the linkage mechanism 734 and apply forces to the linkage mechanism 734, to trigger the control switch 91, there is a particular requirement on rigidity of portions at which the security shield 121 and the collection apparatus 200 separately abut against the linkage mechanism 734. Comprehensively considering costs, in a preferred embodiment, a first push block 746 abutting against the first swing rod 738 is installed on the security shield 121. As shown in FIG. 50, the first push block 746 is located at the first back end 727. When the security shield 121 is fixed at the first opening 12, the first push block 746 abuts against the first end 739. At least a part of the security shield 121 is a cheap polypropylene member. The first push block 746 is a nylon member. The price of the nylon member is relatively higher, but rigidity and hardness of the nylon member are better than rigidity and hardness of the polypropylene member. Because when the first push block 746 abuts against the first swing rod 738, a relatively large contact force is applied to the first push block 746, a material having relatively good rigidity and hardness needs to be used, to prevent deformation and ensure displacement precision. A second push block 747 abutting against the second swing rod 742 is installed on the collection apparatus 200. As shown in FIG. 51, the second push block 747 is located at the second back end 733 of the collection apparatus 200. When the collection apparatus 200 is fixed at the first opening 12, the second push block 747 abuts against the third end 743. At least the support portion 731 of the collection apparatus 200 is a polypropylene member, and the second push block 747 is a nylon member. The first push block 746 and the security shield 121 are connected by using a screw. Alternatively, an outer thread provided on the first push block 746 is connected to a threaded hole on the security shield 121. A same connection manner may be used between the second push block 747 and the collection apparatus 200.

In the blowing mode, the security shield 121 is installed at a first opening 12, the first push block 746 abuts against the first end 739 of the first swing rod 738, the first swing rod 738 rotates around the first pivot 737, and the second end 740 of the first swing rod 738 abuts against the control switch 91, so that the control switch 91 is at the first operation position, and the motor 4 rotates in the clockwise direction. The blowing-suction device 1 has a self-resetting mechanism, and the self-resetting mechanism enables the control switch 91 to tend to reset to the third operation position. Preferably, the self-resetting mechanism applies an elastic force to the control switch 91. When the security shield 121 and the collection apparatus 200 are not installed at the first opening 12, that is, no trigger force from the outside is applied to the control switch 91, the self-resetting mechanism enables the control switch 91 to stay at the third operation position, that is, the motor 4 stops working, so that security of the operator is ensured. Therefore, in the blowing mode, the control switch 91 is at the first operation position by overcoming the elastic force from the self-resetting mechanism, and the motor 4 rotates in the clockwise direction. In a process in which the blowing-suction device 1 is switched from the blowing mode to the suction mode, the security shield 121 is moved from the first opening 12, the control switch 91 is reset to the third operation position under action of the self-resetting mechanism, and the motor 4 stops working. In the suction mode, the collection apparatus 200 is installed at the first opening, the second push block 747 abuts against the third end 743 of the second swing rod 742, the second swing rod 742 rotates around the second pivot 741, the fourth end 744 of the second swing rod 742 abuts against the control switch 91, so that the control switch 91 is at the second operation position by overcoming the elastic force from the self-resetting mechanism, and the motor 4 rotates in the counterclockwise direction.

As shown in FIG. 47 and FIG. 48, a handle portion 9 configured for grasping is further disposed on the main body 10, and the handle portion 9 is set to be bent. Two ends of the handle portion 9 are separately connected to the housing 14, so that grasping space is formed. When the blowing-suction device 1 is operated, the handle portion 9 is located above the blowing-suction device 1. Preferably, a speed adjustment switch 748 configured to control a rotational speed of the motor 4 is disposed on the handle portion 9, and the speed adjustment switch 748 operably adjusts the rotational speed of the motor 4 in a step or stepless manner. In a preferred embodiment, the speed adjustment switch 748 has three steps, and the three steps are respectively a stop step, a high speed step, and a low speed step. In another embodiment, the speed adjustment switch 748 may have more than three optionally speed positions, or the speed adjustment switch 748 may be a stepless speed adjustment switch. Certainly, the speed adjustment switch 748 is not limited to be on the handle portion 9, or the speed adjustment switch 748 may be at another position on the main body 10. When the control switch 91 is at the first operation position or the second operation position, that is, the blowing-suction device 1 is in the blowing mode or the suction mode, the speed adjustment switch 748 may operably adjust the rotational speed of the motor 4.

Figure 55:
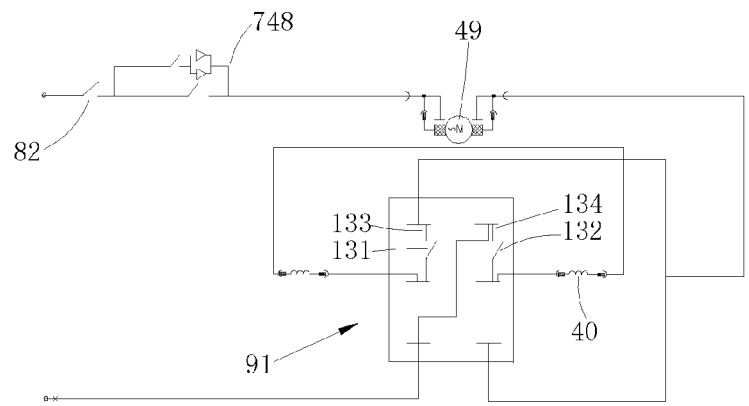
FIG. 55 is a schematic circuit diagram of a control switch at a first operation position in the blowing-suction device in FIG. 47.
Figure 56:
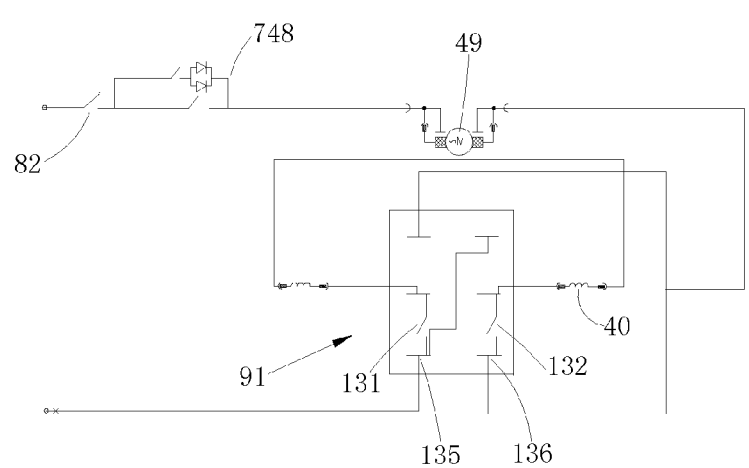
FIG. 56 is a schematic circuit diagram of the control switch at a second operation position in the blowing-suction device in FIG. 47.
Figure 57:
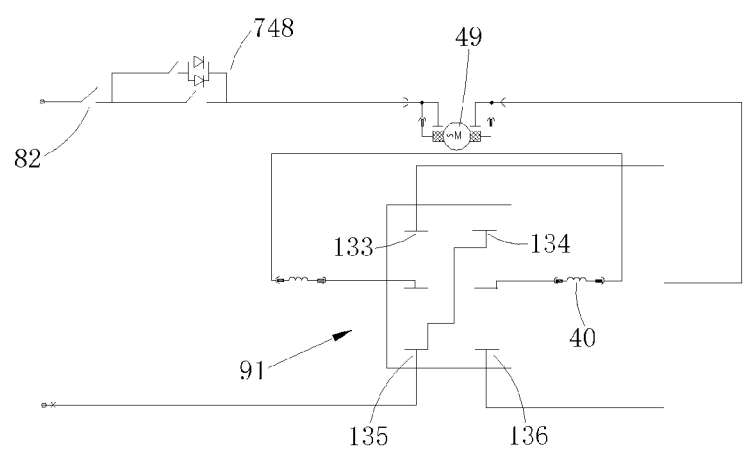
FIG. 57 is a schematic circuit diagram of the control switch at a third operation position in the blowing-suction device in FIG. 47.

As shown in FIG. 48, a trigger switch 82 is disposed between the air tube 2 and the main body 10. As shown in FIG. 55, FIG. 56, and FIG. 57, the trigger switch 82, the control switch 91, and the speed adjustment switch 748 are linked. When the air tube 2 is connected and fixed to the housing 14, the trigger switch 82 is triggered. In this case, if the security shield 121 or the collection apparatus 200 is connected to the first opening 12, that is, the control switch 91 is at the first operation position or the second operation position. Because the trigger switch 82, the control switch 91, and the speed adjustment switch 748 are serially connected, a circuit in which the speed adjustment switch 748 is located is conducted, and adjustment of the rotational speed of the motor 4 may be implemented by adjusting the speed adjustment switch 748. Preferably, a connection between the air tube 2 and the housing 14 may be implemented by connecting the air tube 2 to the air guide cover 53. Specifically, an inner wall at a connection end between the air tube 2 and the air guide cover 53 is provided with an L-shaped groove. An outer wall of the air guide cover 53 is provided with a protrusion point that may fit the L-shaped groove, so that the protrusion point is inserted into the L-shaped groove, and then the air tube 2 is rotated to make the protrusion point move to the other end of the L-shaped groove, so that the air tube 2 is fixed to the air guide cover 53. Certainly, to ensure installation reliability, two pairs or more than two pairs of L-shaped grooves and protrusion points may be disposed. When the air tube 2 is rotated to complete locking between the air tube and the main body 10, the trigger switch 82 is triggered.

As shown in FIG. 55 to FIG. 57, the motor 4 includes: a stator 40 and a rotor 49 that may rotate relative to the stator 40. The stator 40 and the rotor 49 are separately twined with coils and connected to circuits. According to the electromagnetic induction principle, relative rotation between the stator 40 and the rotor 49 may be implemented by using a current generated after the circuits are conducted. The control switch 91 is a double pole double throw switch having three operation positions. The operation positions may be operably switched.

In an embodiment shown in FIG. 55, the control switch 91 has a pin 131 and a pin 132. In the blowing mode, the air tube 2 is connected to the housing 14, the trigger switch 82 is triggered by the air tube 2 to be in a turn-on state, the security shield 121 is connected to the first opening 12, and the first push block 746 abuts against the first end 739 of the first swing rod 738, so that the first swing rod 738 pivots around the first pivot 737 in the counterclockwise direction. Therefore, the second end 740 abuts against the control switch 91, a switch 13 is triggered to be at the first operation position. The pin 131 and the pin 132 are respectively connected to a pin 133 and a pin 134. In this case, the speed adjustment switch 748 is adjusted to be at a non-zero speed step. According to the conducted circuits, a current direction of the circuit in which the stator 40 is located and a current direction of the circuit in which the rotor 49 is located are the same. According to the electromagnetic induction principle, the rotor 49 rotates in the clockwise direction relative to the stator 40, so that the overall performance of the motor 4 is that the motor 4 rotates in the clockwise direction, and the corresponding fan 3 also correspondingly rotates in the clockwise direction.

When the blowing-suction device 1 needs to be switched from the blowing mode to the suction mode, the speed adjustment switch 748 is adjusted to the stop step to cut off the circuit, so that the motor 4 stops working. Alternatively, the security shield 121 may be removed from the first opening 12, the control switch 91 is reset to the third operation position by means of the self-resetting mechanism, and the pin 131 and the pin 132 are not connected to other pins. As shown in FIG. 57, no current pass through the stator 40 and the rotor 49, so that the motor 4 stops working.

When the blowing-suction device 1 needs to work in the suction mode, the collection apparatus 200 is connected to the first opening 12, the second push block 747 abuts against the third end 743 of the second swing rod 742, so that the second swing rod 742 pivots around the second pivot 741 in the clockwise direction. Therefore, the fourth end 744 abuts against the control switch 91, and the control switch 91 is triggered to be at the second operation position. As shown in FIG. 56, the pin 131 and the pin 132 are respectively connected to a pin 135 and a pin 136. In this case, the speed adjustment switch 748 is adjusted to be at a non-zero speed step. According to the conducted circuits, the current direction of the circuit in which the stator 40 is located and the current direction of the circuit in which the rotor 49 is located are opposite. According to the electromagnetic induction principle, the rotor 49 rotates in the counterclockwise direction relative to the stator 40, so that the overall performance of the motor 4 is that the motor 4 rotates in the counterclockwise direction, and the corresponding fan 3 correspondingly rotates in the counterclockwise direction. In the foregoing descriptions, the security shield 121 or the collection apparatus 200 is used to trigger the control switch 91, to make the blowing-suction device 1 at the corresponding blowing mode or the suction mode. There is no need to manually switch the operation position of the control switch 91. This is convenient for a user to operate and ensures that the control switch 91 is triggered only in a safety condition.

During use of the blowing-suction device 1, if the control switch 91 is damaged, the control switch 91 is still at the first operation position or the second operation position when the control switch 91 is not triggered, the motor 4 is in a working state, but the user does not know the condition. Consequently, a security potential risk is caused to an operation of the user. To reduce the risk, the blowing-suction device 1 may include at least two control switches 91, and the control switches 91 are serially connected. In this way, when one of the control switches 91 is damaged, if another control switch 91 or other control switches 91 can normally work, the circuit is still in a cut-off state. Therefore, no danger is caused to the user. Because a probability that two or more control switches 91 are damaged is relatively low, the security risk may be reduced. Two control switches 91 may be triggered by using a same linkage mechanism 734, or may be triggered by using two synchronous mechanisms. Similarly, the blowing-suction device 1 may also includes at least two trigger switches 82, and the trigger switches 82 are serially connected, so as to reduce the security risk, and details are not described herein again.

Figure 63:
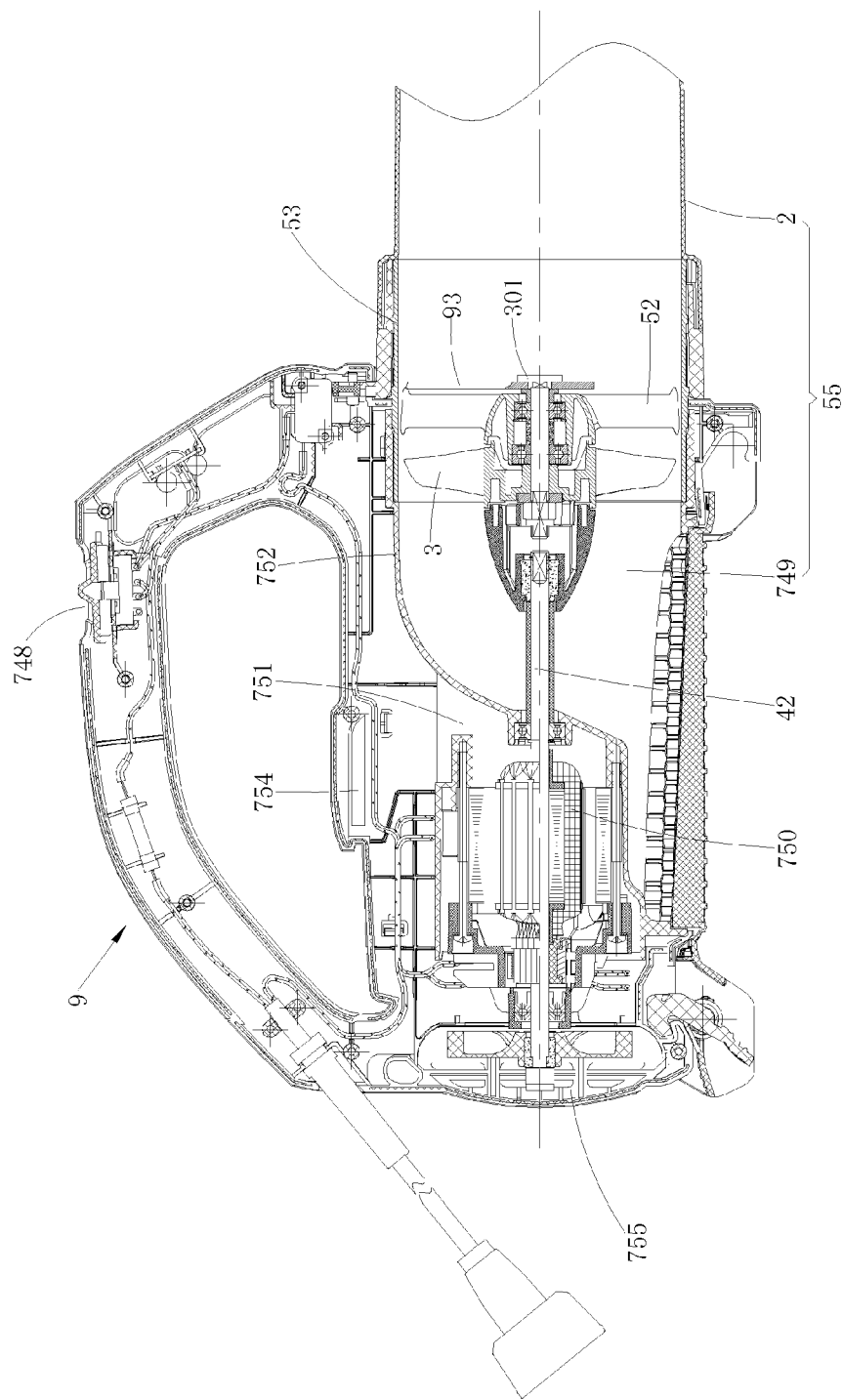
FIG. 63 is a sectional view of the blowing-suction device in FIG. 47.

In an embodiment shown in FIG. 63, the housing 14 of the blowing-suction device 1 has an air flow cavity 749 for an air flow to pass through. The air tube 2 is connected to the housing 14, and is in communication with the air flow cavity 749 to form an air flow channel 55 for the air flow to pass through. The fan 3 is disposed in the air flow channel 55. Further, the fan 3 is disposed in the air flow cavity 749. The housing 14 further has a motor cavity 751 for accommodating for accommodating the motor main body 750. The motor cavity 751 is disposed outside of the air flow cavity 749. The air flow cavity 749 has an air flow cavity wall 752. The air flow cavity wall 752 separates the motor cavity 751 from the air flow cavity 749. The motor shaft 42 passes through the air flow cavity wall 752 and is connected to the motor main body 750 and the fan 3. The motor main body 750 located outside of the air flow cavity drives, by using the motor shaft 42, the fan 3 in the air flow cavity 749 to rotate. Because the motor main body 750 is disposed outside of the air flow channel 55, interference from the motor main body 750 to air sucking and blowing in the air flow channel 55 is avoided, so that wind resistance and noise are reduced, thereby improving blowing performance and suction performance.

The housing 14 has a first opening 12 connected to the outside and an interface 11 connected to the air tube 2. One end of the air tube 2 is connected to the housing 14, and the other end is a tube opening 21 connected to the outside. As shown in FIG. 47, the tube opening 21 is provided with a notch 753. An outline of the notch 753 is in an extending cylindrical surface of the air tube and is concavo-convex-shaped. When a large quantity of leaves is sucked at once and the leaves block the tube opening, the notch 753 is not completely blocked. Therefore, the notch 753 may assist air sucking, so that leaves blocked at the tube opening can be sucked, thereby easily resolving a problem that tube opening is blocked.

As shown in FIG. 63, the first opening 12 and the interface 11 form an air flow cavity 749, and the first opening 12 and the tube opening 21 form an air flow channel 55. There is an angle between a direction of the first opening 12 and a direction of the interface 11. Preferably, a direction of an opening of the interface 11 is the same as an extension direction of the motor shaft 42, and there is an obtuse angle between the direction of the first opening 12 and the direction of the interface 11. The motor cavity 751 has a cooling air duct for an air flow to pass through to cool the motor 4.

The cooling air duct has an air intake vent 754 and an air exhaust vent 755. The air intake vent 754 is located below the handle portion 9, and the air exhaust vent 755 is located on one side that is of the motor 4 and that is away from the fan 3. A direction of the air exhaust vent 755 is perpendicular to the motor shaft 42. The air exhaust vent 755, the motor 4, the fan 3, and the interface 11 are sequentially arranged in a straight line. When an operator uses the blowing-suction device 1, the operator grasps the handle portion 9 with one hand, the air tube 2 faces the front of the operator, the body of the operator is on a side of the blowing-suction device 1, and the air exhaust vent 755 of the cooling air duct faces the back of operator. Therefore, an air flow exhausted from the air exhaust vent 755 is prevented from blowing to the operator. Certainly, in this embodiment, a solution in which the motor main body 750 is located outside of the air flow channel 55 is also applicable to a blowing device having only a blowing function. Similarly, interference from the motor main body 750 to an air flow in the air flow channel 55 is avoided, so that wind resistance and noise are reduced, thereby improving blowing performance.

Figure 64:
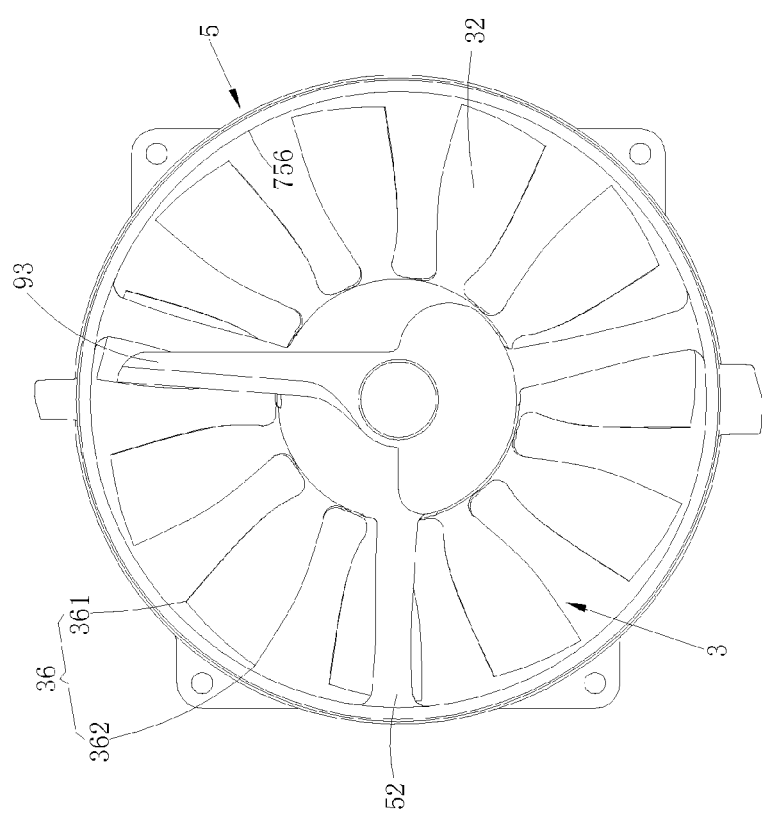
FIG. 64 is a front view of an air flow channel in FIG. 47.

In an embodiment, as shown in FIG. 64, a structure of a blowing-suction device 1 is basically the same as that described in the foregoing embodiment. As shown in FIG. 61, in this embodiment, a blade 32 of the fan 3 may generate a blowing air flow or a sucking air flow, and also has a function of cutting a sucked object. Therefore, the blade 32 is also referred to as a shredding blade. If the blowing-suction device 1 is in the suction mode, when the sucked object (usually a leaf) passes through the rotating fan 3, the leave is shredded by the blade 32, and then enters the collection apparatus 200 with an air flow. In a preferred embodiment, because too many blades 32 easily cause blocking, the quantity of blades 32 is not set to be greater than 12. Because too large outer diameter of the fan 3 easily causes a large-volume and heavy-weight blowing-suction device, the outer diameter of the fan 3 is not set to exceed 125 mm. The outer diameter herein is the diameter of a largest circular formed by rotation of the fan 3. In another embodiment, a blade 32 configured to generate an air flow during rotation and a shredding blade having a shredding function may be disposed in the fan 3. The blade 32 and the shredding blade are arranged around the hub 31 of the fan 3 at an interval. A duct 5 is disposed at a longitudinal front end of the fan 3 and is configured to guide an air flow to pass through. Space between the air guide cover 53 and the air guide entity 51 is for the air flow to pass through. The stationary blade 52 is disposed between the air guide entity 51 and the air guide cover 53. The stationary blade 52 has a function to guide an air flow passing through the duct 5. However, when there are relatively more stationary blades 52, noise generated by the stationary blades 52 is relatively severe. In a preferred embodiment, three to six stationary blades 52 are disposed, and the length of the stationary blade 52 does not exceed 60 mm, so that efficiency of the suction mode may be effectively improved. By means of experimental verification, if three stationary blades 52 are used, the efficiency of the suction mode is improved, and good efficiency of the blowing mode is also remained.

The fan 3 in the prior art is disposed in the duct 5. Distances between ends of the blades 32 and the duct 5 are the same. A sucked object is easily blocked between the ends of the blades 32 and the duct 5. Therefore, in an embodiment, as shown in FIG. 64, an inner wall 756 formed by the duct 5 or a housing of the blowing-suction device 1 is located on the periphery of the fan 3. The blade 32 includes a free end 36 located at a radial end. A distance between the free end 36 of a single blade 32 and the inner wall 756 gradually changes. Specifically, the free end 36 has two ends, respectively a first free end 361 located on one end and a second free end 362 located on the other opposite end, that are distributed in a circumferential direction of the fan 3, a distance between the first free end 361 and the inner wall 756 is greater than a distance between the second free end 362 and the inner wall 756, and the fan rotates in a direction from the first free end 361 to the second free end 362. Therefore, for one blade 32, if an object is blocked at the second free end 362, because a distance between the free end 36 of the blade 32 and the inner wall 756 from the second free end 362 to the first free end 361 gradually increases, with rotation of the blade 32, the object between the free end 36 and the inner wall 756 falls, so that a blocking problem is resolved. The first free end 361 may be connected to the second free end 362 by using a circular-arc surface, so that the object between the free end 36 and the inner wall 756 more easily falls. Certainly, the first free end 361 may alternatively be connected to the second free end 362 by using a plane. In a preferred embodiment, the fan 3 includes 11 blades 32. The outer diameter of the fan 3 does not exceed 125 mm, that is, a distance between the second free end 362 and a rotation axis does not exceed 62.5 mm. In this way, the volume of the fan 3 is not too large, the weight is not heavy, and good blowing efficiency and suction efficiency can also be maintained. The distance between the first free end 361 and the inner wall 756 is 0.5-3 mm greater than the distance between the second free end 362 and the inner wall 756, and a distance between the second free end 362 and the duct 5 is 0.5 mm, so that scrape between the blade 32 and the duct 5 is avoided. The fan 3 may be an axial flow fan, or may be a mixed flow fan.

In the suction mode, an object sucked into the blowing-suction device 1 with an air flow passes through the duct 5 first, and passes through the stationary blade 52 and the blade 32 in the duct 5 in sequence. If a sucked large leaf directly enters the duct 5, the leaf is easily blocked at the stationary blade 52 and is stuck in the duct 5. Therefore, the duct 5 is blocked. In view of this, the blowing-suction device 1 further includes a shredding mechanism 6 disposed at a longitudinal front end of the duct 5. The shredding mechanism 6 is also driven by the motor to rotate, to shred a sucked object. After entering the air tube from the tube opening, an air flow carrying leaves passes through the shredding mechanism 6 first, so that leaves are shredded to some extent. Large leaves are shredded into relatively small debris, so that blocking is not easily caused when the shredded leaves pass through space between the stationary blades 52. However, if a shredding rate of the shredding mechanism 6 is too high, after shredding performed by the shredding mechanism 6 and the blade 32, leaf debris is too small. The debris enters the collection apparatus 200 with the air flow. The collection apparatus 200 is usually a breathable cloth bag. Because the debris is too small, the debris is easily leaked from holes of the cloth bag, that is, a so-called dust leakage phenomenon occurs. In a moist working condition, adhesiveness of too small leave debris is greater than adhesiveness of relatively large leaves, so that too small leave debris is easily adhered on an inner wall of the duct. As a result, the duct 5 is also blocked. Therefore, considering the foregoing reasons, a shredding mechanism 6 needs to be disposed at the longitudinal front end of the duct 5, and a shredding rate of the shredding mechanism 6 does not need to be set to too high. A common technical solution is that the motor 4, the fan 3, and the shredding mechanism 6 are connected in sequence without relative rotation, that is, the motor 4 drives the shredding mechanism 6 and the fan 3 at a same rotational speed. In this embodiment, a method for reducing the rotational speed of the shredding mechanism 6 is used to reduce the shredding rate of the shredding mechanism 6 for shredding leaves. The blowing-suction device 1 includes a speed reduction mechanism 92 that enables the rotational speed of the shredding mechanism 6 to be less than the rotational speed of the motor 4, and the shredding mechanism 6, the speed reduction mechanism 92, the fan 3, and the motor 4 are arranged in sequence.

Figure 65:
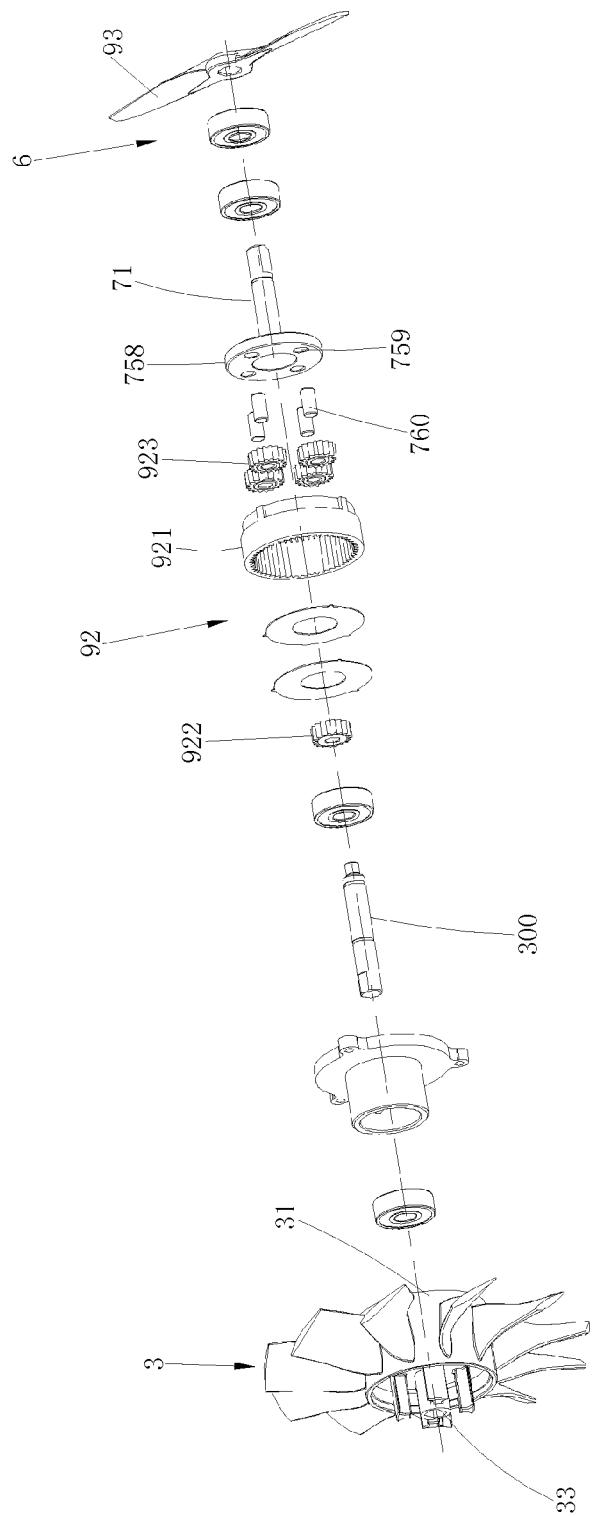
FIG. 65 is an exploded view of a fan, a shredding mechanism, and a connection portion of the fan and the shredding mechanism in FIG. 47.
Figure 66:
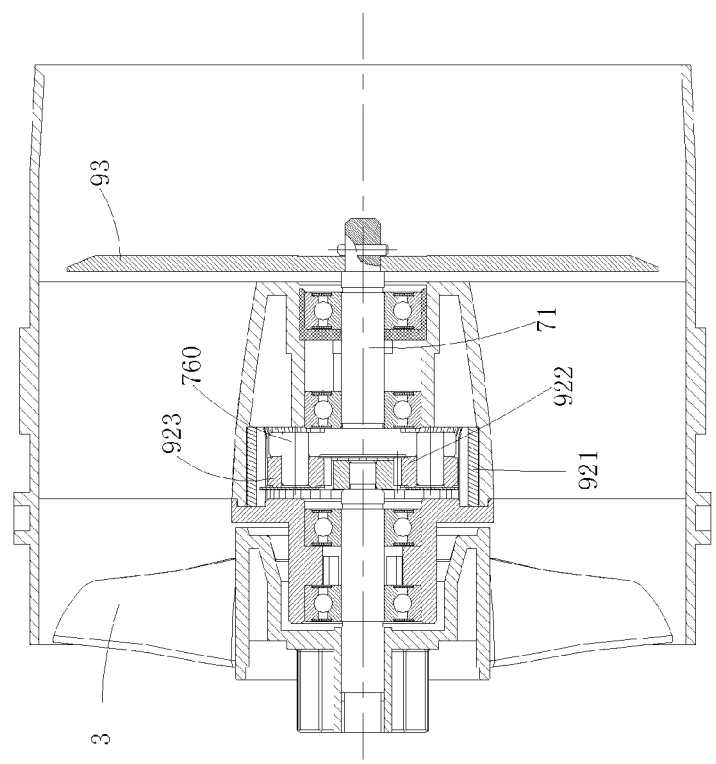
FIG. 66 is a sectional view of the fan, the shredding mechanism, and the connection portion of the fan and the shredding mechanism in FIG. 65.

Preferably, as shown in FIG. 65 and FIG. 66, the blowing-suction device 1 includes a transmission shaft 71 that connects the speed reduction mechanism 92 and the shredding mechanism 6. The shredding mechanism 6 includes a cutting blade 93 that is connected to the transmission shaft 71 without relative rotation and that extends in a radial direction of the transmission shaft 71. The transmission shaft 71 is connected to the speed reduction mechanism 92 by passing through the air guide entity 51. Preferably, the cutting blade 93 is an airfoil blade, that is, an outline of a cross sectional area of the blade is an airfoil line. Certainly, the cutting blade 93 of the shredding mechanism 6 may also be replaced with a trimmer rope made of a flexible material, an impeller disposed around the transmission shaft 71, a cutting blade 93 eccentrically disposed on the impeller, or a blade optionally expands or retracts.

The speed reduction mechanism 92 is a planetary gear mechanism. Main characteristic of planetary gear transmission is a small volume, strong bearing capability, and stable working. The planetary gear mechanism mainly includes a planetary carrier 921, a central gear 922, and a planetary gear 923. The motor 4, the fan 3, the speed reduction mechanism 92, and the shredding mechanism 6 are sequentially arranged and connected in a straight line. The shredding mechanism 6 and the fan 3 are located on two sides of the air guide entity 51 and are located in the air guide cover 53. The shredding mechanism 6 is located at the longitudinal front end of the fan 3. The speed reduction mechanism 92 is located in the air guide entity 51. The transmission shaft 71 is connected to the speed reduction mechanism 92 through the air guide entity 51. The hub 31 of the fan 3 is provided with a connection hole 33. Because the fan 3 is made of aluminium, hardness of the fan 3 is relatively lower than hardness of the fan shaft 300. If the connection hole 33 and the fan shaft 300 implement torque transfer by means of an interference fit, the fan 3 is easily damaged. Therefore, the fan shaft 300 is connected to the connection hole 33 without relative rotation by using a flat rectangular-shaped connection plate 757 (as shown in FIG. 58), so as to implement torque transfer. Specifically, the connection plate 757 has a flat rectangular-shaped hole for connecting to the fan shaft 300. An outer outline of the connection plate 757 is flat rectangular-shaped. The connection plate 757 is installed in a flat rectangular-shaped slot on the fan 3, and is fixed to the fan 3 by using a tightened nut on the fan shaft 300. The central gear 922 in the speed reduction mechanism 92 is connected without relative rotation. Four planetary gears 923 are evenly arranged around the periphery of the central gear 922 and separately engage with the central gear 922. The four planetary gears share one planetary carrier 921. The planetary carrier 921 is an internal tooth ring being coaxial with the central gear 922. The planetary gears 923 separately engage with the planetary carrier 921. The periphery of the planetary carrier 921 is provided with multiple protrusions for clamping grooves on an inner surface in the duct 5. Therefore, the planetary carrier 921 is installed in the duct 5 without relative rotation. The fan shaft 300 drives the central gear 922 to rotate. Driven by the central gear 922, the planetary gear 923 rotates around an axis of the planetary gear 923, and also revolves around an axis of the central gear 922 along an internal tooth ring of the planetary carrier 921. The transmission shaft 71 is connected to the planetary gear 923 without relative rotation along a shaft disk 758 extending in a radial direction. An axis of the shaft disk 758 and an axis of the transmission shaft 71 are overlapped. The shaft disk 758 and the transmission shaft 71 may be integrally formed. The shaft disk 758 may alternatively be fixedly connected to the transmission shaft 71 in a manner such as an interference fit connection, a spline connection, a threaded connection, or the like that a person skilled in the art may conceived. In this embodiment, the shaft disk 758 and the transmission shaft 71 are integrally formed. The shaft disk 758 is provided with four fixing holes 759. An axis of the fixing hole 759 is parallel to the axis of the transmission shaft 71. A hub hole of each planetary gear 923 is aligned to the fixing hole 759. An installation pin 760 is used to insert into four pairs of the fixing holes 759 and the hub holes, and is in an interference fit with the fixing hole 759 and the hub hole of the planetary gear 923, so that the transmission shaft 71 is connected to the planetary gear 923 without relative rotation.

The rotational speed of the motor 4 ranges from 12000 revolutions per minute to 18000 revolutions per minute, and a transmission ratio of the planetary gear mechanism ranges from 2:1 to 5:1, so that the rotational speed of the shredding mechanism 6 ranges from 2400 revolutions per minute to 9000 revolutions per minute. By means of experiments, if the rotational speed of the fan 3 and the rotational speed of the shredding mechanism 6 are respectively in the foregoing ranges, a moderate shredding effect is achieved. Therefore, blocking in the duct 5 and collection apparatus 200 dust leakage phenomena do not easily occur. In this embodiment, preferably, the rotational speed of the motor 4 is 15000 revolutions per minute, and the transmission ratio of the speed reduction mechanism 92 is 4:1. In the foregoing solution in which the speed reduction mechanism 92 is disposed in the blowing-suction device 1 to reduce the rotational speed of the shredding mechanism 6, so as to lower a degree of leaf shredding, that is, to reduce the shredding rate is also applied to a suction device having only a suction function.

Figure 67:
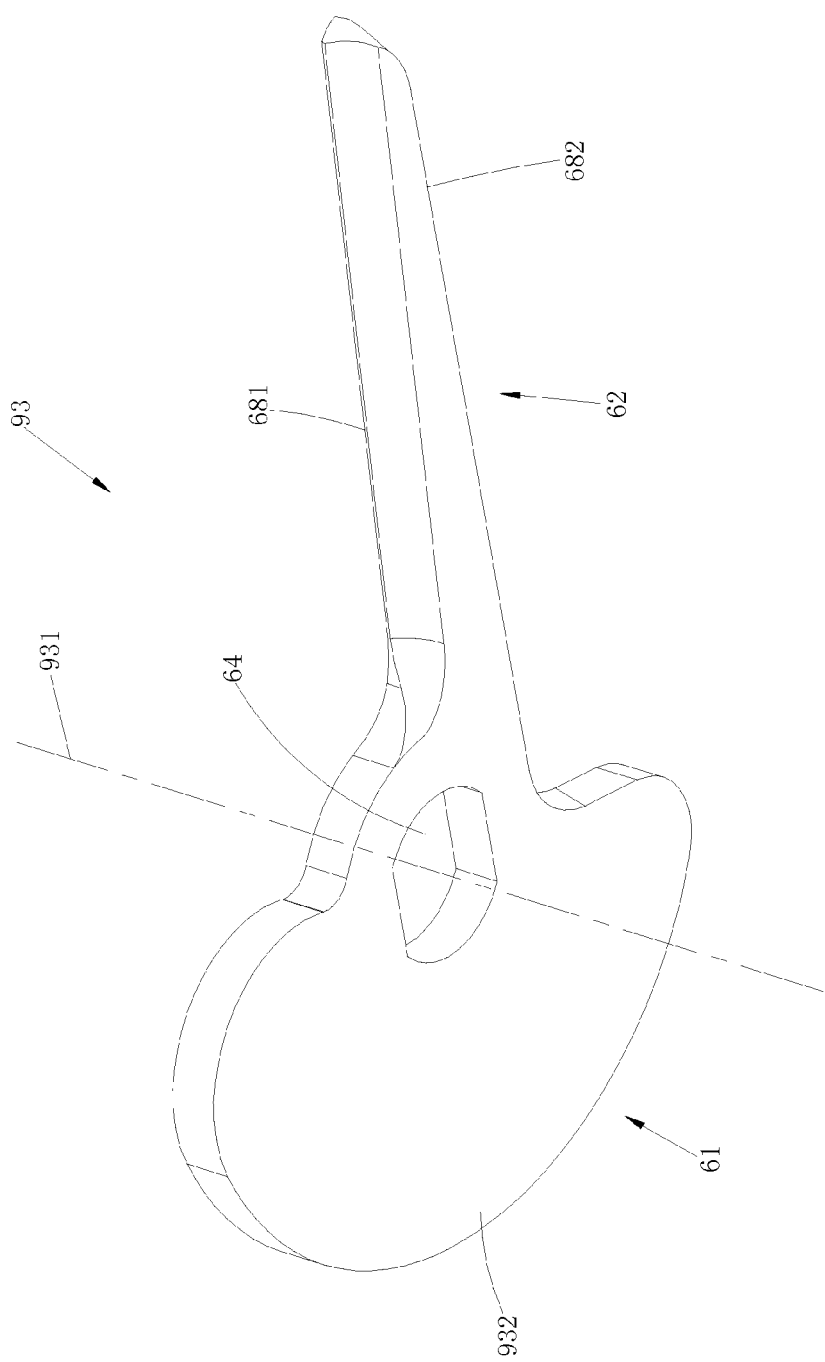
FIG. 67 is a side view of an asymmetrical blade.
Figure 68:
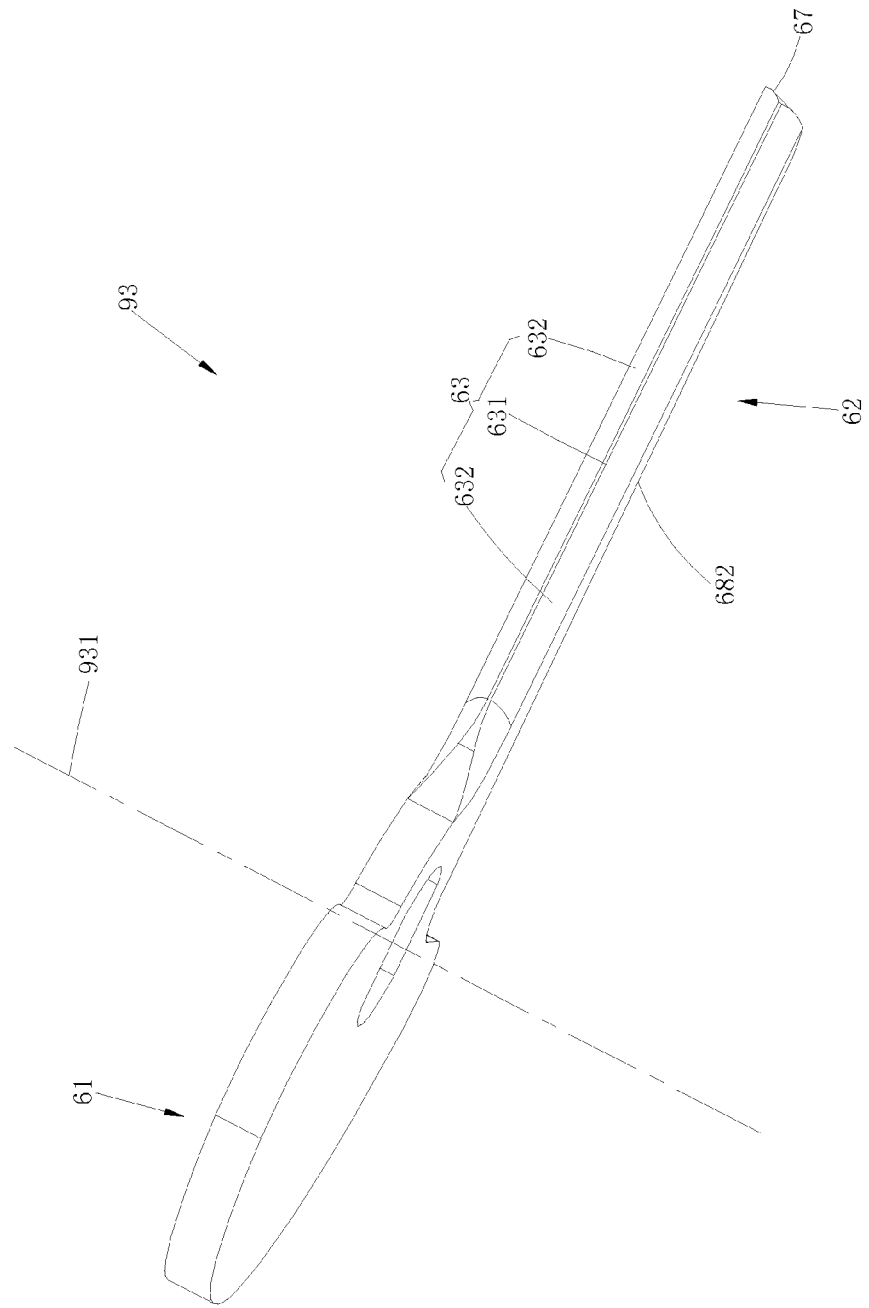
FIG. 68 is a side view of the asymmetrical blade in FIG. 67.

Similarly, for the problem of reducing the shredding rate, in an embodiment, a structure of the cutting blade 93 is improved. An asymmetrical blade is used, so that when the cutting blade 93 rotates for particular rounds, times for cutting an object are reduced. Specifically, as shown in FIG. 67 and FIG. 68, the cutting blade 93 configured to shred an object includes a working portion 62 that a rotation axis 931 extends out in a first direction. When rotating, the working portion 62 shreds the object passing through the cutting blade 93. There is one working portion 62. The first direction may be a radial direction of the rotation axis 931, or may be a direction formed by a curve or a polyline extending from the rotation axis 931. A plane in which a first rotation axis 931 is located may be perpendicular to the rotation axis 931, or may be not perpendicular to the rotation axis 931. There is one working portion 62. In this way, when the cutting blade 93 rotates one cycle, the working portion 62 shreds an object passing through the working portion 62 once. Compared with a conventional cutting blade 93 having two or more working portions 62, at the same rotational speed and within a same time, times for cutting the object by the cutting blade 93 in this embodiment is reduced, and a shredding degree of the object is lowered, that is, the shredding rate is reduced. The motor 4, the fan 3, and the cutting blade 93 are sequentially connected in the longitudinal direction. The cutting blade 93 is located at the longitudinal front end of the fan 3. The fan shaft 300 is driven by the motor 4 to rotate, so as to drive the fan 3 and the cutting blade 93 to rotate. The cutting blade 93 includes: an installation portion 61 connected to the fan shaft 300. The installation portion 61 includes: an eccentrically disposed counterweight portion and a mounting hole 64 coupled to the fan shaft 300. In a preferred embodiment, the mounting hole 64 is a flat rectangular, and may be connected to the fan shaft 300 without relative rotation. A blocking plate 301 whose radius is greater than the radius of the mounting hole is disposed at a longitudinal front end of the fan shaft 300. As shown in FIG. 63, the cutting blade 93 abuts against the blocking plate 301, and a longitudinal back end of the cutting blade 93 is abutted against by a step-shaped sleeve.

Because there is only one working portion 62, the working portion 62 is not symmetrical relative to the rotation axis 931, and the center of mass is located outside of the rotation axis 931, the counterweight portion 932 is disposed. The counterweight portion 932 and the working portion 62 are located on two sides of the rotation axis 931, so that the center of mass of the installation portion 61 is located outside of the rotation axis 931, and the center of mass of the installation portion 61 and the center of mass of the working portion 62 are distributed on the two sides of the rotation axis 931. Therefore, the center of mass of the cutting blade 93 is located on the rotation axis 931. The working portion 62 includes an end portion 67 located at a radial end. A first side edge 681 and a second side edge 682 are oppositely provided between the end portion 67 and the installation portion 61. The first side edge 681 and the second side edge 682 are both set to be straight edges, and are not relatively bent on a radial direction and an axial direction. The working portion 62 includes a cutting portion 63 configured for cutting, and the cutting portion 63 is located on the first side edge 681.

The cutting portion 63 includes: a cutting edge 631 and two cutting surfaces 632 extending from the cutting edge 631. The cutting edge 631 is set to be straight. An included angle between the two cutting surfaces 632 is an acute angle, and the two cutting surfaces 632 are symmetrically disposed. In this way, in a shredding process, forces applied to the two cutting edges 631 are balanced, a case in which the working portion 62 is broken by a force from one side does not easily occur. The first side edge 681 and the second side edge 682 are set to be inclined to each other, so that in the radial direction of the rotation axis 931, that is, in a direction from the installation portion 61 to the end portion 67, the transverse width of the working portion 62 gradually narrows. In this way, under the premise that the strength of the root of the working portion 62 is ensured, a blockage caused by the cutting blade 93 to an air flow is reduced, and material costs of the cutting blade 93 may also be reduced. Because the first side edge 681, the second side edge 682, and the cutting edge 631 are all set to be straight, a structure of the cutting blade 93 is simple, the cutting blade 93 is easy to be manufactured, and manufacturing costs are relatively low.

The cutting blade 93 and the fan 3 are located in the duct 5, and the cutting blade 93 is located at the longitudinal front end of the duct 5. The motor 4, the fan 3, and the cutting blade 93 are sequentially arranged. A ratio of the radius of the duct 5 to a distance between an end portion 67 and the duct 5 ranges from 5 to 65. For the objective of reducing the shredding rate, the solution in which the speed reduction mechanism 92 is used between the shredding mechanism 6 and the fan 3 has disadvantages: relatively high costs and a relatively complex structure. In this embodiment, the objective of reducing the shredding rate can be achieved by using the cutting blade 93. In addition, an advantage is that costs are reduced and a structure of the cutting blade 93 is simple.

Figure 70:
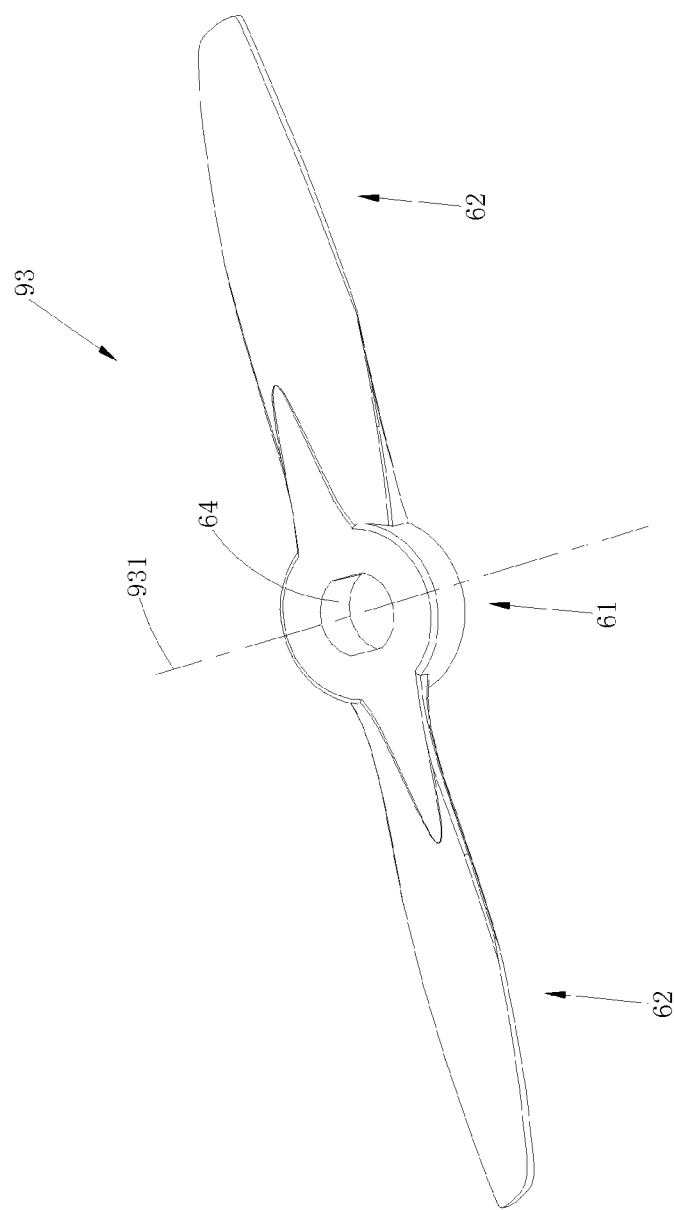
FIG. 70 is a side view of an airfoil blade according to the present invention.
Figure 71:
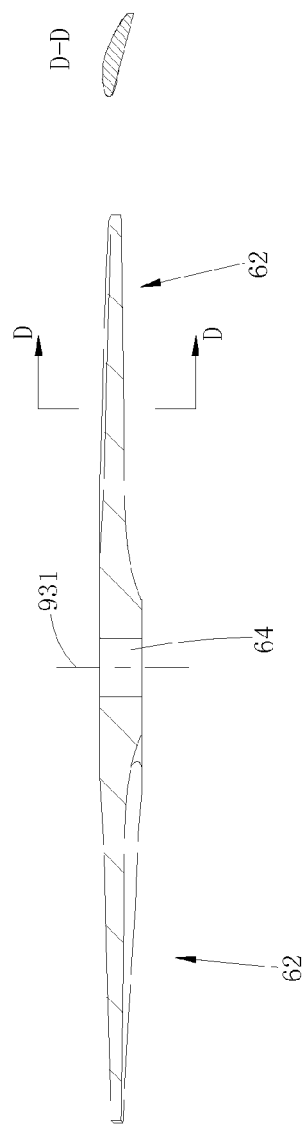
FIG. 71 is a sectional view of an airfoil blade according to the present invention.

In an embodiment, as shown in FIG. 70 and FIG. 71, the cutting blade 93 is an airfoil blade. The cutting blade 93 includes: an installation portion 61 connected to the fan shaft 300 and working portions 62 extending in a direction perpendicular to a rotation axis 931. There are two or more working portions 62. Preferably, an included angle between extension directions of the two working portions 62 is 180 degrees. The two working portions 62 are symmetrical relative to the rotation axis 931 and are not in a same plane. An outline of the cross section of the working portion 62 is an airfoil line. As shown in a sectional view D-D in FIG. 71, one end of the airfoil is smooth, and the other end is sharp corner-shaped. When the airfoil moves relative to air, a force is applied by an air flow to a surface of the airfoil, a component force that is of a resultant force of the force and that is on a movement direction of the airfoil or a direction of an incoming flow is resistance applied to the airfoil, and a component force perpendicular to the foregoing direction is a lifting force. According to the principle of the airfoil line, in a rotation process of the cutting blade 93, on one hand, the working portion 62 shreds an object passing through the working portion 62, and on the other hand, an air flow is generated. A direction of the air flow is the same as a direction of an air flow generated by the fan 3. Therefore, the airfoil cutting blade 93 is disposed at the longitudinal front end of the axial flow fan, and in the suction mode, the airfoil cutting blade 93 shreds an object. In the blowing mode and the suction mode, blowing efficiency and suction efficiency are respectively improved. Similar to another cutting blade 93, the cutting blade 93 may be connected to the fan shaft 300 without relative rotation in a manner, in which the installation portion 61 is provided a flat rectangular-shaped mounting hole 64, a spline, or the like, that a person skilled in the art may conceived.

Figure 69:
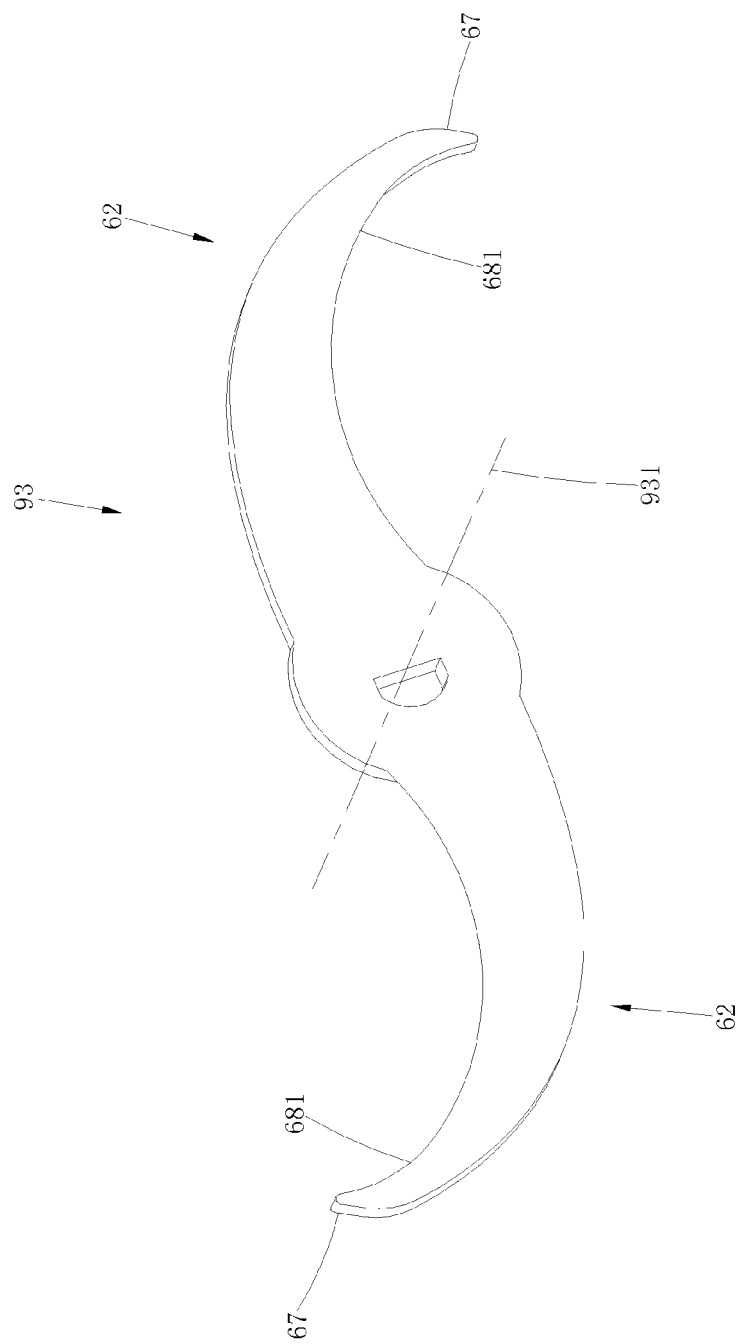
FIG. 69 is a side view of a centripetal blade according to the present invention.

In another embodiment, the cutting blade 93 is a centripetal the blade, as shown in FIG. 69. The cutting blade 93 includes two working portions 62. The working portion 62 includes an end portion 67 located at a radial end. A first side edge 681 and a second side edge 682 are oppositely provided between the end portion 67 and an installation portion 61. The working portion 62 includes a cutting portion 63 configured for cutting, and the cutting portion 63 is located on the first side edge 681. The cutting blade 93 is located in the duct 5. An outline of a portion that is of the cutting portion 63 and that is close to the duct 5 is a centripetal outline. A direction of the normal line of the centripetal outline portion tends to be toward the rotation center, that is, the normal line of this portion has a component vector pointing to the rotation center. In the prior art, in a rotation process, the cutting blade 93 of the blowing-suction device 1 tends to throw leaves away from the rotation center. The thrown out leaves always fall in an included angle between the stationary blade 52 and the air guide cover 53. Because there is almost no air ventilation at the included angle, leaves are easily accumulated at the included angle. However, in this embodiment, a portion that is of the centripetal blade and that is close to the duct 5 has a function of gathering leaves to a centripetal direction, so as to prevent the leaves from being thrown in the included angle between the stationary blade 52 and the air guide cover 53, thereby resolving a problem that the duct 5 is blocked. Preferably, a projection, on a direction perpendicular to a rotation axis 931, of the cutting blade 93 is S-shaped.

In an embodiment, a blowing-suction device 1 includes an indicator configured to remind a user when an air duct is blocked. When an existing blowing-suction device 1 is in the suction mode, after an air flow channel 55 is partially blocked by leaves, the performance of the blowing-suction device 1 is decreased. The blowing-suction device 1 can continue to effectively work only when the leaves are cleaned up. However, the existing blowing-suction device 1 cannot remind a user that the blowing-suction device 1 needs to be cleaned. When the performance of the blowing-suction device 1 is not obviously decreased, it is not easy for the user to detect that the performance of the blowing-suction device 1 is decreased, so that the user continues to use the blowing-suction device 1 under relatively low efficiency. An energy loss of the blowing-suction device 1 is relatively large. Especially for a direct current blowing-suction device 1, cleaning works that can be borne by the blowing-suction device 1 after one-time charge of a single battery pack are reduced. Because when leaves block the air flow channel 55, a current of the motor 4 changes, in this embodiment, a detection apparatus and a control apparatus are disposed in the blowing-suction device 1. The detection apparatus determines, by detecting a current change of the motor 4, whether the air flow channel 55 is blocked. If the determining result is that an air tube is blocked, the control apparatus controls an LED light to blink or light up, so that the user learns that the blowing-suction device 1 needs to be cleaned.

Figure 73:
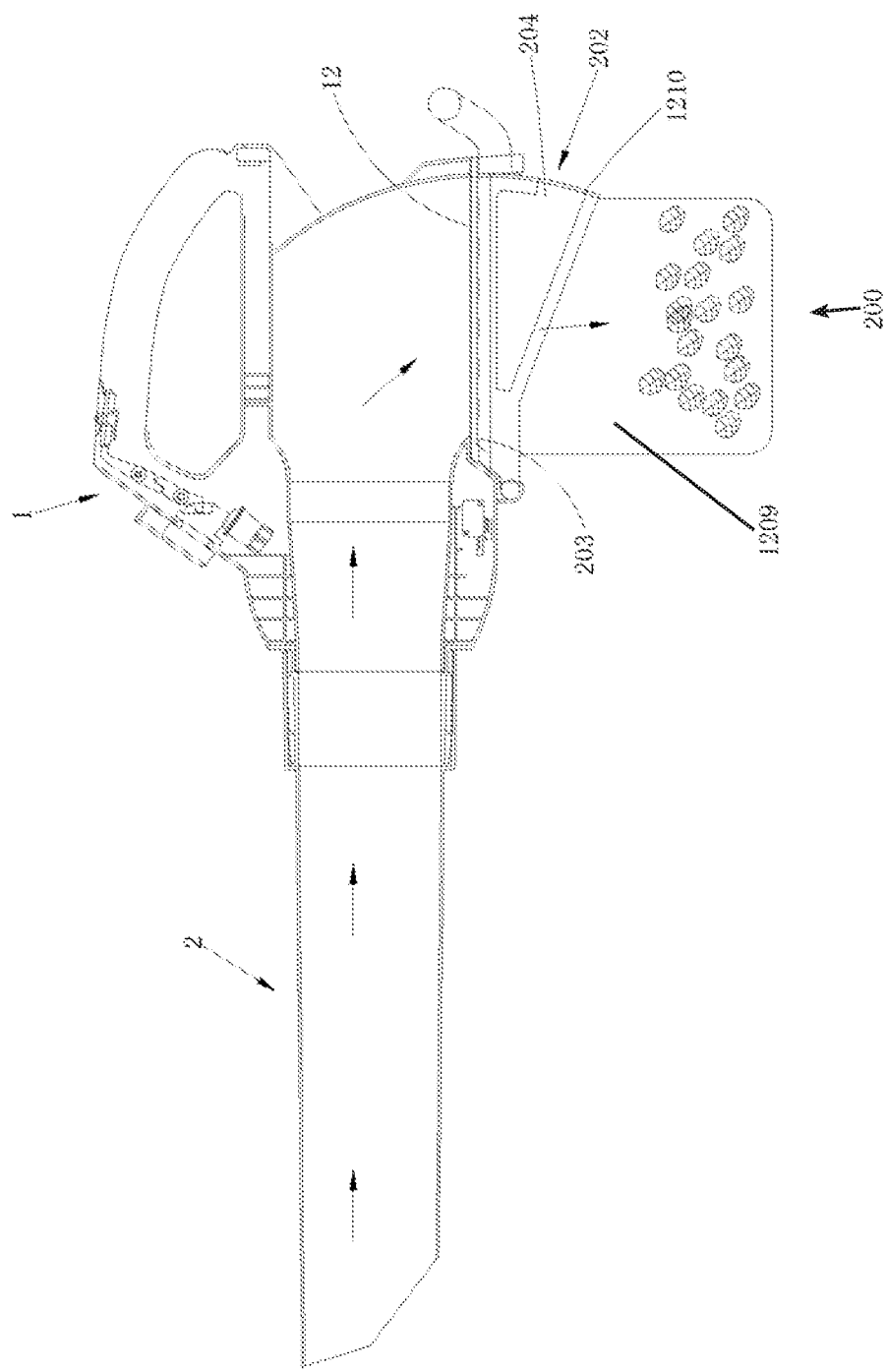
FIG. 73 is a schematic diagram of installing a collection apparatus when a blowing-suction device is in a suction mode according to another embodiment of the present invention.
Figure 74:
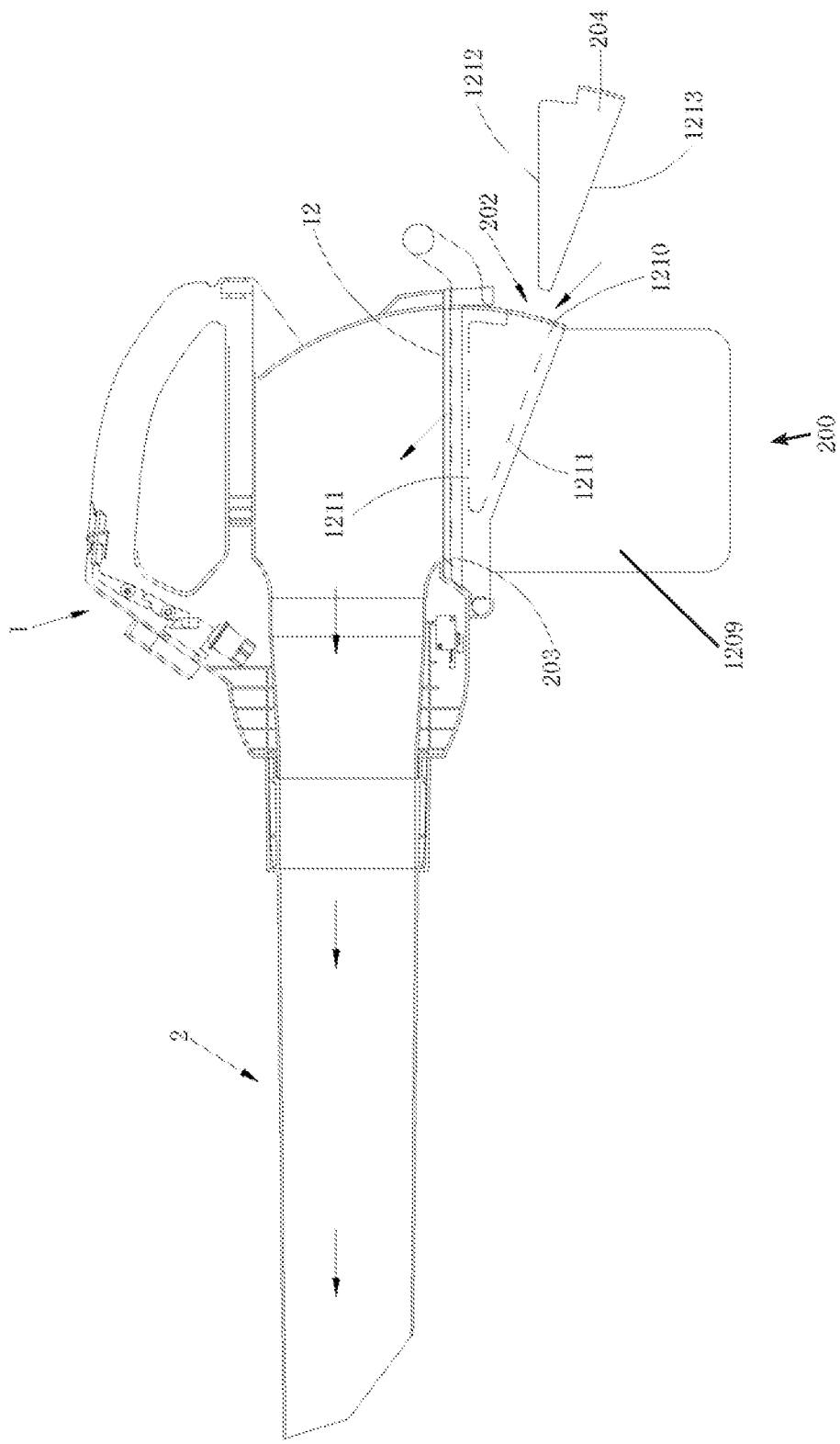
FIG. 74 is a schematic diagram of installing a collection apparatus when the blowing-suction device in the embodiment in FIG. 73 is in a blowing mode.
Figure 75:
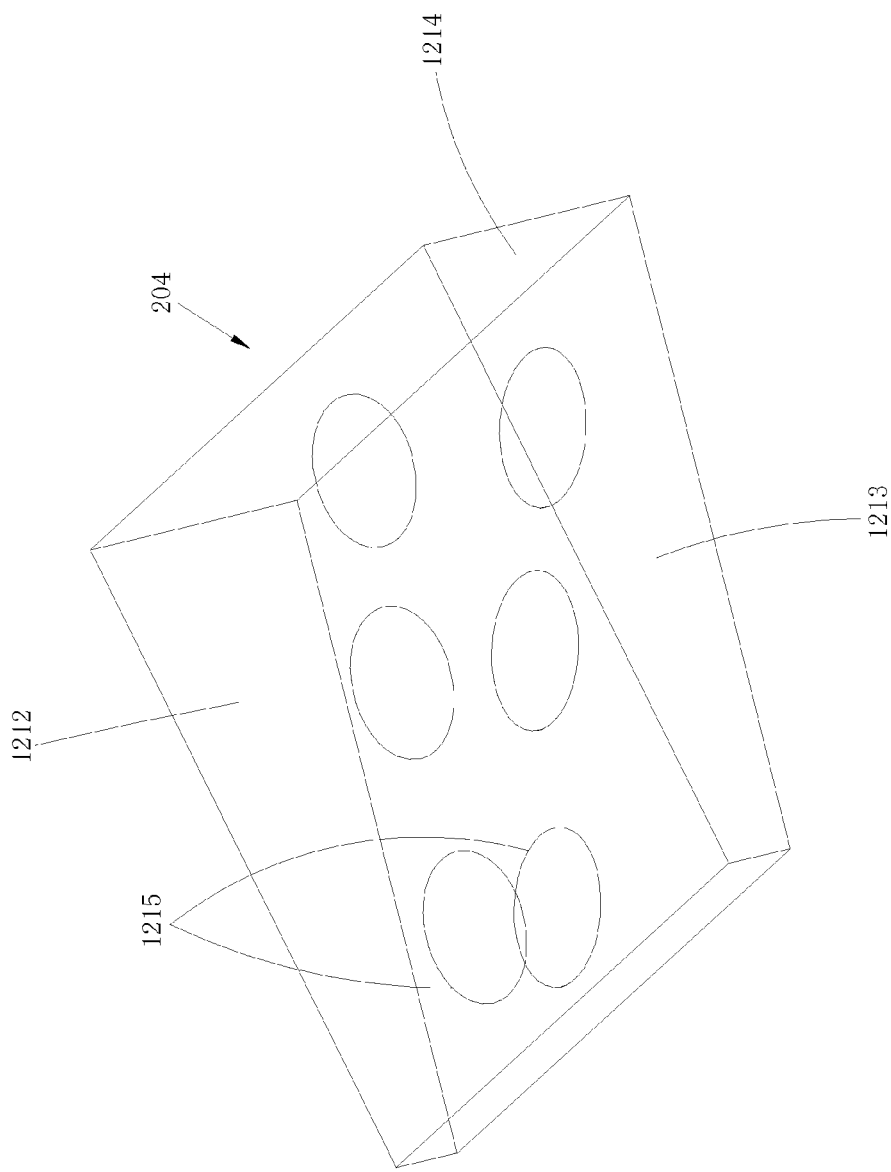
FIG. 75 is a schematic diagram of an operation portion in FIG. 73 and FIG. 74.

FIG. 73 to FIG. 75 show another embodiment of a collection apparatus. In this embodiment, regardless of a blowing mode or a suction mode of a blowing-suction device, the collection apparatus 200 may be always installed on the blowing-suction device 1. In this way, when a working mode of the blowing-suction device 1 is switched, the collection apparatus 200 does not need to be frequently detached from or installed on the blowing-suction device 1. Therefore, a user uses the blowing-suction device 1 more conveniently, thereby saving additional time spent for detaching or installing the collection apparatus 200, and improving working efficiency. Specially, the collection apparatus 200 is fixedly installed on a the first opening 12 of the blowing-suction device 1. The collection apparatus 200 includes a collection main body 1209. The collection main body 1209 is mainly configured to collect leaves or rubbish sucked from an air tube 2 of a blowing-suction device 1. The interior of the collection main body 1209 is usually set to be hollow for storing a sucked object. A surface of the collection main body 1209 is made of a breathable material, so that air sucked into the collection apparatus with the leaves or rubbish may be exhausted to the outside through the surface of the collection main body 1209 instead of accumulating in the collection apparatus 200. A common breathable material may be a nylon fabric, a nonwoven fabric, or the like. Preferably, an installation portion 203 is further disposed on the collection main body 1209, and is configured to fixedly install and connect to the first opening 12 of the blowing-suction device 1. In addition, the collection apparatus 200 further has an air admission portion 202 connected to the outside, and the collection apparatus 200 further has an operation portion 204 configured to control open and close of the air admission portion 202. As shown in FIG. 74, when the operation portion 204 opens the air admission portion 202, a movement direction of air is indicated by an arrow in FIG. 74. Air enters the blowing-suction device 1 from the air admission portion 202, to supplement air required for the blowing-suction device 1 in the blowing mode, so as to eliminate impact caused by installing the collection apparatus 200 on the blowing-suction device 1 to air flow ventilation. When the operation portion 204 closes the air admission portion 202, a movement direction of air is indicated by an arrow shown in FIG. 73, the collection apparatus 200 may normally collect leaves or rubbish, and the closed air admission portion 202 does not affect leakage of the leaves or rubbish from the collection apparatus 200. In this embodiment, the air admission portion 202 is a notch 1210 provided on the collection main body 1209, and the operation portion 204 is an air door that may be put into the notch 1210. As shown in FIG. 73, when the air door is put into the notch 1210, because the air door blocks the notch, the collection apparatus 200 may normally perform collection. In this case, the blowing-suction device 1 is in a suction mode. As shown in FIG. 74, when the air door moves from the notch 1210, the notch 1210 is open, so that supplementary air enters the blowing-suction device 1 from the notch 1210. In this embodiment, the notch 1210 is formed by two intersected barrier walls 1211. Space for accommodating the air door is formed between the barrier walls 1211. An end portion of the space is an opening 1210. As shown in FIG. 75, the air door is substantially wedge-shaped, and the air door includes a three-dimensional structure formed by an inclined surface 1212, a bottom surface 1213, and a side surface 1214. The inclined surface 1212 and the bottom surface 1213 respectively abut against the barrier walls 1211, and the side surface 1214 is located between the inclined surface 1212 and the bottom surface 1213. When the air door is inserted into the notch 1210, the inclined surface 1212 and the bottom surface 1213 are respectively in contact with the barrier walls 1211. It should be noted that a ventilation structure 1215 is provided on the inclined surface 1212 and the bottom surface 1213 of the air door, air may pass through the inclined surface 1212 and the bottom surface 1213 by using the ventilation structure 1215. A ventilation structure is further provided on the barrier wall 1211 for air flow ventilation. However, a ventilation structure is not provided on the side surface 1214, so that air may pass through the inclined surface 1212 or the bottom surface 1213, but cannot pass through the side surface 1214. When the air door is not inserted into the notch 1210, air enters the space opening between the barrier walls 1211, and enters the inside of the blowing-suction device 1 through the ventilation structure on the barrier wall 1211, so as to supplement the blowing-suction device 1 with necessary air. When the air door is inserted into the notch 1210, because of a blocking function of the side surface 1214 on the air door, a connection between the inside of the blowing-suction device 1 and the outside is cut off. Leaves and rubbish sucked by the blowing-suction device 1 may enter the collection apparatus 200 by using the ventilation structure on the inclined surface 1212, the bottom surface 1213, and the barrier wall 1211. The ventilation structure 1215 may be a through hole provided on a surface of the ventilation structure 1215. Air and leaves may pass through the through hole. In addition, in this embodiment, the air door and the notch 1210 may be separately formed, and the air door may further provide a guide structure for guiding a relative movement between the air door and the notch 1210. The guide structure may be a corresponding structure such as a slide guide or a chute. A relative movement manner between the air door and the notch 1210 may be linear translation, or may be rotation around a pivot.

Figure 76:
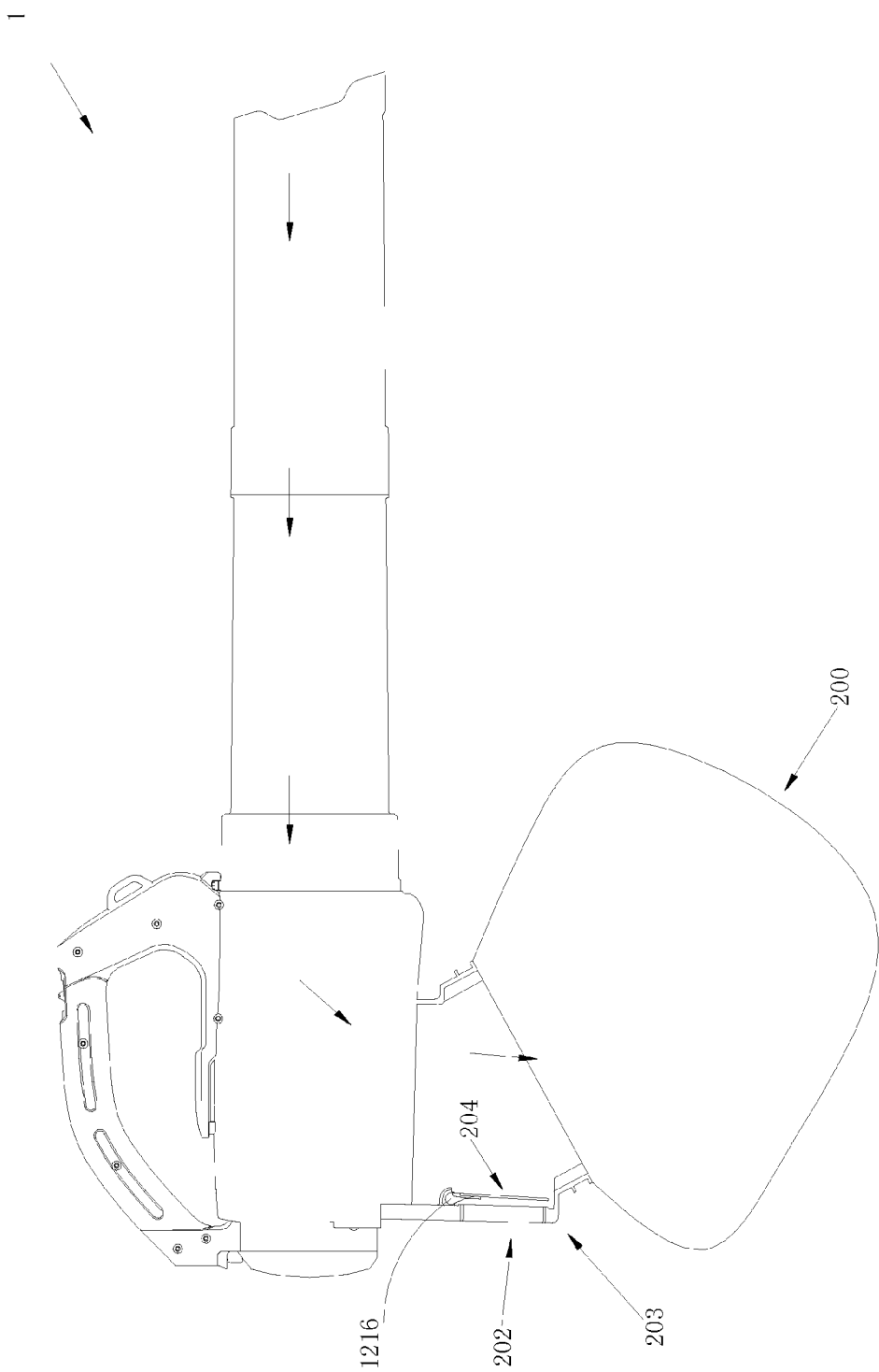
FIG. 76 is a schematic diagram of installing a collection apparatus when a blowing-suction device is in a suction mode according to still another embodiment of the present invention.
Figure 77:
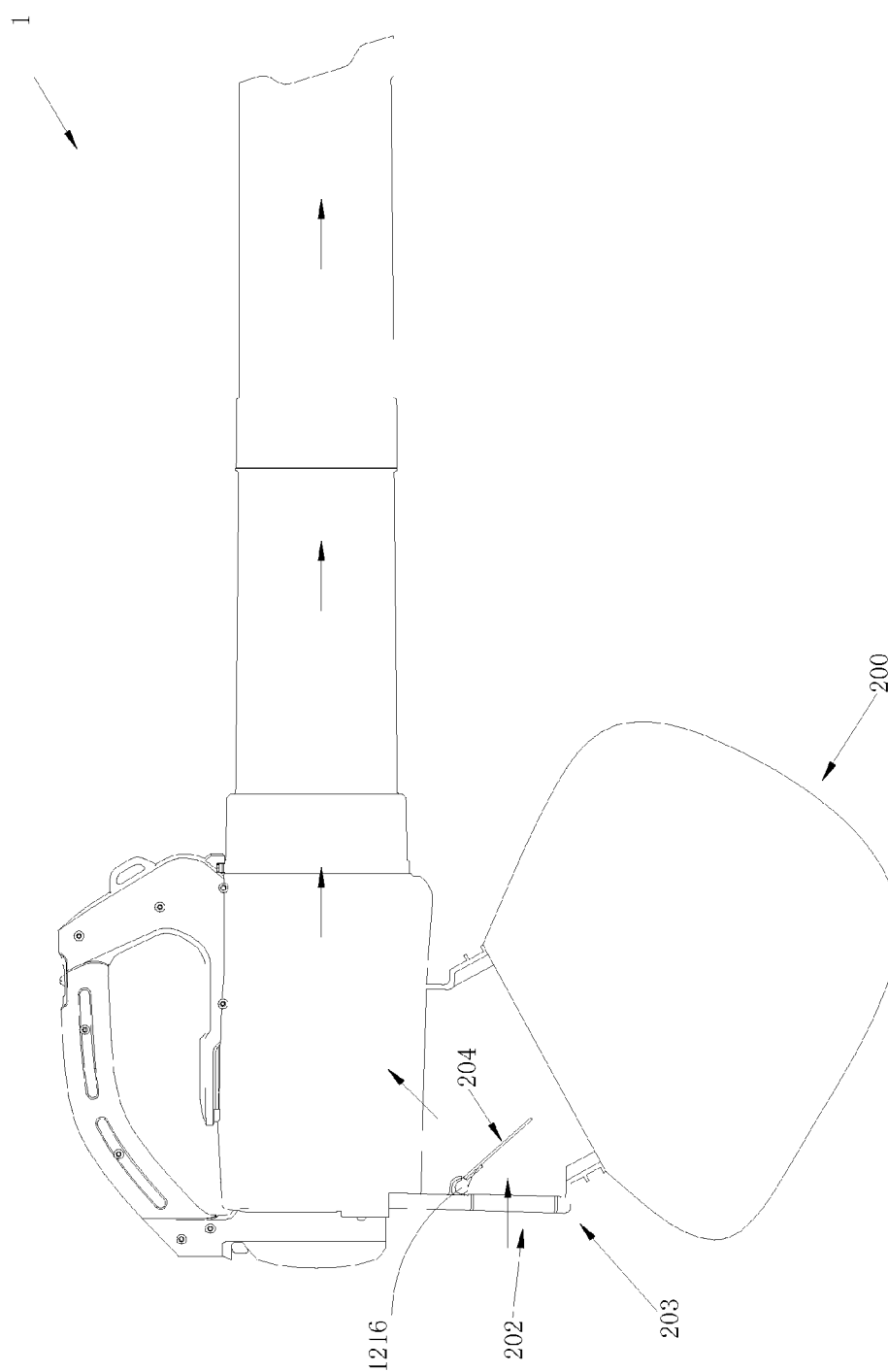
FIG. 77 is a schematic diagram of installing a collection apparatus when the blowing-suction device in the embodiment in FIG. 76 is in a blowing mode.

FIG. 76 to FIG. 77 show another embodiment of a collection apparatus 200. In this embodiment, the collection apparatus 200 also has a collection main body 1209, and the collection main body has an air admission portion 202 connected to the outside. The collection apparatus 200 further has an operation portion 204 configured to control open and close of the air admission portion 202. In this embodiment, the air admission portion 202 is an opening provided on a surface of the collection apparatus 200. Preferably, the air admission portion 202 is provided at an upper end of the collection apparatus 200, that is, a position close to a blowing-suction device 1. The operation portion 204 is a cover disposed near the opening. The cover operably opens or closes the air admission portion 202. The cover may open or close the opening in a pivoting manner or in a translation manner. In an embodiment, a pivotal shaft 1216 may be further disposed on the blowing-suction device. The cover is installed on the pivotal shaft 1216, so that the cover can pivotally open or close the opening around the pivotal shaft 1216. In another embodiment, the blowing-suction device is provided with a guide mechanism for guiding the cover to move, so that the cover can open or close the opening in a translation manner. As shown in FIG. 77, when the cover opens the opening, supplementary air can enter the inside of the blowing-suction device from the opening. A movement direction of air is indicated by an arrow shown in FIG. 77. As shown in FIG. 76, when the cover closes the opening, the collection apparatus 200 is configured to normally collect leaves or rubbish. A movement direction of air is indicated by an arrow shown in FIG. 76. The collection main body 1209 also has an installation portion 203 configured to install and connect to the blowing-suction device 1. In this embodiment, the installation portion 203 is made of a first material, and a portion that is of the collection main body 1209 and that is not the installation portion 203 is made of a second material. The first material is different from the second material. Preferably, the first material is manufactured by using a plastic blowing molding or injection molding, and the second material is a fabric. Preferably, the opening may alternatively be disposed on the installation portion 203.

Figure 78:
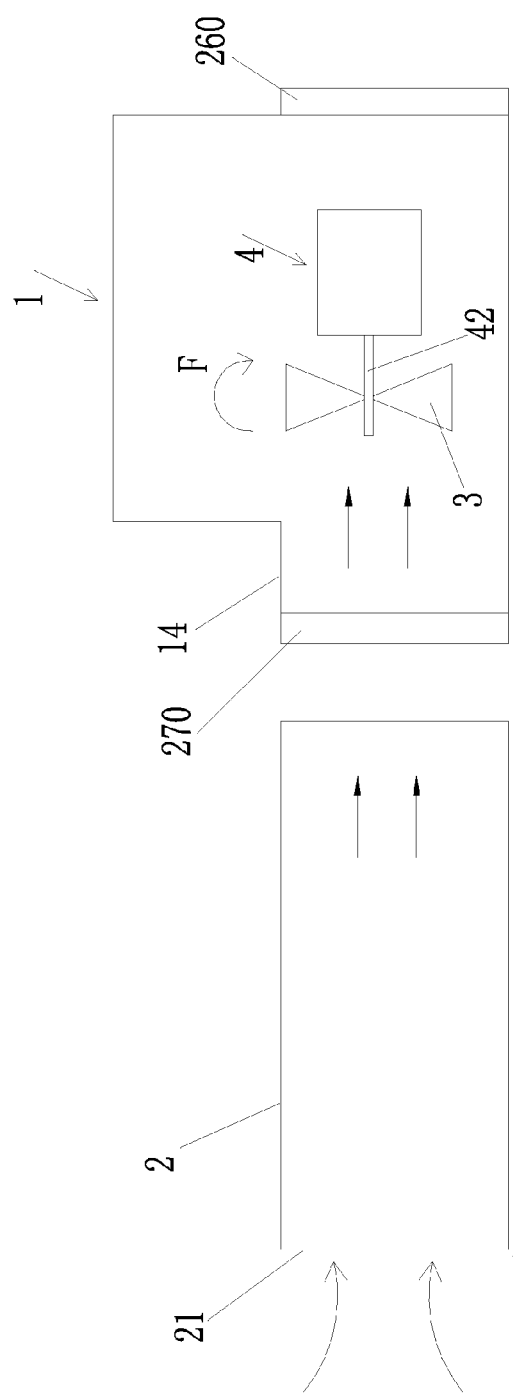
FIG. 78 is a schematic diagram of a blowing-suction device in a suction mode according to an embodiment of the present invention.
Figure 79:
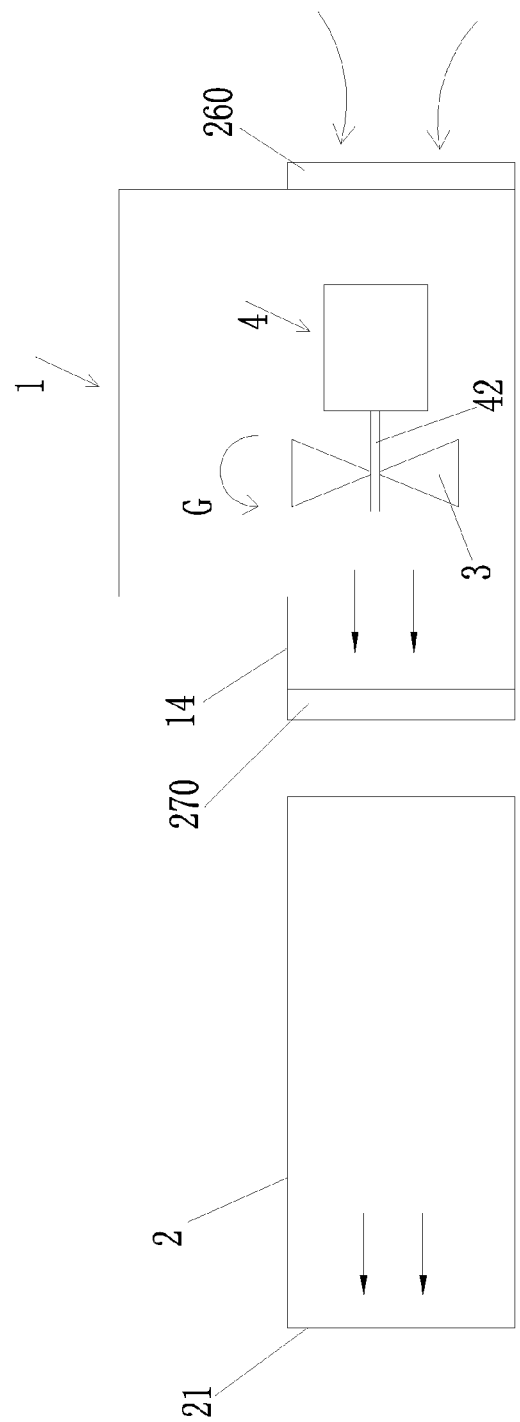
FIG. 79 is a schematic diagram of the blowing-suction device in FIG. 78 in a blowing mode.

Referring to FIG. 78, FIG. 78 is a blowing-suction device 1 according to an embodiment of the present invention. The blowing-suction device 1 includes: a housing 14 and an air tube 2 connected to the housing 14. The housing 14 usually includes two symmetrical half-housings, and the half-housings are connected by using a fixing element. The fixing element may be a common screw, nut, and the like. The housing 14 has a first opening 260 and a second opening 270 that are separately disposed. Air ventilation and exchange inside and outside of the housing 14 may be implemented by using the first opening 260 and/or the second opening 270. When the blowing-suction device 1 does not need to be used, the air tube 2 may be detached from the housing 14 for storage. The blowing-suction device 1 has at least two working modes. When the blowing-suction device 1 is in a first working mode, the blowing-suction device 1 performs a blowing function, so that air is blown out to the outside from the air tube 2. An air flowing direction is indicated by an arrow shown in FIG. 79. When the blowing-suction device 1 is in a second working mode, the blowing-suction device 1 performs a suction function, so that air, together with leaves and rubbish are sucked from the air tube 2. An air flowing direction is indicated by an arrow shown in FIG. 78. Therefore, the first working mode may also be referred to as a blowing mode, and the second working mode may also be referred to as a suction mode. Therefore, because performance requirements of the blowing and suction functions on air flow movements are different, the air tube 2 usually includes a blower tube 1304 and a suction tube 1305. The blower tube 1304 is configured to connect to the housing 14 in the blowing mode, and the suction tube 1305 is configured to connect the housing 14 in the suction mode. The blower tube 1304 and the suction tube 1305 are two different air tubes. The diameter of the blower tube 1304 is relatively small, and the diameter of the suction tube 1305 is relatively large. In addition, positions at which the blower tube 1304 and the suction tube 1305 are connected to the housing 14 are also different. However, in this embodiment, as shown in FIGS. 78 and 79, the blower tube and the suction tube are a same air tube 2, that is, in the blowing mode, the air tube 2 is connected to the housing 14, or in the suction mode, the air tube 2 is still connected to the housing 14. Further, positions at which the air tube 2 is connected to the housing 14 in the blowing mode and the suction mode are the same. Preferably, the air tube 2 is detachably connected to the housing 14 by using the second opening 270. Certainly, the quantity of air tubes 2 and a position at which the air tube 2 is connected to the housing 14 are not limited in the present invention. In an embodiment, there is one air tube 2. In the blowing mode, the air tube 2 is connected to the housing 14 by using the second opening 270. In the suction mode, the air tube 2 is connected to the housing 14 by using a third opening that is different from the second opening 270. However, in another embodiment, there are two air tubes 2, and the two air tubes 2 are respectively the blower tube 1304 and the suction tube 1305. The blower tube 1304 is connected to the housing 14 in the blowing mode, and the suction tube 1305 is connected to the housing 14 in the suction mode. In addition, positions at which the blower tube 1304 and the suction tube 1305 are connected to the housing 14 are different.

Figure 80:
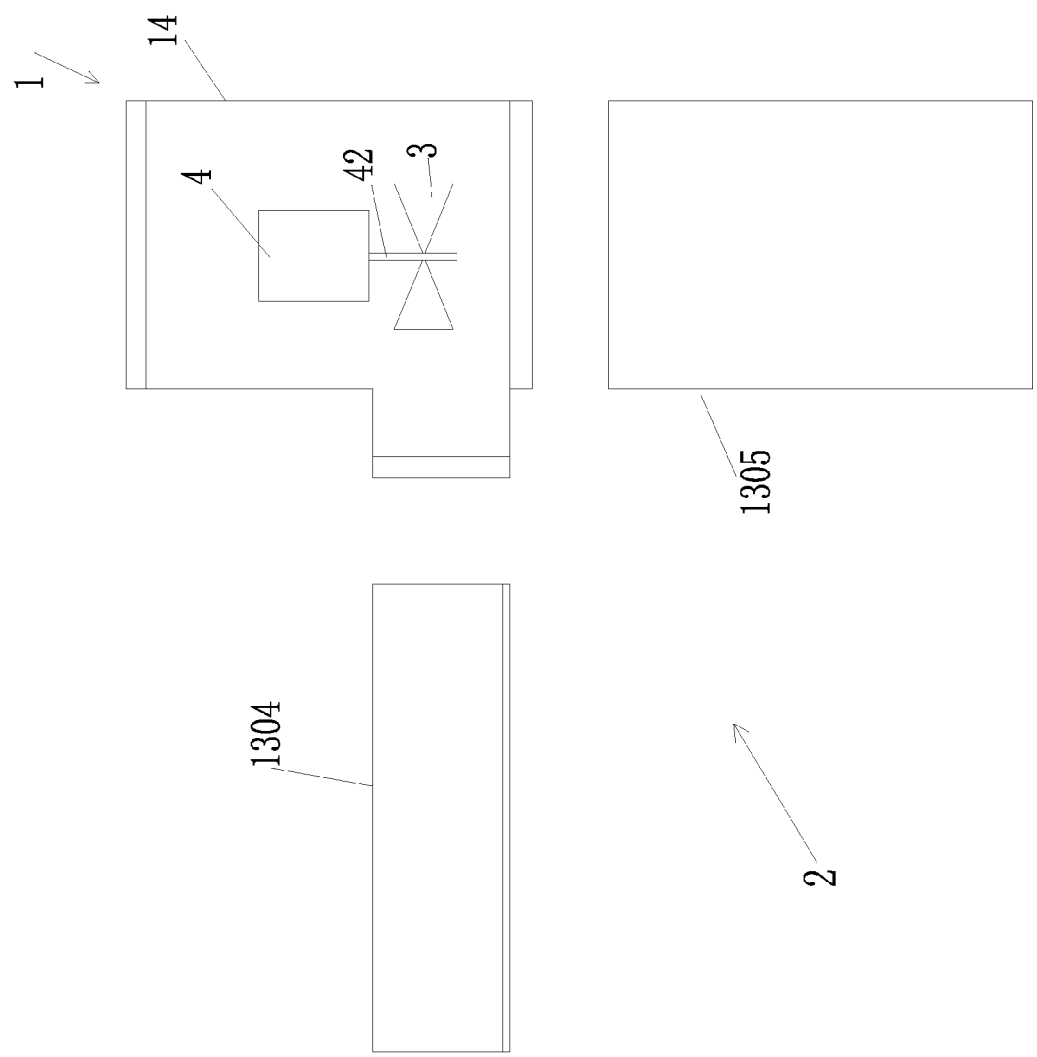
FIG. 80 is a schematic diagram of another embodiment of the present invention.

In this embodiment, one end of the air tube 2 is connected to the housing 14, and the other end of the air tube 2 has a tube opening 21. Air enters the tube opening 21 on one end, and enters the housing 14 from the other end. The tube opening 21 of the air tube 2 and the first opening 260 of the housing 14 form an air intake vent and an air exhaust vent for air to come into and out of the blowing-suction device 1. As shown in FIG. 79, when the blowing-suction device 1 is in the blowing mode, air enters the housing 14 from the first opening 260 and is blown out to the outside from the tube opening 21 of the air tube 2. In this case, the first opening 260 forms the air intake vent, and the tube opening 21 of the air tube 2 forms the air exhaust vent. However, as shown in FIG. 78, when the blowing-suction device 1 is the suction mode, air and foreign matters such as leaves and dust are sucked into the housing 14 from the tube opening 21, and is exhausted from the first opening 260. In this case, the tube opening 21 of the air tube 2 forms the air intake vent, and the first opening 260 forms the air exhaust vent. In this embodiment, the first opening 260 and the tube opening 21 are disposed in a longitudinal direction, and the orientation of the first opening 260 and the orientation of the tube opening 21 are opposite. Certainly, the position of the air intake vent, the position of the air exhaust vent, the quantity of air intake vents, and the quantity of air exhaust vents are not limited in the present invention. In an embodiment, the air intake vent and the air exhaust vent are not disposed in the longitudinal direction. For example, the air intake vent is set to face forward in the longitudinal direction, and the air exhaust vent is set to be deviated from the longitudinal direction and face the ground, so that a 90-degree angle is between the orientation of the air intake vent and the orientation of the air exhaust vent, as shown in FIG. 80. In addition, in the blowing mode, air enters a first air intake vent and is blown out from the first air exhaust vent. However, in the suction mode, air and foreign matters such as leaves and dust enter the second air intake vent and are exhausted from the second air exhaust vent. The first air intake vent and the second air intake vent, the first air exhaust vent and the second air exhaust vent are different.

A motor 4 and a fan 3 are further disposed in the blowing-suction device 1. The motor 4 is configured to provide rotation power. According to power sources, the motor 4 may be a pneumatic motor, or may be an electrical motor driven by electric power, or may be a gasoline motor using gasoline as fuel. As the most common electrical motor, the electrical motor may also be classified into a brush motor or and brushless motor according to a carbon brush type. However, the electrical motor may also be classified into an AC motor and a DC motor according to a power source type. The motor 4 has a motor shaft 42, and the motor 4 may rotate around an axis of the motor shaft 42 in a clockwise direction or in a counterclockwise direction. The fan 3 may be driven by the motor 4 to rotate to generate an air flow. In this embodiment, the fan 3 is connected to the motor shaft 42, so that the fan 3 is driven by the motor shaft 42 to correspondingly rotate. Certainly, a transmission mechanism such as a solar and planetary gear may further be disposed between the fan 3 and the motor 4, to improve transmission efficiency. The fan 3 is disposed in the housing 14. The fan 3 may be an axial flow fan, a centrifugal fan, or the like. The axial flow fan means that the fan rotates around a fan axis, and a generated air flow moves in an extension direction of the fan axis. The centrifugal fan means that the fan rotates around the fan axis, and a generated air flow moves in an extension direction perpendicular to the fan axis. In this embodiment, the fan 3 is an axial flow fan. The axial flow fan controllably rotates in a first direction or a second direction. The first direction and the second direction are opposite. In FIG. 78, in the suction mode, the fan 3 controllably rotates in the first direction (an arrow F in FIG. 78) to generate an air flow moving from the tube opening 21 to the inside of the housing 14. However, in blowing mode, as shown in FIG. 79, the fan 3 controllably rotates in the second direction (an arrow G in FIG. 79) to generate an air flow moving from the inside of the housing 14 to the tube opening 21. The fan is controlled to switch different rotation directions by switching different rotation directions by the motor. When the motor 4 rotates around the axis of the motor shaft 42 in the clockwise direction, the fan 3 is driven to rotate in the first direction; or when the motor 4 rotates around the axis of the motor shaft 42 in the counterclockwise direction, the fan 3 is driven to rotate in the second direction. Certainly, the fan 3 may alternatively be controlled to switch to rotate in different directions in another manner. For example, a clutch mechanism is disposed in the transmission mechanism between the motor 4 and the fan 3. The clutch mechanism is operably switched between a first clutch position and a second clutch position. The first clutch position corresponds to a position at which the fan rotates in the first direction, and the second clutch position corresponds to a position at which the fan rotates in the second direction. That the fan 3 controllably rotates in the first direction or the second direction may alternatively be implemented by changing a position of the clutch mechanism. Therefore, the motor may always rotate in one direction.

During actual use of the blowing-suction device 1, in the suction mode, because relatively large rubbish such as leaves are sucked in the blowing-suction device 1 with an air flow, an air flow channel inside of the blowing-suction device 1 is easily blocked. After the blowing-suction device 1 is blocked, smooth of the air flow channel is further affected. As a result, the air flow passing through the air flow channel is more and more weakened. Consequently, the normal use of the blowing-suction device 1 is affected. Therefore, in the present invention, when the air flow entered from the tube opening 21 into the housing 14 is blocked or impeded, a rotation direction of the fan 3 is controllably switched from the first direction to the second direction, so that an air flow moving from the inside of the housing 14 to the tube opening 21 is generated. That is, when the air flow is blocked, the rotation direction of the fan 3 is controllably changed, so that a movement direction of the air flow is also changed. Therefore, the air flow is blown out from the tube opening 21 of the air tube 4. In this way, a blocking problem is resolved by means of the blown out air flow. When the blocking problem is resolved, the fan 3 is also changed to rotate in the first direction, so as to continue to generate an air flow sucked from the tube opening 21. Therefore, working in the suction mode is normally performed.

Figure 81:
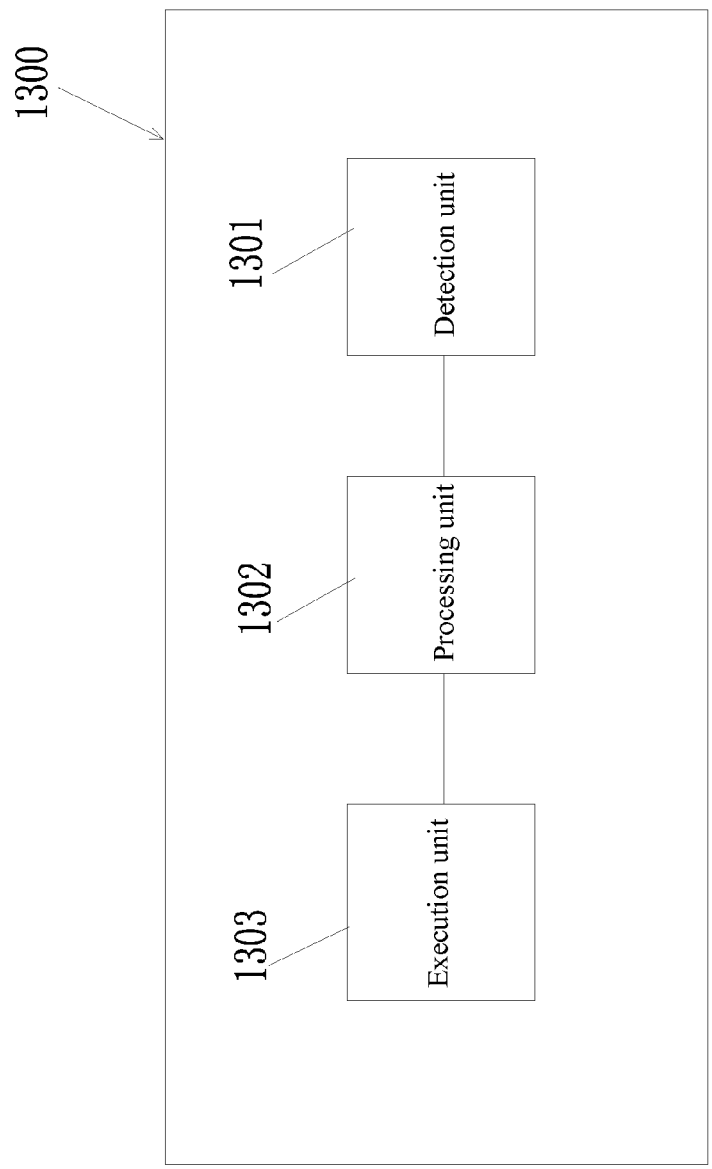
FIG. 81 is a schematic framework diagram of a control circuit according to a first embodiment of the present invention.
Figure 82:
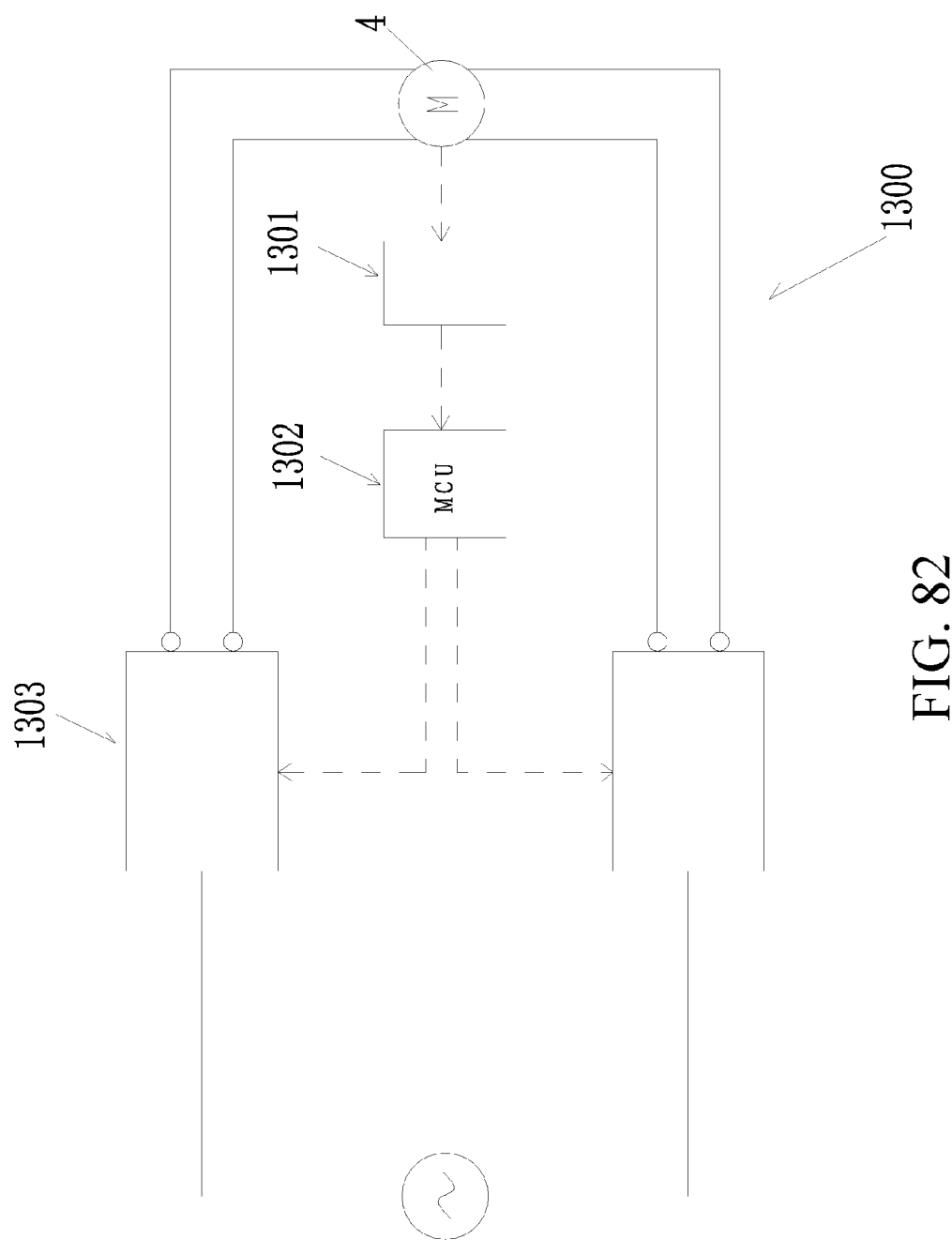
FIG. 82 is a schematic control diagram of the control circuit in FIG. 81.

The following are two different embodiments. In a first embodiment, as shown in FIG. 81 and FIG. 82, a blowing-suction device 1 can automatically detect that an air flow is blocked and controls a fan to change a rotation direction, so as to achieve unblocking. In this embodiment, the blowing-suction device 1 has a control circuit 1300 electrically connected to a motor 4. The control circuit 1300 may automatically detect a blocking case in a suction mode and correspondingly control a rotation direction of the motor 4. Specifically, the control circuit 1300 includes a detection unit 1301 for detecting an operational parameter of the motor 4; a processing unit 1302 that generates a processing instruction according to a detection result; and an execution unit 1303 that switches the rotation direction of the fan between a first direction and a second direction according to the processing instruction When the blowing-suction device 1 normally works in the suction mode, the motor 4 is in a stable working state, that is, the operational parameter of the motor 4 is normal. The detection unit 1301 can detect that the operational parameter in this case is in a normal working state, it indicates that the blowing-suction device 1 normally works in this case. When the blowing-suction device 1 is blocked, the operational parameter of the motor 4 is abnormal. If the detection unit 1301 detects the abnormal operational parameter, it indicates that the blowing-suction device 1 may be blocked, a corresponding action needs to be performed to troubleshoot the blocking. The operational parameter may be any parameter characterizing whether the motor normally works, for example, a voltage, a current, a rotational speed, or the like of the motor. In this embodiment, the detection unit 1301 is a sensor electrically connected to the control circuit 1300, and the detection unit 1301 can detect a working voltage of the motor. When the detection unit 1301 detects that the working voltage keeps in a steady state, it indicates that the blowing-suction device normally works. The detection unit 1301 sends a first detection signal. The first detection signal means that operating of the motor 4 keeps unchanged. When the detection unit 1301 detects that a fluctuation of the working voltage is relatively large, it indicates that a working condition of the motor 4 is abnormal. For example, load of the motor 4 becomes large. This is caused because the blowing-suction device 1 is blocked during suction. Therefore, the detection unit 1301 sends a first detection signal. The first detection signal means that the operating of the current motor 4 needs to be changed. A manner of detecting, by the detection unit 1301, that the fluctuation of the working voltage is relatively large may has two detection ways. One way is that when a change rate of the voltage exceeds a preset value, it is considered that there is a relatively large fluctuation; or when a change rate of the voltage does not exceed a preset value, it is considered that the voltage keeps in a stable state. The preset value may be set in advance. In addition, alternatively, it may be detected that whether the change rate exceeds a preset interval. When the detected change rate of the voltage exceeds the preset interval, it may be considered that there is a relatively large fluctuation; or when the change rate of the voltage is in the preset interval, it may be considered that the voltage keeps in a stable state. Another way is that when a value of the voltage exceeds a preset value, it is considered that there is a relatively large fluctuation; or when a value of the voltage does not exceed a preset value, it is considered that the voltage keeps in a stable state. Certainly, alternatively, it may be detected that whether a value of the voltage exceeds a preset interval, and when the value of the voltage exceeds the preset interval, it is considered that there is a relatively large fluctuation, or when the value of the voltage is in the preset interval, it is considered that the voltage keeps in a stable state. Certainly, in another embodiment, an object detected by the detection unit 1301 may alternatively be a current passing through the motor 4, or a rotational speed of the motor 4. A specific structure of the detection unit 1301 may be a sensor in various manners, such as an inductive sensor, or a Hall effect sensor.

The processing unit 1302 is configured to receive the detection signal of the detection unit and correspondingly sends a processing instruction. In this embodiment, the processing unit 1302 may be a micro control unit (MCU) connected in the control circuit 1300. The MCU has multiple pin interfaces, and these pin interfaces are separately electrically connected to the detection unit 1301 and the execution unit 1303. The detection signal of the detection unit 1301 is transferred to the processing unit 1302 by using the pin the interface. Specifically, when the processing unit 1302 receives the first detection signal, the processing unit 1302 sends a first processing instruction; or when the processing unit 1302 receives a second detection signal, the processing unit 1302 sends a second processing instruction. The first processing instruction or the second processing instruction is also transferred to the execution unit 1303 by using the pin interfaces.

The execution unit 1303 correspondingly performs actions according to various processing instructions. When the execution unit 1303 receives the second processing instruction, the execution unit 1303 keeps the rotation direction of the motor unchanged, so that the rotation direction of the fan driven by the motor keeps unchanged. Therefore, the blowing-suction device 1 still generates an air flow moving from the tube opening 21 to the inside of the housing 14. However, when the execution unit 1303 receives the first processing instruction, the execution unit 1303 changes the rotation direction of the motor, so that the rotation direction of the fan driven by the motor keeps unchanged. Therefore, the blowing-suction device 1 still generates an air flow moving from the inside of a housing 14 to a tube opening 21. In this embodiment, the execution unit 1303 is a switch set. The switch set controllably switches between a first working position and a second working position. Different working positions at which the switch set is located correspond to different rotation direction of the motor. When the second processing instruction is received, the switch set is at the second working position, so that the motor rotates in a forward direction; or when the first processing instruction is received, the switch set is at the first working position, so that the motor rotates in a reverse direction. In another embodiment, the execution unit is multiple switch sets, and each switch set controllably moves between two working positions, so that the multiple switch sets are combined into an integral to form different working states. Different working states correspond to different processing instructions.

Therefore, in this embodiment, the blowing-suction device 1 can automatically detect that the blowing-suction device 1 is blocked, and automatically correspondingly change the rotation direction of the motor 4, so that the blowing-suction device 1 generates an air flow blown out from the tube opening 21 instead of generating an air flow sucked from the tube opening 21. The blowing-suction device 1 is unblocked by using the blown out air flow. A manner of unblocking the blowing-suction device 1 is implemented as follows: when the blowing-suction device 1 is in the suction mode, the fan 3 rotates in the first direction to generate an air flow sucked from the tube opening 21, and the detection unit 6 automatically detects an operating state of the motor 4. If the motor 4 is in a normally working state, the execution unit 1303 keeps the fan 3 to rotate in the first direction. If the blowing-suction device 1 is blocked, and as a result, operating of the motor 4 is abnormally, and the detection unit 6 can detect the abnormal operating of the motor 4, the execution unit 1303 changes the rotation direction of the fan 3 according to the instruction, so that the fan 3 rotates in the second direction to generate an air flow blown out from the tube opening 21. Therefore, a blocking problem is resolved.

In a second embodiment, when a blowing-suction device 1 is blocked, a user may manually change a rotation direction of the motor 4 according to actual experience of the user, so that the blowing-suction device 1 generates an air flow blown out from the tube opening 21 instead of generating an air flow sucked from the tube opening 21. The blowing-suction device 1 is unblocked by using the blown out air flow.

Figure 83:
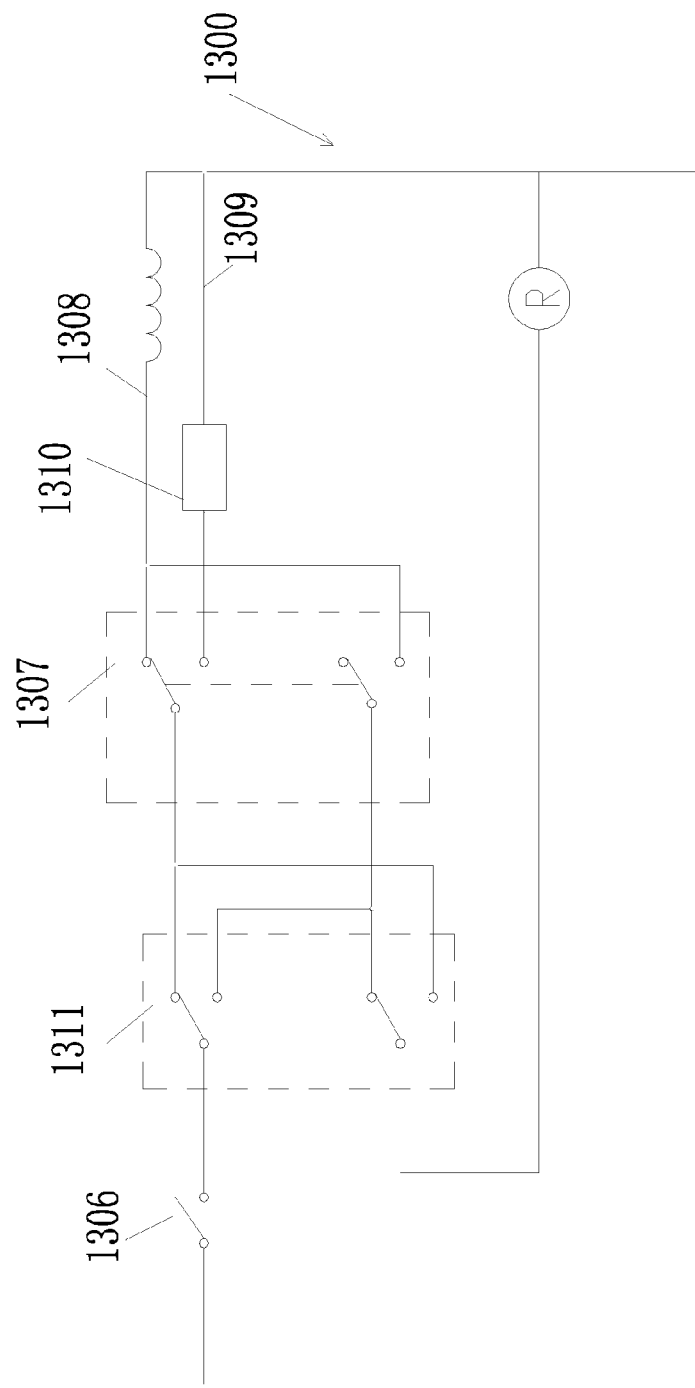
FIG. 83 is a schematic diagram of a control circuit according to a second embodiment of the present invention.

As shown in FIG. 83, in this embodiment, the blowing-suction device 1 includes a control circuit 1300 that controls a fan to rotate in a first direction or a second direction. The control circuit 1300 is provided with a first switch 1306 and a second switch 1307 that are serially connected. The first switch 1306 and the second switch 1307 are located outside of a housing 14, and are operably controlled by a user. In a preferred embodiment, the first switch 1306 and the second switch 1307 may be disposed on a handle of the blowing-suction device 1, so that it is convenient for the user to operate. The first switch 1306 is configured to conduct and cut off the control circuit 1300. When the first switch 1306 is an ON state, the entire control circuit 1300 is conducted. When the first switch 1306 is in an OFF state, the entire control circuit 1300 is cut off, so that the entire blowing-suction device 1 is in a stop state. The second switch 1307 is configured to control a rotation direction of a motor 4, so as to control a rotation direction of the fan 3. The second switch 1307 is operably switched between a first position and a second position. When the second switch 1307 is switched to the first position, the control circuit 1300 enables the fan 3 to rotate in the first direction. When the second switch 1307 is switched to the second position, the control circuit 1300 enables the fan 3 to rotate in the second direction. The second switch 1307 may have different forms. In this embodiment, the second switch 1307 is a double control switch. The control circuit 1300 has a first loop 1308 and second loop 1309 that cooperate with the second switch 1307. One of the first loop 1308 or the second loop 1309 may be selected to be conducted. When the second switch 1307 is moved to the first position by the user, the second switch 1307 conducts the first loop 1308, and the second loop 1309 is in a cut-off state. When the second switch 1307 is moved to the second position by the user, the second switch 1307 conducts the second loop 1309, and the first loop 1308 is in a cut-off state. It should be noted that the control circuit 1300 further includes a circuit control module 1310. The circuit control module 1310 is disposed in the second loop 1309, so that when the second loop 1309 is conducted, the circuit control module 1310 works. A function of the circuit control module 1310 is to decrease a voltage of the second loop 64. Because when the blowing-suction device 1 is blocked, an operator controls the second switch 1307 to conduct the second loop 1309, so that the fan 3 rotates in the second direction, thereby unblocking the blowing-suction device 1 by using an air flow blown out from the fan 3. Because only unblocking of the blowing-suction device 1 needs to be performed, rotational speeds of the fan 3 and the motor 4 do not need to be too high and working time of the fan 3 and the motor 4 do not need to be too long. Therefore, the circuit control module 1310 is disposed to decrease a current and a voltage of the motor 4, so as to protect the motor and prolong the service life. The circuit control module 1310 may have different forms. In an embodiment, the circuit control module 1310 has a voltage step-down circuit. The voltage step-down circuit can decrease the voltage of the motor, so that the motor works in a relatively low power state, thereby protecting the motor. In another embodiment, the circuit control module has a PWM module, to adjust and control the circuit.

In a preferred embodiment, the second switch 1307 further has a resetting structure (not shown in the figure). The resetting structure enables the second switch 1307 to tend to move to the first position. Therefore, under the premise that there is no external force or the operator does not perform an operation, the second switch 1307 is always at the first position. When the operator applies a force to the second switch 1307 to overcome a resetting function of the resetting structure, the second switch 1307 can move from the first position to the second position. Once the user releases the force applied to the second switch 1307, the second switch 1307 automatically resets to the first position. The resetting structure has multiple structure forms. In an embodiment, the resetting structure is an elastic part that enables the second switch to be biased to the first position.

A manner of unblocking the blowing-suction device is implemented as follows: when the blowing-suction device is in a suction mode, the second switch 1307 is at the first position, so that the fan 3 rotates to generate an air flow sucked from the tube opening; or when an operator finds that the air tube 2 is blocked, a pressing operation manner is preferably used to operate the second switch, so that the second switch is moved from the first position to the second position. When the second switch 1307 is moved to the second position, the fan 3 changes a rotation direction to generate an air flow blown out from the tube opening 21, and the blown out air flow may blow out blockages such as leaves and dust that are blocked in the blowing-suction device 1 from the tube opening 21, so that a problem that the air tube 2 is blocked is resolved. When the operator finds that the problem that the air tube 2 is blocked is resolved, the operator releases a force applied to the second switch 1307, so that the second switch 1307 automatically resets to the first position under action of the resetting structure. Therefore, the fan 3 is changed to an initial rotation direction and generates an air flow sucked from the tube opening 21. Certainly, if no resetting structure is disposed in the second switch 1307, implementation of the present invention is not affected. This still falls within the scope of the present invention.

In a preferred embodiment, as shown in FIG. 83, the control circuit further includes a third switch 1311 serially connected to the first switch 1306 and the second switch 1307. The third switch 1311 is configured to control the blowing-suction device 1 to switch between a blowing mode and the suction mode. When the third switch 1311 is at a first working position, the blowing-suction device 1 is in the blowing mode; or when the third switch 1311 is at a second working position, the blowing-suction device 1 is in the suction mode. Specifically, the third switch 1311 is disposed inside of the blowing-suction device 1. The third switch 1311 is triggered by a trigger part to move between the first working position and the second working position. Therefore, an additional manual control operation performed by the operator does not required. Only when the third switch 1311 is only at the second working position, that is, only when the blowing-suction device is in the suction mode, the second switch 1307 can be moved by the user.

The foregoing embodiments only describe several implementations of the present invention, and their description is specific and detailed, but cannot therefore be understood as a limitation to the patent scope of the present invention. It should be pointed out that a person of ordinary skill in the art can make modifications and improvements without departing from the idea of the present invention and these modifications and improvements all belong to the protection scope of the present invention.

What is claimed is:

1. A blowing-suction device that operably works in a blowing mode or a suction mode, wherein the blowing-suction device comprises:
    a housing, having a first opening;
    an air tube, connected to the housing and having a tube opening;
    an air flow generation apparatus disposed in the housing and operably generates an air flow, the air flow generation apparatus comprising a fan having a fan axis and a motor configured to rotate the fan;
    a collection apparatus configured to collect an object sucked by the blowing-suction device in the suction mode, the collection apparatus connected to the first opening when the device is in the blowing mode and the suction mode; and
    an air admission portion configured to be open when the device is in the blowing mode and closed when the device is in the suction mode;
    wherein the collection apparatus further has an operation portion that controls the air admission portion; in the blowing mode, the operation portion opens the air admission portion, and air passes through the air admission portion; or in the suction mode, the operation portion closes the air admission portion, and air cannot pass through the air admission portion;
    the collection apparatus further comprising a collection portion; the collection portion can move relative to the air admission portion; and in the suction mode, the air admission portion is accommodated in the collection portion; or in the blowing mode, the collection portion is moveable relative to the air admission portion and the air admission portion is exposed for communication with the air flow;
    wherein, the blowing-suction device is configurable between the blowing mode, wherein air flow enters the first opening and is blown out from the tube opening, and the suction mode, wherein, the air flow is sucked from the tube opening and exhausted from the first opening;

wherein, a length of the air tube is coaxial with the fan axis.

2. The blowing-suction device according to claim 1, wherein the collection apparatus comprises a pivotal shaft that connects to the collection portion and the air admission portion, so that the collection portion rotates around the pivotal shaft.

3. The blowing-suction device according to claim 1, wherein the operation portion is a handle installed on the collection portion.

4. The blowing-suction device according to claim 1, wherein the air admission portion is provided with an air intake hole.

5. A blowing-suction device that operably works in a blowing mode or a suction mode, wherein the blowing-suction device comprises:
   a housing, having a first opening;
   an air tube, connected to the housing and having a tube opening;
   an air flow generation apparatus disposed in the housing and operably generates an air flow, the air flow generation apparatus comprising a fan having a fan axis and a motor configured to rotate the fan;
   a collection apparatus configured to collect an object sucked by the blowing-suction device in the suction mode, the collection apparatus connected to the first opening when the device is in the blowing mode and the suction mode; and
   an air admission portion configured to be open when the device is in the blowing mode and closed when the device is in the suction mode;
   wherein, the blowing-suction device is configurable between the blowing mode, wherein air flow enters the first opening and is blown out from the tube opening, and the suction mode, wherein, the air flow is sucked from the tube opening and exhausted from the first opening,
   wherein, a length of the air tube is coaxial with the fan axis;
   wherein the collection apparatus further has an operation portion that controls the air admission portion; in the blowing mode, the operation portion opens the air admission portion, and air passes through the air admission portion; or in the suction mode, the operation portion closes the air admission portion, and air cannot pass through the air admission portion;
   wherein the collection apparatus comprises a collection main body configured for collection; the air admission portion is a notch provided on the collection main body; and in the suction mode, the notch is blocked by the operation portion; or in the blowing mode, the operation portion moves, so that the notch is open.

6. The blowing-suction device according to claim 5, wherein the notch is formed by two intersected barrier walls on the collection main body, and the operation portion is a wedge-shaped three-dimensional structure that can be inserted into the notch.

7. The blowing-suction device according to claim 6, wherein the wedge-shaped three-dimensional structure has an inclined surface and a bottom surface that correspond to the barrier walls, and a ventilation structure is provided on the inclined surface and the bottom surface.

8. The blowing-suction device according to claim 5, wherein the notch is provided on a surface of the collection main body, and the operation portion is a cover that operably opens or closes the notch.

9. The blowing-suction device according to claim 8, wherein the cover opens or closes the notch in a translation manner, and the blowing-suction device has a guide mechanism that guides the cover to move.

10. The blowing-suction device according to claim 8, wherein the cover opens or closes the notch in a pivoting manner, the blowing-suction device has a pivotal shaft, and the cover is rotatably connected to the pivotal shaft.

* * * * *